US010846151B2

(12) United States Patent
Guereca-Pinuelas et al.

(10) Patent No.: US 10,846,151 B2
(45) Date of Patent: **\*Nov. 24, 2020**

(54) NOTIFYING ENTITIES OF RELEVANT EVENTS REMOVING PRIVATE INFORMATION

(71) Applicant: Banjo, Inc., South Jordan, UT (US)

(72) Inventors: Armando Guereca-Pinuelas, Cottonwood Heights, UT (US); Damien Patton, Park City, UT (US); Christian Gratton, Las Vegas, NV (US)

(73) Assignee: safeXai, Inc., Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/850,172

(22) Filed: Apr. 16, 2020

(65) Prior Publication Data

US 2020/0264940 A1  Aug. 20, 2020

Related U.S. Application Data

(63) Continuation-in-part of application No. 16/751,105, filed on Jan. 23, 2020, which is a continuation of application No. 16/536,452, filed on Aug. 9, 2019, now Pat. No. 10,585,724, which is a
(Continued)

(51) Int. Cl.
*G06F 9/54* (2006.01)
*G08B 21/18* (2006.01)
*G08B 21/04* (2006.01)

(52) U.S. Cl.
CPC ......... *G06F 9/542* (2013.01); *G08B 21/0423* (2013.01); *G08B 21/182* (2013.01)

(58) Field of Classification Search
None
See application file for complete search history.

(56) References Cited

U.S. PATENT DOCUMENTS

| 8,782,041 | B1 | 7/2014 | Daniel |
| 8,830,054 | B2 | 9/2014 | Weiss |
| 9,159,030 | B1 | 10/2015 | Maennel |

(Continued)

OTHER PUBLICATIONS

Office Action received in U.S. Appl. No. 16/536,452, dated Nov. 4, 2019, 21 pages.
(Continued)

*Primary Examiner* — Umut Onat
(74) *Attorney, Agent, or Firm* — Dodd Law Group, LLC; Michael B. Dodd

(57) ABSTRACT

The present invention extends to systems and methods for notifying entities of relevant events notifying entities of relevant events removing private information. A privacy infrastructure can apply data privacy operations to user information prior to, during, or after any of signal ingestion, event detection, or event notification. An entity defines a rule formula that is triggered when one or more detected events match the rule formula including defining one or more event types and one or more locations types. One or more events are detected. User information is detected in one of the events. The privacy infrastructure applies a data privacy operation on the user information. It is determined that the one or events satisfies the rule formula subsequent to applying the data privacy operation.

30 Claims, 51 Drawing Sheets

Related U.S. Application Data continuation-in-part of application No. 16/353,212, filed on Mar. 14, 2019, now Pat. No. 10,423,688.

(60) Provisional application No. 62/657,695, filed on Apr. 13, 2018, provisional application No. 62/657,705, filed on Apr. 13, 2018, provisional application No. 62/660,934, filed on Apr. 20, 2018, provisional application No. 62/660,924, filed on Apr. 20, 2018, provisional application No. 62/660,929, filed on Apr. 20, 2018, provisional application No. 62/664,001, filed on Apr. 27, 2018, provisional application No. 62/667,616, filed on May 7, 2018, provisional application No. 62/669,540, filed on May 10, 2018, provisional application No. 62/686,791, filed on Jun. 19, 2018, provisional application No. 62/859,941, filed on Jun. 11, 2019.

(56) References Cited

U.S. PATENT DOCUMENTS

| | | |
|---|---|---|
| 9,215,252 B2 | 12/2015 | Smith et al. |
| 9,443,002 B1 | 9/2016 | Freese et al. |
| 9,544,438 B1 * | 1/2017 | Andraszek ............... G10L 21/06 |
| 9,727,882 B1 | 8/2017 | Huntwork et al. |
| 9,894,169 B2 | 2/2018 | Sheinfeld |
| 10,057,349 B2 | 8/2018 | Kodner et al. |
| 10,212,572 B1 | 2/2019 | Patton et al. |
| 10,257,058 B1 | 4/2019 | Leung et al. |
| 10,261,846 B1 | 4/2019 | Patton et al. |
| 10,268,642 B1 | 4/2019 | Leung et al. |
| 10,268,660 B1 | 4/2019 | Arazi |
| 10,423,688 B1 * | 9/2019 | Patton ................. G06F 16/9535 |
| 10,585,724 B2 * | 3/2020 | Patton ................. G08B 21/0423 |
| 10,691,512 B1 * | 6/2020 | Patton ..................... G06F 9/542 |
| 2002/0055924 A1 | 5/2002 | Liming |
| 2002/0154178 A1 | 10/2002 | Barnett et al. |
| 2006/0235833 A1 | 10/2006 | Smith et al. |
| 2011/0211737 A1 | 9/2011 | Krupka et al. |
| 2011/0224807 A1 | 9/2011 | Murakami et al. |
| 2012/0131139 A1 | 5/2012 | Siripurapu et al. |
| 2013/0018896 A1 | 1/2013 | Fleischman et al. |
| 2013/0166385 A1 | 6/2013 | Russell |
| 2013/0214925 A1 | 8/2013 | Weiss |
| 2013/0222133 A1 | 8/2013 | Schultz et al. |
| 2013/0293378 A1 * | 11/2013 | Aninye ............... G08B 21/0423 340/539.13 |
| 2013/0346414 A1 * | 12/2013 | Smith ..................... G06F 16/48 707/741 |
| 2014/0067951 A1 | 3/2014 | Sheinfeld |
| 2014/0085328 A1 | 3/2014 | Codella et al. |
| 2014/0095425 A1 | 4/2014 | Sipple |
| 2014/0149305 A1 | 5/2014 | Aziz et al. |
| 2014/0295885 A1 | 10/2014 | Marko et al. |
| 2014/0304262 A1 | 10/2014 | Makki |
| 2014/0351046 A1 | 11/2014 | Carlyle et al. |
| 2015/0145662 A1 | 5/2015 | Barfield et al. |
| 2015/0234570 A1 | 8/2015 | Hampson et al. |
| 2015/0331856 A1 | 11/2015 | Choi et al. |
| 2015/0348591 A1 | 12/2015 | Kaps et al. |
| 2016/0210367 A1 | 7/2016 | Yamada et al. |
| 2016/0371957 A1 * | 12/2016 | Ghaffari ............... G01M 3/2807 |
| 2017/0011053 A1 | 1/2017 | Hubbard et al. |
| 2017/0075749 A1 | 3/2017 | Ambichl et al. |
| 2017/0075995 A1 | 3/2017 | Fleischman et al. |
| 2017/0076217 A1 | 3/2017 | Krumm et al. |
| 2017/0098181 A1 | 4/2017 | Herman et al. |
| 2017/0142200 A1 | 5/2017 | Kodner |
| 2017/0262697 A1 | 9/2017 | Kaps et al. |
| 2017/0279957 A1 | 9/2017 | Abramson et al. |
| 2017/0286621 A1 | 10/2017 | Cox et al. |
| 2018/0097762 A1 | 4/2018 | Garcia et al. |
| 2018/0146354 A1 | 5/2018 | Patel et al. |
| 2018/0151174 A1 | 5/2018 | Lee et al. |
| 2018/0157700 A1 | 6/2018 | Roberts et al. |
| 2018/0199179 A1 | 7/2018 | Rauner |
| 2018/0225687 A1 | 8/2018 | Ahmed et al. |
| 2018/0287797 A1 | 10/2018 | Banerjee et al. |
| 2019/0068784 A1 | 2/2019 | Reddy et al. |
| 2019/0082044 A1 | 3/2019 | Melendez et al. |

OTHER PUBLICATIONS

Office Action received in U.S. Appl. No. 16/836,237, dated Jun. 16, 2020, 24 pages.

Sheikh et al. "Quality-of-context and its use for protecting privacy in context aware systems." JSW 3.3, Mar. 2008; 11 pages.

Lin et al. "Semantics-preserving hashing for cross-view retrieval." Proceedings of the IEEE conference on computer vision and pattern recognition; 2015; 9 pages.

Non-Final OA issued in U.S. Appl. No. 16/570,672 , dated Dec. 6, 2019, 17 pages.

Non-Final OA issued in U.S. Appl. No. 16/751,105 , dated Mar. 19, 2020, 13 pages.

Non-Final OA issued in U.S. Appl. No. 16/871,572 , dated Jul. 8, 2020, 17 pages.

Non-Final OA issued in U.S. Appl. No. 16/394,620, dated Jun. 12, 2019, 25 pages.

Non-Final OA issued in U.S. Appl. No. 16/396,454, dated Jun. 28, 2019, 14 pages.

Non-Final OA issued in U.S. Appl. No. 16/379,401, dated May 15, 2019, 22 pages.

Non-Final OA issued in U.S. Appl. No. 16/287,035, dated Apr. 15, 2019, 23 pages.

Non-Final OA issued in U.S. Appl. No. 16/374,939, dated Jun. 25, 2019, 9 pages.

Non-Final OA issued in U.S. Appl. No. 16/388,570, dated May 14, 2019, 11 pages.

Non-Final OA issued in U.S. Appl. No. 16/353,212 , dated May 30, 2019, 17 pages.

* cited by examiner

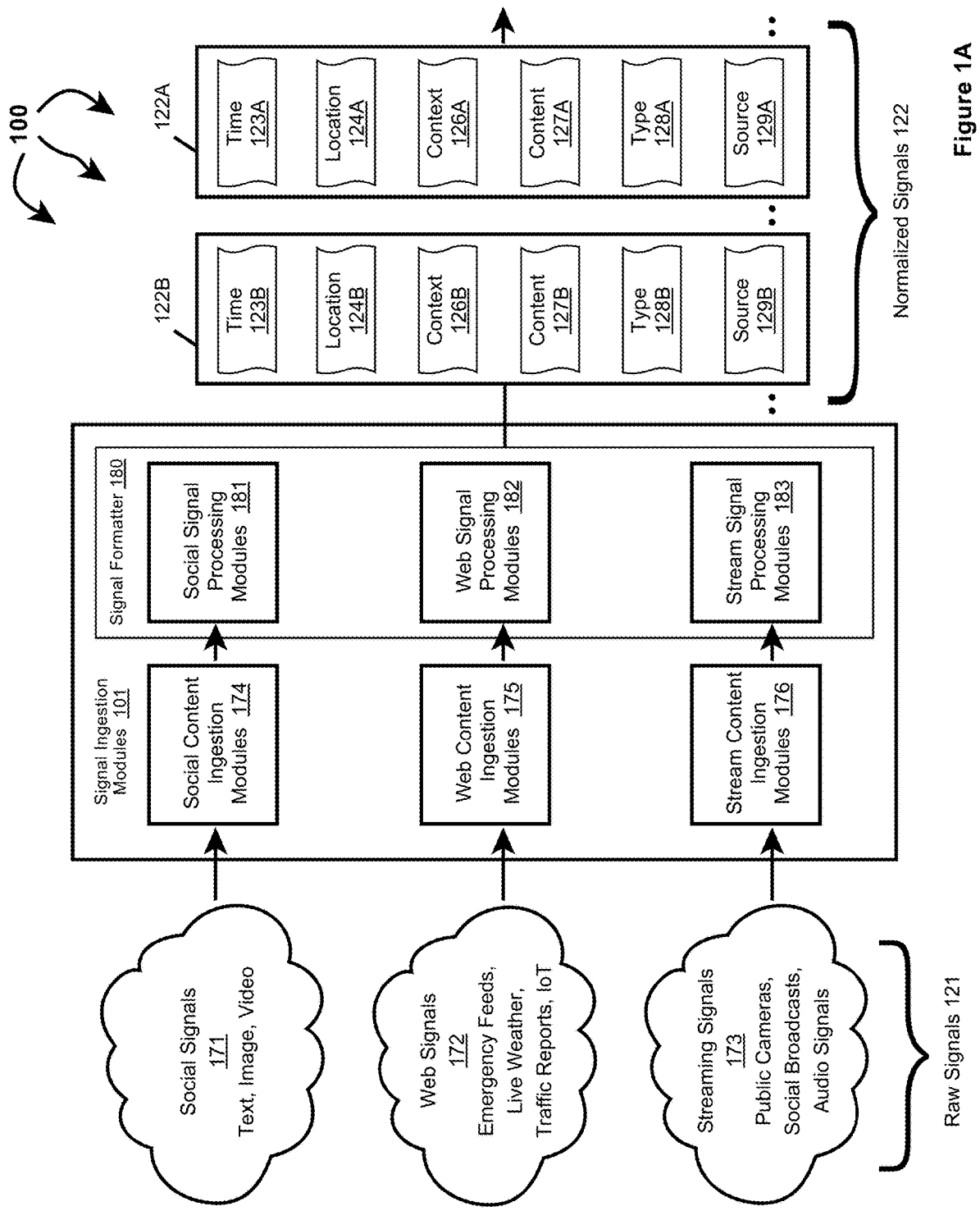

```
┌─────────────────────────────────────────────────────────────────────────┐
│ RECEIVING A NORMALIZED SIGNAL INCLUDING SIGNAL CHARACTERISTICS INCLUDING A│
│ SIGNAL TYPE, A SIGNAL SOURCE, AND SIGNAL CONTENT DETECTING AN EVENT FROM THE│
│                CONTENT OF THE FIRST SIGNAL 1001                         │
└─────────────────────────────────────────────────────────────────────────┘
                                    ↓
┌─────────────────────────────────────────────────────────────────────────┐
│         DETECTING AN EVENT FROM THE CONTENT OF THE NORMALIZED SIGNAL    │
│                                 1002                                    │
└─────────────────────────────────────────────────────────────────────────┘
                                    ↓
┌─────────────────────────────────────────────────────────────────────────┐
│  CALCULATING A LOCATION SEVERITY VALUE, A TIME SEVERITY VALUE, A RESPONSE│
│   SEVERITY VALUE, A CATEGORY SEVERITY VALUE, AND AN IMPACT SEVERITY VALUE BASED│
│  ON A LOCATION, TIME, RESPONSE, CATEGORY, AND IMPACT RESPECTIVELY ASSOCIATED WITH│
│                      THE NORMALIZED SIGNAL 1003                         │
└─────────────────────────────────────────────────────────────────────────┘
                                    ↓
┌─────────────────────────────────────────────────────────────────────────┐
│  CALCULATING A SEVERITY SCORE FOR THE NORMALIZED SIGNAL BASED ON THE LOCATION│
│    SEVERITY VALUE, THE TIME SEVERITY VALUE, THE RESPONSE SEVERITY VALUE, THE│
│       CATEGORY SEVERITY VALUE, AND THE IMPACT SEVERITY VALUE 1004       │
└─────────────────────────────────────────────────────────────────────────┘
                                    ↓
┌─────────────────────────────────────────────────────────────────────────┐
│    CALCULATING AN EVENT SEVERITY RANK FOR THE EVENT FROM THE SEVERITY SCORE│
│                                 1005                                    │
└─────────────────────────────────────────────────────────────────────────┘
                                    ↓
┌─────────────────────────────────────────────────────────────────────────┐
│   SENDING THE EVENT AND THE EVENT SEVERITY RANK TO AN EVENT NOTIFICATION MODULE│
│                                 1006                                    │
└─────────────────────────────────────────────────────────────────────────┘
                                    ↓
┌─────────────────────────────────────────────────────────────────────────┐
│ RECEIVING A SECOND NORMALIZED SIGNAL INCLUDING SECOND SIGNAL CHARACTERISTICS│
│  INCLUDING A SECOND SIGNAL TYPE, A SECOND SIGNAL SOURCE, AND SECOND SIGNAL│
│                               CONTENT                                   │
│                                 1007                                    │
└─────────────────────────────────────────────────────────────────────────┘
                                    ↓
┌─────────────────────────────────────────────────────────────────────────┐
│     DETERMINING THAT THE SECOND NORMALIZED SIGNAL IS ASSOCIATED WITH THE EVENT│
│                                 1008                                    │
└─────────────────────────────────────────────────────────────────────────┘
                                    ↓
┌─────────────────────────────────────────────────────────────────────────┐
│ CALCULATING A SECOND LOCATION SEVERITY VALUE, A SECOND TIME SEVERITY VALUE, A│
│   SECOND RESPONSE SEVERITY VALUE, A SECOND CATEGORY SEVERITY VALUE, AND A│
│ SECOND IMPACT SEVERITY VALUE BASED ON A LOCATION, TIME, RESPONSE, CATEGORY, AND│
│      IMPACT RESPECTIVELY ASSOCIATED WITH THE SECOND NORMALIZED SIGNAL   │
│                                 1009                                    │
└─────────────────────────────────────────────────────────────────────────┘
                                    ↓
┌─────────────────────────────────────────────────────────────────────────┐
│ CALCULATING A SECOND SEVERITY SCORE FOR THE SECOND NORMALIZED SIGNAL BASED ON│
│ THE SECOND LOCATION SEVERITY VALUE, THE SECOND TIME SEVERITY VALUE, THE SECOND│
│  RESPONSE SEVERITY VALUE, THE SECOND CATEGORY SEVERITY VALUE, AND THE SECOND│
│                      IMPACT SEVERITY VALUE 1010                         │
└─────────────────────────────────────────────────────────────────────────┘
                                    ↓
┌─────────────────────────────────────────────────────────────────────────┐
│    CALCULATING AN UPDATED EVENT SEVERITY RANK FOR THE EVENT FROM THE FIRST│
│        SEVERITY SCORE AND THE SECOND SEVERITY SCORE 1011                │
└─────────────────────────────────────────────────────────────────────────┘
                                    ↓
┌─────────────────────────────────────────────────────────────────────────┐
│    SENDING THE EVENT AND THE UPDATED EVENT SEVERITY RANK TO THE EVENT   │
│                     NOTIFICATION MODULE 1012                            │
└─────────────────────────────────────────────────────────────────────────┘
```

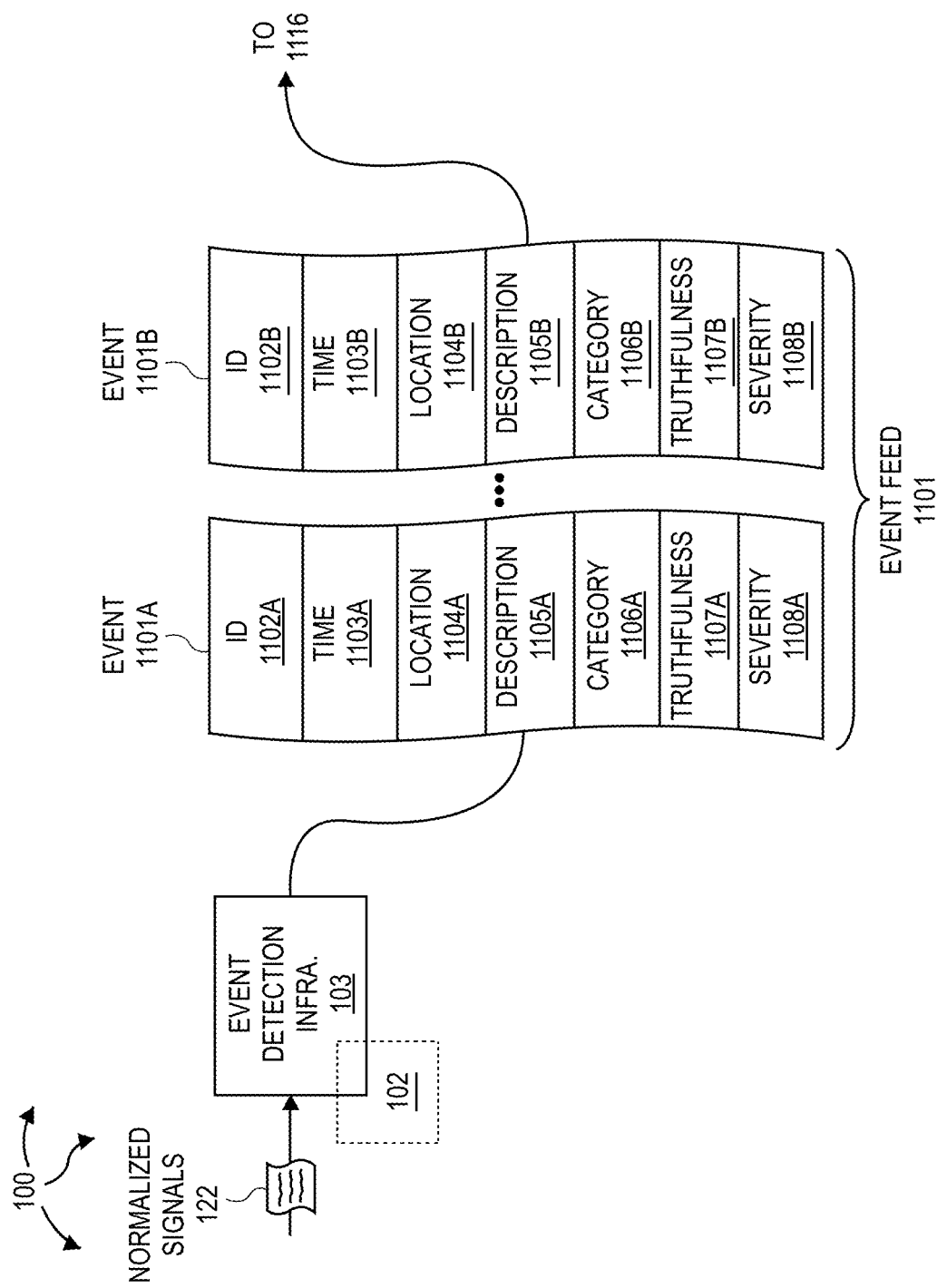

1200

1201
RECEIVING AN EVENT FEED CONTAINING A PLURALITY OF EVENTS, EACH EVENT DETECTED FROM ONE OR MORE NORMALIZED SIGNALS, EACH EVENT INCLUDING AN EVENT LOCATION, AN EVENT CATEGORY, AN EVENT AN EVENT TRUTHFULNESS, AN EVENT SEVERITY, AND AN EVENT TIME

1202
ACCESSING ENTITY NOTIFICATION PREFERENCES DEFINING EVENTS RELEVANT TO AN ENTITY, THE ENTITY NOTIFICATION PREFERENCES INCLUDING CATEGORY PREFERENCES, LOCATION PREFERENCES, DISTANCE PREFERENCES, TRUTH PREFERENCES, SEVERITY PREFERENCES, AND TIME PREFERENCES, THE LOCATION PREFERENCES AND DISTANCE PREFERENCES COLLECTIVELY DEFINING THAT THE ENTITY IS INTERESTED IN EVENTS WITHIN A SPECIFIED DISTANCE OF ONE OR MORE LOCATIONS, THE TIME PREFERENCES DEFINING THAT THE ENTITY DESIRES EVENT NOTIFICATION AT LEAST WITHIN A SPECIFIED TIME PERIOD OF EVENT DETECTION

1203
FOR AN EVENT IN THE EVENT FEED, COMPARING CHARACTERISTICS OF THE EVENT TO THE ENTITY NOTIFICATION PREFERENCES, INCLUDING:

1204
COMPARING THE EVENT LOCATION TO THE LOCATION PREFERENCES IN VIEW OF THE DISTANCE PREFERENCES

1205
COMPARING THE EVENT CATEGORY TO THE CATEGORY PREFERENCES

1206
COMPARING THE EVENT TRUTHFULNESS TO THE TRUTH PREFERENCES

1207
COMPARING THE EVENT SEVERITY TO THE SEVERITY PREFERENCES

1208
DETERMINING THAT THE EVENT SATISFIES THE ENTITY NOTIFICATION PREFERENCES BASED ON THE COMPARISONS

1209
NOTIFYING AN ELECTRONIC DEVICE OF THE EVENT IN COMPLIANCE WITH THE TIME PREFERENCES

1251 RECEIVING AN EVENT FEED CONTAINING A PLURALITY OF EVENTS, EACH EVENT DETECTED FROM ONE OR MORE SIGNALS, EACH EVENT INCLUDING AN EVENT LOCATION, AND EVENT CATEGORY, AN EVENT TRUTHFULNESS, AND EVENT SEVERITY, AND AN EVENT TIME

1252 ACCESSING ENTITY NOTIFICATION PREFERENCES DEFINING EVENTS RELEVANT TO AN ENTITY, THE ENTITY NOTIFICATION PREFERENCES INCLUDING CATEGORY PREFERENCES, LOCATION PREFERENCES, DISTANCE PREFERENCES, TRUTH PREFERENCES, SEVERITY PREFERENCES, AND TIME PREFERENCES, THE LOCATION PREFERENCES AND DISTANCE PREFERENCES COLLECTIVELY INDICATING THAT THE ENTITY IS INTERESTED IN EVENTS WITHIN A SPECIFIED DISTANCE OF AT LEAST ONE OF: THE ENTITY'S CURRENT LOCATION OR THE ENTITY'S PROBABLE FUTURE LOCATION, THE TIME PREFERENCES DEFINING THAT THE ENTITY DESIRES EVENT NOTIFICATION AT LEAST WITHIN A SPECIFIED TIME PERIOD OF EVENT DETECTION

1253 FOR AN EVENT IN THE EVENT FEED, COMPARING CHARACTERISTICS OF THE EVENT TO THE ENTITY NOTIFICATION PREFERENCES, INCLUDING:

1254 ACCESSING ONE OR MORE OF: LOCATION DATA CORRESPONDING TO THE ENTITY OR OTHER LOCATION RELATED DATA CORRESPONDING TO THE ENTITY

1256 DETERMINING THE AT LEAST ONE OF: THE ENTITY'S CURRENT LOCATION OR THE ENTITY'S PROBABLE FUTURE LOCATION FROM THE ONE OR MORE OF: THE LOCATION DATA AND THE OTHER LOCATION RELATED DATA

1257 COMPARING THE EVENT CATEGORY TO THE CATEGORY PREFERENCES

1258 COMPARING THE EVENT TRUTHFULNESS TO THE TRUTH PREFERENCES

1259 COMPARING THE EVENT SEVERITY TO THE SEVERITY PREFERENCES

1261 DETERMINING THAT THE EVENT SATISFIES THE ENTITY NOTIFICATION PREFERENCES BASED ON THE COMPARISONS

1262 NOTIFYING AN ELECTRONIC DEVICE OF THE EVENT IN COMPLIANCE WITH THE TIME PREFERENCES

FIG. 12B

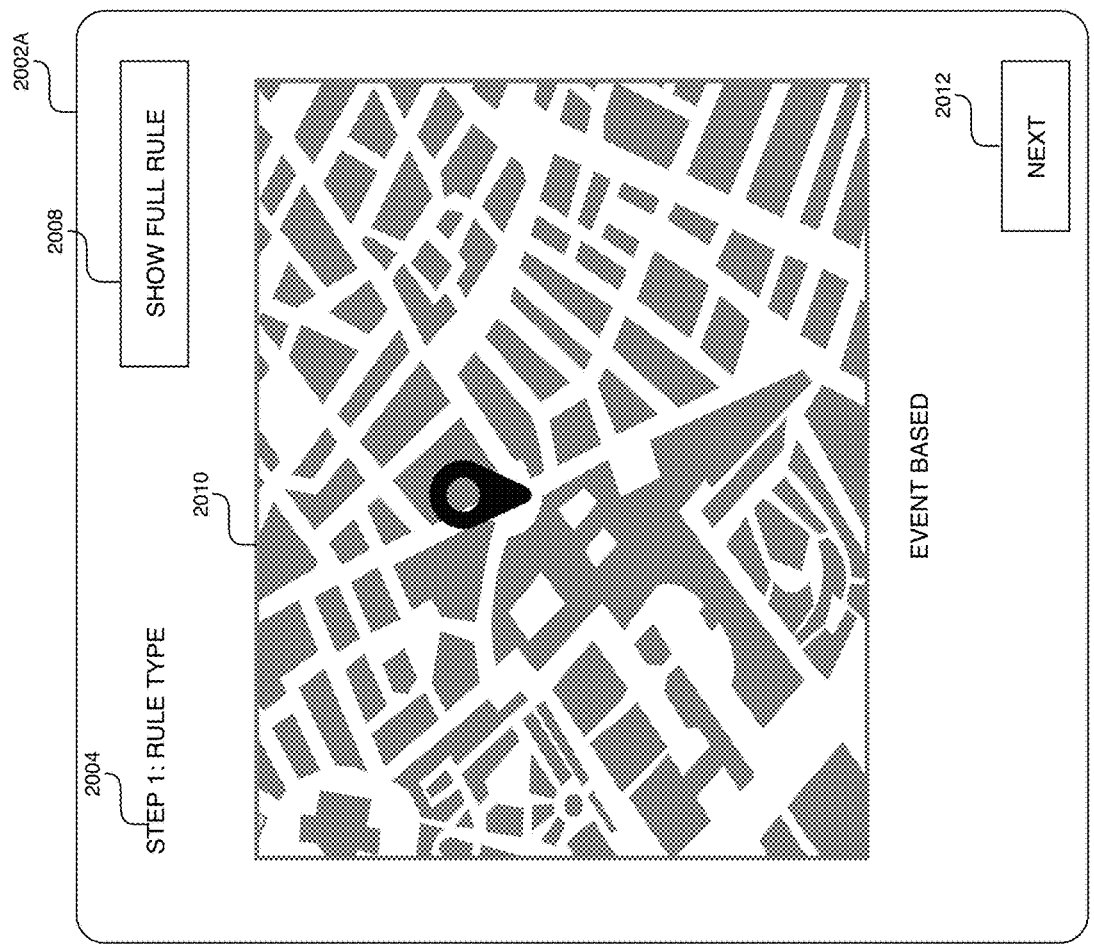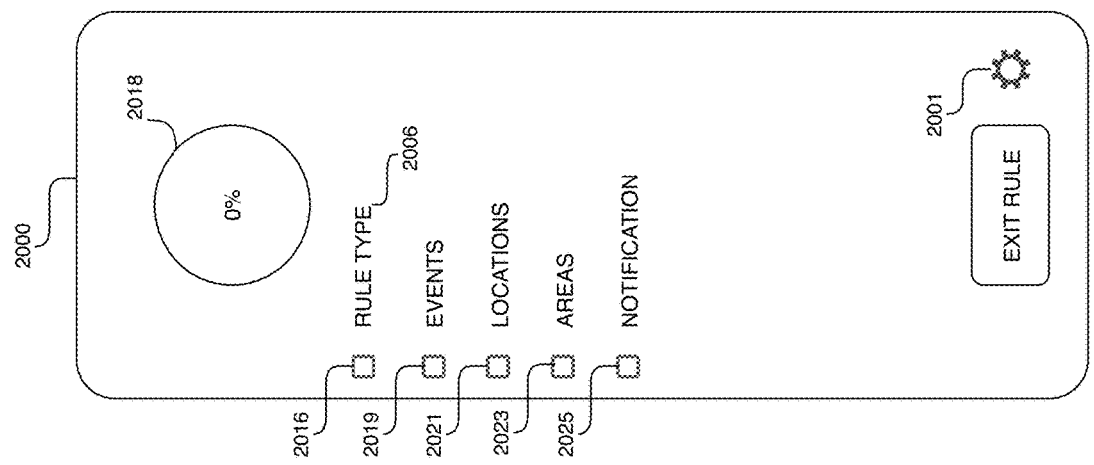
FIG. 20A

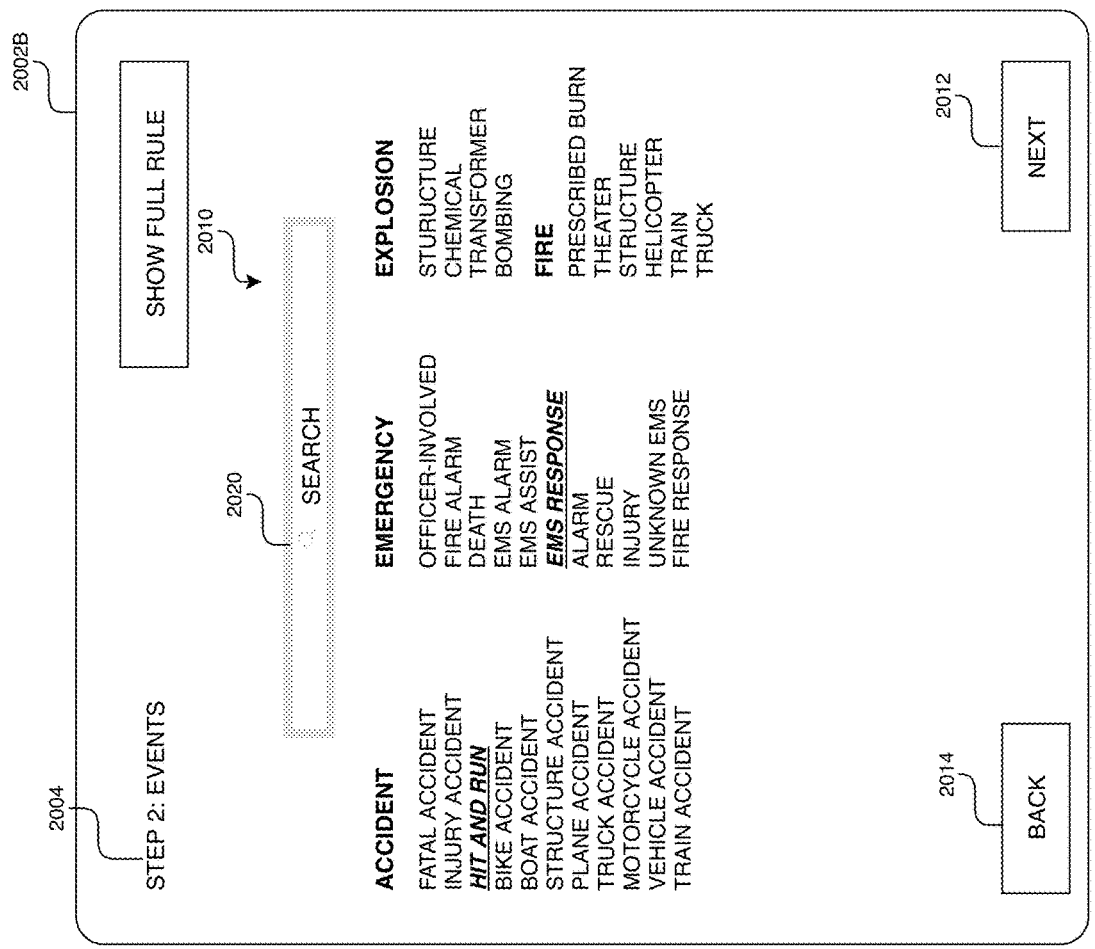
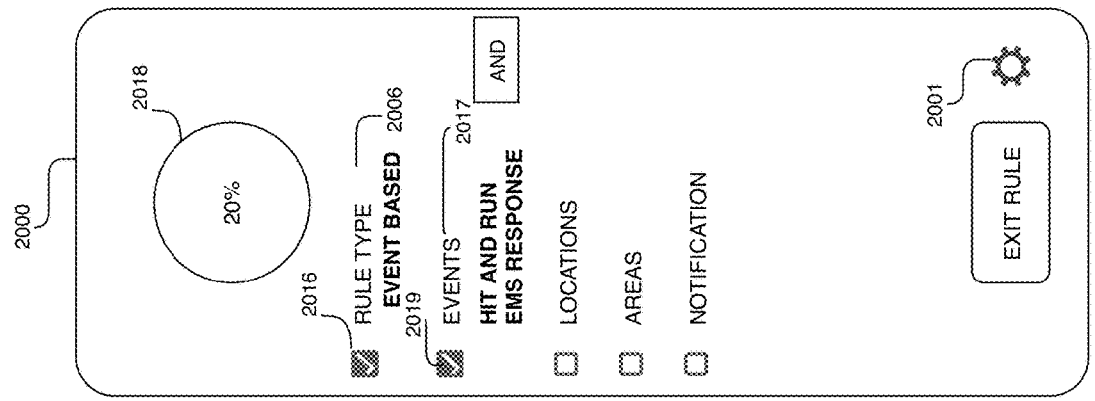
FIG. 20B

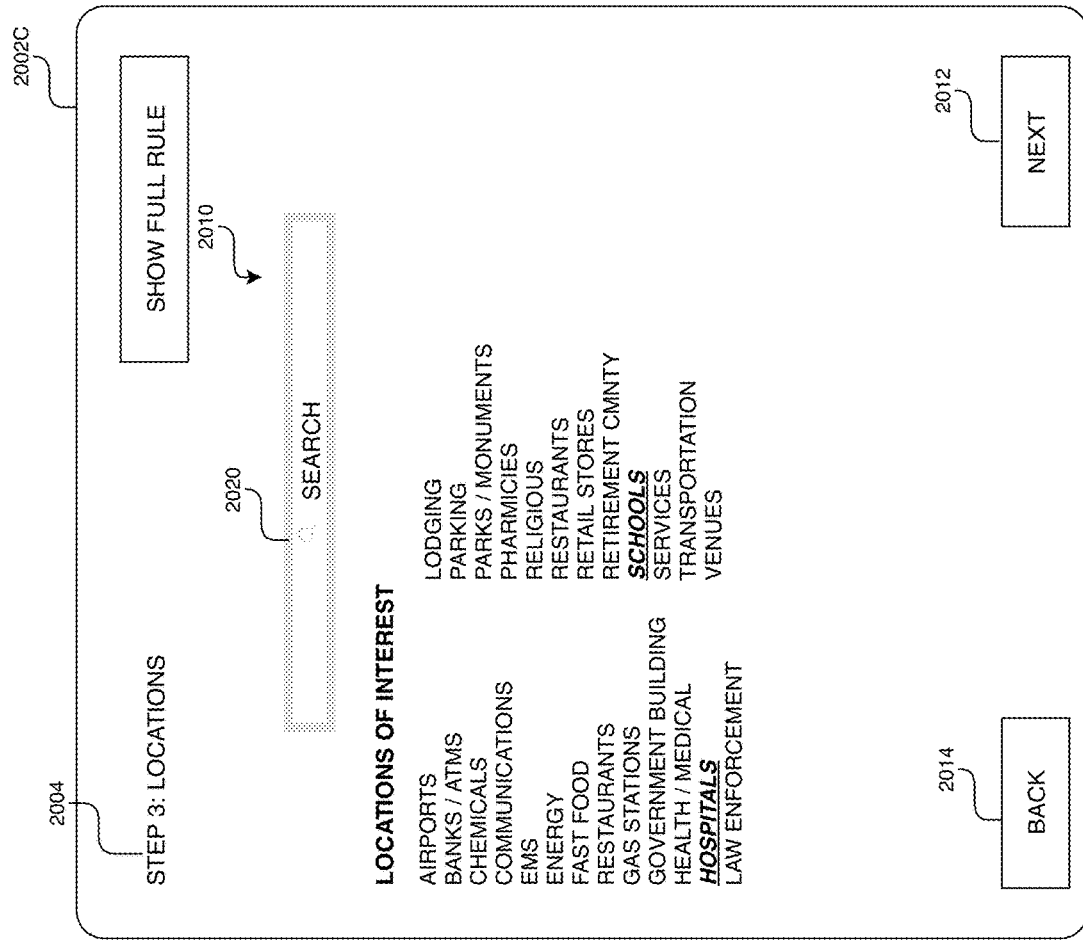
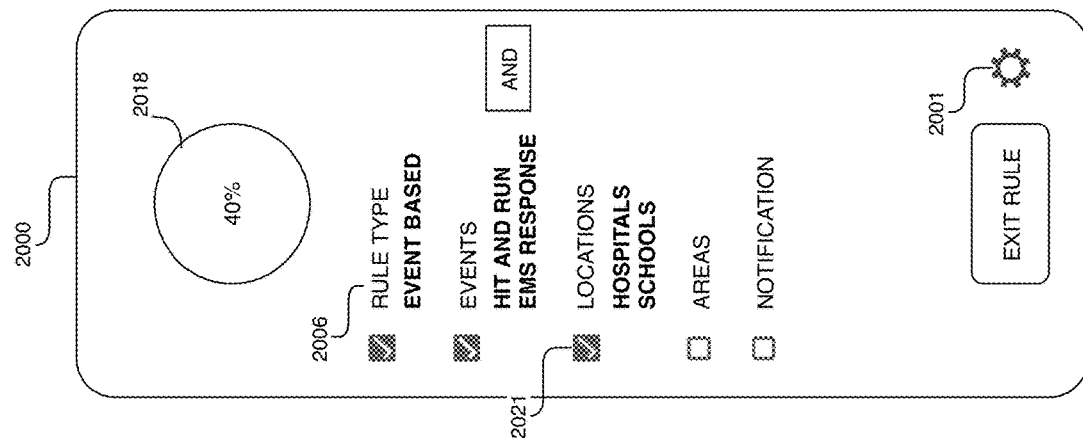
FIG. 20C

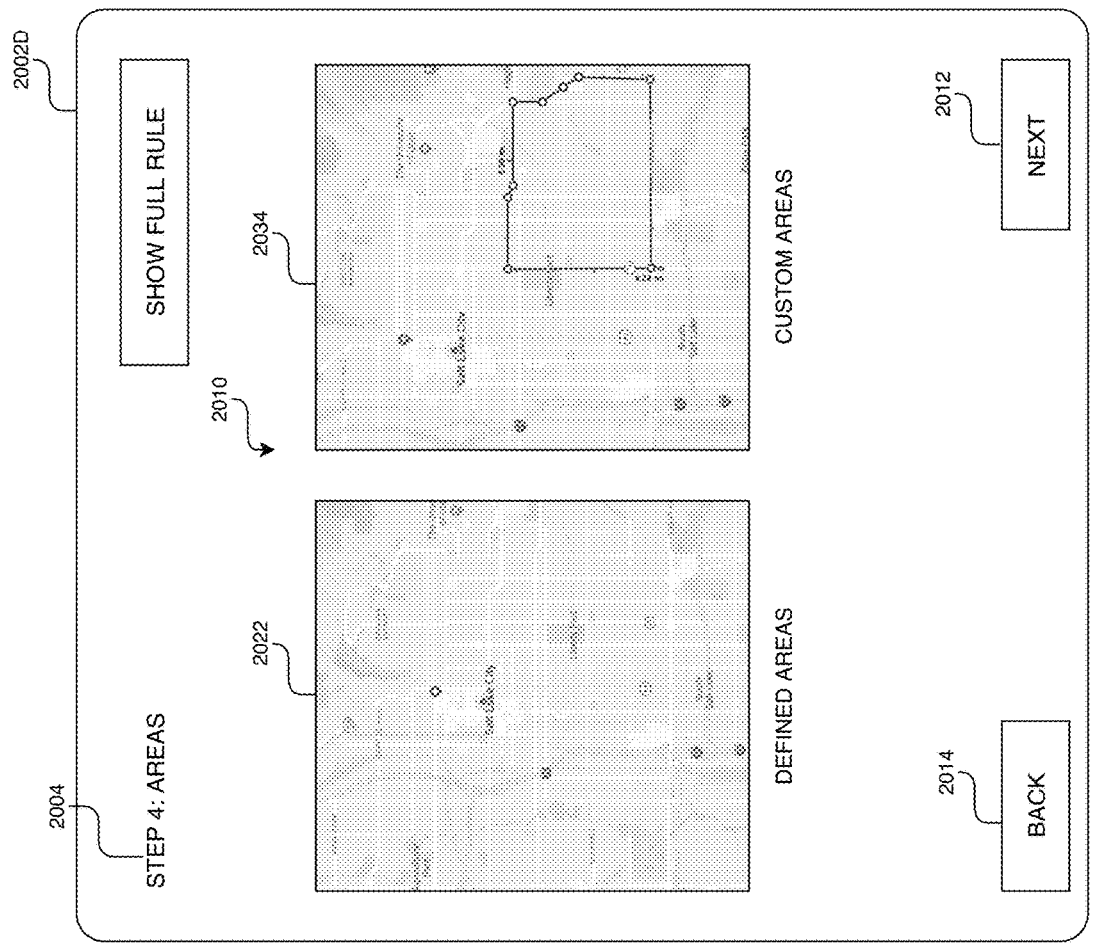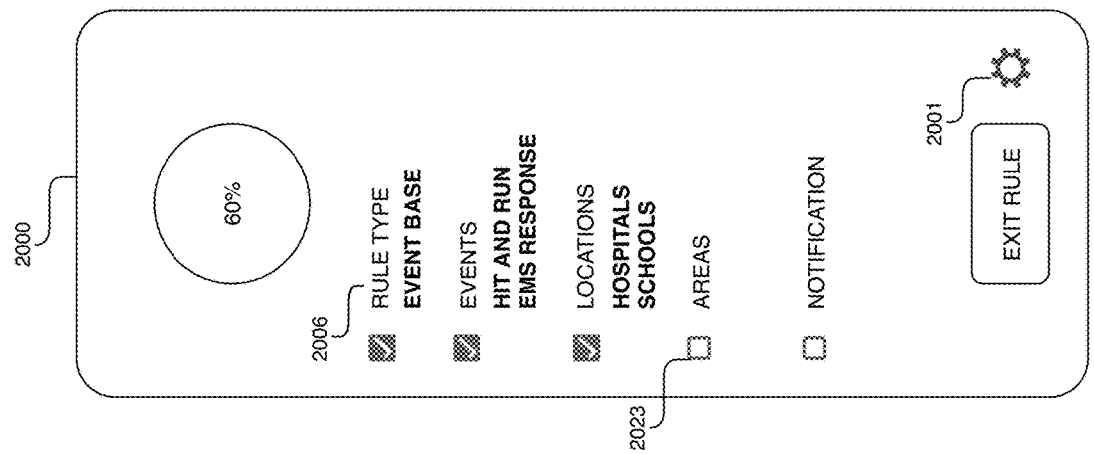
FIG. 20D

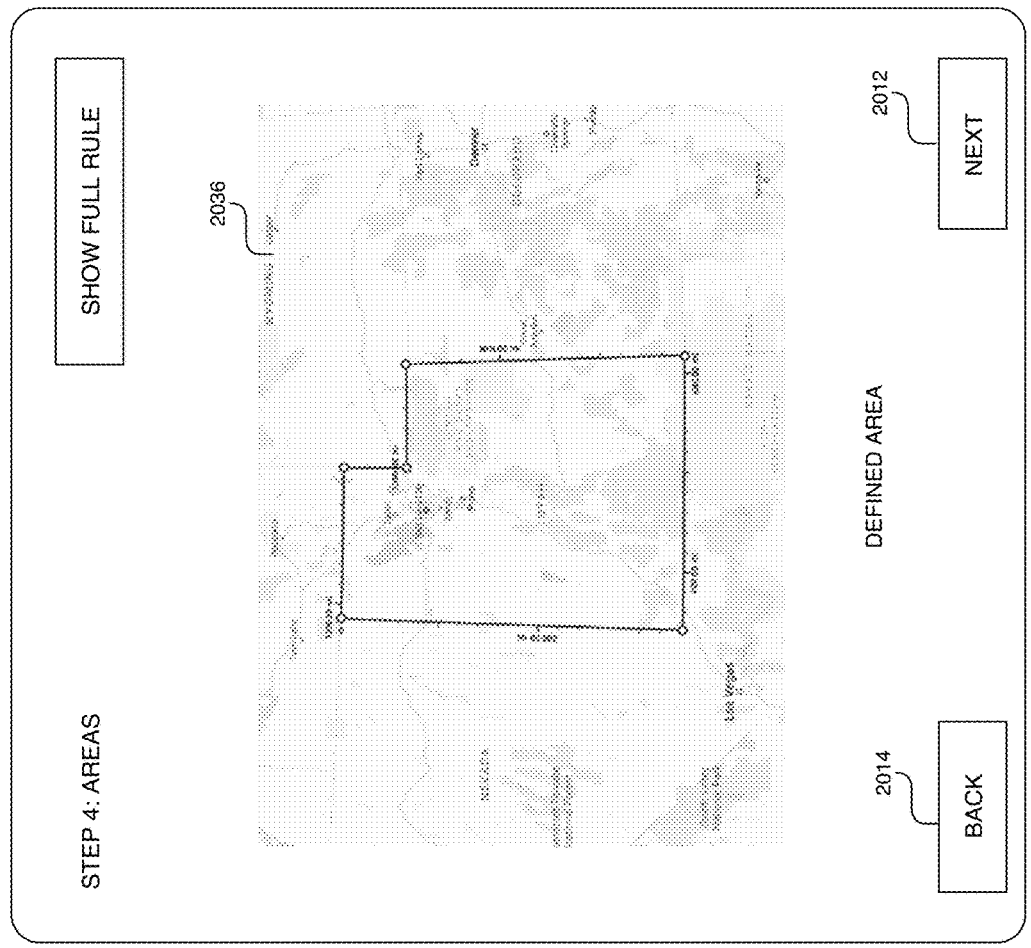
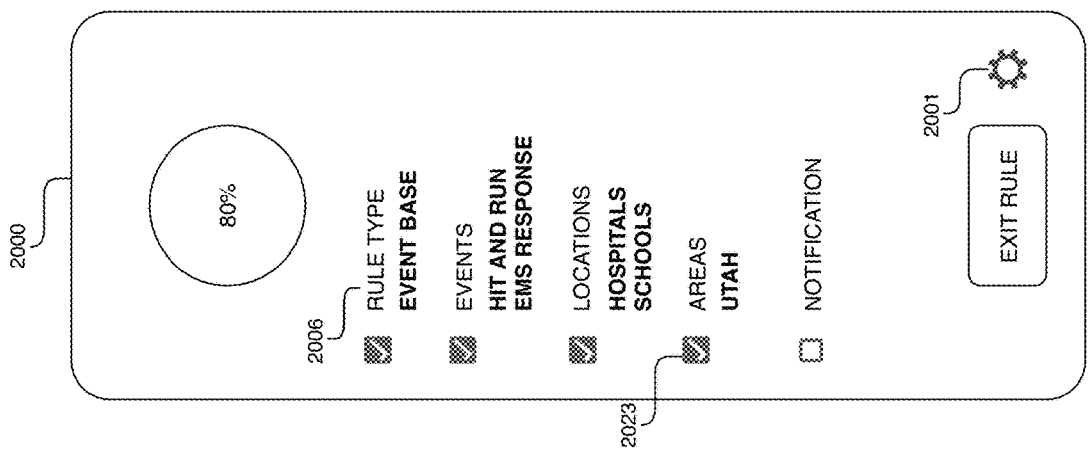
FIG. 20F

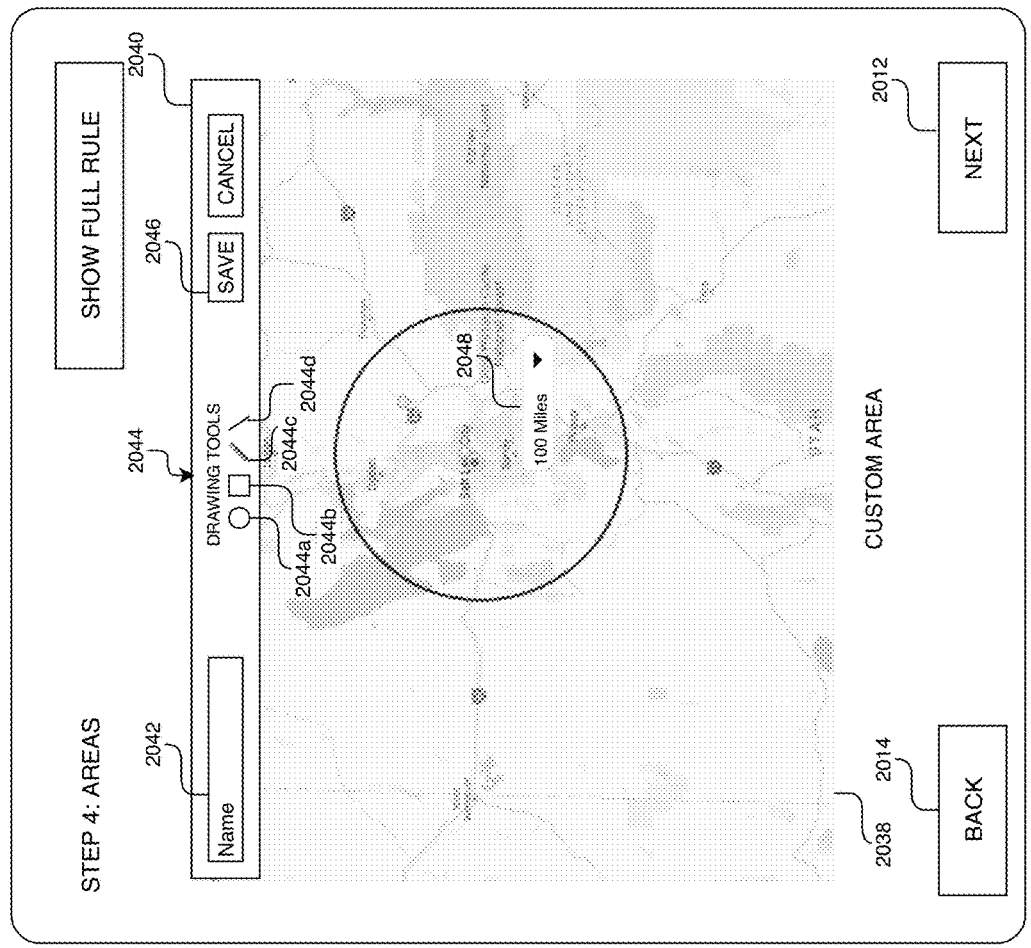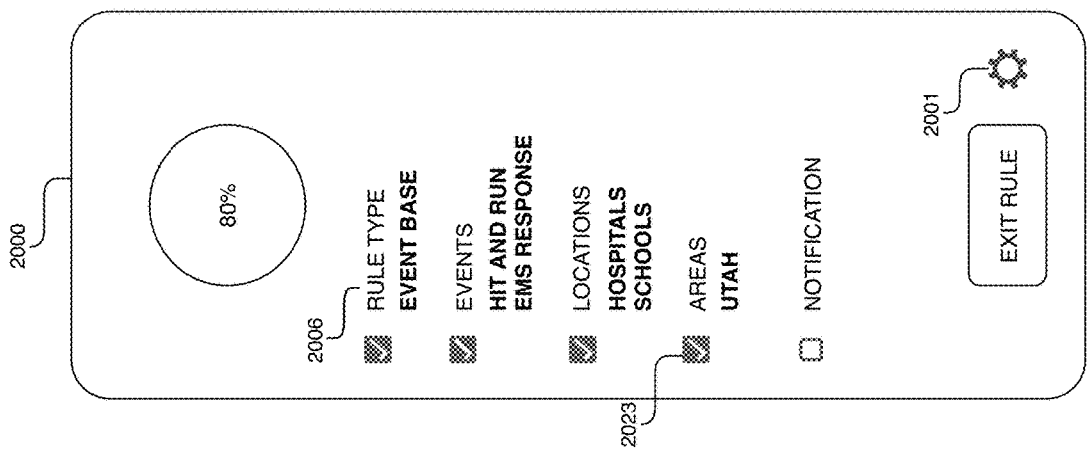
FIG. 20G

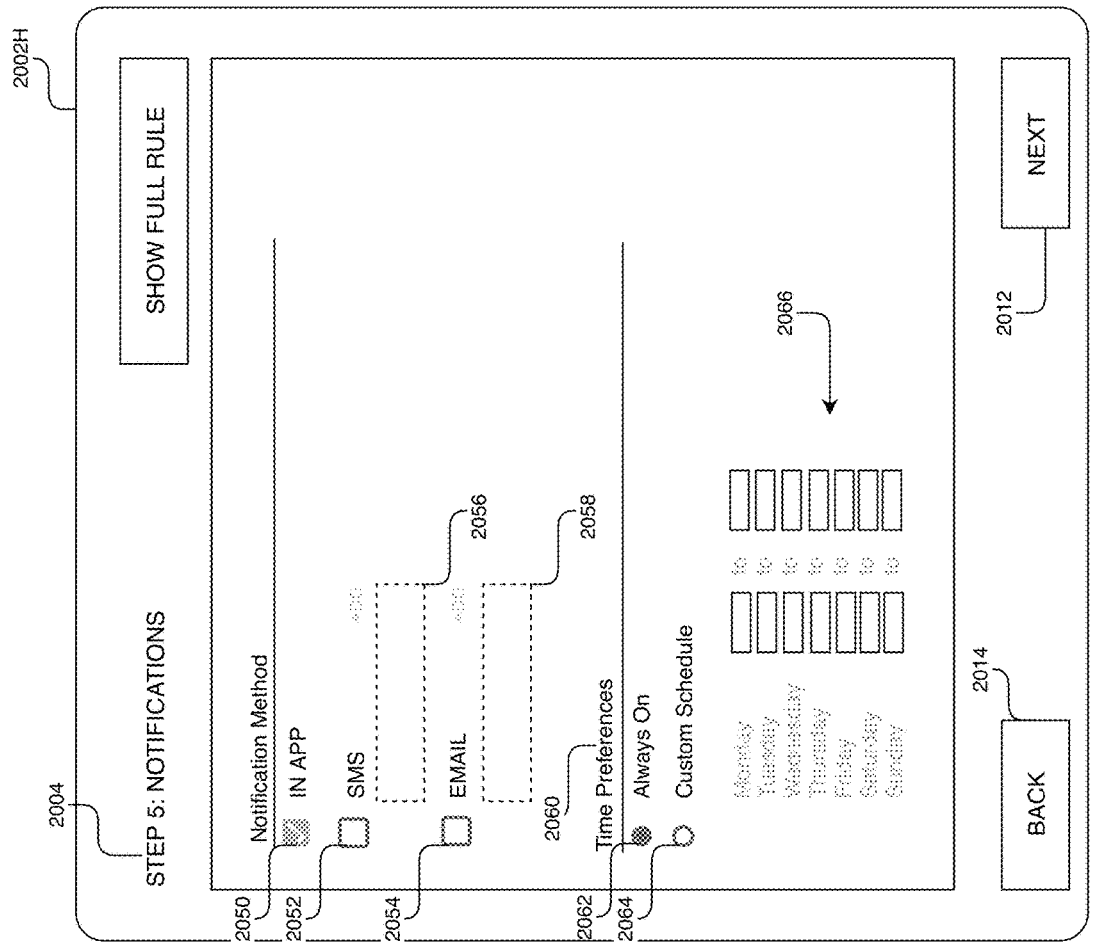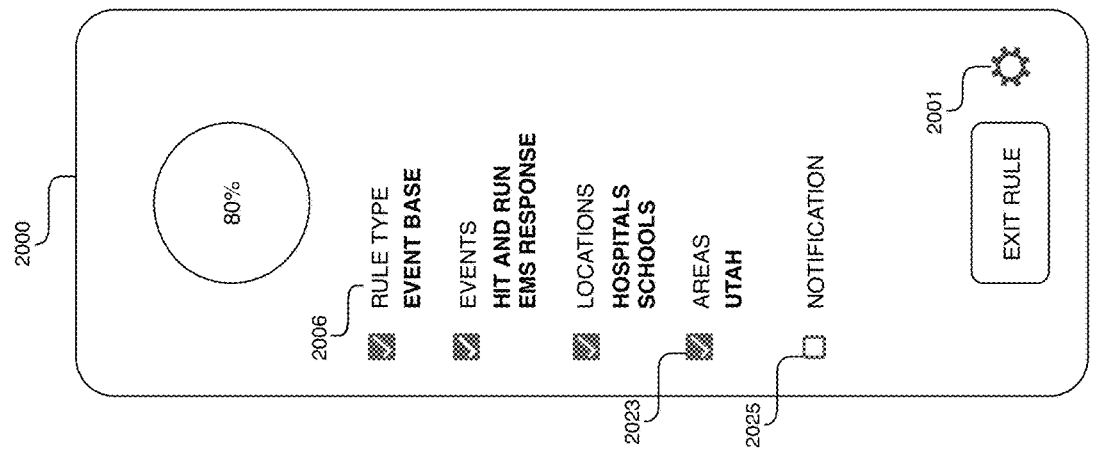
FIG. 20H

NOTIFYING ENTITIES OF RELEVANT EVENTS REMOVING PRIVATE INFORMATION

CROSS-REFERENCE TO RELATED APPLICATIONS

This application is a continuation in part of U.S. patent application Ser. No. 16/751,105, entitled "NOTIFYING ENTITIES OF RELEVANT EVENTS," filed Jan. 23, 2020, which is herein incorporated by reference in its entirety. That Application is a continuation of U.S. patent application Ser. No. 16/536,452, now U.S. Pat. No. 10,585,724, entitled "NOTIFYING ENTITIES OF RELEVANT EVENTS," filed Aug. 9, 2019, which is incorporated herein in its entirety. That Application is a continuation in part of U.S. patent application Ser. No. 16/353,212, now U.S. Pat. No. 10,423,688, entitled "NOTIFYING ENTITIES OF RELEVANT EVENTS," filed Mar. 14, 2019, which is incorporated herein in its entirety.

U.S. patent application Ser. No. 16/353,212 claims the benefit of U.S. Provisional Patent Application Ser. No. 62/657,695, entitled "Event Identification And Notification Based On Entity Selected Event Notification Preferences," filed Apr. 13, 2018, which is incorporated herein in its entirety. U.S. patent application Ser. No. 16/353,212 claims the benefit of U.S. Provisional Patent Application Ser. No. 62/657,705, entitled "Pushing Event Notifications Based On Current or Predicted Entity Location," filed Apr. 13, 2018, which is incorporated herein in its entirety. U.S. patent application Ser. No. 16/353,212 claims the benefit of U.S. Provisional Patent Application Ser. No. 62/660,934, entitled "Event Identification And Notification Based On Entity Selected Event Notification Preferences," filed Apr. 20, 2018, which is incorporated herein in its entirety. U.S. patent application Ser. No. 16/353,212 claims the benefit of U.S. Provisional Patent Application Ser. No. 62/660,924, entitled "Pushing Event Notifications Based On Current or Predicted Entity Location," filed Apr. 20, 2018, which is incorporated herein in its entirety. U.S. patent application Ser. No. 16/353,212 claims the benefit of U.S. Provisional Patent Application Ser. No. 62/660,929, entitled "Determining Event Truthfulness From Multiple Input Signals," filed Apr. 20, 2018, which is incorporated herein in its entirety. U.S. patent application Ser. No. 16/353,212 claims the benefit of U.S. Provisional Patent Application Ser. No. 62/664,001, entitled "Normalizing Different Types Of Ingested Signals Into A Common Format," filed Apr. 27, 2018, which is incorporated herein in its entirety. U.S. patent application Ser. No. 16/353,212 claims the benefit of U.S. Provisional Patent Application Ser. No. 62/667,616, entitled "Normalizing Different Types Of Ingested Signals Into A Common Format," filed May 7, 2018, which is incorporated herein in its entirety. U.S. patent application Ser. No. 16/353,212 claims the benefit of U.S. Provisional Patent Application Ser. No. 62/669,540, entitled "Determining Event Severity From Multiple Input Signals," filed May 10, 2018, which is incorporated herein in its entirety. U.S. patent application Ser. No. 16/353,212 claims the benefit of U.S. Provisional Patent Application Ser. No. 62/686,791 entitled, "Normalizing Signals," filed Jun. 19, 2018, which is incorporated herein in its entirety This application claims the benefit of U.S. Provisional Patent Application Ser. No. 62/859,941 entitled "CUSTOMIZING EVENT NOTIFICATIONS," filed Jun. 11, 2019, which is incorporated herein in its entirety, each of which is incorporated herein in its entirety.

BACKGROUND

1. Background and Relevant Art

Entities (e.g., parents, guardians, friends, relatives, teachers, social workers, first responders, hospitals, delivery services, media outlets, government entities, etc.) may desire to be made aware of relevant events (e.g., fires, accidents, police presence, shootings, etc.) as close as possible to the events' occurrence. However, entities typically are not made aware of an event until after a person observes the event (or the event aftermath) and calls authorities.

Some techniques to automate event detection have been attempted. However, in general, automated event detection techniques are unreliable. Some techniques attempt to mine social media data to detect events and forecast when events might occur. However, events can occur without prior planning and/or may not be detectable using social media data. Further, these techniques are not capable of meaningfully processing available data nor are these techniques capable of differentiating false data (e.g., hoax social media posts)

Further, data provided to computer systems can come from any number of different sources, such as, for example, user input, files, databases, applications, sensors, social media systems, cameras, emergency communications, etc. In some environments, computer systems receive (potentially large volumes of) data from a variety of different domains and/or verticals in a variety of different formats. When data is received from different sources and/or in different formats, it can be difficult to efficiently and effectively derive intelligence from the data.

Extract, transform, and load (ETL) refers to a technique that extracts data from data sources, transforms the data to fit operational needs, and loads the data into an end target. ETL systems can be used to integrate data from multiple varied sources, such as, for example, from different vendors, hosted on different computer systems, etc.

ETL is essentially an extract and then store process. Prior to implementing an ETL solution, a user defines what (e.g., subset of) data is to be extracted from a data source and a schema of how the extracted data is to be stored. During the ETL process, the defined (e.g., subset of) data is extracted, transformed to the form of the schema (i.e., schema is used on write), and loaded into a data store. To access different data from the data source, the user has to redefine what data is to be extracted. To change how data is stored, the user has to define a new schema.

ETL is beneficial because it allows a user to access a desired portion of data in a desired format. However, ETL can be cumbersome as data needs evolve. Each change to the extracted data and/or the data storage results in the ETL process having to be restarted. As such, ETL is marginally practical, at best, for automated event detection. When using ETL, measures can be taken to reduce the possibility of introducing errors or inconsistencies into event detection and notification processes. However, inevitably errors and/or inconsistencies occur at least from time to time.

Unfortunately, many events are related to human suffering and possibly even human death, such as, for example, accidents, shootings, natural disasters, etc. Entities being notified of such events (e.g., drivers, first responders, disaster relief organizations, etc.) attempt to tailor their response based on circumstances of an event. Thus, entities can rely on event notification when allocating and expending resources. Errors or inconsistencies in event detection and notification may cause entities to respond inappropriately (insufficiently), waste resources, etc.

BRIEF SUMMARY

Examples extend to methods, systems, and computer program products for notifying entities of relevant events removing private information.

A privacy infrastructure spans other modules used for signal ingestion, event detection, and event notification. The privacy infrastructure can apply data privacy operations to user information in any of raw signals, normalized signals, events, or event notifications prior to, during, or after any of signal ingestion, event detection, or event notification.

An indication of a location type, a boundary geometry, a user event truthfulness preference, a first event type, and a second event type are received. An indication of an area including a first location of the location type and a second location of the location type are received. The location type, the boundary geometry, the area, the user event truthfulness preference, the first event type, and the second event type are combined into a rule formula.

The area is monitored for events occurring within a first boundary surrounding the first location or occurring within a second boundary surrounding the second location, the first boundary and the second boundary defined in accordance with the boundary geometry. First event characteristics including a first event type and a first event truthfulness corresponding to a first detected event are accessed. User information contained within the first event characteristics is identified. A data privacy operation is applied to the user information.

Second event characteristics including a second event type and a second event truthfulness corresponding to a second detected event are accessed. It is determined that a combination of the first characteristics and the second characteristics satisfy the rule formula subsequent to applying the data privacy operation. The determination includes determining that the first event type and the second event type occurred in combination within the first boundary and that the first event truthfulness and the second event truthfulness both satisfy the user event truthfulness preference. An entity is automatically electronically notified in accordance with notification preferences that the rule formula was satisfied.

In one aspect, other user information contained within the second event characteristics is identified. Another data privacy operation is applied to the other user information. It is determined that the combination of the first characteristics and the second characteristics satisfy the rule formula subsequent to applying the other data privacy operation.

In general, user information can include confidential information, patient information, personally identifiable information (PII), personal health information (PHI), sensitive personal information (SPI), Payment Card Industry information (PCI), or other private information. Data privacy operations can include removing user information (e.g., stripping, scrubbing, etc.), obscuring user information, anonymizing user information, encrypting user information encryption, segregating user information segregation, or applying access controls.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which:

FIG. 1A illustrates an example computer architecture that facilitates normalizing ingesting signals.

FIG. 10 illustrates a flow chart of an example method for determining event severity.

FIGS. 11A-1 and 11A-2 illustrate a computer architecture that facilitates identifying relevant events and notifying entities of relevant events.

FIG. 12A illustrates a flow chart of an example method for identifying relevant events and notifying entities of relevant events.

FIG. 12B illustrates a flow chart of an example method for identifying relevant events and notifying entities of relevant events.

FIGS. 20A through 20I illustrate a wizard for user generated rule configuration.

DETAILED DESCRIPTION

Figure 1B:
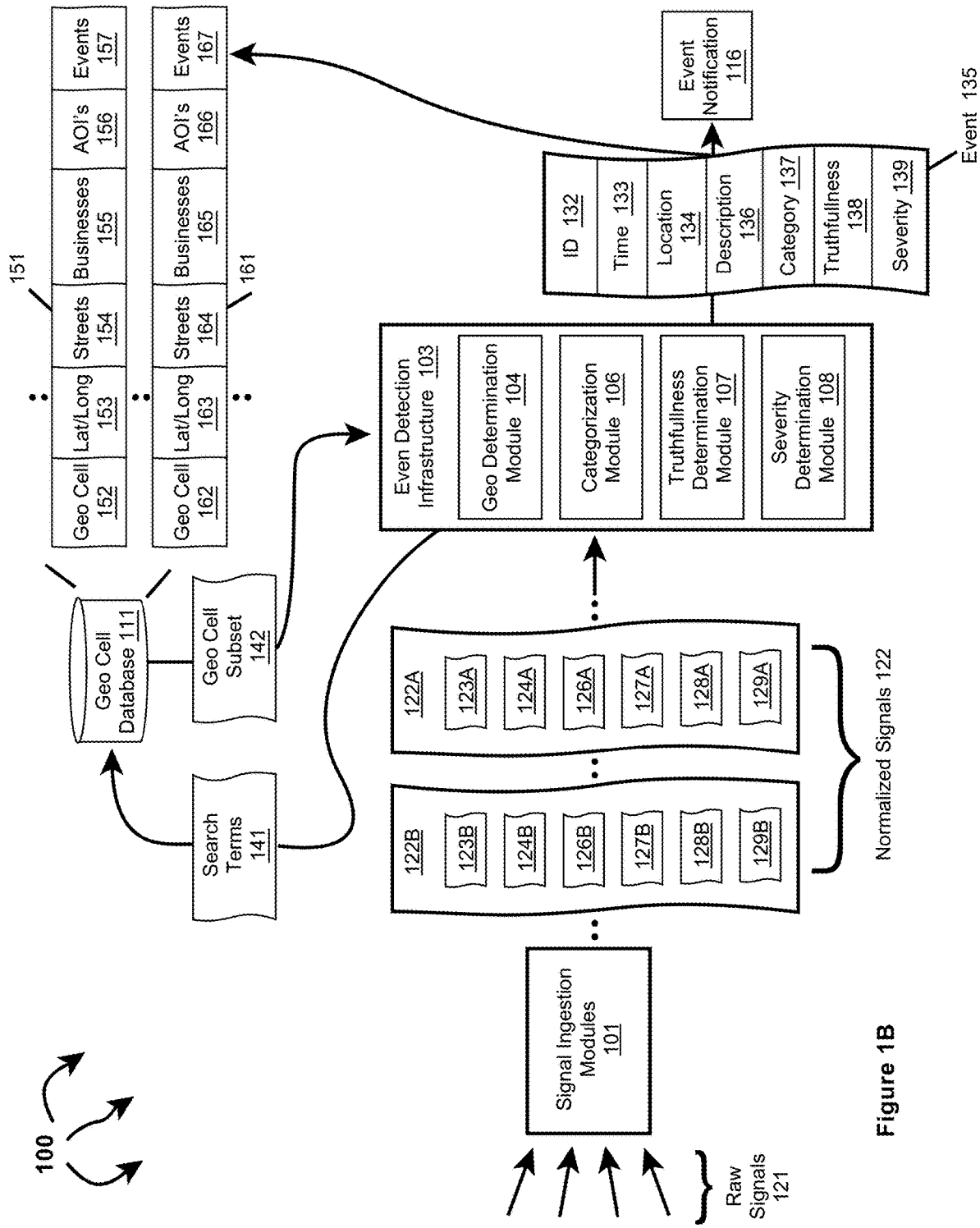
FIG. 1B illustrates an example computer architecture that facilitates detecting events from normalized signals.

Examples extend to methods, systems, and computer program products for ????

Entities (e.g., parents, other family members, guardians, friends, teachers, social workers, first responders, hospitals, delivery services, media outlets, government entities, security personnel, etc.) may desire to be made aware of relevant events as close as possible to the events' occurrence (i.e., as close as possible to "moment zero"). Different types of ingested signals (e.g., social media signals, web signals, and streaming signals) can be used to detect events. Event relevancy can be determined from entity selectable notification preferences including but not limited to event categories, event location, a computed event truth, a computed event severity, event impact, etc. Entities can also select notification preferences indicating a minimal notification delay. The minimal notification delay defines a minimum time after a relevant event is detected that an entity desires notification of the relevant event.

In general, signal ingestion modules ingest different types of raw structured and/or raw unstructured signals on an ongoing basis. Different types of signals can include different data media types and different data formats. Data media types can include audio, video, image, and text. Different formats can include text in XML, text in JAVASCRIPT Object Notation (JSON), text in RSS feed, plain text, video stream in Dynamic Adaptive Streaming over HTTP (DASH), video stream in HTTP Live Streaming (HLS), video stream in Real-Time Messaging Protocol (RTMP), other Multipurpose Internet Mail Extensions (MIME) types, etc. Handling different types and formats of data introduces inefficiencies into subsequent event detection processes, including when determining if different signals relate to the same event.

Accordingly, the signal ingestion modules can normalize raw signals across multiple data dimensions to form normalized signals. Each dimension can be a scalar value or a vector of values. In one aspect, raw signals are normalized into normalized signals having a Time, Location, Context (or "TLC") dimensions.

A Time (T) dimension can include a time of origin or alternatively a "event time" of a signal. A Location (L) dimension can include a location anywhere across a geographic area, such as, a country (e.g., the United States), a State, a defined area, an impacted area, an area defined by a geo cell, an address, etc.

A Context (C) dimension indicates circumstances surrounding formation/origination of a raw signal in terms that facilitate understanding and assessment of the raw signal. The Context (C) dimension of a raw signal can be derived from express as well as inferred signal features of the raw signal.

Signal ingestion modules can include one or more single source classifiers. A single source classifier can compute a single source probability for a raw signal from features of the raw signal. A single source probability can reflect a mathematical probability or approximation of a mathematical probability (e.g., a percentage between 0%-100%) of an event actually occurring. A single source classifier can be configured to compute a single source probability for a single event type or to compute a single source probability for each of a plurality of different event types. A single source classifier can compute a single source probability using artificial intelligence, machine learning, neural networks, logic, heuristics, etc.

As such, single source probabilities and corresponding probability details can represent a Context (C) dimension. Probability details can indicate (e.g., can include a hash field indicating) a probabilistic model and (express and/or inferred) signal features considered in a signal source probability calculation.

Thus, per signal type, signal ingestion modules determine Time (T), a Location (L), and a Context (C) dimensions associated with a signal. Different ingestion modules can be utilized/tailored to determine T, L, and C dimensions associated with different signal types. Normalized (or "TLC") signals can be forwarded to an event detection infrastructure. When signals are normalized across common dimensions subsequent event detection is more efficient and more effective.

Normalization of ingestion signals can include dimensionality reduction. Generally, "transdimensionality" transformations can be structured and defined in a "TLC" dimensional model. Signal ingestion modules can apply the "transdimensionality" transformations to generic source data in raw signals to re-encode the source data into normalized data having lower dimensionality. Dimensionality reduction can include reducing dimensionality (e.g., hundreds, thousands, or even more signal features (dimensions)) of a raw signal into a normalized signal including a T vector, an L vector, and a C vector. At lower dimensionality, the complexity of measuring "distances" between dimensional vectors across different normalized signals is reduced.

Concurrently with signal ingestion, an event detection infrastructure considers features of different combinations of normalized signals to attempt to identify events. For example, the event detection infrastructure can determine that features of multiple different normalized signals collectively indicate an event. Alternately, the event detection infrastructure can determine that features of one or more normalized signals indicate a possible event. The event detection infrastructure then determines that features of one or more other normalized signals validate the possible event. Signal features can include: signal type, signal source, signal content, Time (T) dimension, Location (L) dimension, Context (C) dimension, other circumstances of signal creation, etc.

The event detection infrastructure can send detected events to an event relevancy module. The event relevancy module can compare event characteristics to entity selected notification preferences. Based on the comparisons, the event relevancy module can determine a detected event is relevant to one or more entities. Relevant events can be forwarded to an event notification module along with entity identifiers for the one or more entities. The event notification module can use the entity identifiers to notify the one or more entities of the relevant event.

In one aspect, an entity identifier includes information for communicating with an entity, such as, for example, an email address, mobile telephone number, social media name, etc. In another aspect, an entity identifier is specific to the event relevancy module. Upon receiving an entity identifier, the event notification module refers to a database, list, mapping table, etc. that matches entity identifiers to corresponding information for communicating with an entity.

The event notification module notifies the one or more entities that the relevant event occurred and/or is occurring in accordance with entity notification preferences. The event notification module can use one or more communication mechanisms, such as, for example, email, text, social media direct message, etc., to attempt to notify an entity of a relevant event. In one aspect, an entity is notified of a relevant event within a period of time less than a selected minimal notification delay.

In some aspects, raw signals (or portions thereof), normalized signals (or portions thereof), events (or portions thereof), or event notifications (or portions thereof) may include information (private information, user information, etc.) deemed inappropriate for further propagation. A privacy infrastructure can span other modules used for signal ingestion, signal normalization, event detection, and event notification. The privacy infrastructure can use various data privacy operations to prevent other modules from inappropriately propagating information. For example, the privacy infrastructure can remove or otherwise (temporarily or permanently) obscure information in any of: raw signals, normalized signals, events, or event notifications prior to, during, or after any of: signal ingestion, event detection, or event notification.

Thus, signals, including raw signals and/or normalized signals, may include information deemed inappropriate for propagation. Similarly, detected events and event notifications may include information deemed inappropriate for propagation. The privacy infrastructure can apply data privacy operations to prevent the information from being inappropriately propagated prior to, during, or after event detection. Information deemed inappropriate for propagation can include: confidential information, patient information, personally identifiable information (PII), personal health information (PHI), sensitive personal information (SPI), Payment Card Industry information (PCI), or other private information, etc. (collectively, "user information"). Preventing propagation of user information can include removing (e.g., scrubbing or stripping) the user information from ingested signals. Removal of user information prior to event detection allows events to be detected while significantly increasing the privacy of any entities (e.g., individuals, businesses, etc.) referenced within the user information.

More specifically, for example, user information can include one or more portions of data that when considered individually or in the aggregate relate to the identity of a natural person or can be used to identify a natural person. Alternately, user information can be any information that can be used on its own or with other information to identify, contact, or locate a single person, or to identify an individual in context, including but not limited to: name, first name, last name, home address (or portions thereof), email address, nation identification number, passport number, vehicle registration plate, driver's license, face, fingerprints, handwriting, credit card numbers, digital identity, date of birth, birthplace, login name, social media identifier, mobile telephone number, nickname, age, gender, employer, school name, criminal record, job position, etc.

Data scrubbing or stripping can include the removal or permanent destruction of certain information. As compared to data anonymization (another type of data privacy operation)—which may involve complex methods of obfuscation—data scrubbing eliminates information from the system. That is, scrubbed data is not merely aggregated in a manner that delinks it from other data, rather, scrubbed data is permanently eliminated.

A signal source may include user information in a raw signal when the raw signal is generated. During normalization, user information included in a raw signal may be retained in a corresponding normalized signal. During event detection, user information in one or more normalized signals can be retained in a detected event. During event notification, user information included in a detected event can be retained in an event notification.

As such, and when appropriate, the privacy infrastructure can be configured to actively attempt to identify user information in one or more of: ingested raw signals, normalized signals, detected events, or notifications. For example, the privacy infrastructure can parse one or more of: (attributes/characteristics of) an ingested raw signal (including signal content), (attributes/characteristics of) a normalized signal (including signal content), (attributes/characteristics of) a detected event, or (attributes/characteristics of) an event notifications, searching for user information, such as, names, birthdates, physical characteristics, etc. When appropriate, the privacy infrastructure can also can actively attempt to identify user information in any intermediate data structures utilized during signal ingestion, signal normalization, event detection, notification, etc. The privacy infrastructure can apply data privacy operations to/on (e.g. scrubbing or otherwise removing) any identified user information in raw signals, normalized signals, events, and event notification, as well as identified user information in intermediate data structures utilized during signal ingestion, signal normalization, event detection, or notification. For example, the privacy infrastructure can identify and scrub PII included in a Computer Aided Dispatch (CAD) signal prior to utilizing the CAD signal for event detection.

In one aspect, user information is included in metadata within an ingested raw signal. The privacy infrastructure can apply data privacy operations (e.g., scrubbing) to the metadata prior to event detection and/or storage of the raw signal. For example, the privacy infrastructure can remove associated account information from a social media post. The privacy infrastructure can also scrub (or otherwise remove) geocoded information included in an ingested raw signal metadata.

Certain types of data may be inherently personal but are also used for event detection. For example, in an emergency situation involving a suspected perpetrator, it may be appropriate (and even beneficial) to propagate identifying physical characteristics (or other user information) included in a signal to law enforcement. The physical characteristics (or other user information) may remain with the signal but the signal may be tagged to indicate the presence of the physical characteristics. The privacy infrastructure may apply various data privacy operations on signals tagged as including user information. Data privacy operations can include segregating the tagged signal from other signals, applying encryption (or higher encryption) to the tagged signal, applying access controls (e.g., user-based, entity-based, purpose-based, time-based, warrant-based, etc.) to the tagged signal, or otherwise implementing rules regarding activities that are authorized/appropriate for the tagged signal.

The privacy infrastructure can apply data privacy operations to remove (or otherwise obscure) user information in accordance with one or more of: time-domain, expiry, or relevance-based rules. In one aspect, some user information may be appropriate to retain for a (e.g., relatively short) period of time. However, after the period of time, retention of the user information is no longer appropriate. The privacy infrastructure can implement a time based rule to remove (or otherwise obscure) the user information when the time period expires. For example, in a healthcare setting, it may be appropriate to know the identity of a person who tests positive for a communicable disease during the time in which the disease is communicable to others. However, once the person is no longer contagious, the identity loses relevance, and the privacy infrastructure can scrub the identify while maintaining other, non-user-identifiable information about the case.

In another aspect, the privacy infrastructure can retain information on a rolling window of time, for example 24 hours. For example, an access log for a resource (e.g., a building, a file, a computer, etc.) may be retained for a set period of time. Once the period of time has expired for a specific record, user information may be scrubbed from the access record while maintaining non-identifiable information (e.g., an indication that the resource was accessed).

In further aspect, the privacy infrastructures can obscure user information at multiple layers to further protect a user's privacy even during a period of time in which their user information is retained. For example, a data provider may hide, modify, encrypt, hash, or otherwise obscure user information prior to transfer into a system. The event detection algorithms previously described may be employed to identify similarities among signal characteristics even with the data within the signals has been arbitrarily assigned. That is, event detection may still be possible based on a uniform obfuscation of data prior to ingestion within the system. In this way, user data within the event detection system may not be traceable back to a user without also having access to the entirely separate system operated by the entity providing the signal. This may improve user privacy.

To further improve user privacy, the privacy infrastructure can combine receiving pre-obscured data from a signal provider with a process of applying an additional local obfuscation. For example, a signal source may provide only a hashed version of a user identifier to the signal ingestion system. The hashed version of the user identified may be hashed according to a method unknown to the signal ingestion system (e.g., a private key, salt, or the like). Upon receipt, the privacy infrastructure may apply an additional obfuscation (e.g., a second private key, salt, or the like) to the received data using a method unknown to the signal provider. As described, the privacy infrastructure may then scrub, cancel, or delete any connection between the received data (already obfuscated), and the secondary local modification according to a time-window, expiry, relevance, etc., rules.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: raw signals, normalized signals, signal features, single source probabilities, times, time dimensions, locations, location dimensions, geo cells, geo cell entries, designated market areas (DMAs), contexts, location annotations, context annotations, classification tags, context dimensions, events, truth values, truth scores, truth factors, geo fences, time decay functions, severity values, severity scores, severity ranks, signal groups, signal bursts, entity input, event notification preferences, event notifications, entity location data, entity locations, predicted impacts, impact notifications, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, raw signals, normalized signals, signal features, single source probabilities, times, time dimensions, locations, location dimensions, geo cells, geo cell entries, designated market areas (DMAs), contexts, location annotations, context annotations, classification tags, context dimensions, events, truth values, truth scores, truth factors, geo fences, time decay functions, severity values, severity scores, severity ranks, signal groups, signal bursts, entity input, event notification preferences, event notifications, entity location data, entity locations, predicted impacts, impact notifications, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, a "geo cell" is defined as a piece of "cell" in a spatial grid in any form. In one aspect, geo cells are arranged in a hierarchical structure. Cells of different geometries can be used.

A "geohash" is an example of a "geo cell".

In this description and the following claims, "geohash" is defined as a geocoding system which encodes a geographic location into a short string of letters and digits. Geohash is a hierarchical spatial data structure which subdivides space into buckets of grid shape (e.g., a square). Geohashes offer properties like arbitrary precision and the possibility of gradually removing characters from the end of the code to reduce its size (and gradually lose precision). As a consequence of the gradual precision degradation, nearby places will often (but not always) present similar prefixes. The longer a shared prefix is, the closer the two places are. geo cells can be used as a unique identifier and to approximate point data (e.g., in databases).

In one aspect, a "geohash" is used to refer to a string encoding of an area or point on the Earth. The area or point on the Earth may be represented (among other possible coordinate systems) as a latitude/longitude or Easting/Northing—the choice of which is dependent on the coordinate system chosen to represent an area or point on the Earth. geo cell can refer to an encoding of this area or point, where the geo cell may be a binary string comprised of 0s and is corresponding to the area or point, or a string comprised of 0s, 1s, and a ternary character (such as X)—which is used to refer to a don't care character (0 or 1). A geo cell can also be represented as a string encoding of the area or point, for example, one possible encoding is base-32, where every 5 binary characters are encoded as an ASCII character.

Depending on latitude, the size of an area defined at a specified geo cell precision can vary. When geohash is used for spatial indexing, the areas defined at various geo cell precisions are approximately:

TABLE 1

Example Areas at Various Geohash Precisions

| Geohash Length/Precision | width × height |
|---|---|
| 1 | 5,009.4 km × 4,992.6 km |
| 2 | 1,252.3 km × 624.1 km |
| 3 | 156.5 km × 156 km |
| 4 | 39.1 km × 19.5 km |
| 5 | 4.9 km × 4.9 km |
| 6 | 1.2 km × 609.4 m |
| 7 | 152.9 m × 152.4 m |
| 8 | 38.2 m × 19 m |
| 9 | 4.8 m × 4.8 m |
| 10 | 1.2 m × 59.5 cm |
| 11 | 14.9 cm × 14.9 cm |
| 12 | 3.7 cm × 1.9 cm |

Other geo cell geometries, such as, hexagonal tiling, triangular tiling, etc. are also possible. For example, the H3 geospatial indexing system is a multi-precision hexagonal tiling of a sphere (such as the Earth) indexed with hierarchical linear indexes.

In another aspect, geo cells are a hierarchical decomposition of a sphere (such as the Earth) into representations of regions or points based a Hilbert curve (e.g., the S2 hierarchy or other hierarchies). Regions/points of the sphere can be projected into a cube and each face of the cube includes a quad-tree where the sphere point is projected into. After that, transformations can be applied and the space discretized. The geo cells are then enumerated on a Hilbert Curve (a space-filling curve that converts multiple dimensions into one dimension and preserves the approximate locality).

Due to the hierarchical nature of geo cells, any signal, event, entity, etc., associated with a geo cell of a specified precision is by default associated with any less precise geo cells that contain the geo cell. For example, if a signal is associated with a geo cell of precision 9, the signal is by default also associated with corresponding geo cells of precisions 1, 2, 3, 4, 5, 6, 7, and 8. Similar mechanisms are applicable to other tiling and geo cell arrangements. For example, S2 has a cell level hierarchy ranging from level zero (85,011,012 km$^2$) to level 30 (between 0.48 cm$^2$ to 0.96 cm$^2$).

Signal Ingestion and Normalization

Signal ingestion modules ingest a variety of raw structured and/or raw unstructured signals on an on going basis and in essentially real-time. Raw signals can include social posts, live broadcasts, traffic camera feeds, other camera feeds (e.g., from other public cameras or from CCTV cameras), listening device feeds, 911 calls, weather data, planned events, IoT device data, crowd sourced traffic and road information, satellite data, air quality sensor data, smart city sensor data, public radio communication (e.g., among first responders and/or dispatchers, between air traffic controllers and pilots), subscription data services, etc. The content of raw signals can include images, video, audio, text, etc.

In general, signal normalization can prepare (or preprocess) raw signals into normalized signals to increase efficiency and effectiveness of subsequent computing activities, such as, event detection, event notification, etc., that utilize the normalized signals. For example, signal ingestion modules can normalize raw signals into normalized signals having a Time, Location, and Context (TLC) dimensions. An event detection infrastructure can use the Time, Location, and Content dimensions to more efficiently and effectively detect events.

Per signal type and signal content, different normalization modules can be used to extract, derive, infer, etc. Time, Location, and Context dimensions from/for a raw signal. For example, one set of normalization modules can be configured to extract/derive/infer Time, Location and Context dimensions from/for social signals. Another set of normalization modules can be configured to extract/derive/infer Time, Location and Context dimensions from/for Web signals. A further set of normalization modules can be configured to extract/derive/infer Time, Location and Context dimensions from/for streaming signals.

Normalization modules for extracting/deriving/inferring Time, Location, and Context dimensions can include text processing modules, NLP modules, image processing modules, video processing modules, etc. The modules can be used to extract/derive/infer data representative of the Time, Location, and Context dimensions for a signal. Time, Location, and Context dimensions for a signal can be extracted/derived/inferred from metadata and/or content of the signal.

For example, NLP modules can analyze metadata and content of a sound clip to identify a time, location, and keywords (e.g., fire, shooter, etc.). An acoustic listener can also interpret the meaning of sounds in a sound clip (e.g., a gunshot, vehicle collision, etc.) and convert to relevant context. Live acoustic listeners can determine the distance and direction of a sound. Similarly, image processing modules can analyze metadata and pixels in an image to identify a time, location and keywords (e.g., fire, shooter, etc.). Image processing modules can also interpret the meaning of parts of an image (e.g., a person holding a gun, flames, a store logo, etc.) and convert to relevant context. Other modules can perform similar operations for other types of content including text and video.

Per signal type, each set of normalization modules can differ but may include at least some similar modules or may share some common modules. For example, similar (or the same) image analysis modules can be used to extract named entities from social signal images and public camera feeds. Likewise, similar (or the same) NLP modules can be used to extract named entities from social signal text and web text.

In some aspects, an ingested signal includes sufficient expressly defined time, location, and context information upon ingestion. The expressly defined time, location, and context information is used to determine Time, Location, and Context dimensions for the ingested signal. In other aspects, an ingested signal lacks expressly defined location information or expressly defined location information is insufficient (e.g., lacks precision) upon ingestion. In these other aspects, Location dimension or additional Location dimension can be inferred from features of an ingested signal and/or through references to other data sources. In further aspects, an ingested signal lacks expressly defined context information or expressly defined context information is insufficient (e.g., lacks precision) upon ingestion. In these further aspects, Context dimension or additional Context dimension can be inferred from features of an ingested signal and/or through reference to other data sources.

In further aspects, time information may not be included, or included time information may not be given with high enough precision and Time dimension is inferred. For example, a user may post an image to a social network which had been taken some indeterminate time earlier.

Normalization modules can use named entity recognition and reference to a geo cell database to infer Location dimension. Named entities can be recognized in text, images, video, audio, or sensor data. The recognized named entities can be compared to named entities in geo cell entries. Matches indicate possible signal origination in a geographic area defined by a geo cell.

As such, a normalized signal can include a Time dimension, a Location dimension, a Context dimension (e.g., single source probabilities and probability details), a signal type, a signal source, and content.

A single source probability can be calculated by single source classifiers (e.g., machine learning models, artificial intelligence, neural networks, statistical models, etc.) that consider hundreds, thousands, or even more signal features (dimensions) of a signal. Single source classifiers can be based on binary models and/or multi-class models.

FIG. 1A depicts part of computer architecture 100 that facilitates ingesting and normalizing signals. As depicted, computer architecture 100 includes signal ingestion modules 101, social signals 171, Web signals 172, and streaming signals 173. Signal ingestion modules 101, social signals 171, Web signals 172, and streaming signals 173 can be connected to (or be part of) a network, such as, for example, a system bus, a Local Area Network ("LAN"), a Wide Area Network ("WAN"), and even the Internet. Accordingly, signal ingestion modules 101, social signals 171, Web signals 172, and streaming signals 173 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Signal ingestion module(s) 101 can ingest raw signals 121, including social signals 171, web signals 172, and streaming signals 173, on an on going basis and in essentially real-time. Raw signals 121 can include social posts, traffic camera feeds, other camera feeds, listening device feeds, 911 calls, weather data, planned events, IoT device data, crowd sourced traffic and road information, satellite data, air quality sensor data, smart city sensor data, public radio communication, subscription data service data, etc. As such, potentially thousands, millions or even billions of unique raw signals, each with unique characteristics, are can be ingested and used determine event characteristics, such as, event truthfulness, event severity, event category or categories, etc.

Signal ingestion module(s) 101 include social content ingestion modules 174, web content ingestion modules 176, stream content ingestion modules 176, and signal formatter 180. Signal formatter 180 further includes social signal processing module 181, web signal processing module 182, and stream signal processing modules 183.

For each type of signal, a corresponding ingestion module and signal processing module can interoperate to normalize the signal into a Time, Location, Context (TLC) dimensions. For example, social content ingestion modules 174 and social signal processing module 181 can interoperate to normalize social signals 171 into TLC dimensions. Similarly, web content ingestion modules 176 and web signal processing module 182 can interoperate to normalize web signals 172 into TLC dimensions. Likewise, stream content ingestion modules 176 and stream signal processing modules 183 can interoperate to normalize streaming signals 173 into TLC dimensions.

In one aspect, signal content exceeding specified size requirements (e.g., audio or video) is cached upon ingestion. Signal ingestion modules 101 include a URL or other identifier to the cached content within the context for the signal.

In one aspect, signal formatter 180 includes modules for determining a single source probability as a ratio of signals turning into events based on the following signal properties: (1) event class (e.g., fire, accident, weather, etc.), (2) media type (e.g., text, image, audio, etc.), (3) source (e.g., twitter, traffic camera, first responder radio traffic, etc.), and (4) geo type (e.g., geo cell, region, or non-geo). Probabilities can be stored in a lookup table for different combinations of the signal properties. Features of a signal can be derived and used to query the lookup table. For example, the lookup table can be queried with terms ("accident", "image", "twitter", "region"). The corresponding ratio (probability) can be returned from the table.

In another aspect, signal formatter 180 includes a plurality of single source classifiers (e.g., artificial intelligence, machine learning modules, neural networks, etc.). Each single source classifier can consider hundreds, thousands, or even more signal features (dimensions) of a signal. Signal features of a signal can be derived and submitted to a signal source classifier. The single source classifier can return a probability that a signal indicates a type of event. Single source classifiers can be binary classifiers or multi-source classifiers.

Raw classifier output can be adjusted to more accurately represent a probability that a signal is a "true positive". For example, 1,000 signals whose raw classifier output is 0.9 may include 80% as true positives. Thus, probability can be adjusted to 0.8 to reflect true probability of the signal being a true positive. "Calibration" can be done in such a way that for any "calibrated score" this score reflects the true probability of a true positive outcome.

Signal ingestion modules 101 can insert one or more single source probabilities and corresponding probability details into a normalized signal to represent a Context (C) dimension. Probability details can indicate a probabilistic model and features used to calculate the probability. In one aspect, a probabilistic model and signal features are contained in a hash field.

Signal ingestion modules 101 can access "transdimensionality" transformations structured and defined in a "TLC" dimensional model. Signal ingestion modules 101 can apply the "transdimensionality" transformations to generic source data in raw signals to re-encode the source data into normalized data having lower dimensionality. Dimensionality reduction can include reducing dimensionality (e.g., hundreds, thousands, or even more signal features (dimensions)) of a raw signal into a normalized signal including a T vector, an L vector, and a C vector. At lower dimensionality, the complexity of measuring "distances" between dimensional vectors across different normalized signals is reduced.

Thus, in general, any received raw signals can be normalized into normalized signals including a Time (T) dimension, a Location (L) dimension, a Context (C) dimension, signal source, signal type, and content. Signal ingestion modules 101 can send normalized signals 122 to event detection infrastructure 103.

For example, signal ingestion modules 101 can send normalized signal 122A, including time 123A, location 124A, context 126A, content 127A, type 128A, and source 129A to event detection infrastructure 103. Similarly, signal ingestion modules 101 can send normalized signal 122B, including time 123B, location 124B, context 126B, content 127B, type 128B, and source 129B to event detection infrastructure 103.

Event Detection

Turning back to FIG. 1B, computer architecture 100 also includes components that facilitate detecting events. As depicted, computer architecture 100 includes geo cell database 111 and event notification 116. Geo cell database 111 and event notification 116 can be connected to (or be part of) a network with signal ingestion modules 101 and event detection infrastructure 103. As such, geo cell database 111 and even notification 116 can create and exchange message related data over the network.

As described, in general, on an ongoing basis, concurrently with signal ingestion (and also essentially in real-time), event detection infrastructure 103 detects different categories of (planned and unplanned) events (e.g., fire, police response, mass shooting, traffic accident, natural disaster, storm, active shooter, concerts, protests, etc.) in different locations (e.g., anywhere across a geographic area, such as, the United States, a State, a defined area, an impacted area, an area defined by a geo cell, an address, etc.), at different times from Time, Location, and Context dimensions included in normalized signals. Since, normalized signals are normalized to include Time, Location, and Context dimensions, event detection infrastructure 103 can handle normalized signals in a more uniform manner increasing event detection efficiency and effectiveness.

Event detection infrastructure 103 can also determine an event truthfulness, event severity, and an associated geo cell. In one aspect, a Context dimension in a normalized signal increases the efficiency and effectiveness of determining truthfulness, severity, and an associated geo cell.

Generally, an event truthfulness indicates how likely a detected event is actually an event (vs. a hoax, fake, misinterpreted, etc.). Truthfulness can range from less likely to be true to more likely to be true. In one aspect, truthfulness is represented as a numerical value, such as, for example, from 1 (less truthful) to 10 (more truthful) or as percentage value in a percentage range, such as, for example, from 0% (less truthful) to 100% (more truthful). Other truthfulness representations are also possible. For example, truthfulness can be a dimension or represented by one or more vectors.

Generally, an event severity indicates how severe an event is (e.g., what degree of badness, what degree of damage, etc. is associated with the event). Severity can range from less severe (e.g., a single vehicle accident without injuries) to more severe (e.g., multi vehicle accident with multiple injuries and a possible fatality). As another example, a shooting event can also range from less severe (e.g., one victim without life threatening injuries) to more severe (e.g., multiple injuries and multiple fatalities). In one aspect, severity is represented as a numerical value, such as, for example, from 1 (less severe) to 5 (more severe). Other severity representations are also possible. For example, severity can be a dimension or represented by one or more vectors.

In general, event detection infrastructure 103 can include a geo determination module including modules for processing different kinds of content including location, time, context, text, images, audio, and video into search terms. The geo determination module can query a geo cell database with search terms formulated from normalized signal content. The geo cell database can return any geo cells having matching supplemental information. For example, if a search term includes a street name, a subset of one or more geo cells including the street name in supplemental information can be returned to the event detection infrastructure.

Event detection infrastructure 103 can use the subset of geo cells to determine a geo cell associated with an event location. Events associated with a geo cell can be stored back into an entry for the geo cell in the geo cell database. Thus, over time an historical progression of events within a geo cell can be accumulated.

As such, event detection infrastructure 103 can assign an event ID, an event time, an event location, an event category, an event description, an event truthfulness, and an event severity to each detected event. Detected events can be sent to relevant entities, including to mobile devices, to computer systems, to APIs, to data storage, etc.

Event detection infrastructure 103 detects events from information contained in normalized signals 122. Event detection infrastructure 103 can detect an event from a single normalized signal 122 or from multiple normalized signals 122. In one aspect, event detection infrastructure 103 detects an event based on information contained in one or more normalized signals 122. In another aspect, event detection infrastructure 103 detects a possible event based on information contained in one or more normalized signals 122. Event detection infrastructure 103 then validates the potential event as an event based on information contained in one or more other normalized signals 122.

As depicted, event detection infrastructure 103 includes geo determination module 104, categorization module 106, truthfulness determination module 107, and severity determination module 108.

Generally, geo determination module 104 can include NLP modules, image analysis modules, etc. for identifying location information from a normalized signal. Geo determination module 104 can formulate (e.g., location) search terms 141 by using NLP modules to process audio, using image analysis modules to process images, etc. Search terms can include street addresses, building names, landmark names, location names, school names, image fingerprints, etc. Event detection infrastructure 103 can use a URL or identifier to access cached content when appropriate.

Generally, categorization module 106 can categorize a detected event into one of a plurality of different categories (e.g., fire, police response, mass shooting, traffic accident, natural disaster, storm, active shooter, concerts, protests, etc.) based on the content of normalized signals used to detect and/or otherwise related to an event.

Generally, truthfulness determination module 107 can determine the truthfulness of a detected event based on one or more of: source, type, age, and content of normalized signals used to detect and/or otherwise related to the event. Some signal types may be inherently more reliable than other signal types. For example, video from a live traffic camera feed may be more reliable than text in a social media post. Some signal sources may be inherently more reliable than others. For example, a social media account of a government agency may be more reliable than a social media account of an individual. The reliability of a signal can decay over time.

Generally, severity determination module 108 can determine the severity of a detected event based on or more of: location, content (e.g., dispatch codes, keywords, etc.), and volume of normalized signals used to detect and/or otherwise related to an event. Events at some locations may be inherently more severe than events at other locations. For example, an event at a hospital is potentially more severe than the same event at an abandoned warehouse. Event category can also be considered when determining severity. For example, an event categorized as a "Shooting" may be inherently more severe than an event categorized as "Police Presence" since a shooting implies that someone has been injured.

Geo cell database 111 includes a plurality of geo cell entries. Each geo cell entry is included in a geo cell defining an area and corresponding supplemental information about things included in the defined area. The corresponding supplemental information can include latitude/longitude, street names in the area defined by and/or beyond the geo cell, businesses in the area defined by the geo cell, other Areas of Interest (AOIs) (e.g., event venues, such as, arenas, stadiums, theaters, concert halls, etc.) in the area defined by the geo cell, image fingerprints derived from images captured in the area defined by the geo cell, and prior events that have occurred in the area defined by the geo cell. For example, geo cell entry 151 includes geo cell 152, lat/lon 153, streets 154, businesses 155, AOIs 156, and prior events 157. Each event in prior events 157 can include a location (e.g., a street address), a time (event occurrence time), an event category, an event truthfulness, an event severity, and an event description. Similarly, geo cell entry 161 includes geo cell 162, lat/lon 163, streets 164, businesses 165, AOIs 166, and prior events 167. Each event in prior events 167 can include a location (e.g., a street address), a time (event occurrence time), an event category, an event truthfulness, an event severity, and an event description.

Other geo cell entries can include the same or different (more or less) supplemental information, for example, depending on infrastructure density in an area. For example, a geo cell entry for an urban area can contain more diverse supplemental information than a geo cell entry for an agricultural area (e.g., in an empty field).

Geo cell database 111 can store geo cell entries in a hierarchical arrangement based on geo cell precision. As such, geo cell information of more precise geo cells is included in the geo cell information for any less precise geo cells that include the more precise geo cell.

Geo determination module 104 can query geo cell database 111 with search terms 141. Geo cell database 111 can identify any geo cells having supplemental information that matches search terms 141. For example, if search terms 141 include a street address and a business name, geo cell database 111 can identify geo cells having the street name and business name in the area defined by the geo cell. Geo cell database 111 can return any identified geo cells to geo determination module 104 in geo cell subset 142.

Geo determination module can use geo cell subset 142 to determine the location of event 135 and/or a geo cell associated with event 135. As depicted, event 135 includes event ID 132, time 133, location 137, description 136, category 137, truthfulness 138, and severity 139.

Event detection infrastructure 103 can also determine that event 135 occurred in an area defined by geo cell 162 (e.g., a geohash having precision of level 7 or level 9). For example, event detection infrastructure 103 can determine that location 134 is in the area defined by geo cell 162. As such, event detection infrastructure 103 can store event 135 in events 167 (i.e., historical events that have occurred in the area defined by geo cell 162).

Event detection infrastructure 103 can also send event 135 to event notification module 116. Event notification module 116 can notify one or more entities about event 135.

Privacy Infrastructure

Figure 1C:
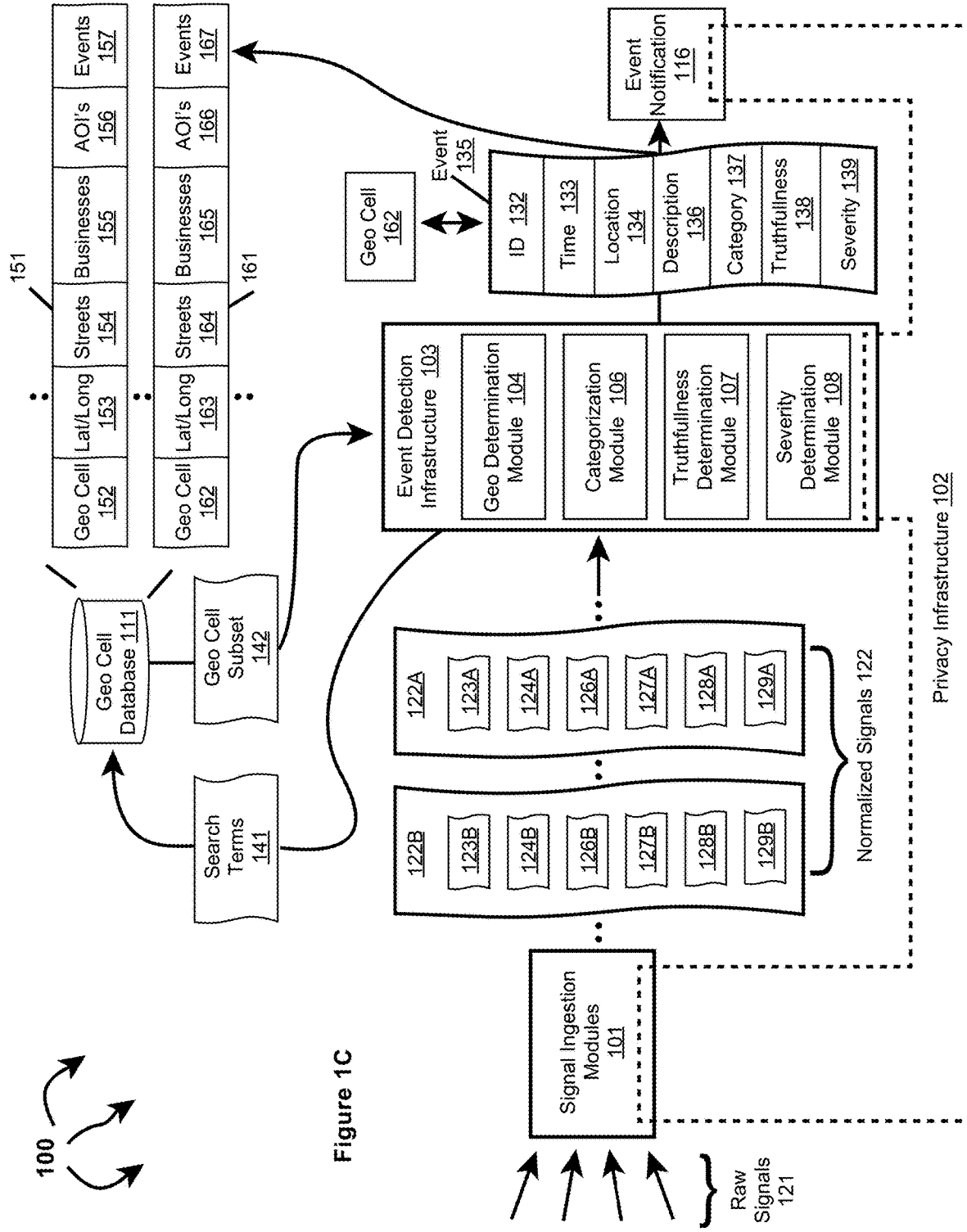
FIG. 1C illustrates the example computer architecture of FIG. 1B and includes a privacy infrastructure.

Referring now to FIG. 1C, privacy infrastructure 102 spans signal ingestion modules 101, event detection infrastructure 103, and event notification 116. Privacy infrastructure 102 can implement any described user information data privacy operations (e.g., removal, scrubbing, stripping, obfuscation, access rule application, etc.) within and/or through interoperation with one or more of ingestion modules 101, event detection infrastructure 103, and event notification 116. As such, privacy infrastructure 102 may be configured to apply data privacy operations, including data scrubbing, before, during, or after signal ingestion, event detection, and/or event notification.

In some aspects, one or more of raw signals 121 (or portions thereof) can include user information. Privacy infrastructure 102 can implement/apply data privacy operations through interaction and/or interoperation with signal ingestion modules 101 on the user information (e.g., prior to, during, or after signal ingestion and/or signal normalization). For example, while normalizing one of raw signals 121, privacy infrastructure 102 may apply one or more data privacy operations to alter an aspect of the raw signal 121 (e.g., user information) relating to the Time dimension. One way this may be done is to round a time-stamp to the nearest second, minute, hour, etc. By reducing precision associated with a timestamp, privacy can be increased (e.g., by making it impossible to directly link a signal aspect to the original aspect). However, the reduced time-stamp precision may cause little, if any, corresponding reduction in identifying an event based on the raw signal 121. Depending on signal type, the level of precision may be more or less important to event detection and may also be more or less helpful in eliminating user information. Thus, heuristics may be applied to different signal types to determine relevancy of precision and/or relevancy of reducing user information footprint.

Privacy infrastructure 102 can also apply one or more data privacy operations to modify location information (e.g., user information) associated with a signal in a manner that irreversibly increases privacy with little, if any, reduction in event detection capabilities. For example, privacy infrastructure 102 can reduce or eliminate GPS precision. Depending on the signal type, location information may not benefit event detection. In such cases, signal specific rules may be implemented to reduce or eliminate the unnecessary information prior to event detection processing.

Privacy infrastructure 102 can also apply one or more data privacy operations to modify different types of contextual information (e.g., user information) associated with a signal. For example, vehicle telematics information may include metadata identifying a make/model of a vehicle. However, if such telematic information is used to detect events, such as, car accidents, the exact make/model of the automobile may not be necessary and can be eliminated from the signal during normalization. In another example, content from a social media post may be scrubbed to eliminate extraneous information. This may be accomplished through natural language processing and configured to eliminate content such as names, locations, or other sensitive information.

As described, privacy infrastructure 102 can perform data privacy actions during signal ingestion including applying a layer of obfuscation along with an indication of how and/or when any reversible linkage should be destroyed, scrubbed, or otherwise removed from the system. For example, a user ID field may be hashed using a customized salt during signal ingestion and marked with time-domain expiry information. The data then proceeds through the system, for example, to event detection, in its salted form. While within the time-domain, the customized salt may be available if it becomes necessary to ascertain the pre-obfuscated data. However, once the time-domain has expired, the custom salt may be destroyed. Destroying the custom salt essentially permanently and irreversibly obscures the data element (at least to the degree provided by hash/encryption algorithm chosen for the obfuscation) from transformation back to its pre-salted form.

In some aspects, one or more of normalized signals 122 (or portions thereof) can include user information. Privacy infrastructure 102 can also implement/apply data privacy operations through interaction and/or interoperation with event detection infrastructure 103 on the user information (e.g., prior to, during, or after event detection). Applying obfuscation during event detection may include applying additional techniques that are appropriate when different portions of data (possibly from different sources) are to be aggregated. In one example, when one data signal is determined to be related to an event that includes data from other data signals, permissions for each respective data signal may be determined. Based upon those permissions, one or more data elements from within one or more of the event related signals may be hidden, scrubbed, or otherwise obfuscated.

For example, if an event is detected using a first signal from a first entity and a second signal from a second entity, permissions may be consulted to determine whether the first entity has permission to see all of the data fields provided within the signal of the second entity. When the first entity does not have permission for one or more fields, those fields may be dropped or obscured. In some scenarios, this may result in a failed event detection, or an event detection with a lower relative reliability. Reducing reliability may be appropriate, or even desired, to increase user privacy. In such scenarios, additional signals can be used to corroborate the event detection without reference to user information contained in the first or second signals.

Generally, event detection without reference to user information may make event detection less efficient and/or effective (e.g., more signals are required, more processing time is required, etc.). However, the trade-off between privacy and additional signal processing may be appropriate and is often desirable. Further, the ability to detect events using privacy-aware methods increases data security.

In some aspects, a detected event (or a portion thereof), such as, event 135, can include user information. Privacy infrastructure 102 can also implement/apply privacy operations through interaction and/or interoperation with event notification 116 on the user information (e.g., prior to, during, or after event notification). Once an event, such as event 135, has been detected, a notification may be generated in a way that maintains user privacy. In one aspect, user identifications may be removed from a notification altogether where the notification can be determined to not need such identifiers. This may be determined based on the identity of the recipient and notifications of the same event customized based on the recipient. For example, if an event is a fire, a police officer may receive a notification of the fire event along with a description of a suspected arsonist. A fire fighter, on the other hand, may only receive notification of the occurrence of the fire. In this way, the use of personal information is limited in scope according to relevance to the recipient.

In another example, privacy infrastructure 102 and/or event notification 116 may employ dynamic notifications that apply rules to user information that may change over time or according to context. For example, a user may access a dynamic notification during a designated time-window in which a suspect description is available. At a later time, the user may access the same dynamic notification but be unable to see the suspect descriptors. This change in access may be based on a time-domain (e.g., available for 24 hours) or a relevance domain (e.g., removed if an updated description is received, a suspect is arrested, etc.)

A dynamic notification may also be implemented such that user information is always initially obscured but may be available upon request and authentication by a user. This process may rely on user-based, role-based, or other dynamic or static heuristics. It is appreciated that any combination of these techniques may be implemented.

Figure 2:
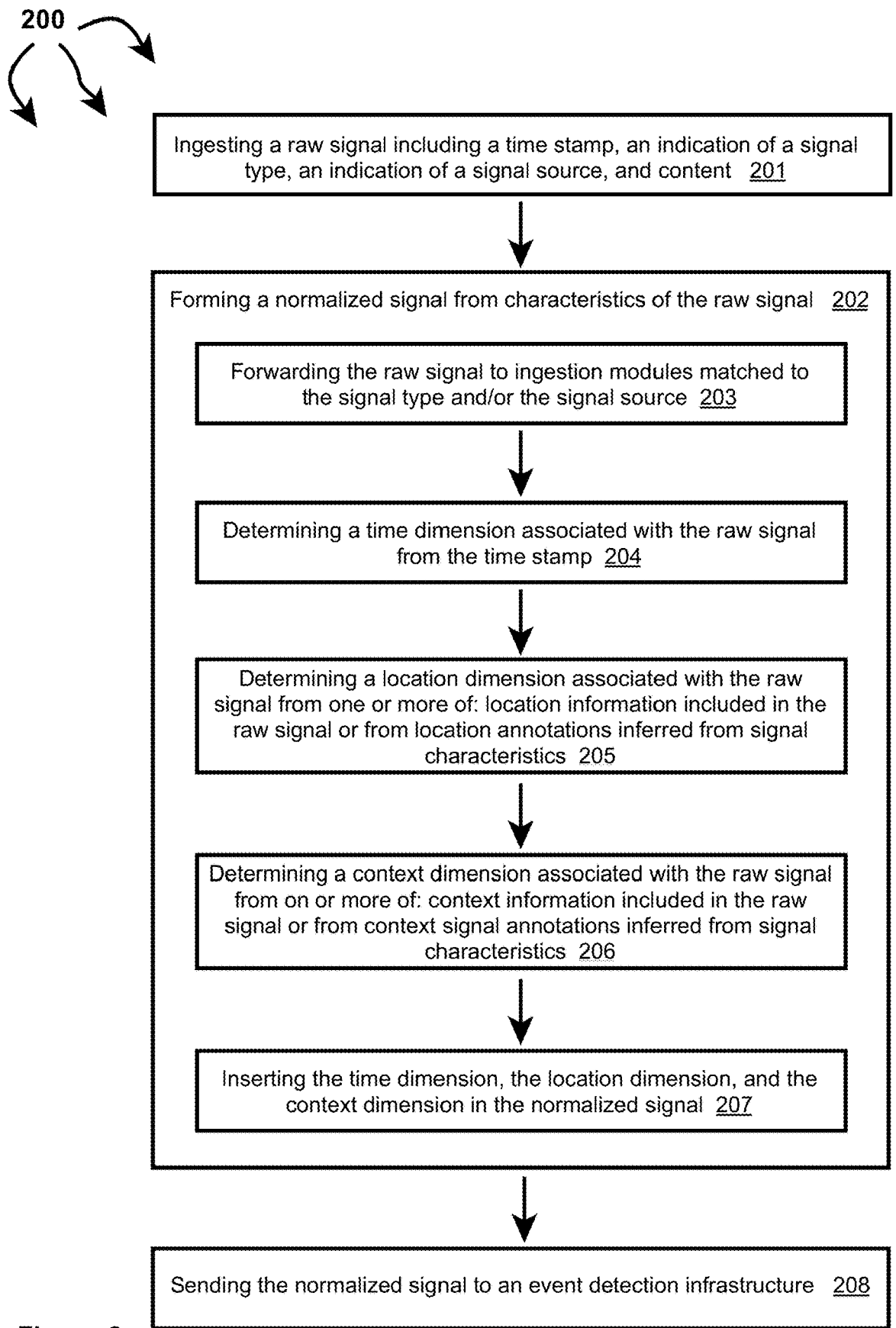
FIG. 2 illustrates a flow chart of an example method for normalizing ingested signals.

FIG. 2 illustrates a flow chart of an example method 200 for normalizing ingested signals. Method 200 will be described with respect to the components and data in computer architecture 100.

Method 200 includes ingesting a raw signal including a time stamp, an indication of a signal type, an indication of a signal source, and content (201). For example, signal ingestion modules 101 can ingest a raw signal 121 from one of: social signals 171, web signals 172, or streaming signals 173.

Method 200 includes forming a normalized signal from characteristics of the raw signal (202). For example, signal ingestion modules 101 can form a normalized signal 122A from the ingested raw signal 121.

Forming a normalized signal includes forwarding the raw signal to ingestion modules matched to the signal type and/or the signal source (203). For example, if ingested raw signal 121 is from social signals 171, raw signal 121 can be forwarded to social content ingestion modules 174 and social signal processing modules 181. If ingested raw signal 121 is from web signals 172, raw signal 121 can be forwarded to web content ingestion modules 175 and web signal processing modules 182. If ingested raw signal 121 is from streaming signals 173, raw signal 121 can be forwarded to streaming content ingestion modules 176 and streaming signal processing modules 183.

Forming a normalized signal includes determining a time dimension associated with the raw signal from the time stamp (204). For example, signal ingestion modules 101 can determine time 123A from a time stamp in ingested raw signal 121.

Forming a normalized signal includes determining a location dimension associated with the raw signal from one or more of: location information included in the raw signal or from location annotations inferred from signal characteristics (205). For example, signal ingestion modules 101 can determine location 124A from location information included in raw signal 121 or from location annotations derived from characteristics of raw signal 121 (e.g., signal source, signal type, signal content).

Forming a normalized signal includes determining a context dimension associated with the raw signal from one or more of: context information included in the raw signal or from context signal annotations inferred from signal characteristics (206). For example, signal ingestion modules 101 can determine context 126A from context information included in raw signal 121 or from context annotations derived from characteristics of raw signal 121 (e.g., signal source, signal type, signal content).

Forming a normalized signal includes inserting the time dimension, the location dimension, and the context dimension in the normalized signal (207). For example, signal ingestion modules 101 can insert time 123A, location 124A, and context 126A in normalized signal 122. Method 200 includes sending the normalized signal to an event detection infrastructure (208). For example, signal ingestion modules 101 can send normalized signal 122A to event detection infrastructure 103.

In some aspects, method 200 also includes one or more privacy operations. Privacy infrastructure 102 can implement and/or apply any described data privacy operations (possibly through interoperation with modules in signal ingestion modules 101), such as, user information removal, user information scrubbing, user information stripping, user information obfuscation, access rule application, etc., prior to, during, or after any of: 201, 202, 203, 204, 205, 206, 207, or 208.

Figure 3A:
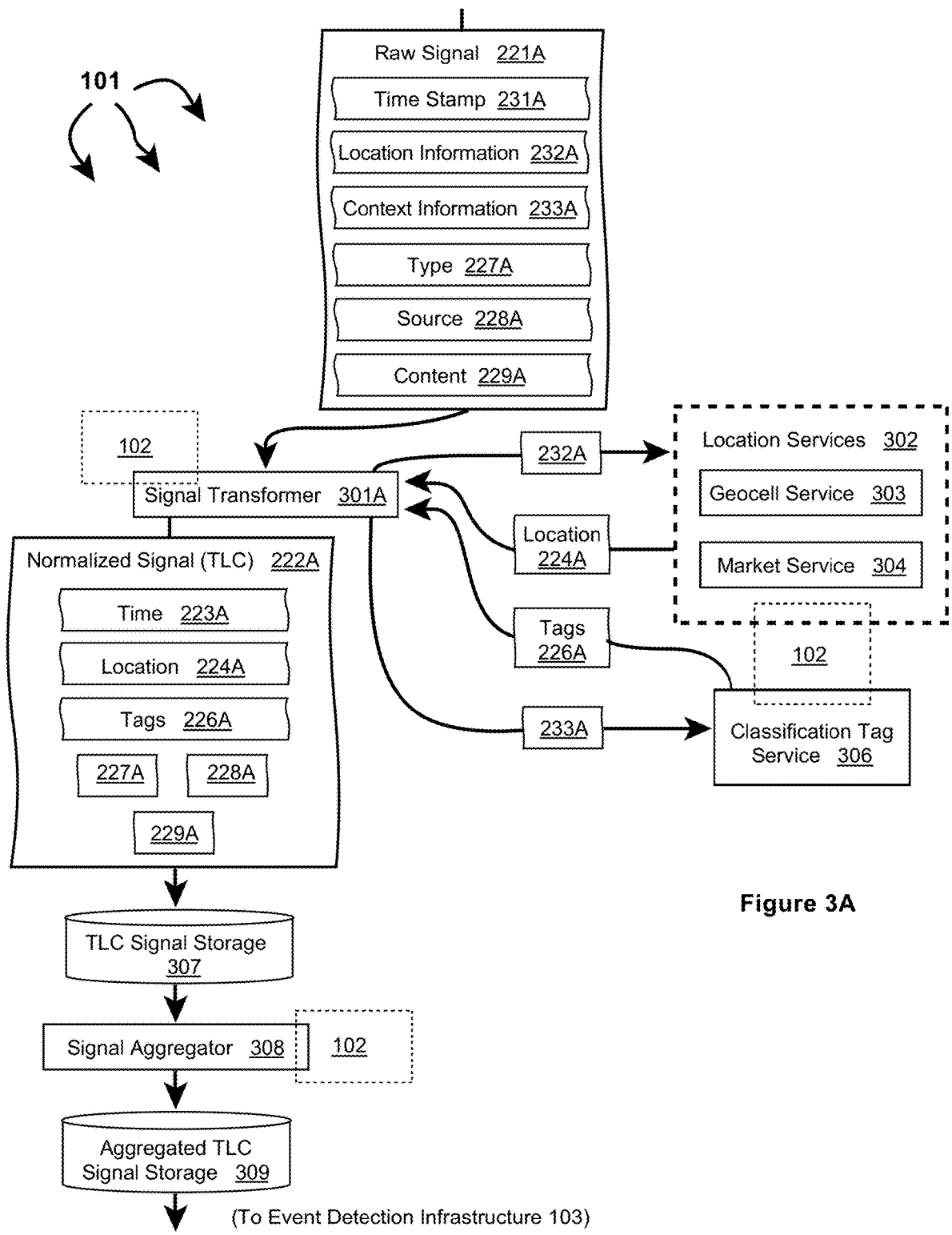
FIGS. 3A, 3B, and 3C illustrate other example components that can be included in signal ingestion modules.
Figure 3B:
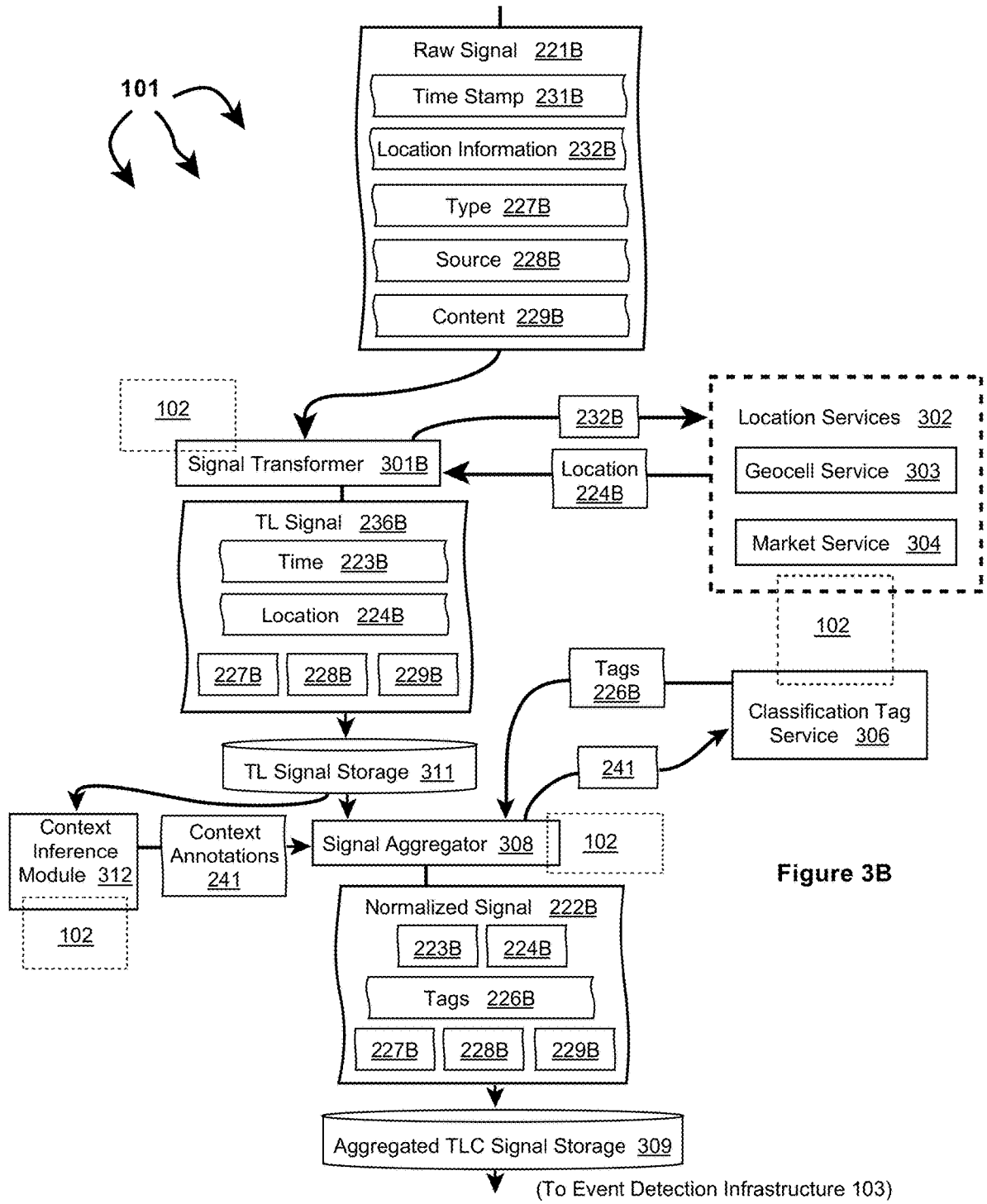
Figure 3C:
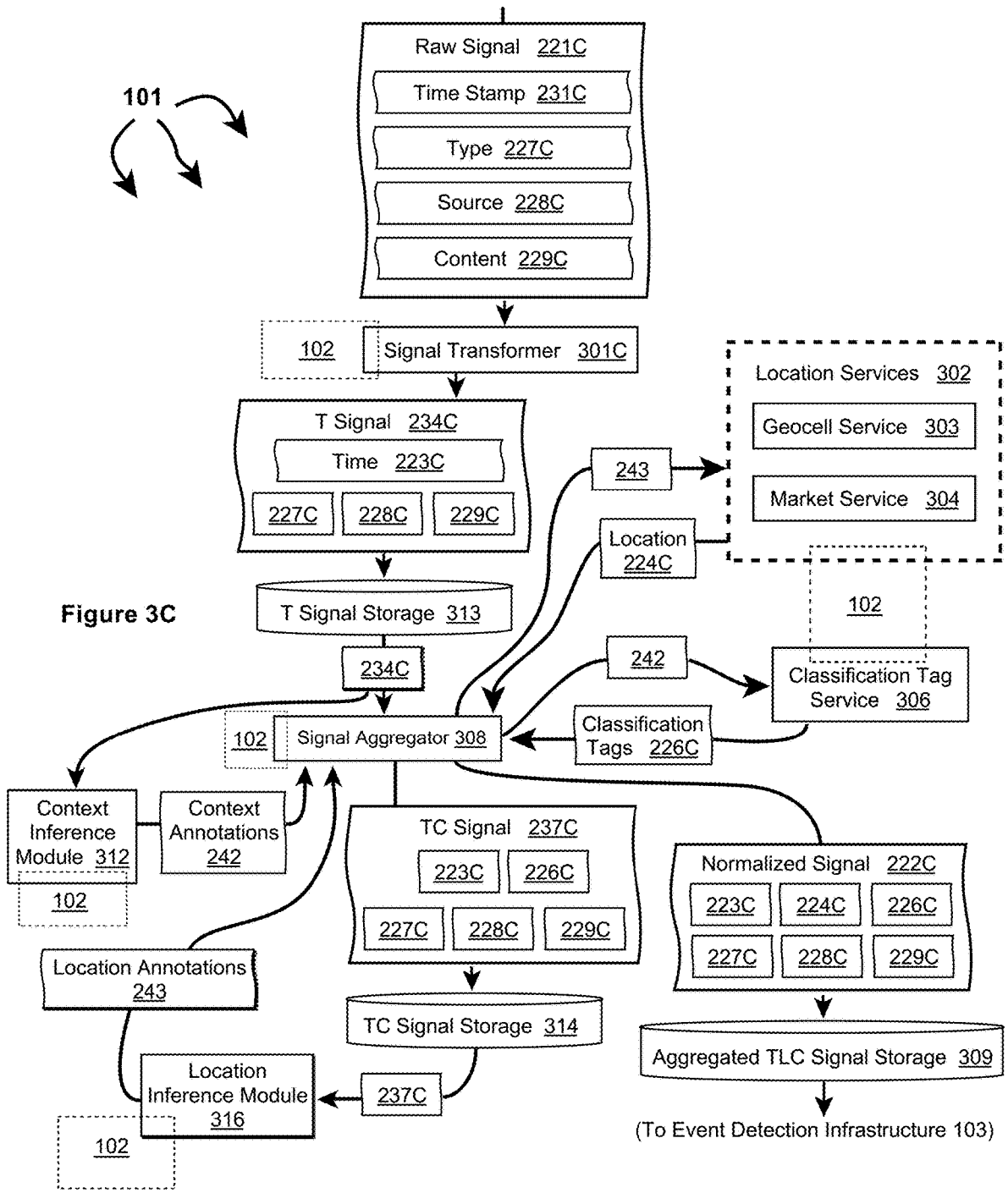

FIGS. 3A, 3B, and 3C depict other example components that can be included in signal ingestion modules 101. Signal ingestion modules 101 can include signal transformers for different types of signals including signal transformer 301A (for TLC signals), signal transformer 301B (for TL signals), and signal transformer 301C (for T signals). In one aspect, a single module combines the functionality of multiple different signal transformers.

Signal ingestion modules 101 can also include location services 302, classification tag service 306, signal aggregator 308, context inference module 312, and location inference module 316. Location services 302, classification tag service 306, signal aggregator 308, context inference module 312, and location inference module 316 or parts thereof can interoperate with and/or be integrated into any of ingestion modules 174, web content ingestion modules 176, stream content ingestion modules 176, social signal processing module 181, web signal processing module 182, and stream signal processing modules 183. Location services 302, classification tag service 306, signal aggregator 308, context inference module 312, and location inference module 316 can interoperate to implement "transdimensionality" transformations to reduce raw signal dimensionality into normalized TLC signals.

Signal ingestion modules 101 can also include storage for signals in different stages of normalization, including TLC signal storage 307, TL signal storage 311, T signal storage 313, TC signal storage 314, and aggregated TLC signal storage 309. In one aspect, data ingestion modules 101 implement a distributed messaging system. Each of signal storage 307, 309, 311, 313, and 314 can be implemented as a message container (e.g., a topic) associated with a type of message.

As depicted, in FIGS. 3A, 3B, and 3C privacy infrastructure 102 can span modules that facilitate signal ingestion. For example, in FIG. 3A, privacy infrastructure 102 spans signal transformer 301A, location services 302 (including geocell service 303 and market service 304), classification tag service 306, and signal aggregator 308. In FIG. 3B, privacy infrastructure 102 spans signal transformer 301B, location services 302 (including geocell service 303 and market service 304), classification tag service 306, signal aggregator 308, and context inference module 312. In FIG. 3C, privacy infrastructure 102 spans signal transformer 301C, location services 302 (including geocell service 303 and market service 304), classification tag service 306, signal aggregator 308, context inference module 312, and location inference module 316. Privacy infrastructure 102 can implement and/or apply any described data privacy operations, such as, user information removal, user information scrubbing, user information stripping, user information obfuscation, access rule application, etc., at and/or through interoperation with any of: signal transformer 301A, signal transformer 301B, signal transformer 301C, location services 302 (including geocell service 303 and market service 304), classification tag service 306, signal aggregator 308, context inference module 312, or location inference module 316.

Figure 4:
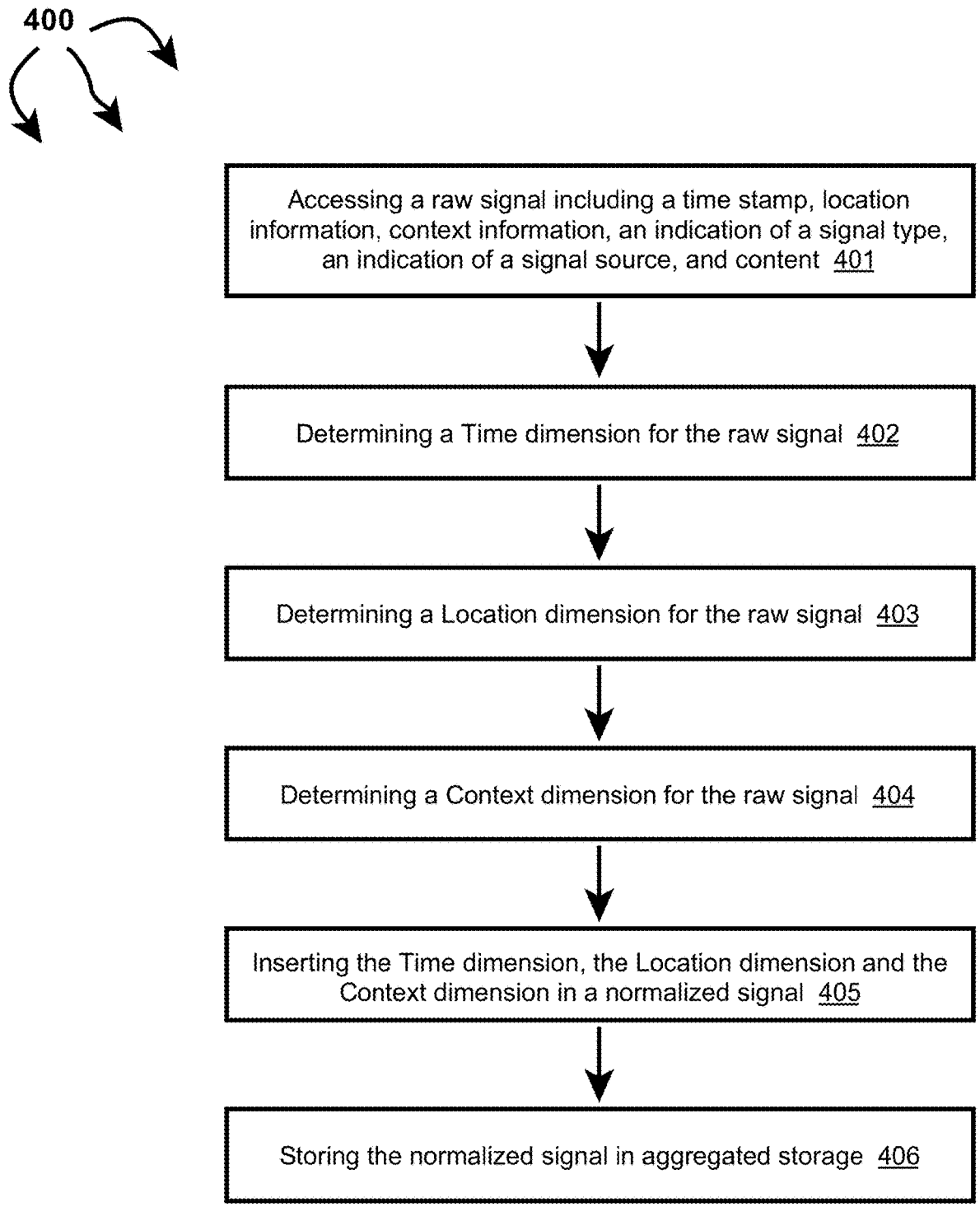
FIG. 4 illustrates a flow chart of an example method for normalizing an ingested signal including time information, location information, and context information.

FIG. 4 illustrates a flow chart of an example method 400 for normalizing an ingested signal including time information, location information, and context information. Method 400 will be described with respect to the components and data in FIG. 3A.

Method 400 includes accessing a raw signal including a time stamp, location information, context information, an indication of a signal type, an indication of a signal source, and content (401). For example, signal transformer 301A can access raw signal 221A. Raw signal 221A includes timestamp 231A, location information 232A (e.g., lat/lon, GPS coordinates, etc.), context information 233A (e.g., text expressly indicating a type of event), signal type 227A (e.g., social media, 911 communication, traffic camera feed, etc.), signal source 228A (e.g., FACEBOOK, TWITTER, WAZE, etc.), and signal content 229A (e.g., one or more of: image, video, text, keyword, locale, etc.).

Method 400 includes determining a Time dimension for the raw signal (402). For example, signal transformer 301A can determine time 223A from timestamp 231A.

Method 400 includes determining a Location dimension for the raw signal (403). For example, signal transformer 301A sends location information 232A to location services 302. Geo cell service 303 can identify a geo cell corresponding to location information 232A. Market service 304 can identify a designated market area (DMA) corresponding to location information 232A. Location services 302 can include the identified geo cell and/or DMA in location 224A. Location services 302 return location 224A to signal transformer 301.

Method 400 includes determining a Context dimension for the raw signal (404). For example, signal transformer 301A sends context information 233A to classification tag service 306. Classification tag service 306 identifies one or more classification tags 226A (e.g., fire, police presence, accident, natural disaster, etc.) from context information 233A. Classification tag service 306 returns classification tags 226A to signal transformer 301A.

Method 400 includes inserting the Time dimension, the Location dimension, and the Context dimension in a normalized signal (405). For example, signal transformer 301A can insert time 223A, location 224A, and tags 226A in normalized signal 222A (a TLC signal). Method 400 includes storing the normalized signal in signal storage (406). For example, signal transformer 301A can store normalized signal 222A in TLC signal storage 307. (Although not depicted, timestamp 231A, location information 232A, and context information 233A can also be included (or remain) in normalized signal 222A).

Method 400 includes storing the normalized signal in aggregated storage (406). For example, signal aggregator 308 can aggregate normalized signal 222A along with other normalized signals determined to relate to the same event. In one aspect, signal aggregator 308 forms a sequence of signals related to the same event. Signal aggregator 308 stores the signal sequence, including normalized signal 222A, in aggregated TLC storage 309 and eventually forwards the signal sequence to event detection infrastructure 103.

In some aspects, method 400 also includes one or more privacy operations. Privacy infrastructure 102 can implement and/or apply any described data privacy operations (possibly through interoperation with modules in signal ingestion modules 101), such as, user information removal, user information scrubbing, user information stripping, user information obfuscation, access rule application, etc., prior to, during, or after any of: 401, 402, 403, 404, 405, or 406.

Figure 5:
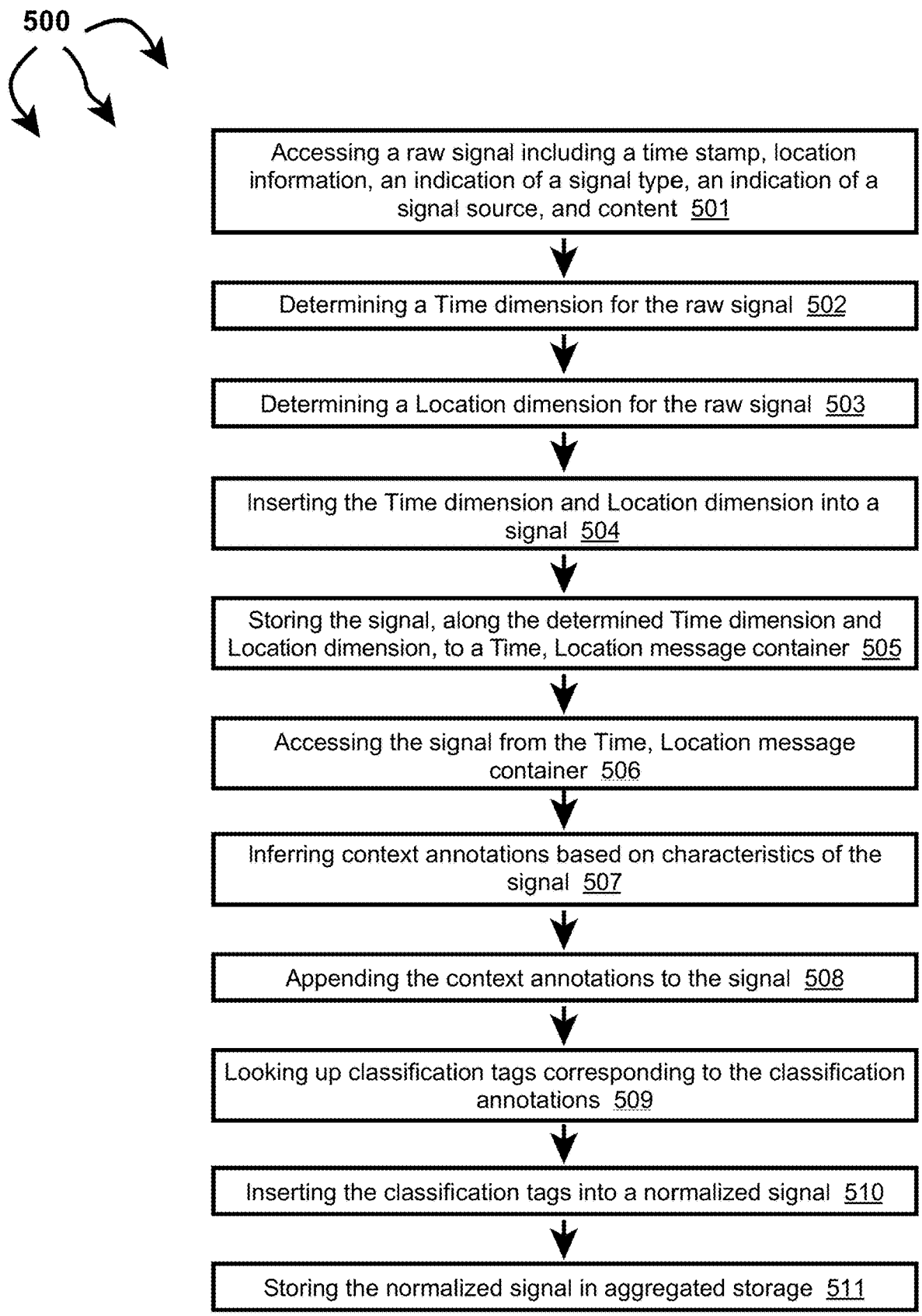
FIG. 5 illustrates a flow chart of an example method for normalizing an ingested signal including time information and location information.

FIG. 5 illustrates a flow chart of an example method 500 for normalizing an ingested signal including time information and location information. Method 500 will be described with respect to the components and data in FIG. 3B.

Method 500 includes accessing a raw signal including a time stamp, location information, an indication of a signal type, an indication of a signal source, and content (501). For example, signal transformer 301B can access raw signal 221B. Raw signal 221B includes timestamp 231B, location information 232B (e.g., lat/lon, GPS coordinates, etc.), signal type 227B (e.g., social media, 911 communication, traffic camera feed, etc.), signal source 228B (e.g., FACEBOOK, TWITTER, WAZE, etc.), and signal content 229B (e.g., one or more of: image, video, audio, text, keyword, locale, etc.).

Method 500 includes determining a Time dimension for the raw signal (502). For example, signal transformer 301B can determine time 223B from timestamp 231B.

Method 500 includes determining a Location dimension for the raw signal (503). For example, signal transformer 301B sends location information 232B to location services 302. Geo cell service 303 can be identify a geo cell corresponding to location information 232B. Market service 304 can identify a designated market area (DMA) corresponding to location information 232B. Location services 302 can include the identified geo cell and/or DMA in location 224B. Location services 302 returns location 224B to signal transformer 301.

Method 500 includes inserting the Time dimension and Location dimension into a signal (504). For example, signal transformer 301B can insert time 223B and location 224B into TL signal 236B. (Although not depicted, timestamp 231B and location information 232B can also be included (or remain) in TL signal 236B). Method 500 includes storing the signal, along with the determined Time dimension and Location dimension, to a Time, Location message container (505). For example, signal transformer 301B can store TL signal 236B to TL signal storage 311. Method 500 includes accessing the signal from the Time, Location message container (506). For example, signal aggregator 308 can access TL signal 236B from TL signal storage 311.

Method 500 includes inferring context annotations based on characteristics of the signal (507). For example, context inference module 312 can access TL signal 236B from TL signal storage 311. Context inference module 312 can infer context annotations 241 from characteristics of TL signal 236B, including one or more of: time 223B, location 224B, type 227B, source 228B, and content 229B. In one aspect, context inference module 312 includes one or more of: NLP modules, audio analysis modules, image analysis modules, video analysis modules, etc. Context inference module 312 can process content 229B in view of time 223B, location 224B, type 227B, source 228B, to infer context annotations 241 (e.g., using machine learning, artificial intelligence, neural networks, machine classifiers, etc.). For example, if content 229B is an image that depicts flames and a fire engine, context inference module 312 can infer that content 229B is related to a fire. Context inference 312 module can return context annotations 241 to signal aggregator 308.

Method 500 includes appending the context annotations to the signal (508). For example, signal aggregator 308 can append context annotations 241 to TL signal 236B. Method 500 includes looking up classification tags corresponding to the classification annotations (509). For example, signal aggregator 308 can send context annotations 241 to classification tag service 306. Classification tag service 306 can identify one or more classification tags 226B (a Context dimension) (e.g., fire, police presence, accident, natural disaster, etc.) from context annotations 241. Classification tag service 306 returns classification tags 226B to signal aggregator 308.

Method 500 includes inserting the classification tags in a normalized signal (510). For example, signal aggregator 308 can insert tags 226B (a Context dimension) into normalized signal 222B (a TLC signal). Method 500 includes storing the normalized signal in aggregated storage (511). For example, signal aggregator 308 can aggregate normalized signal 222B along with other normalized signals determined to relate to the same event. In one aspect, signal aggregator 308 forms a sequence of signals related to the same event. Signal aggregator 308 stores the signal sequence, including normalized signal 222B, in aggregated TLC storage 309 and eventually forwards the signal sequence to event detection infrastructure 103. (Although not depicted, timestamp 231B, location information 232C, and context annotations 241 can also be included (or remain) in normalized signal 222B).

In some aspects, method 500 also includes one or more privacy operations. Privacy infrastructure 102 can implement and/or apply any described data privacy operations (possibly through interoperation with modules signal ingestion modules 101), such as, user information removal, user information scrubbing, user information stripping, user information obfuscation, access rule application, etc., prior to, during, or after any of: 501, 502, 503, 504, 505, 506, 507, 508, 509, 510, or 511.

Figure 6:
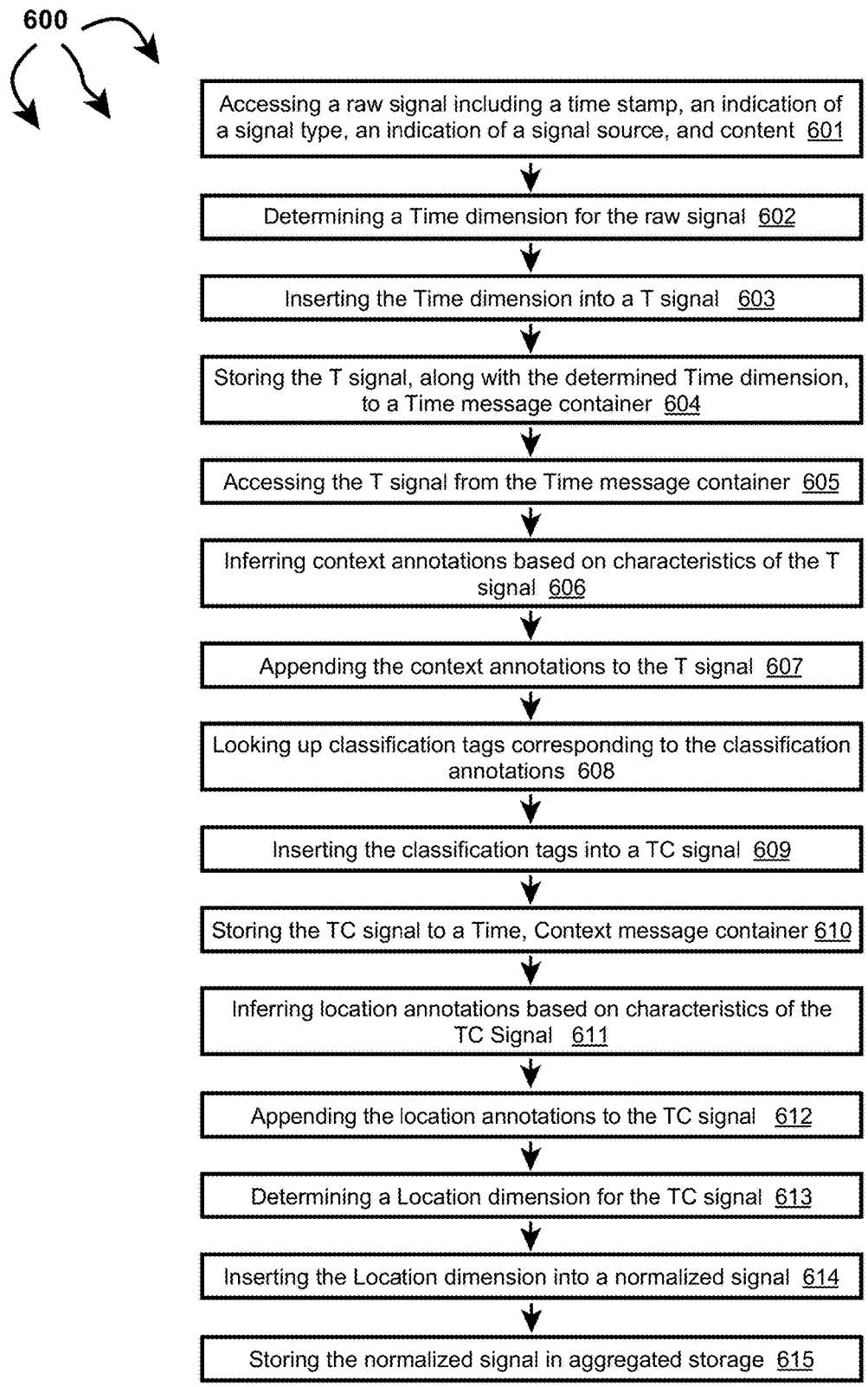
FIG. 6 illustrates a flow chart of an example method for normalizing an ingested signal including time information.

FIG. 6 illustrates a flow chart of an example method 600 for normalizing an ingested signal including time information and location information. Method 600 will be described with respect to the components and data in FIG. 3C.

Method 600 includes accessing a raw signal including a time stamp, an indication of a signal type, an indication of a signal source, and content (601). For example, signal transformer 301C can access raw signal 221C. Raw signal 221C includes timestamp 231C, signal type 227C (e.g., social media, 911 communication, traffic camera feed, etc.), signal source 228C (e.g., FACEBOOK, TWITTER, WAZE, etc.), and signal content 229C (e.g., one or more of: image, video, text, keyword, locale, etc.).

Method 600 includes determining a Time dimension for the raw signal (602). For example, signal transformer 301C can determine time 223C from timestamp 231C. Method 600 includes inserting the Time dimension into a T signal (603). For example, signal transformer 301C can insert time 223C into T signal 234C. (Although not depicted, timestamp 231C can also be included (or remain) in T signal 234C).

Method 600 includes storing the T signal, along with the determined Time dimension, to a Time message container (604). For example, signal transformer 301C can store T signal 236C to T signal storage 313. Method 600 includes accessing the T signal from the Time message container (605). For example, signal aggregator 308 can access T signal 234C from T signal storage 313.

Method 600 includes inferring context annotations based on characteristics of the T signal (606). For example, context inference module 312 can access T signal 234C from T signal storage 313. Context inference module 312 can infer context annotations 242 from characteristics of T signal 234C, including one or more of: time 223C, type 227C, source 228C, and content 229C. As described, context inference module 312 can include one or more of: NLP modules, audio analysis modules, image analysis modules, video analysis modules, etc. Context inference module 312 can process content 229C in view of time 223C, type 227C, source 228C, to infer context annotations 242 (e.g., using machine learning, artificial intelligence, neural networks, machine classifiers, etc.). For example, if content 229C is a video depicting two vehicles colliding on a roadway, context inference module 312 can infer that content 229C is related to an accident. Context inference 312 module can return context annotations 242 to signal aggregator 308.

Method 600 includes appending the context annotations to the T signal (607). For example, signal aggregator 308 can append context annotations 242 to T signal 234C. Method 600 includes looking up classification tags corresponding to the classification annotations (608). For example, signal aggregator 308 can send context annotations 242 to classification tag service 306. Classification tag service 306 can identify one or more classification tags 226C (a Context dimension) (e.g., fire, police presence, accident, natural disaster, etc.) from context annotations 242. Classification tag service 306 returns classification tags 226C to signal aggregator 308.

Method 600 includes inserting the classification tags into a TC signal (609). For example, signal aggregator 308 can insert tags 226C into TC signal 237C. Method 600 includes storing the TC signal to a Time, Context message container (610). For example, signal aggregator 308 can store TC signal 237C in TC signal storage 314. (Although not depicted, timestamp 231C and context annotations 242 can also be included (or remain) in normalized signal 237C).

Method 600 includes inferring location annotations based on characteristics of the TC signal (611). For example, location inference module 316 can access TC signal 237C from TC signal storage 314. Location inference module 316 can include one or more of: NLP modules, audio analysis modules, image analysis modules, video analysis modules, etc. Location inference module 316 can process content 229C in view of time 223C, type 227C, source 228C, and classification tags 226C (and possibly context annotations 242) to infer location annotations 243 (e.g., using machine learning, artificial intelligence, neural networks, machine classifiers, etc.). For example, if content 229C is a video depicting two vehicles colliding on a roadway, the video can include a nearby street sign, business name, etc. Location inference module 316 can infer a location from the street sign, business name, etc. Location inference module 316 can return location annotations 243 to signal aggregator 308.

Method 600 includes appending the location annotations to the TC signal with location annotations (612). For example, signal aggregator 308 can append location annotations 243 to TC signal 237C. Method 600 determining a Location dimension for the TC signal (613). For example, signal aggregator 308 can send location annotations 243 to location services 302. Geo cell service 303 can identify a geo cell corresponding to location annotations 243. Market service 304 can identify a designated market area (DMA) corresponding to location annotations 243. Location services 302 can include the identified geo cell and/or DMA in location 224C. Location services 302 returns location 224C to signal aggregation services 308.

Method 600 includes inserting the Location dimension into a normalized signal (614). For example, signal aggregator 308 can insert location 224C into normalized signal 222C. Method 600 includes storing the normalized signal in aggregated storage (615). For example, signal aggregator 308 can aggregate normalized signal 222C along with other normalized signals determined to relate to the same event. In one aspect, signal aggregator 308 forms a sequence of signals related to the same event. Signal aggregator 308 stores the signal sequence, including normalized signal 222C, in aggregated TLC storage 309 and eventually forwards the signal sequence to event detection infrastructure 103. (Although not depicted, timestamp 231B, context annotations 241, and location annotations 24, can also be included (or remain) in normalized signal 222B).

In some aspects, method 600 also includes one or more privacy operations. Privacy infrastructure 102 can implement and/or apply any described data privacy operations (possibly through interoperation with modules included in signal ingestion modules 101), such as, user information removal, user information scrubbing, user information stripping, user information obfuscation, access rule application, etc., prior to, during, or after any of: 601, 602, 603, 604, 605, 606, 607, 608, 609, 610, 611, 612, 613, 614, or 615.

In another aspect, a Location dimension is determined prior to a Context dimension when a T signal is accessed. A Location dimension (e.g., geo cell and/or DMA) and/or location annotations are used when inferring context annotations.

Accordingly, location services 302 can identify a geo cell and/or DMA for a signal from location information in the signal and/or from inferred location annotations. Similarly, classification tag service 306 can identify classification tags for a signal from context information in the signal and/or from inferred context annotations.

Signal aggregator 308 can concurrently handle a plurality of signals in a plurality of different stages of normalization. For example, signal aggregator 308 can concurrently ingest and/or process a plurality T signals, a plurality of TL signals, a plurality of TC signals, and a plurality of TLC signals. Accordingly, aspects of the invention facilitate acquisition of live, ongoing forms of data into an event detection system with signal aggregator 308 acting as an "air traffic controller" of live data. Signals from multiple sources of data can be aggregated and normalized for a common purpose (e.g., of event detection). Data ingestion, event detection, and event notification can process data through multiple stages of logic with concurrency.

As such, a unified interface can handle incoming signals and content of any kind. The interface can handle live extraction of signals across dimensions of time, location, and context. In some aspects, heuristic processes are used to determine one or more dimensions. Acquired signals can include text and images as well as live-feed binaries, including live media in audio, speech, fast still frames, video streams, etc.

Signal normalization enables the world's live signals to be collected at scale and analyzed for detection and validation of live events happening globally. A data ingestion and event detection pipeline aggregates signals and combines detections of various strengths into truthful events. Thus, normalization increases event detection efficiency facilitating event detection closer to "live time" or at "moment zero".

It may be that geo cell service 303 and/or market service 304 are integrated with and/or interoperate with and/or include geo cell database 111. As such, geo cell database 111 can be used to determine Location dimension as well as to detect events.

Determining Event Truthfulness

When determining how (or if) to respond to notification of an event, an entity may consider the truthfulness of the detected event. The entity may desire some level of confidence in the veracity of a detected event before taking an action. For example, the entity may want assurances that a detected event isn't a hoax, fake, misinterpreted, etc. Accordingly, aspects of the invention include mechanisms for determining truthfulness of an event from multiple input signals used to detect the event.

Thus, as generally described, truthfulness determination module 107 can determine an event truthfulness. In one aspect, truth scores are calculated for received signals as the signals are received. Truthfulness determination module 107 calculates and recalculates an evolving truth factor (truthfulness) for an event from the truth scores. In one aspect, the truth factor (truthfulness) is sent along with a detected event to event notification 116. Event notification 116 can also send the truth factor (truthfulness) to an entity that is notified of the detected event. In one aspect, an entity registers to receive events at or above a specified truthfulness. The entity can then be notified of events having a truth factor at or above the specified truthfulness. On the other hand, events having a truth factor below the specified truthfulness can be filtered out and not sent to the entity.

Truth factor (truthfulness) can be represented as a score, a numeric value, a percentage, etc. In one aspect, truth factor (truthfulness) is represented by a percentage between 0%-100% indicating a probability that an associated event is actually occurring (or is actually true). Percentages closer to 100% can indicate an increased probability that an associated event is actually occurring. On the other hand, percentages closer to 0% can indicate a decreased probability that an associated event is actually occurring.

Similar indications can be associated with scores and numeric values. Higher scores or numeric values can indicate an increased likelihood that an associated event is actually occurring. Lower scores or numeric values can indicate a decreased likelihood that an associated event is actually occurring. However, in other aspects, lower scores or numeric values indicate increased likelihoods that an associated event is actually occurring and higher scores or numeric values indicate decreased likelihoods that an associated event is actually occurring. Scores and numeric values can be in a range, such as, for example, 1-5, etc.

When the score, numeric value, percentage, etc. representing truth factor (truthfulness) and associated with an event exceeds (or alternately is below) the specified threshold registered by an entity, the entity can be notified of the event, In this description and the following claims, the term "confidence level" is synonymous with "truth factor" and/or "truthfulness". Thus, confidence level is also applicable in implementations described as using "truth factor" and/or "truthfulness".

Thus, when an entity is notified of an event, the entity is also provided an indication of the event's truthfulness. As such, the entity can consider the event's truthfulness when determining how (if at all) to respond to the event.

For each normalized signal, truthfulness determination module 107 can determine various truth related values based on characteristics of the normalized signal. For example, truthfulness determination module 107 can determine one or more of: a signal type truth value based on signal type, a signal source truth value based on the signal source, and a signal content truth value based on content type(s) contained in the normalized signal. Truthfulness determination module 107 can compute a truth score for a normalized signal by combining the signal type truth value, the signal source truth value, and the signal content truth value determined for the signal. Truthfulness determination module 107 can assign the truth score to the normalized signal.

In one aspect, event detection infrastructure 103 detects an event at least in part on truth characteristics of a signal. For example, truthfulness determination module 107 determines one or more of: a signal type truth value based on signal type of the first signal, a signal source truth value based on the signal source of the first signal, and a signal content truth value based on content type(s) contained in the first signal. Truthfulness determination module 107 computes a first truth score for the first signal by combining: the signal type truth value, the signal source truth value, and the signal content truth value determined for the first signal. Truthfulness determination module 107 assigns the first truth score to the first signal. Based on the first truth score (e.g., exceeding a threshold), event detection infrastructure 103 can trigger an event detection for the event. Truthfulness determination module 107 can also compute a truth factor for the detected event based on the first truth score.

Per normalized signal, event detection infrastructure 103 and/or truthfulness determination module 107 can also determine/maintain a signal origination time, a signal reception time, and a signal location. Event detection infrastructure 103 and/or truthfulness determination module 107 can track signal origination time, signal reception time, and signal location per normalized signal. Thus, when a first normalized signal triggers an event detection, event detection infrastructure 103 and/or truthfulness determination module 107 can determine and record a signal origination time, a signal reception time, and a signal location associated with the first normalized signal.

Subsequent to triggering initial event detection, event detection infrastructure 103 can determine that a second normalized signal is related to the initial event detection based on characteristics of the second normalized signal. Truthfulness module 107 computes one or more of: a signal type truth value based on signal type of the second signal, a signal source truth value based on the signal source of the second signal, and a signal content truth value based on content type(s) contained in the second signal.

In addition, event detection infrastructure 103 and/or truthfulness module 107 determines and records a signal origination time, a signal reception time, and a signal location associated with the second normalized signal. Event detection infrastructure 103 and/or truthfulness determination module 107 determines a distance measure between the signal location of the first normalized signal and the signal location of the second normalized signal. Event detection infrastructure 103 and/or truthfulness determination module 107 computes a time measure between the signal origination time of the first normalized signal and the signal origination time of the second normalized signal.

Truthfulness determination module 107 computes a second truth score for the second normalized signal by combining: the signal type truth value determined for the second normalized signal, the signal source truth value determined for the second normalized signal, the signal content truth value determined for the second normalized signal, the distance measure, and the time measure. Truthfulness determination module 107 assigns the second truth score to the second signal. Truthfulness determination module 107 can also recompute a truth factor for the detected event based on the first truth score and the second truth score.

If/when the event detection infrastructure determines that additional signals are related to the detected event, similar actions can be implemented on a per normalized signal basis to compute a signal truth score for the normalized signal and recompute an evolving truth factor for the detected event from aggregated truth scores.

The truth factor for a detected event can decay over time. Time decay can be configured per event category based on historical analysis of signal data. A decay function/curve can be maintained per event category. A time decay function/curve can be applied to a truth factor to indicate a reduction in truthfulness as time passes from initial event detection.

Figure 7:
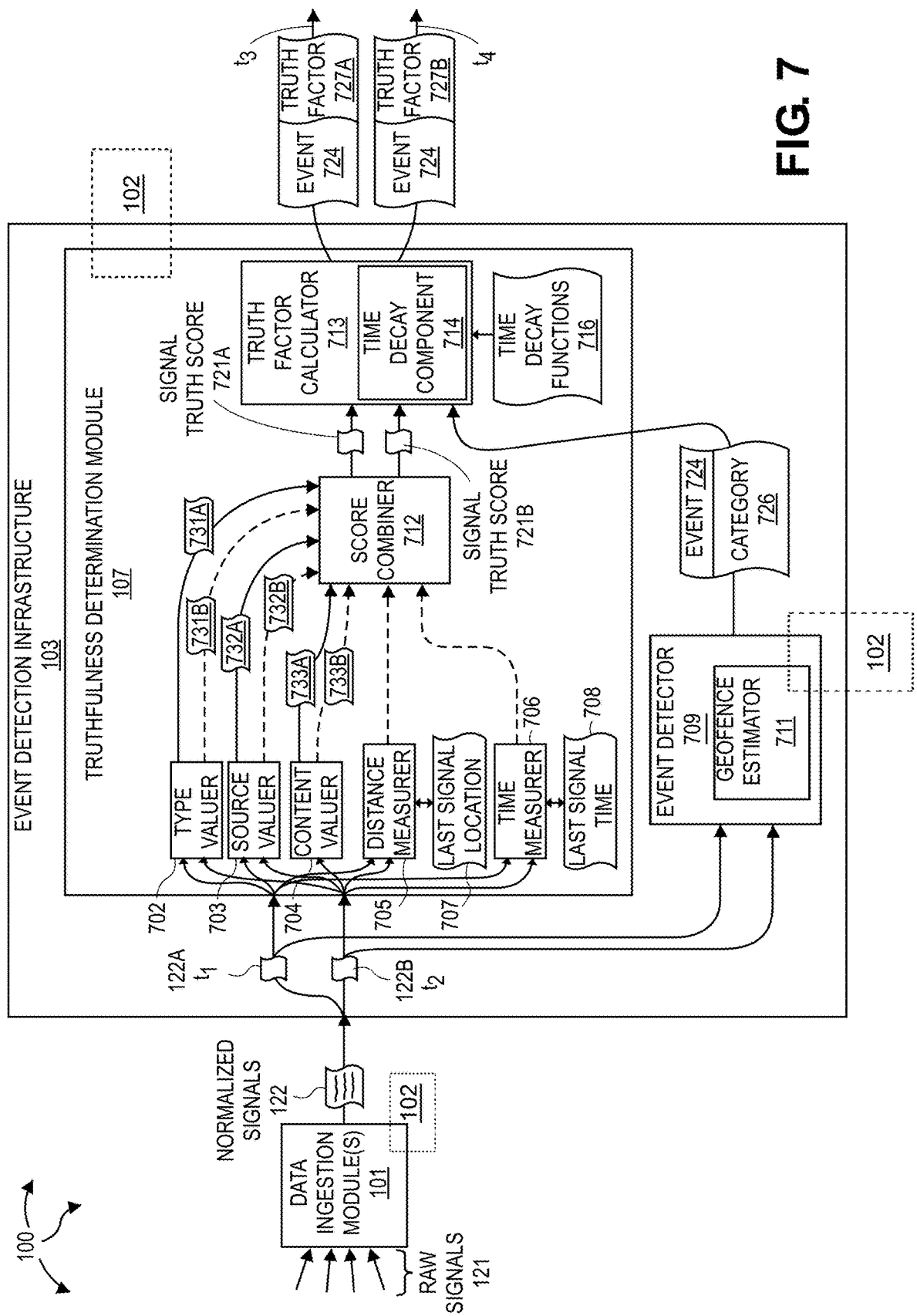
FIG. 7 illustrates a more detailed view of truthfulness determination module.

FIG. 7 illustrates a more detailed view of truthfulness determination module 107. Normalized signals received at event detection infrastructure 103 can be sent to truthfulness determination module 107 and event detector 709. From one or more normalized signals 122, event detector 709 can detect an event. In one aspect, geofence estimator 711 estimates a distance between signals and event detector 709 considers signals that are within a specified distance of each other (or contained in the same geofence). For example, geofence estimator 711 can estimate if signals are within the same geofence.

As depicted, truthfulness module 107 includes type valuer 702, source valuer 703, content valuer 704, distance measurer 705, and time measurer 706. Type valuer 702 can determine a type value for a signal based on signal type. Source valuer 703 can determine a source value for a normalized signal based on signal source. Content valuer 704 can determine a content value for a normalized signal based on content types contained in the signal. Distance measurer 705 can determine a signal location of a normalized signal and measure a distance between the signal location of the normalized signal and the signal location of a previously received normalized signal (when a location of a previously received normalized signal is available). Time measurer 706 can determine a signal origination time for a normalized signal and measure a time between the signal origination time of normalized signal and the signal origination time of a previously received normalized signal (when a origination time of a previously received normalized signal is available).

A type value, a source value, and a content value and, when appropriate, a distance measure and a time measure for a normalized signal can be sent to score combiner 712. Score combiner 712 can combine received values and measures into a signal truthfulness score. Score combiner 712 can send the signal truthfulness score to truth factor calculator 713. Truth factor calculator 713 can calculate a truth factor for an event from one or more signal truth scores. Time decay component 214 can discount a truth factor for an event over time based on a time decay function corresponding to a category of the event.

Thus, a truth factor for an event can evolve over time and as additional normalized signals are received.

As depicted, in FIG. 7 privacy infrastructure 102 can span signal ingestion modules 101 and event infrastructure 103, including modules included in event infrastructure 103. For example, privacy infrastructures 102 is expressly depicted spanning truthfulness determination module 107 and event detector 709 (including geofence estimator 711). Privacy infrastructure 102 can also span other modules included in truthfulness determination module 107 including type valuer 702, source valuer 703, content valuer 704, distance measurer 705, time measurer 706, score combiner 712, and truth factor calculator 713 (including time decay component 714). However, for clarity, privacy infrastructure 102's span across type valuer 702, source valuer 703, content valuer 704, distance measurer 705, time measurer 706, score combiner 712, truth factor calculator 713, and time decay component 714 is not expressly depicted. As such, privacy infrastructure 102 can implement and/or apply any described data privacy operations, such as, user information removal, user information scrubbing, user information stripping, user information obfuscation, access rule application, etc., at and/or through interoperation with any of: truthfulness determination module 107, event detector 709, geofence estimator 711, type valuer 702, source valuer 703, content valuer 704, distance measurer 705, time measurer 706, score combiner 712, truth factor calculator 713, or time decay component 714.

Figure 8:
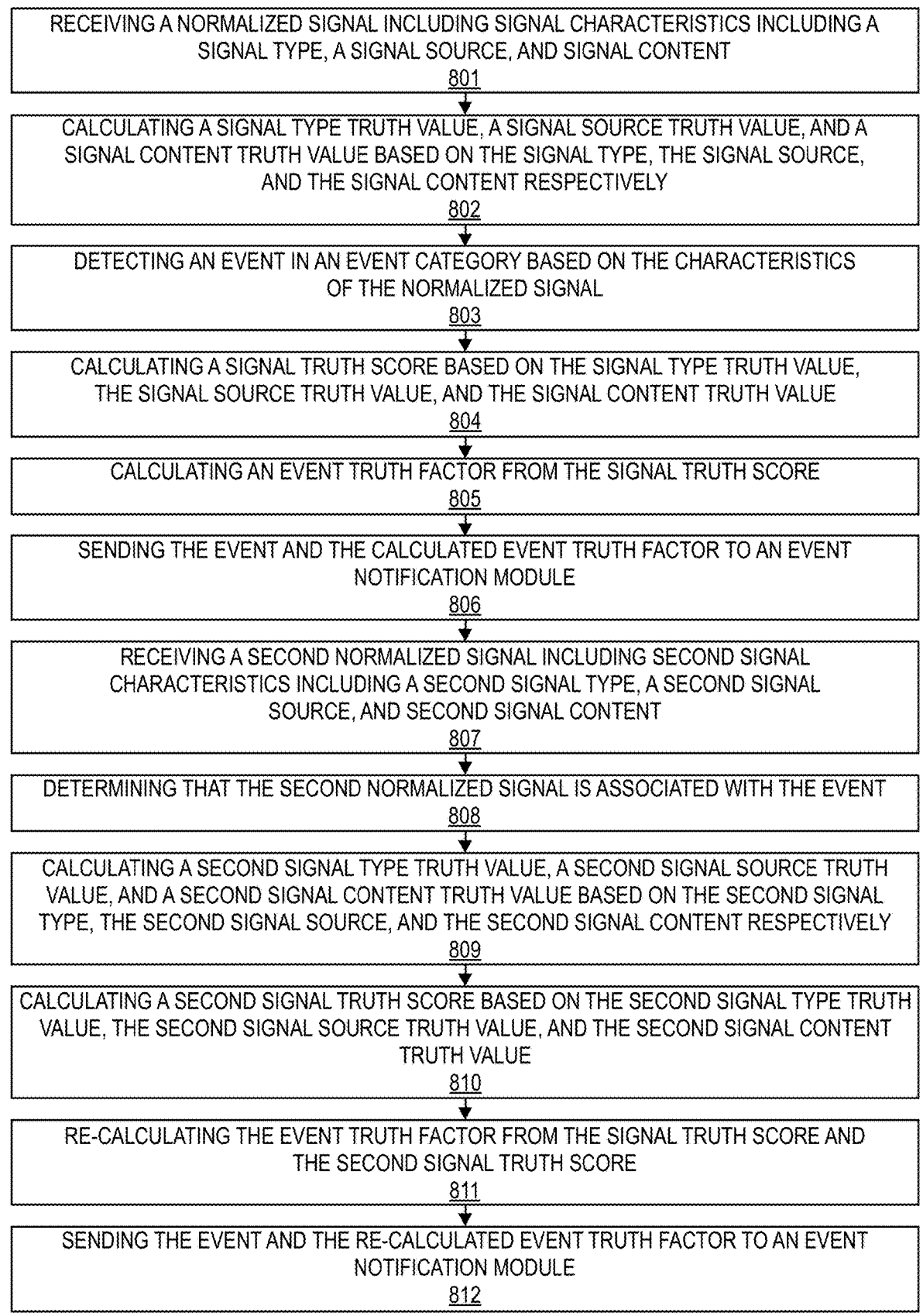
FIG. 8 illustrates a flow chart of an example method for determining event truthfulness.

FIG. 8 illustrates a flow chart of an example method 800 for determining event truthfulness. Method 800 will be described with respect to the components and data depicted in FIG. 7.

Method 800 includes receiving a normalized signal including signal characteristics including a signal type, a signal source, and signal content (801). For example, event detection infrastructure 103 can receive normalized signal 122A at time $t_1$. Normalized signal 122A includes type 128A, source 129A, and content 127A. Normalized signal 122A can be forwarded to truthfulness determination module 107 and event detector 709.

Method 800 includes calculating a signal type truth value, a signal source truth value, and a signal content truth value based on the signal type, the signal source, and the signal content respectively (802). For example, type valuer 702 can calculate signal type truth value 731A from type 128A, source valuer 703 can calculate signal source truth value 732A from source 129A, and content valuer 704 can calculate signal content truth value 733A from content 127A. Type valuer 702 can send signal type truth value 731A to score combiner 712. Source valuer 703 can send signal source truth value 732A to score combiner 712. Content valuer 704 can send signal content truth value 733A to score combiner 712.

Method 800 includes detecting an event in an event category based on the characteristics of the normalized signal (803). For example, event detector 709 can detect event 724 in category 726 based on the characteristics of normalized signal 122A (a trigger signal) (including any of time 123A, location 124A, context 126A, content 127A, type 128A, sources 129A, etc.) Event detector 709 can send event 724 and category 726 to truth factor calculator 713.

Distance measurer 705 can store location 124A as last signal location 707. Time measurer 706 can store time 123A as last signal time 708.

Method 800 includes calculating a signal truth score based on the signal type truth value, the signal source truth value, and the signal content truth value (804). For example, score combiner 712 can calculate signal truth score 721A based on signal type truth value 731A, source truth value 732A, and signal content truth value 733A. Score combiner 712 can send signal truth score 721A to truth factor calculator 713.

Method 800 includes calculating an event truth factor from the signal truth score (805). For example, truth factor calculator 713 can calculate event truth factor 727A for event 724 from signal truth score 721A. Method 800 includes sending the event and the calculated event truth factor to an event notification module (806). For example, event detection infrastructure 103 can send event 724 and truth factor 727A to event notification 116 at time $t_3$. Time $t_3$ can be after time $t_1$. Truth factor 727A can indicate a truthfulness of event 724.

Method 800 includes receiving a second normalized signal including second signal characteristics including a second signal type, a second signal source, and second signal content (807). For example, event detection infrastructure 103 can receive normalized signal 122B at time $t_2$. Normalized signal 122B includes type 128B, source 129B, and content 127B. Normalized signal 122B can be forwarded to truthfulness determination module 107 and event detector 709.

Method 800 includes determining that the second normalized signal is associated with the event (808). For example, geofence estimator 711 can estimate that location 124B is within a threshold distance of location 124A. Based on location 124B being estimated to be within a threshold distance of location 124A, event detector 209 can detect signal 122B as confirming/validating, etc. event 224.

Method 800 includes calculating a second signal type truth value, a second signal source truth value, and a second signal content truth value based on the second signal type, the second signal source, and the second signal content respectively (809). For example, type valuer 702 can calculate signal type truth value 731B from type 128B, source valuer 703 can calculate signal source truth value 732B from source 129B, and content valuer 704 can calculate signal content truth value 733B from content 127B. Type valuer 702 can send signal type truth value 731B to score combiner 712. Source valuer 703 can send signal source truth value 732B to score combiner 712. Content valuer 704 can send signal content truth value 733B to score combiner 712.

Method 800 includes calculating a second signal truth score based on the second signal type truth value, the second signal source truth value, and the second signal content truth value (810). For example, score combiner 712 can calculate signal truth score 721B based on signal type truth value 731B, source truth value 732B, and signal content truth value 733B. Score combiner 712 can send signal truth score 721B to truth factor calculator 713.

Method 800 includes re-calculating the event truth factor from the signal truth score and the second signal truth score (811). For example, truth factor calculator 713 can re-calculate truth factor 727A as truth factor 727B from signal truth score 721A and signal truth score 721B. In one aspect, truth factor calculator 713 calculates truth factor 227B for event 224 from a combination of truth score 721A, truth score 721B, and a time decay discount value. The time decay discount value can be calculated in accordance with a time decay function 216 corresponding to category 726.

Method 800 includes sending the event and the re-calculated (updated) event truth factor to an event notification module (812). For example, event detection infrastructure 103 can send event 724 and truth factor 727B to event notification 116 at time $t_4$. Time $t_4$ can be after time $t_2$. Truth factor 727B can indicate a truthfulness of event 724. Truth factor 721B can indicate increased or decreased truthfulness of event 724 relative to truth factor 721A.

It may also be that distance measurer 205 measures a distance between location 124A and 124B and sends the distance measure to score combiner 712. Distance measurer 705 can also store the location of signal 122B as last signal location 207. Time measurer 706 can also measure a time difference between time 123A and 123B and sends the measured time difference to score combiner 712. Score combiner 712 can combine type value 732A, source value 732B, content value 733B, the measure distance, and the measured time difference into truth score 721B.

In some aspects, method 800 also includes one or more privacy operations. Privacy infrastructure 102 can implement and/or apply any described data privacy operations (possibly through interoperation with modules included in event detection infrastructure 103), such as, user information removal, user information scrubbing, user information stripping, user information obfuscation, access rule application, etc., prior to, during, or after any of: 801, 802, 803, 804, 805, 806, 807, 808, 809, 810, 811, or 812.

In some aspects, signals are grouped into social (FACEBOOK, INSTAGRAM, TWITTER etc.) and non-social (EMS radio communication, CAD, Traffic Cameras, etc.). Individual signals can be valued based on truth factor evaluation (e.g., Computer Aided Dispatch (CAD)) and Emergency Management System (EMS) radio communication signals rank higher than TWITTER/FACEBOOK source signals). Geofences can be generated based on available signals. The geofences can then be used to monitor correlating signals and thus can be used to adjust (improve) truth factor on a continuous basis. Time decay curves can be incorporated to generate value scores for each correlating new signal.

In one aspect, a signal truth score is computed from the equation:

Signal Truth Score=(Sig. Source Value*Sig. Type Value*Sig. Content Value*Distance Measure*Time Measure)

An event truth factor for an event can calculated from the equation:

Truth Factor=((Signal 1 Score+Signal 2 Score++ Signal N Score)/N)*Time Decay

For each category of events, a time decay function can be used to decay a truth factor over time.

Some examples of signal Type and/or Source Rank (value) include:

TABLE 2

Signal Type and/or Source Rank

| Signal Source | Signal Source Rank |
|---|---|
| Traffic Cameras | 10 |
| CAD | 9 |
| Twitter - State/Federal Agency Owned Accounts | 8 |
| Facebook - State/Federal Agency Owned Accounts | 7 |
| Twitter - Individual Owned Accounts | 6 |
| Facebook - Individual Owned Accounts | 5 |
| Instagram | 4 |
| Other | 3 |

Some examples of Signal Distance Rank (value) include:

TABLE 3

Signal Distance Rank

| Distance measure between the previous signal and the next new signal (in meters) | Signal Distance Rank |
|---|---|
| 50 | 10 |
| 100 | 9 |
| 200 | 8 |
| 500 | 7 |
| 800 | 6 |
| 1000+ | 5 |

Some example Signal Time Rank (value) include:

TABLE 4

Signal Time Rank

| Time measure between the previous signal and the next new signal (in seconds) | Signal Time Rank |
|---|---|
| 30 | 10 |
| 60 | 9 |
| 180 | 8 |
| 300 | 7 |
| 600 | 6 |
| 900+ | 5 |

Truthfulness determination module 107 can operate concurrently with other modules included in event detection infrastructure 103 and with privacy infrastructure 102.

Determining Event Severity

Severity scores of individual normalized signals can be considered during event detection. In one aspect, the severity of an event is determined from characteristics of multiple normalized signals. Event severity can be determined concurrently with event detection and determination of other signal/event characteristics, including event truthfulness.

An event severity indicates how severe an event is (e.g., what degree of badness, what degree of damage, etc. is associated with the event). Severity can range from less severe (e.g., a single vehicle accident without injuries) to more severe (e.g., multi vehicle accident with multiple injuries and a possible fatality). As another example, a shooting event can also range from less severe (e.g., one victim without life threatening injuries) to more severe (e.g., multiple injuries and multiple fatalities). In one aspect, severity is represented as a numerical value, such as, for example, from 1 (less severe) to 5 (more severe). Other severity representations, such as, for example, "low", "medium", and "high", are also possible. Additional severity representations include percentages are also possible.

Signal volume (e.g., signal bursts) can be considered when deriving severity for an event. Signal groupings can also be considered from deriving severity for an event. Severity of historical events and corresponding combinations of normalized signals used to detect the historical events can be considered when deriving severity for a new event.

In one aspect, event detection infrastructure 103 determines that characteristics of a first normalized signal provide a basis for detection of an event. For the first normalized signal, severity determination module 108 determines one or more of: a signal location severity value based on signal location of the first normalized signal, a signal time severity value based on a signal time of the first normalized signal, a signal response severity value based on a dispatch codes in the first normalized signal, a signal category severity value based on a signal category of the first normalized signal, and a signal impact severity value based on a signal impact (e.g., on people/property) of the first normalized signal. Severity determination module 108 can compute a first signal severity score for the first normalized signal by combining: the signal location severity value, the signal time severity value, the signal response severity value, the signal category severity value, and the signal impact severity value.

Severity determination module 108 can also calculate an event severity rank from the first signal severity score.

Per normalized signal, event detection infrastructure 103 can also determine/maintain a signal origination time, a signal reception time, and a signal location. Event detection infrastructure 103 can track signal origination time, signal reception time, and signal location per normalized signal. Thus, when a first normalized signal triggers an event detection, event detection infrastructure 103 can determine and record a signal origination time, a signal reception time, and a signal location associated with the first normalized signal.

Subsequent to triggering event detection, event detection infrastructure 103 can determine that a second normalized signal is related to the initial event detection based on characteristics of the second normalized signal. For the second normalized signal, severity determination module 108 determines one or more of: a second signal location severity value based on signal location of the second normalized signal, a second signal time severity value based on a signal time of the second normalized signal, a second signal response severity value based on a dispatch codes in the second normalized signal, a signal category severity value based on a signal category of the second normalized signal, and a signal impact severity value based on a signal impact (e.g., on people/property) of the second normalized signal.

In addition, event detection infrastructure 103 determines and records a signal origination time, a signal reception time, and a signal location associated with the second normalized signal. Event detection infrastructure 103 determines a distance measure between the signal location of the first normalized signal and the signal location of the second normalized signal. Event detection infrastructure 103 also determines a time measure between the signal origination time of the first normalized signal and the signal origination time of the second normalized signal. The distance measure and time measure can be used to group normalized signals within a specified distance or time of one another.

Severity determination module 108 can compute a second signal severity score for the second normalized signal by combining: the second signal location severity value, the second signal time severity value, the second signal response severity value, the second signal category severity value, and the second signal impact severity value.

Severity determination module 108 recalculates the event severity rank for the event from the first signal severity score and the second signal severity score.

If/when event detection infrastructure 103 determines that additional normalized signals are related to the event, similar actions can be implemented on a per normalized signal basis to calculate a signal severity score for the normalized signal and recalculate an evolving event severity rank for the event from aggregated signal severity scores.

Severity determination module 108 can also consider event related signal volume, for example, a count of available CAD signals, burst detection of social signals, etc., when calculating an event severity rank for an event. For example, a burst of normalized signals related to an event may indicate a more severe event. Severity determination module 108 can also consider signal groupings when calculating an event severity rank for an event. A tighter grouping of normalized signals may indicate a more localized and thus less severe event. On the other hand, a wider grouping of normalized signals may indicate a less localized and thus more severe event.

Severity determination module 108 can also consider historical events and corresponding combinations of normalized signals used to detect the historical events when calculating a severity rank for a new event. For example, if a similar event was received in the past and assigned a particular severity rank, it may be appropriate to assign a similar severity rank to a new event.

Figure 9:
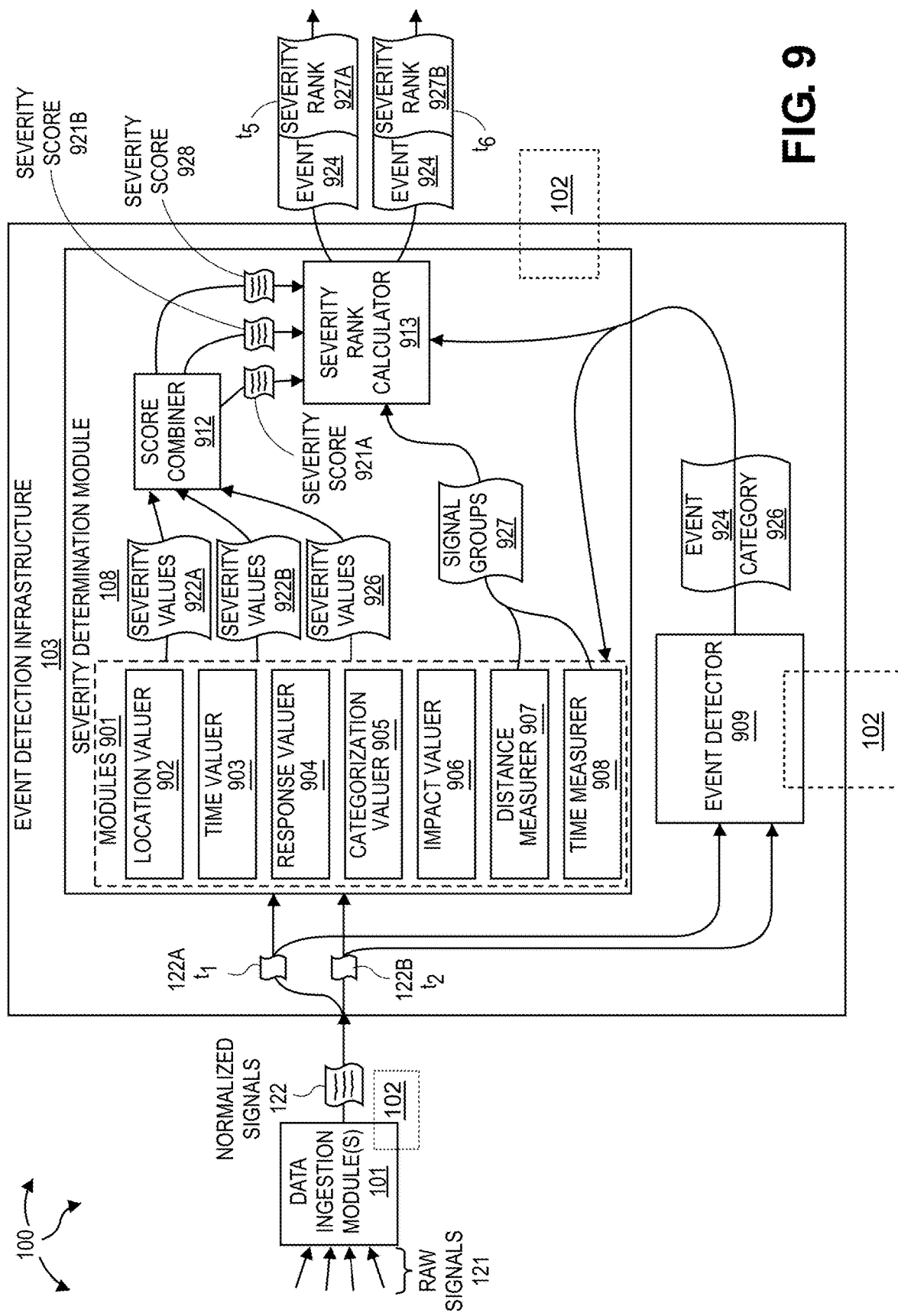
FIG. 9 illustrates a more detailed view of severity determination module.

FIG. 9 illustrates a more detailed view of severity determination module 107. Normalized signals 122 received at event detection infrastructure 103 can be sent to severity determination module 108 and event detector 909 (e.g., event detector 709). From one or more normalized signals 122, event detector 209 can detect an event. From one or more normalized signals 122 and detected events, severity determination module 108 can detect the severity of an event.

As depicted, severity determination module 108 includes modules 901, score combiner 913 and severity rank calculator 913. Modules 901 further include location valuer 902, time valuer 903, response valuer 904, categorization valuer 905, impact valuer 906, distance measurer 907, and time measurer 908. Location valuer 902 can determine a location severity value for a signal or event based on normalized signal location. Time valuer 903 can determine a time severity value for a signal or event based on normalized signal time. Response valuer 904 can determine a response severity value for a signal or event based on a response to a normalized signal. Categorization valuer 905 can determine a category severity value for a signal or event based on a category of a normalized signal. Impact valuer 906 can determine an impact severity value for a signal or event based on an impact associated with a normalized signal. Distance measurer 907 can determine a physical distance between different normalized signals. Time measurer 908 can determine a time distance between different normalized signals. Distance measurer 907 and time measure 908 can interoperate to detect signal bursts and group signals.

When available, any of a location severity value, a time severity value, a response severity value, a category severity value, an impact severity value can be sent to score combiner 912. Score combiner 912 can combine received values and into a signal severity score or an event severity score. Score combiner 912 can send an event severity score to severity rank calculator 913. Distance measurer 907/time measurer 908 can also indicated signal bursts, signal groups to severity rank calculator 913. Severity rank calculator 913 can calculate a severity rank for an event from one or more event severity scores, indications of signal bursts and/or signal groupings, and possibly also through reference to severity ranks of historical events and signals.

As such, a severity event rank can evolve over time and as additional signals are received.

As depicted, in FIG. 9 privacy infrastructure 102 can span signal ingestion modules 101 and event infrastructure 103, including modules included in event infrastructure 103. For example, privacy infrastructures 102 is expressly depicted spanning severity determination module 108 and event detector 909. Privacy infrastructure 102 can also span other modules included in severity determination module 108 including modules 901, location valuer 902, time valuer 903, response valuer 904, categorization valuer 905, impact valuer 906, distance measurer 907, time measurer 908, score combiner 912, and severity rank calculator 913. However, for clarity, privacy infrastructure 102's span across modules 901, location valuer 902, time valuer 903, response valuer 904, categorization valuer 905, impact valuer 906, distance measurer 907, time measurer 908, score combiner 912, and severity rank calculator 913 is not expressly depicted. As such, privacy infrastructure 102 can implement and/or apply any described data privacy operations, such as, user information removal, user information scrubbing, user information stripping, user information obfuscation, access rule application, etc., at and/or through interoperation with any of: severity determination module 108, event detector 909, modules 901, location valuer 902, time valuer 903, response valuer 904, categorization valuer 905, impact valuer 906, distance measurer 907, time measurer 908, score combiner 912, or severity rank calculator 913.

FIG. 10 illustrates a flow chart of an example method 1000 for determining event truthfulness. Method 1000 will be described with respect to the components and data depicted in FIG. 9.

Method 1000 includes receiving a normalized signal including signal characteristics including a signal type, a signal source, and signal content detecting an event from the content of the first signal (1001). For example, event detection infrastructure 103 can receive normalized signal 122A at time $t_1$. Normalized signal 122A includes type 128A, source 129A, and content 127A. Normalized signal 122A can be forwarded to severity determination module 108 and event detector 909 (which may be event detector 709).

Method 1000 includes detecting an event from the content of the normalized signal (1002). For example, event detector 709 can detect event 924 (e.g., event 724) in category 926 (e.g., category 726) based on the characteristics of normalized signal 122A (a trigger signal) (including any of time 123A, location 124A, context 126A, content 127A, type 128A, sources 129A, etc.) Event detector 909 can send event 924 and category 926 to severity rank calculator 913 and to any of modules 901.

Method 1000 includes calculating a location severity value, a time severity value, a response severity value, a category severity value, and an impact severity value based on a location, time, response, category, and impact respectively associated with the normalized signal (1003). For example, location valuer 902, time valuer 903, response valuer 904, categorization valuer 905, and impact valuer 906 can each calculate a corresponding severity value for signal 122A, collectively represented as severity values 922A. Distance measurer 907 can determine and store the location of signal 122A. Time measurer 908 can determine and store an origination time of signal 122A.

Method 1000 includes calculating a severity score for the normalized signal based on the location severity value, the time severity value, the response severity value, the category severity value, and the impact severity value (1004). For example, score combiner 912 can combine severity values 922A into severity score 921A. Score combiner 912 can send severity score 921A to severity rank calculator 913.

Method 1000 includes calculating an event severity rank for the event from the severity score (1005). For example, severity rank calculator 913 can calculate severity 927A for event 924 from severity score 921A. Method 1000 includes sending the event and the event severity rank to an event notification module (1006). For example, event detection infrastructure 103 can send event 924 along with severity rank 927A to event notification at time t5.

Method 1000 includes receiving a second normalized signal including second signal characteristics including a second signal type, a second signal source, and second signal content (1007). For example, event detection infrastructure 103 can receive normalized signal 122B at time $t_2$. Normalized signal 122B includes type 128B, source 129B, and content 127B. Normalized signal 122B can be forwarded to severity determination module 108 and event detector 909 (which may be event detector 709).

Method 1000 includes determining that the second normalized signal is associated with the event (1008). For example, event detector 909 can determine that normalized signal 122B is associated with event 924.

Method 1000 includes calculating a second location severity value, a second time severity value, a second response severity value, a second category severity value, and a second impact severity value based on a location, time, response, category, and impact respectively associated with the second normalized signal (1009). For example, location valuer 902, time valuer 903, response valuer 904, categorization valuer 905, and impact valuer 906 can each calculate a corresponding severity value for signal 122B, collectively represented as severity values 922B. Distance measurer 907 can determine and store the location of signal 122B. Time measurer 908 can determine and store an origination time of signal 122B. Based on locations and origination times, distance measurer 907/time measurer 908 can determine that normalized signals 922A and 922B are in a signal group 927 (and possibly part of a signal burst).

Method 1000 includes calculating a second severity score for the second normalized signal based on the second location severity value, the second time severity value, the second response severity value, the second category severity value, and the second impact severity value (1010). For example, score combiner 912 can combine severity values 922B into severity score 921B. Score combiner 912 can send severity score 921B to severity rank calculator 913. Distance measurer 907/time measurer 908 can also send signal groups 927 to severity rank calculator 913.

Method 1000 includes calculating an updated event severity rank for the event from the first severity score and the second severity score (1011). For example, severity rank calculator 913 can calculate severity 927B for event 924 from severity score 921A, severity score 921B, and signal groups 927 (and/or one or more signal bursts). Method 1000 includes sending the event and the updated event severity rank to the event notification module (1012). For example, event detection infrastructure 103 can send event 924 along with severity rank 927B to event notification at time t6.

In one aspect, event 924 is sent to severity determination module 108.

Location valuer 902, time valuer 903, response valuer 904, categorization valuer 905, and impact valuer 906 can calculate severity values 926 from characteristics of event 224. Distance measurer 907 can determine and store the location of event 924. Score combiner 912 can combine severity values 926 into severity score 928. Score combiner 912 can send severity score 928 to severity rank calculator 913. Severity rank calculator 913 can calculate an additional severity rank for event 224 from severity score 921A, severity score 921B, severity score 928, and signal groups 927. Event detection infrastructure 103 can send event 224 with the additional severity rank to event notification 116.

In some aspects, method 1000 also includes one or more privacy operations. Privacy infrastructure 102 can implement and/or apply any described data privacy operations (possibly through interoperation with modules included in event detection infrastructure 103), such as, user information removal, user information scrubbing, user information stripping, user information obfuscation, access rule application, etc., prior to, during, or after any of: 1001, 1002, 1003, 1004, 1005, 1006, 1007, 1008, 1009, 1010, 1011, or 1012.

In some aspects, signals are grouped into social (FACEBOOK INSTAGRAM, TWITTER, etc.) and non-social (EMS radio communication, CAD, Traffic Cameras, etc.). Individual signals can be valued based on severity rank evaluation (e.g., CAD (computer aided dispatch) and Traffic Camera signals rank higher than TWITTER/FACEBOOK source signals). Geofences can be generated based on available signals. The geofences can then be used to monitor correlating signals and thus can be used to improve severity rank on a continuous basis.

In one aspect, criteria used for a severity assessment include signal/event location, signal/event time, event response (dispatch code, nature of 911 call, etc.), event categorization, event related signal volume, such as, count of signals, detection of bursts of social signals/events, etc., and event impact (e.g., people/property impacted).

A weighted average module (e.g., integrated into and/or spanning score combiner 912 and/or severity rank calculator 913) can be used to determine event severities.

Location Rank (L1): location groups (cities, schools, hospitals, places of interest etc.)

Time Rank (T1): time of occurrence which can directly influence the severity

Response Rank (R1): Priority Dispatch Codes, and whether it's fire, police, or medical, or all of them+SWAT can correspond to higher ranks Category Rank (C1): Fire, Accident, Explosion, etc. can have a higher severity rank than certain other event categories Signal Rank (S1): Rank signal groups based on historical observations Impact Rank (I1): Rank keywords (Killed, Hurt, Hospitalized, SWAT, Shots Fired, Officer Shot, Biohazard, Terrorism, etc.)—places keywords (subway stations, airports, Whitehouse, etc. have higher ranks)

Wherein, Event Severity Rank=(L1*W1)+(T1*W2)+(C1*W3)+(S1*W4)+(I1*W5) and W1, W2, Wn, etc. represent corresponding weights. Weights can be derived dynamically using machine learning models built on an historical events database (i.e., derived based on historical event dissections). Event Severity can be normalized to derive a Severity Rank (e.g., score between 1 and 5, range of "low", "medium", or "high", etc.)

Severity determination module 108 can operate concurrently with any of: truthfulness determination module 107, other modules includes in event detection infrastructure 103, and privacy infrastructure 102.

Event Identification and Notification Based on Entity Preferences

Aspects of the invention identify relevant events and notify entities of relevant events based on entity selected event notification preferences. Entities indicate event notification preferences to an event notification service. An event detection infrastructure detects events based on received signals. The notification service monitors detected events. For each detected event, the notification service compares characteristics of the detected event to event notification preferences for one or more entities. Based on the comparisons, the event notification service determines if an event satisfies event notification preferences for any entities. The event notification service notifies entities having satisfied event notification preferences about the event. Components that facilitate identifying relevant events and notifying entities of relevant events can be integrated with data ingestion modules and an event detection infrastructure.

Detected events can be of interest to entities, such as, for example, parents, guardians, teachers, social workers, first responders, hospitals, delivery services, media outlets, government entities, government agencies, etc. based on event characteristics, such as, for example, a combination of one or more of: event location, event category, event truthfulness, and event severity. For example, a teacher may be interested in shooting and police presence events at and within a specified of distance of a school where they work regardless of truthfulness, severity, or when the event occurred. On the other hand, a parent may be interested in shooting events at the school having at least a specified truthfulness and regardless of severity and time but not interested in shootings in the surrounding area and not interested in other police presence events at the school.

To be notified of events they deem relevant, entities can indicate event notification preferences at a user interface. The user interface can include controls for indicating location preferences, distance range preferences, event category preferences, event truthfulness preferences, event severity preferences, and event time preferences. An entity can select various preferences through the user interface to define events of interest to the entity. A preference can be indicated as a less than, a less than or equal to, a greater than, a greater than or equal to, or equals, as well as combinations thereof.

For example, an entity may be interested in accidents (event category preference), within 5 miles of their house (location preference and distance range preference), having at least an 80% probability to be true (truthfulness preference), having a specified severity (severity preference), and that occurred in the last 30 minutes. Severity may be considered as a gradient. For example, for accidents: one vehicle, no injuries (severity 1), one vehicle and minor injuries (severity 2), multiple vehicles or a serious injury, (severity 3), life threatening injuries (severity 4), fatalities (severity 5). If the entity is interested in information impacting their commute, they may prefer notification about any accidents and can indicate notification for accidents of severity 1 or greater. On the other hand, a firehouse may be interested in accidents of severity 3 or greater, for example, where medical and/or occupant extraction services may be needed.

An entity may be interested in different categories of events in and/or around multiple different locations that having at least a specified truthfulness and/or that have at least a specified severity and/or may desire event notification within a specified time of event detection. As such, an entity can enter multiple different sets of preferences.

Entity event notification preferences can be stored in a preferences database. Each set of preferences for an entity can be stored along with an entity ID for the entity.

When the event identification module receives a detected event, the event identification module can compare characteristics of the event to different sets of entity event notification preferences. When the characteristics of an event satisfy a set of entity preferences associated with an entity, the event and an entity ID of the entity are sent to an event notification module. If characteristics of an event satisfy multiple sets of entity preferences, the event and entity IDs for each associated entity are sent to the event notification module.

The event notification module refers to notification preferences, to determine how to notify an entity. An entity can be notified via email, via text message, through other messaging infrastructures, by storing an event in durable storage, etc. An event can be formatted for compatibility with entity systems. For example, an event can be stored in a data format requested by an entity. In one aspect, an event detecting in a format used by one entity. The even can be translated into a format used by another entity. As such the meaning of the event can be translated from the one entity to the other entity. A time preference can indicate a desire to be notified of an event within a specified time of event detection. In one aspect, the specified time ranges from live-time (essentially a preference to be notified concurrently with event detection) to 60 minutes.

Figures 2, 11A:
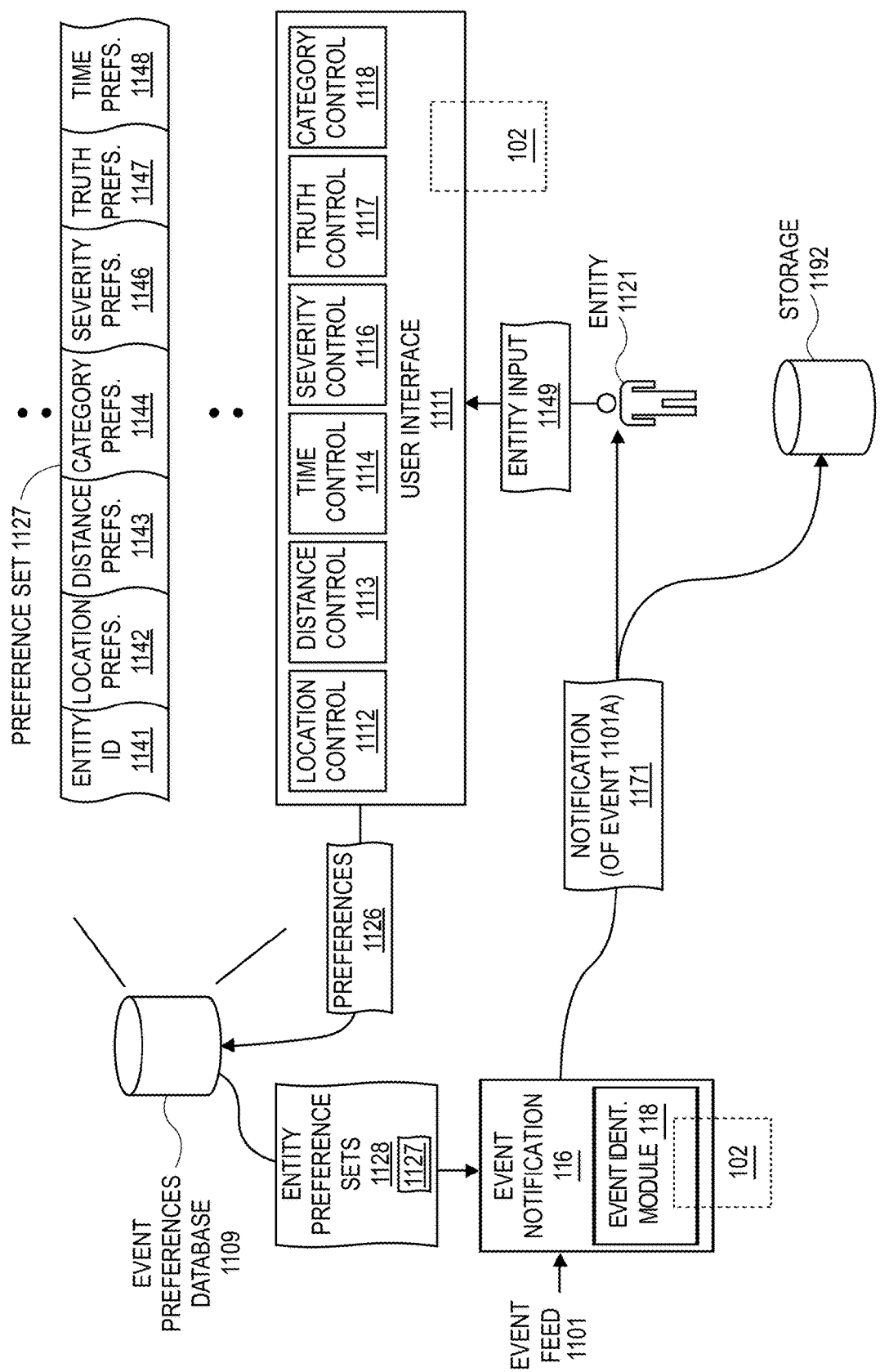

FIGS. 11A-1 and 11A-2 illustrate a computer architecture that facilitates identifying relevant events and notifying entities of relevant events. In one aspect, event detection infrastructure 103 generates event feed 1101. Event feed 1101 includes detected events, including event 1101A, event 1101B, etc. Each event can include an event ID, a time, a location, a description, a category (or categories) (i.e., context), a truthfulness, and a severity. For example, event 1101A includes ID 1102A, time 1103A, location 1104A, description 1105A, category (or categories) 1106A, truth 1107A, and severity 1108A. Similarly, event 1101B includes ID 1102B, time 1103B, location 1104B, description 1105B, category (or categories) 1106B, truth 1107B, and severity 1108B.

Event detection infrastructure 103 can send event feed 1101 to event notification 116.

As depicted in FIG. 11A-2, user interface 1111 includes location control 1112, distance control 1113, time control 1114, severity control 1116, truth control 1117, and category control 1118. Location control 1112 can be used to select locations of interest to an entity. Distance control 1113 can be used to select a distance from (e.g., a radius or other shape around) a selected location or define an area that is of interest to the entity. Location control 1112 and distance control 1113 can be utilized in tandem to indicate any of: a distance from a fixed location, a geo fenced area, or specific types of locations contained in a geo fenced area.

Category control 1118 can be used to select event categories (i.e., context) of interest to an entity. Time control 1114 can be used to indicate a time frame (e.g., 1, 5, 10, 15, or 30 minutes) in which an entity wishes to be notified of events after event detection. The time frame can be defined as an event age after which there is no longer interest in being notified of events that otherwise satisfy entity notification preferences. In one aspect, time control 1114 is used to indicate an interest in being notified of events in "live time" or essentially at "moment zero". In another aspect, time control 1114 is used to indicate an interest in being notified of events within 60 minutes of detection. Severity control 1116 can be used to indicate event severities of interest to the user. Truth control 1117 can be used to indicate event truthfulness of interest to the user.

Other times settings can be configured to indicate when the user desires to be notified. For example, a user may be interested in events that are detected in "live time" or essentially at "moment zero" but wants to be notified on the hour, once a day, etc.

User interface 1111 can also include controls for identifying entities to be notified when event notification preferences are satisfied. For example, an entity selecting event notification preferences can select a preference to notify themselves and/or others of relevant events. User interface 1111 can also include controls enabling an entity to select notification mechanisms, such as, text message, email, data file, etc. per entity that is to be notified.

The depicted controls as well as other indicated controls of user interface 1111 can be graphical user interface controls including any of: check boxes, radio buttons, dials, sliders, text entry fields, etc.

Entity 1121 can enter entity input 1149 at user interface 1111 to formulate preferences 1126. Entity 1121 can select, adjust, manipulate, etc. one or more of location control 1112, distance control 1113, time control 1114, severity control 1116, truth control 117, and category control 1118 to formulate preferences 1126. Entity 1121 can also select one or more notification mechanisms at user interface 1111. When entity 1121 completes preference selection, user interface 1111 can store preferences 1126 as preference set 1127 in event preferences database 1109.

As depicted, preference set 1127 includes entity ID 1141 (of entity 1121), location preferences 1142 (e.g., indicating a location of interest or an area of interest), distance preferences 1143, category preferences 1144, severity preferences 1146, truth preferences 1147, and time preferences 1148. For example, preference set 1127 can indicate that entity 1121 is interested in police presence events (category) within one mile of a high school (location and distance) within 5 minutes of detection (time preference), that have at least a specified severity, that have a 50% or greater probability of being true.

Time preferences 1148 can indicate interest in events less than or equal to a maximum age (and that otherwise meet entity notification requirements). In one aspect, time preferences 1148 indicate that entity 1121 desires to be notified of relevant events detected in "live time" or essentially at "moment zero" (and that otherwise satisfied entity notification preferences). In another aspect, time preferences 1148 indicate that entity 1121 desires to also be notified of relevant events detected within some amount time after moment zero, for example, in range between 1 and 60 minutes (and that otherwise satisfied entity notification preferences).

For example, an entity may register to be notified of events that are less than 30 minutes old and have truthfulness (e.g., confidence level) threshold of at least 75%. At "moment zero" can event may be detected and have an associated truthfulness (confidence level) of 40%. The entity is not notified of the event because the truthfulness does not satisfy the truthfulness threshold. 35 minutes later another signal is received raising the associated truthfulness (confidence level) to 80%. However, the entity is still not notified of the event because the entity is not interested in events that are older than 30 minutes, In one aspect, an application is installed on a mobile phone used by entity 1121. User interface 1111 is included in the application. In another aspect, user interface 1111 is a web-based interface access by entity 1121 using a browser.

Entity 1121 can utilize user interface 1111 to formulate other preference sets. Other users can also utilize user interface 1111 or other similar user interfaces to formulate additional preference sets (e.g., at their mobile phones).

From time to time, or on an ongoing basis, event identification module 118 can access entity preference sets 1128, including preference set 1127, from event preferences database 1109. As event identification module 118 receives events, identification module 118 filters event feed 1101 to identify events that entities have defined as relevant in preference sets. Event identification module 118 compares characteristics of received events to entity preference sets 1128 to determine if events satisfy any event preference sets.

As depicted, in FIGS. 11A-1 and 11A-2 privacy infrastructure 102 spans event infrastructure 103, event notification 116, including event identification module 118, and user interface 1111. As such, privacy infrastructure 102 can implement and/or apply any described data privacy operations, such as, user information removal, user information scrubbing, user information stripping, user information obfuscation, access rule application, etc., at and/or through interoperation with any of: infrastructure 103, event notification 116, event identification module 118, or user interface 1111.

FIG. 12A illustrates a flow chart of an example method 1200 for identifying relevant events and notifying entities of relevant events. Method 1200 will be described with respect to the components and data depicted in FIG. 11A.

Method 1200 includes receiving an event feed containing a plurality of events, each event detected from one or more normalized signals, each event including an event location, an event category, an event an event truthfulness, an event severity, and an event time (1201). For example, event notification 116 can receive event feed 1101, including events 1101A, 1101B, etc.

Method 1200 includes accessing entity notification preferences defining events relevant to an entity, the entity notification preferences including category preferences, location preferences, distance preferences, truth preferences, severity preferences, and time preferences, the location preferences and distance preferences collectively defining that the entity is interested in events within a specified distance of one or more locations, the time preferences defining that the entity desires event notification at least within a specified time period of event detection (1202). For example, from time to time, or on an ongoing basis event identification module 118 can access entity preference sets 1128, including preference set 1127, from event preferences database 1109.

Method 1200 includes for an event in the event feed, comparing characteristics of the event to the entity notification preferences (1203). For example, as event notification 116 receives event feed 1011, identification module 118 filters event feed 1101 to identify events that entities have defined as relevant in preference sets. Event identification module 118 compares characteristics of received events to entity preference sets 1128 to determine if events satisfy any event preference sets. For example, event identification module 118 can compare the characteristics of event 1101A to preference set 1127.

More specifically, method 1200 includes comparing the event location to the location preferences in view of the distance preferences (1204), comparing the event category to the category preferences (1205), comparing the event truthfulness to the truth preferences (1206), and comparing the event severity to the severity preferences (1207). For example, event identification module 118 can compare location 1104A to location preferences 1142 in view of distance preferences 1143, can compare category (or categories) 1106A to category preferences 1144, can compare truthfulness 1107A to truth preferences 1147, and can compare severity 1108A to severity preferences 1148.

Method 1200 includes determining that the event satisfies the entity notification preferences based on the comparisons (1208). For example, event identification module 118 can determine that event 1101A satisfies preference set 1127. Method 1200 includes notifying an electronic device of the event in compliance with the time preferences (1209). For example, event notification 116 can send notification 1171 (of event 1101A) to an electronic device (e.g., a mobile phone) associated with entity 1121 in compliance with time preferences 1148. Event notification 116 can also store notification 1171 at storage 1192. In one aspect, notification 1171 is sent essentially at "moment zero" or in "live-time". In another aspect, notification 1171 is sent after a configured delay, for example, between zero and 60 minutes.

In some aspects, method 1200 also includes one or more privacy operations. Privacy infrastructure 102 can implement and/or apply any described data privacy operations (possibly through interoperation with modules included in one or more of: event detection infrastructure 103, event notification 116, or user interface 1111), such as, user information removal, user information scrubbing, user information stripping, user information obfuscation, access rule application, etc., prior to, during, or after any of: 1201, 1202, 1203, 1204, 1205, 1206, 1207, 1208, or 1209.

In one aspect, notification 1171 includes at least some content from event 1101A, such as, for example, time 1103A, location 1104A, description 1105A, and category (or categories) 106A. Entity 1121 may use storage 1192 to store relevant events over a period of time and subsequently use the stored events in other data processing operations.

If event identification module 118 determines that event 1101A satisfies other additional preference sets, notifications can be set to entities corresponding to those preferences sets. Event notification module 116 can notify other entities in accordance with their notification preferences.

Event identification module 118 through interoperation with event detection infrastructure 103, event preferences database 1109, and event notification 116, essentially functions as a controller of live data. Accordingly, aspects of the invention allow entities to tailor event notifications to their specific needs and desires and receive event notifications for events they deem relevant (without being bombarded with irrelevant events) in a timely manner.

In other scenarios, an entity and/or their associates, related entities, such as, security personnel, etc. may be interested in events at or around the entity's current location and/or events at or around locations the entity may visit in the near future. The entity and/or their associates, related entities, etc. may interested in events on an ongoing basis, including updates as the entity moves between different locations. For example, a person travelling may be interested in events ahead of them on the highway that might slow down their travel. Government officials/corporate executives and/or their security personnel may be interested in events posing a threat of physical injury to the government officials/corporate executive at a location or in transit between locations. First responders may be interested in medical, fire, or law enforcement related events near their location to more quickly provide relevant services. An air traveler may be interested in events at their destination.

Aspects of the invention identify relevant events and notify entities (or their associates, related entities, etc.) of relevant events based on current location or predicted future location of an entity, for example, to provide situational awareness about the entity's current or future surroundings. Current entity location as well as probable future entity locations can be considered when determining event relevancy. Current location and probable future location can be derived from entity location information. Entity location information can be expressly defined and/or inferred from other information about the entity.

In one aspect, a current location of an entity is determined from expressly defined and/or inferred entity location information. The entity (or their associates, related entities, etc.) is sent event notifications to notify the entity (or their associates, related entities, etc.) of relevant events at or near the entity's current location. The entity's current location can be determined, and event notifications sent to the entity (or their associates, related entities, etc.) on an ongoing basis to update the entity (or their associates, related entities, etc.) as the entity moves between locations.

In another aspect, expressly defined and/or inferred entity location information is used to predict, derive, etc., the entity's possible/probable future location(s). The entity (or their associates, related entities, etc.) is sent event notifications to notify the entity (or their associates, related entities, etc.) about relevant events at or near the entity's possible/probable future location(s). Changes to an entity's possible/probable future location(s) can be predicted, derived, etc., on an ongoing basis as expressly defined location information and/or inferred location information for an entity changes. As possible/probable future location(s) change, the entity (or their associates, related entities, etc.) is sent event notifications to update the entity (or their associates, related entities, etc.) about relevant events at or near the changed future location(s).

As described, entities can indicate event notification preferences to an event notification service. An event detection infrastructure detects events based on received signals. The notification service monitors detected events. For each detected event, the notification service compares characteristics of the detected event to event notification preferences for one or more entities. Based on the comparisons, the event notification service determines if an event satisfies event notification preferences for any entities. The event notification service notifies entities having satisfied event notification preferences about the event.

Location control 1112 and distance control 1113 can be utilized in tandem to indicate preferences for being notified of events at an entity's current location and/or for being notified of events at an entity's probably future location(s). Also as described, user interface 1111 can include controls for identifying entities to be notified when event notification preferences are satisfied. For example, an entity selecting event notification preferences can select a preference to notify themselves and/or others of relevant events.

In one aspect, an entity registers event notification preferences indicating a desire to be notified of events at or near the entity's current location and/or to be notified of events at or near the entity's predicted future locations. Alternatively, and/or in combination, an entity (e.g., a protectee) registers event notification preferences indicating a desire that another entity (e.g., the protectee's security personnel) be notified of events at or near the entity's current location and/or to be notified of events at or near the entity's predicted future locations. In a further aspect, an entity (e.g., a protectee's security personnel) registers notification preferences indicating a desire to be notified of events at or near another entity's (e.g., the protectee) current location and/or to be notified of events at or near the other entity's predicted future locations. User interface controls associated with location and distance preferences can be used to define an interest in events at or within a specified distance of an entity's current location and/or at or within a specified distance of the entity's probably future location(s). The event notification service can then notify an appropriate entity or entities of relevant events at or near an entity's current location and/or at or near the entity's possible/probable future location(s) as appropriate.

For example, an entity may be interested in accidents (event category preference), within one mile of their current location as they are driving (location and distance range preference), having at least an 75% probability to be true (truthfulness preference), of any severity (severity preference), and desires event notification of accident that occurred within the last hour (time preference). In another example, an entity on an airplane may be interested in demonstrations (event category preference) in a city where they may be landing within the next hour (location and time preference), having at least a 70% probability to be true (truth preference), and having moderate severity (severity preference). As a further example, a police officer in his/her patrol car may be interested in any crime related events (event category preference) within a half-mile of his/her current location on an ongoing basis as he/she patrols (location and distance range preference), having at least a 60% probability to be true (truth preference), having high severity (e.g., crimes against person) (severity preference), and desires event notification of events that occurred in the last 5 minutes (or in "live time") (time preference).

If there is an interest in events within a specified distance of an entity's current location, a location awareness module can access location data and/or other location related data corresponding to and/or shared by the entity. The location awareness module uses the location data and/or the other location related data to determine (or at least estimate) the entity's current location. In some aspects, location data (e.g., coordinates of a mobile phone, coordinates of a connected vehicle, location data from a location service, etc.) expressly defines the entity's current location. The location awareness module calculates the entity's location from the location data.

In other aspects, other location related data, such as, for example, navigation maps, map routing data, navigational data, calendar data, travel itineraries, social media data, indirectly indicate an entity's location. The location awareness module infers the entity's current location from the other location related data. In one aspect, artificial intelligence and/or machine learning is used to infer an entity's current location from other location related data.

In general, an event identification module can compare an event location to an entity's current location to determine if an event is relevant to the entity (e.g., in accordance with distance preferences). In one aspect, artificial intelligence and/or machine learning is used to determine if an event is relevant to an entity based on current location.

If there is an interest in events within a specified distance of an entity's future location(s), the location awareness module can access location data and/or other location related data corresponding to and/or shared by the entity. The location awareness module predicts probable future locations of the entity from the location data and/or other location related data. In one aspect, artificial intelligence and/or machine learning is used to infer an entity's probable future location(s) from the location data and/or other location related data. For example, from a flight itinerary, the location awareness module can infer that an entity is to land at a destination in a specified period of time. In another example, from a current location on a highway, vehicle speed, and a map route, the location awareness module can infer that an entity is to arrive in a particular town in a specified period of time.

The event identification module can compare an event location to an entity's probably future location(s) to determine if an event is relevant to the entity (e.g., in accordance with distance preferences). In one aspect, artificial intelligence and/or machine learning is used to determine if an event is relevant to the entity based on probable future location(s).

An event notification module refers to notification preferences, to determine how to notify an entity (either about events relevant to them or events relevant to another entity). An entity can be notified via email, via text message, through other messaging infrastructures, by storing an event in durable storage, etc. An event can be formatted for compatibility with entity systems. For example, an event can be stored in a data format requested by an entity.

Figure 11B:
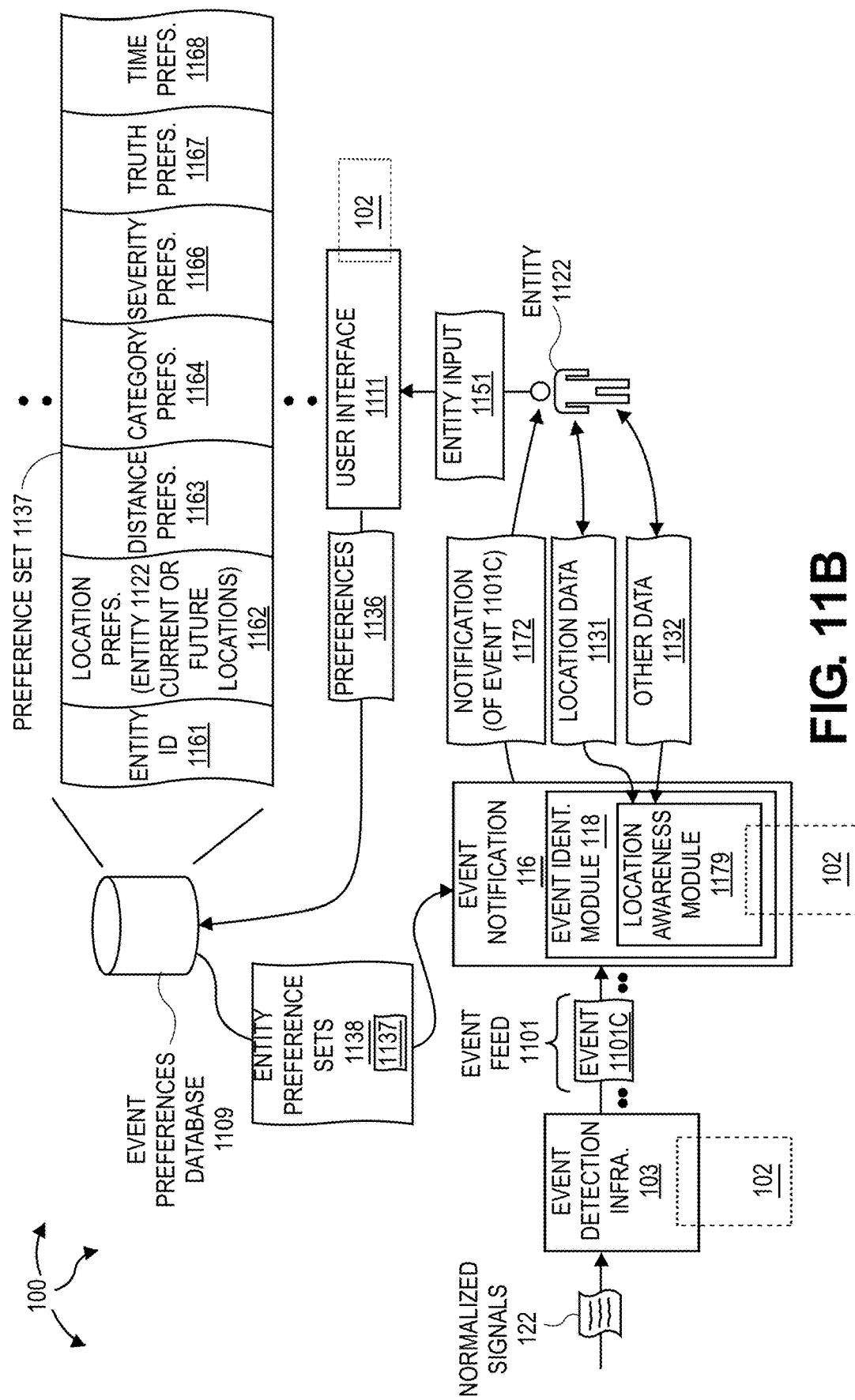
FIG. 11B illustrates a computer architecture that facilitates identifying relevant events and notifying entities of relevant events.

FIG. 11B illustrates a computer architecture that facilitates identifying relevant events and notifying entities of relevant events. As depicted in FIG. 11B, event identification module 118 includes location awareness module 1179. In general, location awareness module 1179 can access location data and/or other (location related) data for an entity. Location awareness module 1179 can (possibly using artificial intelligence and/or machine learning) determine (or at least estimate) a current location of the entity from the location data and/or other (location related) data. Location awareness module 1179 can also (possibly using artificial intelligence and/or machine learning) predict (or at least estimate) probable future location(s) of the entity from the location data and/or other (location related) data As described, user interface 1111 includes location control 1112, distance control 1113, time control 1114, severity control 1116, truth control 1117, and category control 1118. The various controls can be manipulated by an entity to enter event notification preferences. Also as described, user interface 1111 can include controls enabling an entity to select notification mechanisms, such as, text message, email, data file, etc.

Entity 1122 can enter entity input 1151 at user interface 1111 to formulate preferences 1136. Entity 1122 can select, adjust, manipulate, etc. one or more of location control 1112, distance control 1113, time control 1114, severity control 1116, truth control 117, and category control 1118 to formulate preferences 1126. Entity 1122 can also select one or more notification mechanisms at user interface 1111. When entity 1122 completes preference selection, user interface 1111 can store preferences 1136 as preference set 1137 in event preferences database 1109.

Time preferences 1168 can indicate a time delay after which a notification for a relevant event can be sent. In one aspect, time preferences 1168 indicate that entity 1121 desires to be notified of relevant events in "live time" or essentially at "moment zero". In another aspect, time preferences 1168 indicate that entity 1122 desires to be notified of relevant events after a time delay of between zero and 60 minutes.

As depicted, preference set 1137 includes entity ID 1161 (of entity 1121), location preferences 1162 (e.g., indicating interest in events at entity 1122's current and/or probable future locations), distance preferences 1163, category preferences 1164, severity preferences 1166, truth preferences 1167, and time preferences 1168. For example, preference set 1137 can indicate that entity 1122 is interested in police presence events (category) within a specified distance of his or her location (location preference) within 3 minutes of detection (time preference), that have at least a specified severity, that have a 50% or greater probability of being true.

In one aspect, an application is installed on a mobile phone used by entity 1122. User interface 1111 is included in the application. In another aspect, user interface 1111 is a web-based interface access by entity 1122 using a browser.

Entity 1122 can utilize user interface 1111 to formulate other preference sets. Other users can also utilize user interface 1111 or other similar user interfaces to formulate additional preference sets (e.g., at their mobile phones).

From time to time, or on an ongoing basis, event identification module 118 can access entity preference sets 1138, including preference set 1137, from event preferences database 1109. As event identification module 118 receives events, identification module 118 filters event feed 1101 to identify events that entities have defined as relevant in preference sets. Event identification module 118 compares characteristics of received events to entity preference sets 1138 to determine if events satisfy any event preference sets.

As depicted, in FIG. 11B privacy infrastructure 102 spans event infrastructure 103, event notification 116, including event identification module 118 and location awareness module 1179, and user interface 1111. As such, privacy infrastructure 102 can implement and/or apply any described data privacy operations, such as, user information removal, user information scrubbing, user information stripping, user information obfuscation, access rule application, etc., at and/or through interoperation with any of: event infrastructure 103, event notification 116, event identification module 118, location awareness module 1179, or user interface 1111.

FIG. 12B illustrates a flow chart of an example method 1250 for identifying relevant events and notifying entities of relevant events. Method 1250 will be described with respect to the components and data depicted in FIG. 11B.

Method 1250 includes receiving an event feed containing a plurality of events, each event detected from one or more signals, each event including an event location, an event category, an event truthfulness, an event severity, and an event time (1251). For example, event notification 116 can receive event feed 101, including event 1101C.

Method 1250 includes accessing entity notification preferences defining events relevant to an entity, the entity notification preferences including category preferences, location preferences, distance preferences, truth preferences, severity preferences, and time preferences, the location preferences and distance preferences collectively indicating that the entity is interested in events within a specified distance of at least one of: the entity's current location or the entity's probable future location, the time preferences defining that the entity desires event notification at least within a specified time period of event detection (1252). For example, from time to time, or on an ongoing basis event identification module 118 can access entity preference sets 1138, including preference set 1137, from event preferences database 1109.

For an event in the event feed, method 1250 includes comparing characteristics of the event to the entity notification preferences (1253). For example, as event notification 116 receives event feed 1011, identification module 118 filters event feed 1101 to identify events that entities have defined as relevant in preference sets. Event identification module 118 compares characteristics of received events to entity preference sets 1128 to determine if events satisfy any event preference sets. For example, event identification module 118 can compare the characteristics of event 1101C to preference set 1137.

More specifically, method 1250 includes accessing one or more of: location data corresponding to the entity or other location related data corresponding to the entity (1254). Method 1250 includes determining the at least one of: the entity's current location or the entity's probable future location from the one or more of: the location data and the other location related data (1255). Method 1250 includes comparing the event location to the at least one of: the entity's current location or the entity's probable future location (1256).

For example, in one aspect, location preferences 1162 and distance preferences 1163 collective indicate that entity 1122 is interested in events within a specified distance of their current location. In response, location awareness module 1179 accesses location data 1131 and/or other (location related) data 1132. Location awareness module 179 (possibly using artificial intelligence and/or machine learning) determines (or at least estimates) a current location of entity 1122. Event identification module 118 can (possibly using artificial intelligence and/or machine learning) determine if a location indicated in event 1101C is within the specified distance (defined in distance preferences 143) of entity 1122's current location.

In another aspect, location preferences 1162 and distance preferences 1163 collective indicate that entity 1122 is interested in events within a specified distance of their probable future location(s). In response, location awareness module 1179 access location data 1131 and/or other (location related) data 1132. Location awareness module 1179 (possibly using artificial intelligence and/or machine learning) predicts (or at least estimates) probable future location(s) of entity 1122. Event identification module 118 can (possibly using artificial intelligence and/or machine learning) determine if a location indicated in event 1011C is within the specified distance (defined in distance preferences 1163) of entity 1122's probable future location(s).

Method 1250 includes comparing the event category to the category preferences (1257), comparing the event truthfulness to the truth preferences (1258), and comparing the event severity to the severity preferences (1259). For example, event identification module 118 can compare a category (or categories) indicated in event 1101C to category preferences 1164, can compare a truthfulness indicated in event 1101C to truth preferences 1167, and can compare a severity indicated in event 1101C to severity preferences 1168.

Method 1250 includes determining that the event satisfies the entity notification preferences based on the comparisons (1261). For example, event identification module 118 can determine that event 1101C satisfies preference set 1137. Method 1250 includes notifying the entity of the event in compliance with the time preferences (1262). For example, event notification 116 can send notification 1172 (of event 1101C) to an electronic device (e.g., a mobile phone) associated with entity 1122 in compliance with time preferences 1168. Event notification 116 can also store notification 1172 in durable storage. In one aspect, time preferences 1168 indicate that notifications are to be sent essentially at "moment zero". As such, event notification 116 can send be configured to send a live-feed of situational awareness regarding entity 1122.

In some aspects, method 1250 also includes one or more privacy operations. Privacy infrastructure 102 can implement and/or apply any described data privacy operations (possibly through interoperation with modules included in one or more of: event detection infrastructure 103, event notification 116, or user interface 1111), such as, user information removal, user information scrubbing, user information stripping, user information obfuscation, access rule application, etc., prior to, during, or after any of: 1251, 1252, 1253, 1254, 1255, 1256, 1257, 1258, 1259, 1260, 1261, or 1262.

In one aspect, notification 1172 includes at least some content from event 1101C, such as, for example, a time, a location, a description, and a category (or categories). Entity 1122 may use durable storage to store relevant events over a period of time and subsequently use the stored events in other data processing operations.

If event identification module 118 determines that event 1101C satisfies other additional preference sets, notifications can be set to entities corresponding to those preferences sets. Event notification module 116 can notify other entities in accordance with their notification preferences.

Event identification module 118 and location awareness module 1179 through interoperation with event detection infrastructure 103, event preferences database 1109, and event notification 1116, essentially functions as a controller of live data. Accordingly, aspects of the invention allow entities to tailor event notifications to their specific needs and desires and receive event notifications for events they deem relevant (without being bombarded with irrelevant events) in a timely manner.

Figure 13:
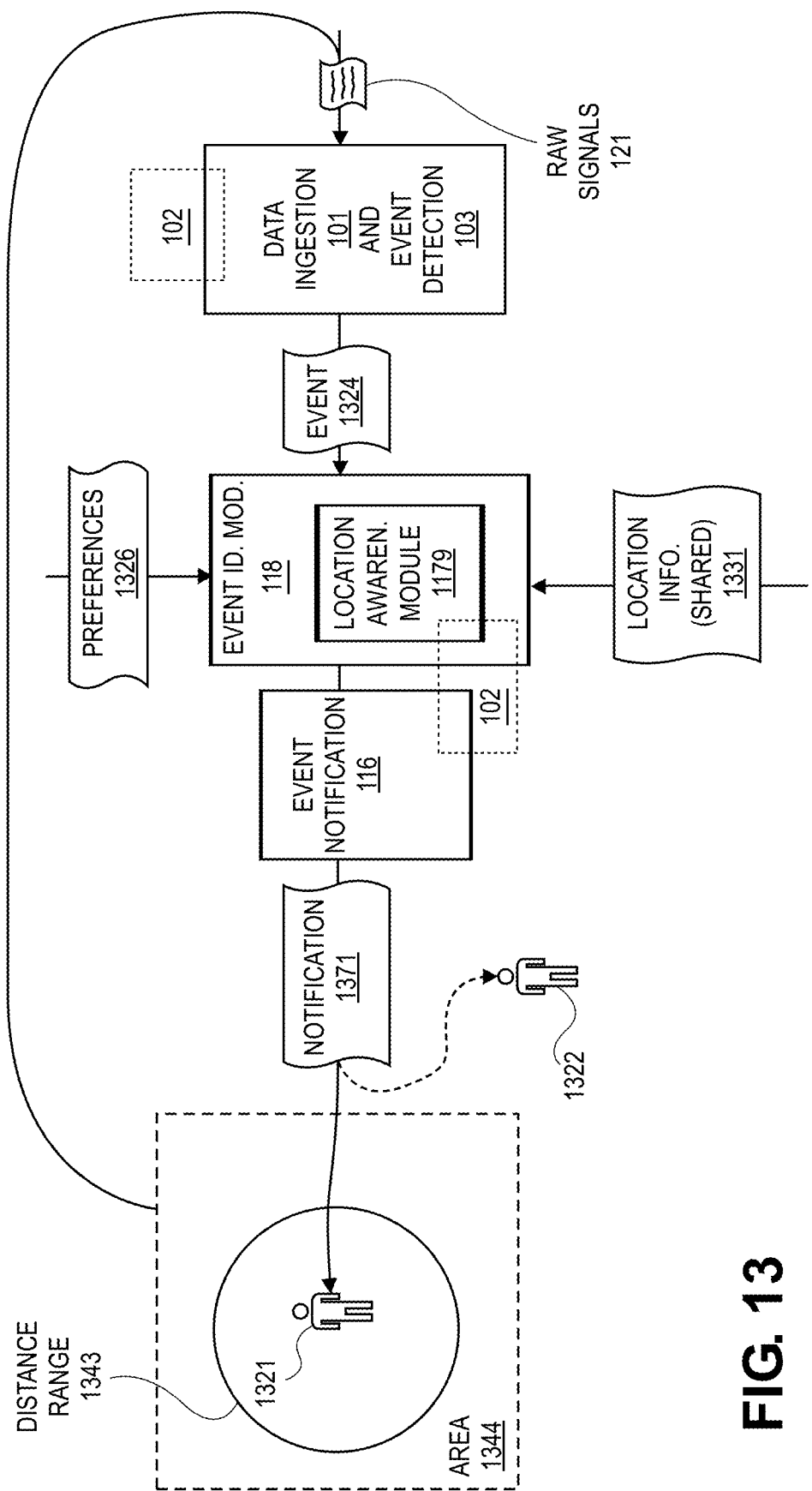
FIG. 13 illustrates a computer architecture that facilitates notifying of an event at or near the current location of an entity.

FIG. 13 illustrates a computer architecture that facilitates notifying of an event at or near the current location of an entity. Entity 1321 can indicate in preferences 1326 (e.g., entered through user interface 1111, 1500, or another similar user interface) a desire to be notified of events within distance range 1343 of entity 1321's current location. Alternately or in combination, entity 1321 can indicate in preferences 1326 a desire to notify entity 1322 of events within distance range 1343 of entity 1321's currently location. In another aspect, entity 1322 indicates in preferences 1326 a desire to be notified of events within distance range 1343 of entity 1321's current location.

From raw signals 121, including raw signals originating in area 1344, data ingestion 101 and event detection 103 can interoperate to detect event 1324. Location awareness module 1179 can access location information 1331 for entity 1321 (e.g., a mobile phone location, travel itinerary, etc.). Location awareness module 1379 can (possibly using artificial intelligence and/or machine learning) derive a current location of entity 1321.

Event identification module 118 can access preferences 1326. Event identification module 118 can (possibly using artificial intelligence and/or machine learning) determine that event 1324 is within distance range 1343 of entity 1321 (and otherwise satisfies preferences 1326). Event notification module 116 can send notification 1371 to entity 1321 to notify entity 1321 of event 1324. Alternately or in combination, event notification module 116 can also send notification 1371 (or a different notification) to entity 1322 to notify entity 1322 of event 1324. Notification 1371 can be an electronic message sent to one or more mobile phones.

Figure 14:
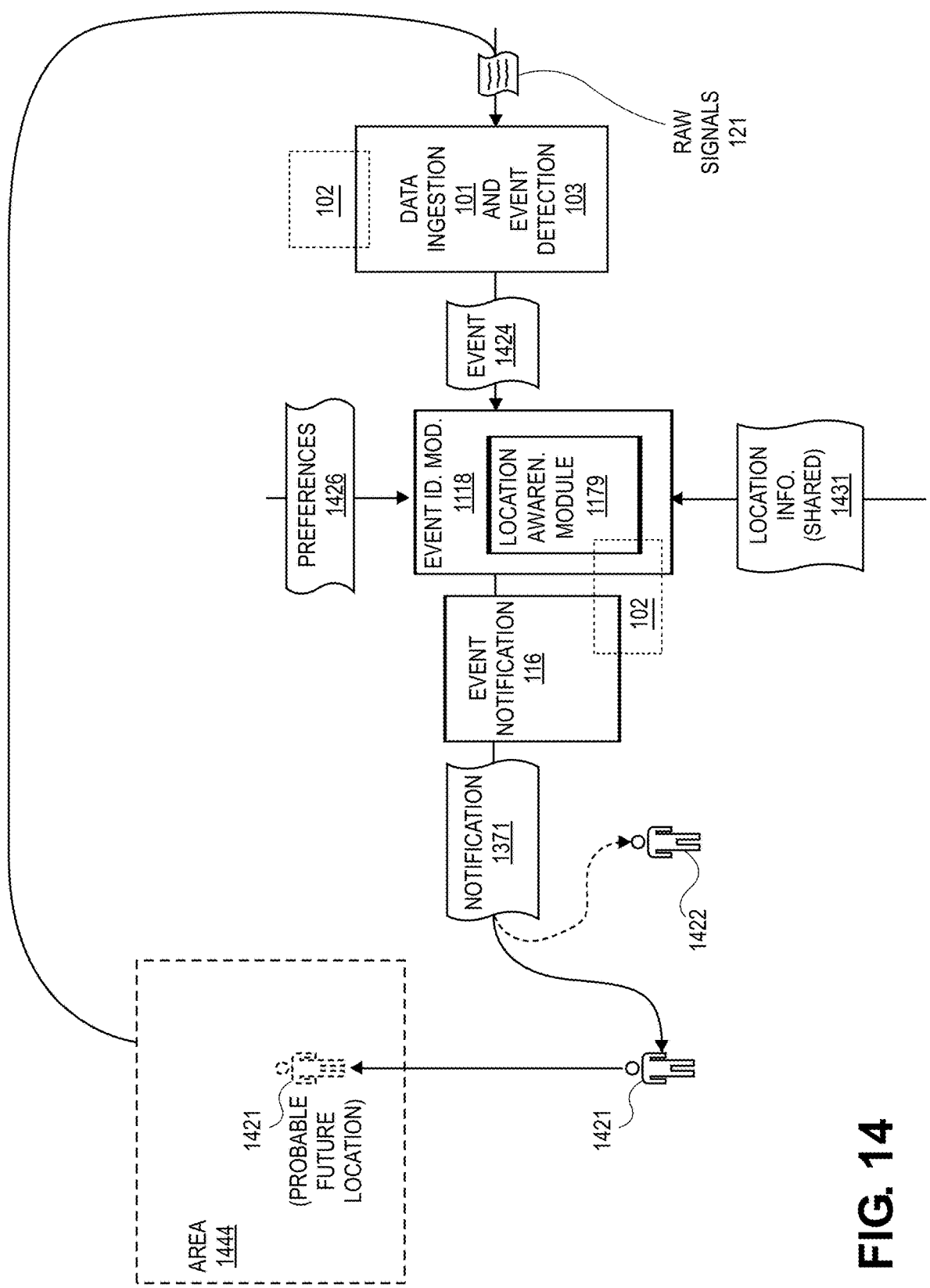
FIG. 14 illustrates a computer architecture that facilitates notifying of an event at or near a predicted future location of an entity.

FIG. 14 illustrates a computer architecture that facilitates notifying of an event at or near a predicted future location of an entity. Entity 1421 can indicate in preferences 1426 (e.g., entered through user interface 1111, 1500, or another similar user interface) a desire to be notified of events within a specified distance range of entity 1421's probably future locations. Alternately or in combination, entity 1421 can indicate in preferences 1426 a desire to notify entity 1422 of events within distance range 1443 of entity 1421's currently location. In another aspect, entity 1422 indicates in preferences 1426 a desire to be notified of events within distance range 1443 of entity 1421's current location.

From raw signals 121, including raw signals originating in area 1444, data ingestion 101 and event detection 103 can interoperate to detect event 1424. Location awareness module 1179 can access location information 1431 for entity 421 (e.g., a speed and direction of travel). Location awareness module 1179 can (possibly using artificial intelligence and/or machine learning) can predict movement of entity 1421 into area 1444 in the future (e.g., in the next 1-3 minutes).

Event identification module 118 can access preferences 1426. Event identification module 1118 can (possibly using artificial intelligence and/or machine learning) determine that event 1424 is occurring in area 1444 (and otherwise satisfies preferences 1426). Event notification module 116 can send notification 1471 to entity 1421 to notify entity 1421 of event 1424. Alternately or in combination, event notification module 116 can also send notification 1471 (or a different notification) to entity 1422 to notify entity 1422 of event 1424. Notification 1471 can be an electronic message sent to one or more mobile phones.

Accordingly, aspects of the invention can notify an entity about events potentially impacting places and/or people. In one aspect, appropriate parties are notified of events occurring in an entity's current or probable future locations to increase situational awareness.

As depicted in FIGS. 13 and 14, privacy infrastructure 102 spans data ingestion modules 101, event detection infrastructure 103, event notification 116, and event identification module 118, including location awareness module 1179. As such, privacy infrastructure 102 can implement and/or apply any described data privacy operations, such as, user information removal, user information scrubbing, user information stripping, user information obfuscation, access rule application, etc., at and/or through interoperation with any of: data ingestion modules 101, event detection infrastructure 103, event notification 116, event identification module 118, or location awareness module 1179.

Figure 15:
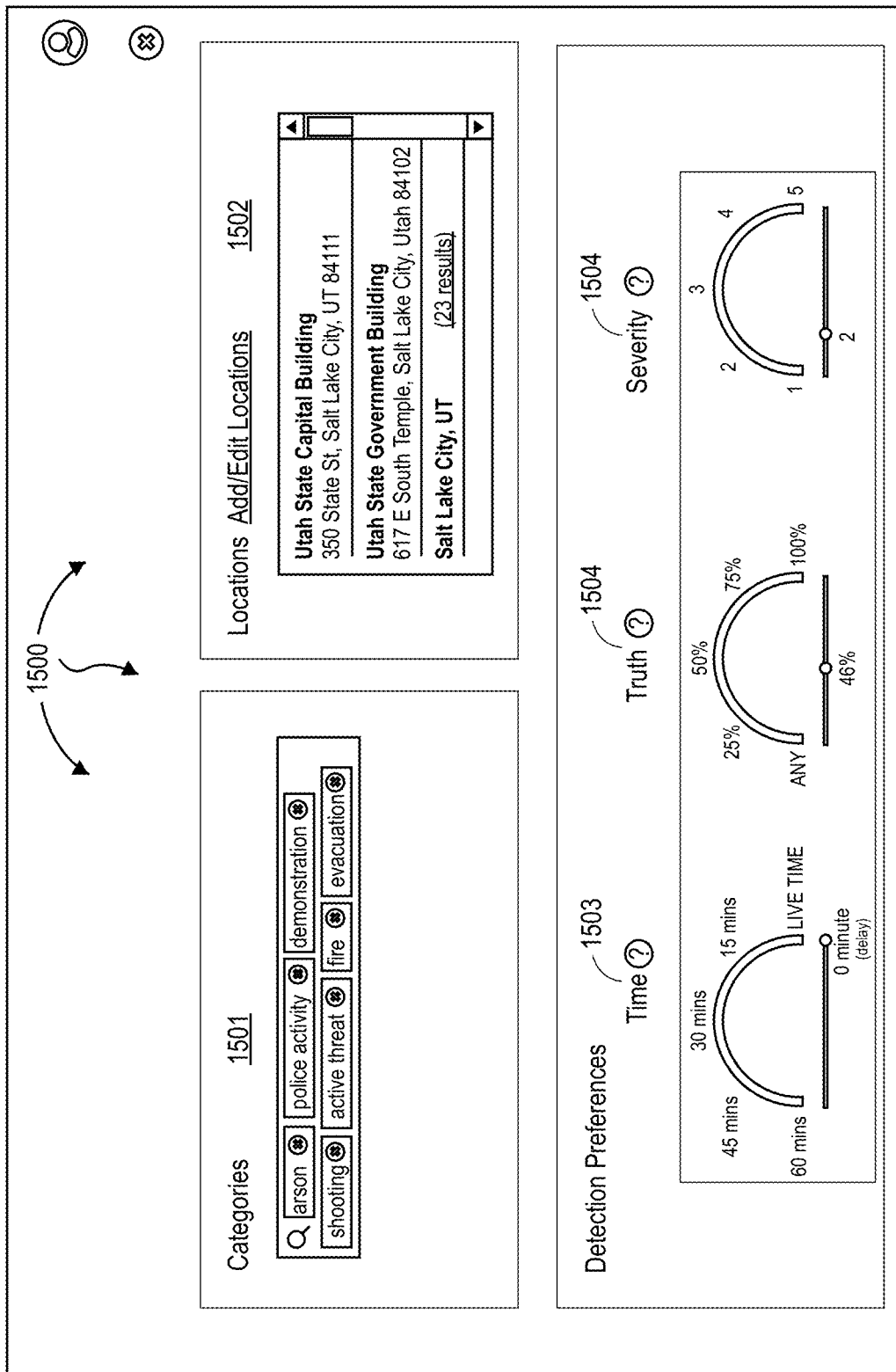
FIG. 15 depicts an example user interface that facilitates selecting event notification preferences.

FIG. 15 depicts an example user interface 1500 that facilitates selecting event notification preferences. User interface 1500 is one possible representation of user interface 1111. As depicted, user interface 1500 includes category controls 1501, locations controls 1502, time control 1503, truth control 1504, and severity control 1505. In general, an entity can manipulate controls in user interface 1500 to indicate event notification preferences. An entity can manipulate controls category controls 1501 to indicate a preference for being notified of different categories of events. An entity can manipulate location controls 1502 to indicate a preference for being notified of events at specified locations. As depicted an entity has indicated interest in various buildings in the Salt Lake City, Utah area.

An entity can manipulate time control 1503 to indicate a preference for being notified of events within a specified time frame after event occurrence, including "live time" or essentially at "moment zero". An entity can manipulate truth control 1504 to indicate a preference for being notified of events with at least a requisite truthfulness ranging from any truthfulness to 100% truthfulness. An entity can manipulate severity control 1505 to indicate a preference for being notified of events with at least a requisite severity ranging from severity 1 (less severe) to severity 5 (more severe).

Preferences selected through user interface 1500 can be stored in an event preferences database, such as, for example, event preferences database 1109. Further, when a entity is notified of an event, the entity may take some action in response to the notification, such as, dismissing the event, following further evolution of the event, etc. Entity action can be used as feedback to provide suggestions to the entity. For example, if an entity repeatedly dismisses accident events, the system may suggest that the entity remove "accident" as an event notification category.

Event Impact

In one aspect, components facilitating impact prediction and relevant entity notification are integrated with data ingestion modules 101 and an event detection infrastructure 103. An impact prediction module can predict impacts (e.g., disruptions) likely to be caused by an event. The impact prediction module can maintain an event history database of prior events and corresponding impacts. As new events are detected, the impact prediction module can refer to the event history database and compare the new events to prior events.

The impact prediction module can formulate predicted impacts of new events based on impacts of prior similar events. Predicted impacts can be on specified types of entities in an impacted area. Specified entities can include hospitals, blood banks, delivery services, etc. Impacted areas can include a geographic region within a specified distance of an event, a direction of travel on a roadway, a specific entity (e.g., a specialty medical facility), etc.

The impact prediction module can send predicted impacts, including impact types and areas, to an impact notification module. The impact notification module can refer to an entity database that stores entity types and entity locations. The impact notification module can compare impact types and impact areas to entity types and entity locations to identify entities likely to be affected by one or more predicted impacts of an event. The impact notification module can notify the identified entities that they are likely to be affected by one or more predicted impacts of an event.

Entities notified of an event may or may not be notified of a likely impact of the event. Similarly, entities notified of a likely impact of an event may or may not be notified of the event. For example, a news station may be notified of accident but not notified of potential traffic congestion caused by the accident. On the other hand, a hospital may not be notified of a shooting event but may be notified to expect multiple victims injured during the shooting.

Figure 16:
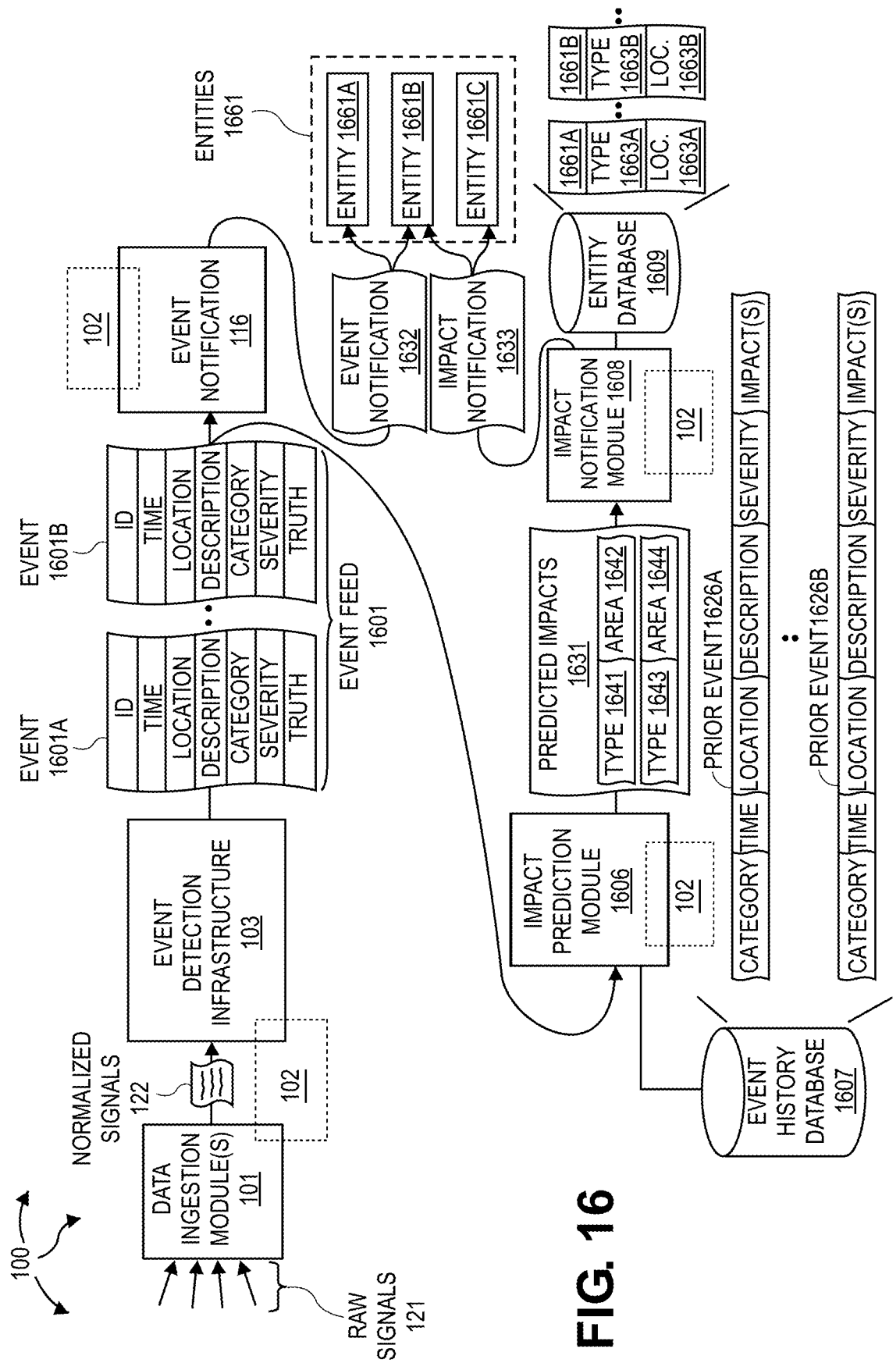
FIG. 16 illustrates a computer architecture that facilitates predicting event impact and notifying relevant entities.

FIG. 16 illustrates a computer architecture that facilitates predicting event impact and notifying relevant entities. As depicted, event detection infrastructure 103 generates event feed 1601, including events 1601A, 1601B, etc. Each event can include an event ID, a time, a location, a description, a category or categories (context), a severity, and a truthfulness As described, detected events can be of interest (or relevant) to entities, such as, for example, first responders, hospitals, blood banks, delivery services, media outlets, government entities, government agencies, etc. based on one or more of an event ID, an event time, an event location, an event category, an event severity, and an event description. Event detection infrastructure 103 can sent event feed 1601 to event notification 116 and to impact prediction module 1606. Event notification 116 can notify one or more entities 1661 of relevant events in event feed 1601 using described mechanisms.

Impact prediction module 1606 is configured to predict disruptions likely to be caused by an event. Impact prediction module 1606 can maintain event history database 1607 of prior events and corresponding impacts. Per event, for example, prior events 1626A and 1626B, event history database 1607 can store event category, event time, event location, event description, event severity, and impact(s).

As new events are detected, impact prediction module 1606 can refer to event history database 1607 and compare characteristics of the new events to characteristics of prior events. Impact prediction module 1606 can formulate predicted impacts of new events based on impacts of prior similar events. Predicted impacts can be on specified types of entities in an impacted area. Specified entities can include hospitals, blood banks, delivery services, etc. Impacted areas can include a geographic region within a specified distance of an event, a direction of travel on a roadway, a specific entity (e.g., a specialty medical facility), etc. Geographic features of a location such as, is the location in a flood plane, is the location historically subject to wildfires, is the location on a fault line, etc. can also be considered.

As depicted in FIG. 16, privacy infrastructure 102 spans data ingestion modules 101, event detection infrastructure 103, event notification 116, impact prediction module 1606, and impact notification module 1608. As such, privacy infrastructure 102 can implement and/or apply any described data privacy operations, such as, user information removal, user information scrubbing, user information stripping, user information obfuscation, access rule application, etc., at and/or through interoperation with any of: data ingestion modules 101, event detection infrastructure 103, event notification 116, impact prediction module 1606, or impact notification module 1608.

Figure 17:
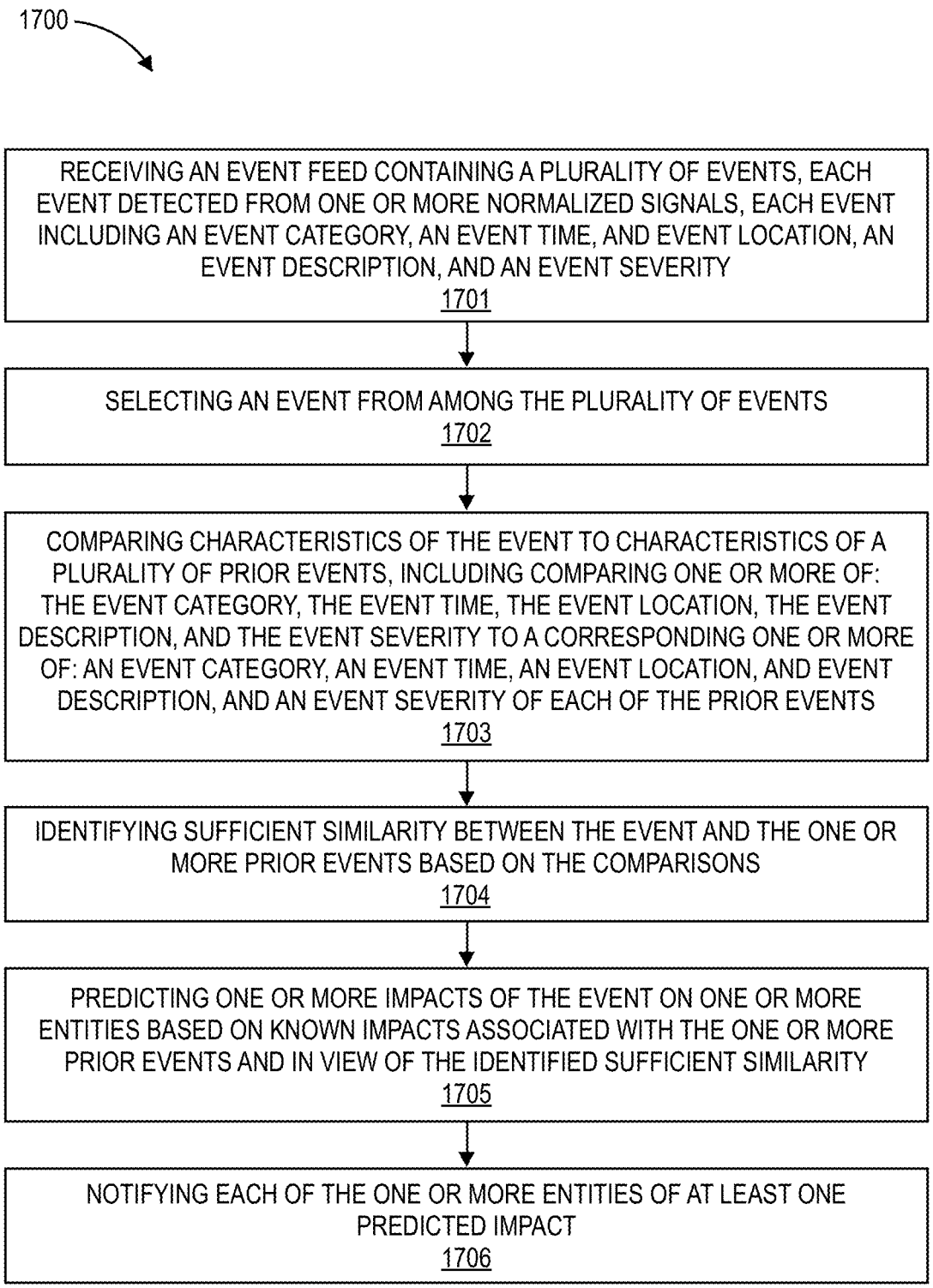
FIG. 17 illustrates a flow chart of an example method for predicting event impact and notifying relevant entities.

FIG. 17 illustrates a flow chart of an example method 1700 for predicting event impact and notifying relevant entities. Method 1700 will be described with respect to the components and data depicted in FIG. 16.

Method 1700 includes receiving an event feed containing a plurality of events, each event detected from one or more normalized signals, each event including an event category, an event time, an event location, an event description, and an event severity (1701). For example, impact prediction module 1606 can receive event feed 1601. Method 1700 includes selecting an event from among the plurality of events (1702). For example, impact prediction module 1606 can select event 1601A from event fees 1601.

Method 1700 includes comparing characteristics of the event to characteristics of a plurality of prior events, including comparing one or more of: the event category, the event time, the event location, the event description, and the event severity to a corresponding one or more of: an event category, an event time, an event location, an event description, and an event severity of each of the prior events (1703). For example, impact prediction module 1606 can compare characteristics of event 1601A to characteristics of prior events 1626A, 1626B, etc. More specifically, impact prediction module 1606 can compare time, category or categories, location, description, and severity included in event 1601A to time, category or categories, location, description, and severity included in prior events 1606A, 1606B, etc.

Method 1700 includes identifying sufficient similarity between the event and one or more prior events based on the comparisons (1704). For example, impact prediction module 1606 can identify sufficient similarity between characteristics of event 1601A and characteristics of prior event 1626B.

Method 1700 includes predicting one or more impacts of the event on one more entities based on known impacts associated with the one or more prior events and in view of the identified sufficient similarity (1705). For example, impact prediction module 1606 can predict that event 1601A is likely to cause impacts similar to prior event 1626B. The prediction can be based on known impacts associated with prior event 1626B and in view of the similarities between characteristics of event 1601A and characteristics of prior event 1626B. For example, a multi car accident with multiple injuries and multiple fatalities at a particular mile marker on a highway during rush hour is likely to cause impacts similar to impacts caused by prior multi car accidents with multiple injuries and multiple fatalities near the same mile marker on the highway during rush hour.

A predicted impact can be of a specified impact type and can impact a specified location or area. For example, impact prediction module 1606 can formulate predicted impacts 1631 of event 1601A, including impact type 1641/impact area 1642, impact type 1643/impact area 1644, etc. An event can cause multiple impact types in multiple impact areas. For example, mass shooting can impact one or more hospitals and one more blood banks. The one or more hospitals and one or more blood banks may be in different locations.

In one aspect, time adjustments or location adjustments are made to event data from event 1601A relative to event data from prior events 1626A, 1662B, etc. Impact prediction module 1606 extrapolates, predicts, or accesses any uncertainty in event data from prior events 1626A, 1662B, etc. relative to event data in event 1601A. Impact prediction module 1606 extrapolates predicted impacts 1631 based on the uncertainty. Accounting for uncertainty, impact prediction module 1606 can compensate for differences in event data.

For example, if event 1601A is similar to event 1626A but the locations of event 1601A and 1662A different by half a mile, impact prediction module 1606 can consider the difference in location when deriving predicted impacts 1631. Similarly, if event 1601A is similar to event 1626B but happened an hour earlier (or later) in the day, impact prediction module 1606 can consider the difference time of day when deriving predicted impacts 1631. Impact prediction module 1606 can give similar consideration to day of week, holidays, etc. For example, an event that happens on a weekend or holiday can have a different impact than a prior event that happened on a weekday or vice versa.

Method 1700 includes notifying each of the one or more entities of at least one predicted impact (1706). For example, impact prediction module 1606 can send predicted impacts 1631 to impact notification module 1608. Impact notification module 1608 can formulate impact notification(s) 1633. Impact notification module 1608 can send impact notification(s) 1633 to entities 1661B and 1661C. Impact notification 1633 can notify entities 1661B and 1661C of predicted impacts 1631, including impact type 1641/impact area 1642, impact type 1643/impact area 1644, etc.

Entity database 1609 stores entity type and entity location per entity. For example, entity database 1609 stores type 1662A and location 1663A for entity 1661A, stores type 1662B and location 1663B for entity 1661B, etc. Entity location may be dynamic if an entity is mobile, such as, for example, a delivery truck.

Impact notification module 1608 can refer to an entity database 1609. Impact notification module 1608 can compare impact types and impact areas to entity types and entity locations to identify entities likely to be affected by one or more predicted impacts of an event. For example, impact notification module can compare impact type 1641/area 1642 to type 1662A/location 1662B, to type 1662B/location 1663B, etc. Similarly, impact notification module 1608 can compare impact type 1643/area 1644 to type 1662A/location 1662B, to type 1662B/location 1663B, etc. Based on the comparisons, impact notification module 1608 can identify entities 1661B and 1661C as being impacted by event 1601A.

In some aspects, method 1700 also includes one or more privacy operations. Privacy infrastructure 102 can implement and/or apply any described data privacy operations (possibly through interoperation with modules included in one or more of: data ingestion modules 101, event detection infrastructure 103, event notification 116, impact prediction module 1606, or impact notification module 1608) such as, user information removal, user information scrubbing, user information stripping, user information obfuscation, access rule application, etc., prior to, during, or after any of: 1701, 1702, 1703, 1704, 1705, or 1706.

Concurrently, event notification 116 can send event notification 1632 to entities 1661A and 1661B to notify entities 1661A and 1461B of event 1601A. As such, entity 1661A is notified of event 1601A but not predicted impacts of event 1601A. Entity 1661B is notified of both event 1401A and predicted impacts of event 1401A. Entity 1661C is notified of event 1601A but is notified of predicted impacts of event 1601A.

In one aspect, entities register to receive predicted impacts. Predicted impacts can be included in a user interface similar to user interface 1111 or 1500. Preferences for predicted impact notifications can be stored in preferences database 1109 or another similar database. Impact identification module 1606 and/or impact notification module 1608 can filter predicted impacts based on entity preferences (similar to event identification module 1118 filtering events based on entity preferences). In some aspects, the functionality of impact prediction module 1606 and/or impact notification module 1608 are integrated into event notification 116 or vice versa.

Event 1601A can also be stored as a prior event in event history database 1607 along with predicted impacts 1631. Impact prediction module 1606 can use event 1601A and predicted impacts 163 when predicting impacts of other events detected after event 1601A.

Aspects of the invention predict impacts (e.g., disruptions) caused by events and notify relevant entities of predicted impacts (e.g., entities likely to be disrupted by predicted impacts). Timely notification of predicted impacts allows entities to better prepare for and/or take measures to address the predicted impacts so that the entities can respond to an event more efficiently and effectively.

Further Embodiments

In general, users can customize their experience by writing rules to get notifications when relevant events (e.g., events they care about) are detected. A notification system monitors detected events. Detected events are compared to user rules. When a detected event matches a user rule, the user is notified of the detected event.

In this description and the following claims, a "reverse search" is defined as a search where the search query remains static and the searched data corpus is dynamic. In one aspect, the search data corpus is detected events. As events are detected, the detected events are checked (filtered) to determine if they satisfy (match) any search queries. For example, a user can formulate a query. Characteristics of detected events can be compared to the query. The user is notified of detected events that match the static query.

A reverse search can be a multi-dimensional reverse search where multiple dimensions of a static query are checked. Thus, a multi-level reverse search technique can be used to identify events relevant to a user. In one aspect, a multi-dimensional reverse search is a two-dimensional reverse search, including a rule matching dimension and a location matching dimension. If a detected event matches a user rule and is within a specified geo-boundary, the user is notified of the detected event.

A user can configure a rule to include one or more rule conditions. A user can combine rule conditions using rule operators, such as, for example, disjunctive operators, conjunctive operators, etc. For example, a Boolean "OR" (disjunctive), a Boolean "AND" (conjunctive), etc. can be used to combine rule conditions. A user can formulate a rule that includes a single rule condition. A user can also formulate a rule that links a plurality of rule conditions together using one or more disjunctive operators and/or one or more conjunctive operators. As such, a user can tailor rules of varied complexities and/or for specific purposes.

In one aspect, a rules engine allows users to create and modify rules to get notifications when events or trends happen. A rule can be defined by a rule type, events, locations, areas, notification settings, and a name. In some aspects, other rule definitions can be utilized. The rules engine can include a formula bar where rules can be defined.

A formula bar can include sections (e.g., fields) for each rule part that get updated as the user defines them. The defined rule parts can include rule types, events, locations, areas, etc. Rule types can include a value of Event Based.

An events section reports the name of the event linked together by AND/OR. For example, Shooting OR Bomb Threat OR Stabbing. A location section reports the name of one or more selected locations. When a user selects multiple locations, the Locations section reports each location with an "and" in between (e.g., Schools and Hospitals). If more than 2 events, the section reports the first two events and then "[number of events] more events" (e.g. Shooting AND bombing, 5 more events). On hover, additional (e.g., all) monitored events are shown in a tooltip.

A locations section reports the name of selected location(s). If the user selects multiple locations, the Locations section reports each location with an "and" in between (e.g. Schools and Hospitals). If there are more than two locations names, the section reports the first two location names and then "[number of locations] more location types" (e.g. Schools, Hospitals and 5 more location types). On hover, some or all monitored location types can be presented in a tooltip.

An areas section reports the name of areas (e.g., cities, counties, states or custom areas). When a user selects multiple areas, the Areas section reports each area with an "and" between (e.g., Salt Lake City and Provo). If there are more than two areas selected, the section reports the first two area names and then "[number of areas] more areas" (e.g. Salt Lake City, Provo, and 5 more areas). On hover, some or all areas are shown in a tooltip.

Figure 18:
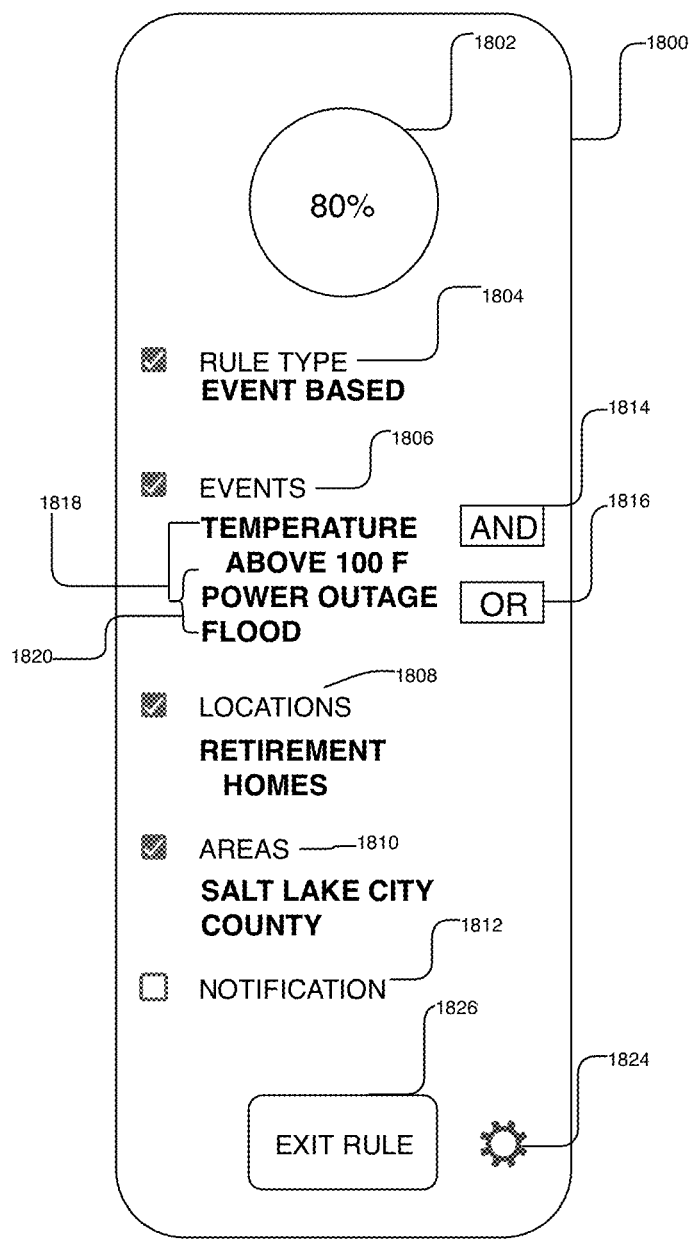
FIG. 18 illustrates a user interface element for viewing a user generated rule configuration.

For example, FIG. 18 shows a user interface element 1800 illustrating a summary of a rule that is in process of being created or defined by an entity or a user (as used herein, an operator of the described rules engine or user interfaces may be referred to as a user, entity, operator, etc.) As depicted, UI element 1800 includes a progress indicator 1802 that can be used to indicate for the entity how much of a rule completion process has been completed. As depicted, 80% of the rule has been configured. In some aspects, a rule is usable any time any of the configuration parameters have been set. In other aspects, an entire configuration may be required in order to have the rule function to generate notifications for the entity.

UI element 1800 also includes rule type parameters 1804, event parameters 1806, location parameters 1808, areas parameters 1810, and notifications parameters 1812. Depending on the parameter, operators may also be depicted to help an entity understand at a glance how a particular configuration parameter functions. For example, event parameters 1806 include AND operator 1814 and OR operator 1816 to illustrate the operators selected within the events configuration.

Event parameters 1806 are configured such that to meet rule conditions, a "temperature above 100 F" must be detected along with either a "power outage" or a "flood."

Additional visualization techniques can be used separately from or in conjunction with operators 1814 and 1816 to indicate how event parameters are grouped. For example, grouping element 1818 links elements connected by AND operator 1814 and the grouping element 1820 links the elements within the OR operator 1816.

In general, different visualizations can be utilized in order to help an entity understand, visually, how their rules are configured and can be triggered to create notifications.

UI element 1800 also includes an exit button 1826 and a rule configuration button 1824.

In FIG. 18, UI element 1800 is shown isolated from other user interface elements. However, UI element 1800 may be presented along with and/or as a sub-component within other user interfaces as depicted in and described with respect to other figures.

Figure 19A:
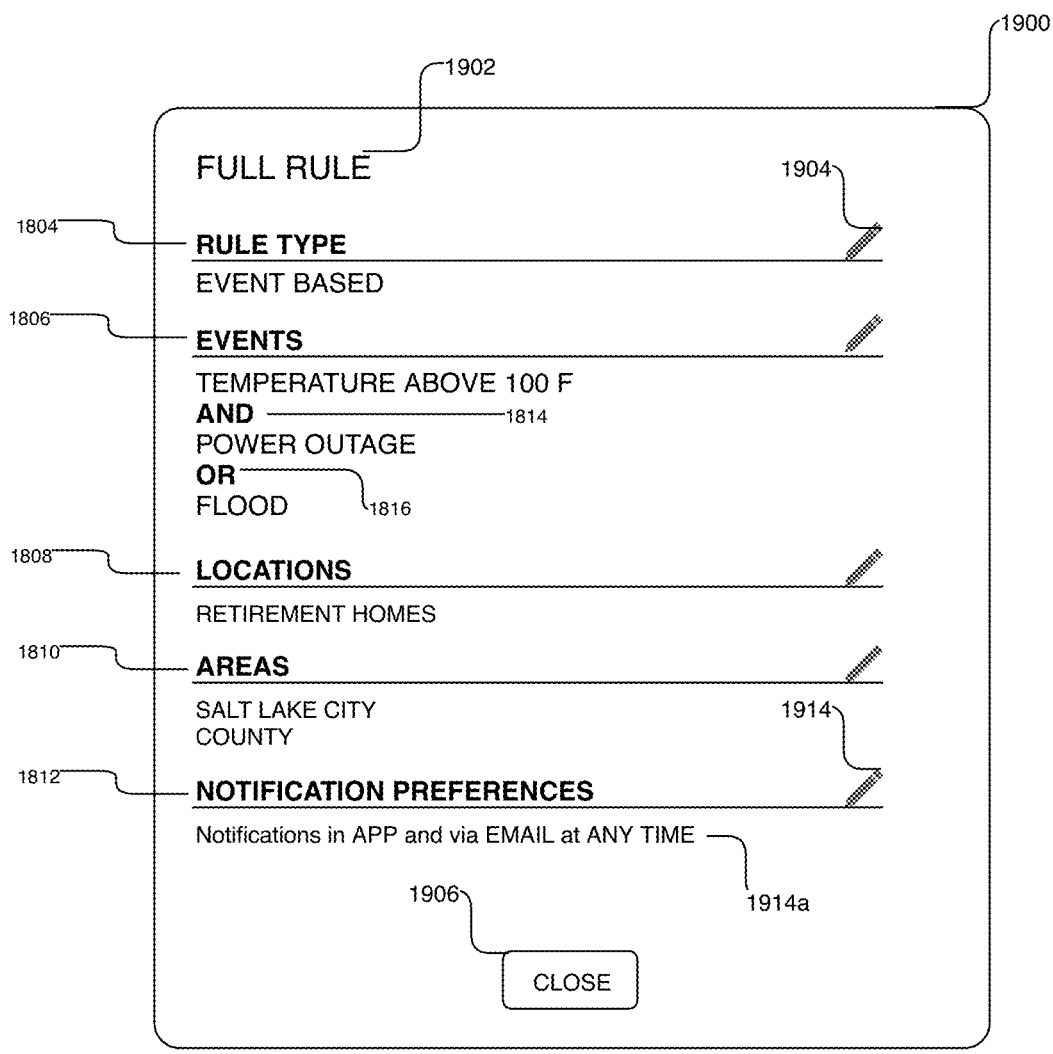
FIGS. 19A and 19B illustrate user interfaces for modifying a user generated rule configuration.

FIG. 19A illustrates an alternative view of a rule builder 1900. Rule builder 1900 may include the same kinds of information as UI element 1800, but in an editable format. For example, a user may select rule configuration button 1824 and be transitioned to rule builder 1900 to further configure or alter the present configuration of a rule.

Rule builder 1900 depicts a rule title 1902 (e.g., "FULL RULE") along with various rule parameters and corresponding values. Each of rule type parameters 1804, events parameters 1806, locations parameters 1808, areas parameters 1810, and notification preferences parameters 1812 can be presented along with an edit control. For example, edit control 1904 can be selected to edit rule type parameters 1804 and edit control 1914 can be selected to edit notification preferences 1812. Upon selection of an edit control, an authorized entity can alter a rule parameter thereby altering the configuration of the rule. Selecting an edit option may open an additional UI interface element—such as a modal dialog—where the entity can change parameters of the particular rule component, save the change, and return to rule builder 1900 to modify additional parameters of other rule components if desirable.

Upon completing rule configuration, the entity may select close button 1906 to return to another UI element. Rule builder 1900 may also include additional features such as a cancel option whereby recent modifications to the rule may be discarded. Rule versioning control may also be implemented such that an entity can select an interface item to see a prior version of the present rule and, in some embodiments, revert a rule back to a prior version.

Figure 19B:
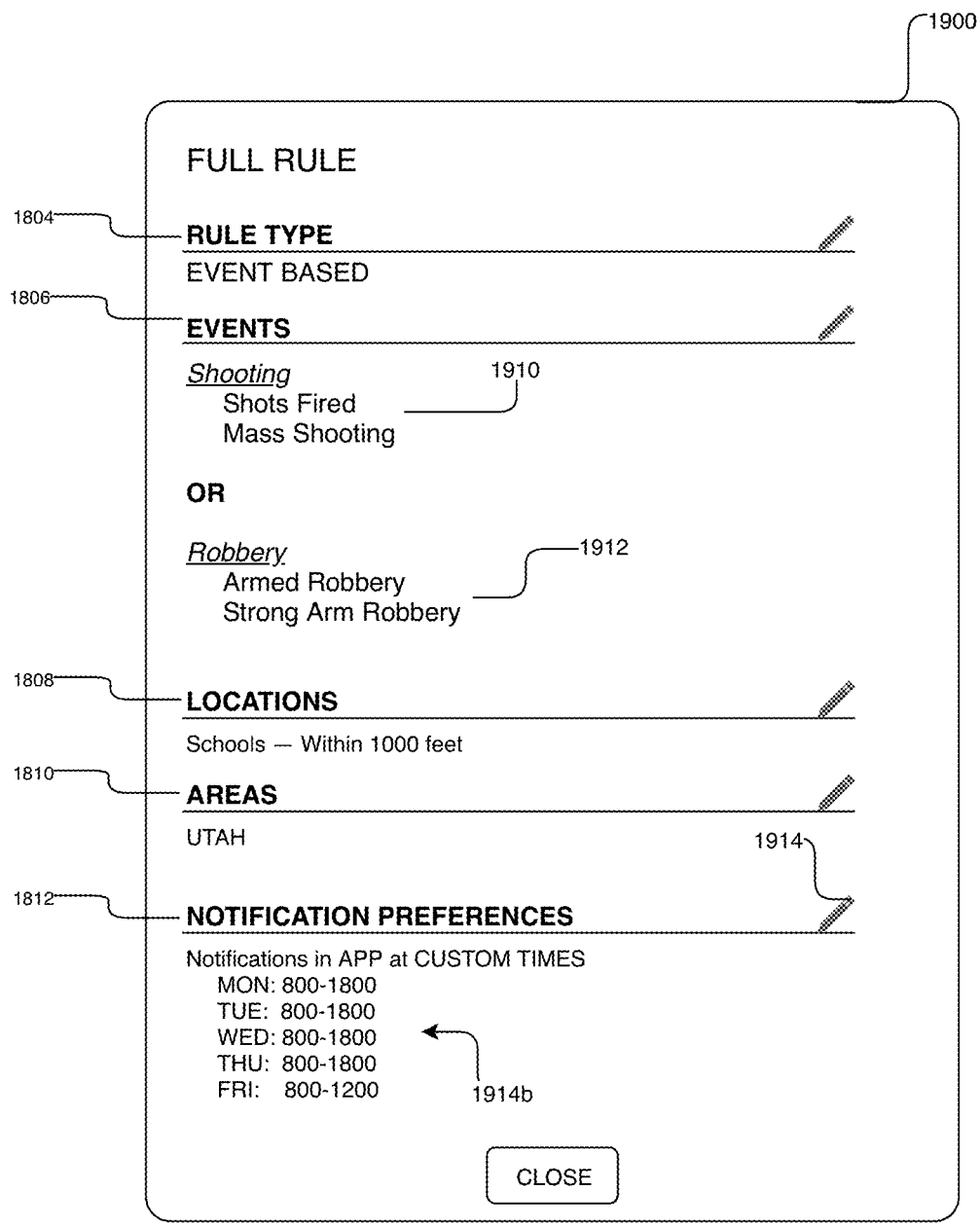

In FIG. 19B, rule builder 1900 is depicted with different parameter values relative to the parameter values depicted in FIG. 19A. For example, events 1806 have been modified to include "Shooting" and a Boolean "OR" operator with events categorized as "Robbery." As previously described, because the OR operator has been invoked, events categorized as shooting or robbery can satisfy this configuration parameter. A single event may satisfy both parameters or only one or the other parameter.

Events 1806 can also include a visual indication of shooting sub-event types 1910 and robbery sub-event types 1912. An entity may select a broad category such as shooting or robbery that includes various sub-event types within that category. It is also possible that an entity may build a configuration parameter by selecting sub-event types (e.g., "shots fired" or "mass shooting") and based on the relationship to the broad category, they may be presented in a nested form as depicted. As such, values shown within event parameters 1806 may be populated based on an entity selection of individual sub-types or by an entity selecting a broad category that includes one or more sub-types.

In some embodiments, the relationship between categories and sub-types may be visually presented using UI elements such as bolding, colors, typographical changes, icons, or other visual indicators that allow an entity to recognize the relationship between the category and the one or more sub-types within that category.

Similarly, the relationship between elements that have been joined using Boolean operators may also be presented using UI elements such as bolding, colors, typographical changes, icons, or other visual indicators that allow an entity to recognize the how the criteria are linked.

In another embodiment, full rule 1900 may be shown when the user selects a "Show Full Rule" button on an interface such as UI 1800 from FIG. 18. Upon selection, Full Rule 1900 may be presented as a modal dialog to list additional or all detail associated with a rule. As used herein, a modal dialog is a UI element that presents itself above at least one other UI element as the result of a user interaction.

In some embodiments, the modal dialog is a true modal dialog in that it requires the entity to perform a conclusive activity (e.g., close, save, exit) in order to dismiss the modal dialog and return to prior screens of the application. In such an embodiment, underlying UI elements may be partially or fully obscured in order to help the entity understand that the modal dialog has been created and requires the entity's attention in order to progress.

In other embodiments, the modal dialog may be a soft modal in that the entity is still able to interact with other portions of the application while the soft modal is present. In such embodiments, certain elements may still behave as if the full rule modal is a true modal. For example, the UI 1800 may not be editable while full modal 1900 is present while other aspects of the application are still interactive and, in some instances, editable.

In another embodiment, UI element 1800 may include an indication that the associated rule is not fully configured. For example, UI element 1800 in FIG. 18 does not have notification parameter 1812 set. In such cases, UI element 1800 may include an indication that the user/entity has not yet defined that particular parameter i.e., the "notification configuration." In some embodiments, an edit UI element may be presented along-side the particular configuration option that has not been set such that, upon selection, the entity is taken directly to that step.

Referring now specifically to the notification preferences 1914, time preference parameters may be configured according to the "any time" configuration 1914*a* (in FIG. 19A) or according to a more granular configuration 1914*b* (in FIG. 19B). In more granular configuration 1914*b*, an entity can configure notifications to occur on certain days and during certain times during those days. For example, in a more granular configuration, a notification can be provided to a user when there is a match to the rule type, events, locations, and areas entered by the user during the notification period(s) configured in the notification preferences parameters.

As an example, suppose a rule was configured for identifying particular events near a school. In such instances, an event can be triggered by understanding that the event—such as a shooting, power outage, flood, etc.—occurs during a time when students are in the school. Outside of those times, the event may be of interest but perhaps not in conjunction with its proximity to the school. Accordingly, a user may set notification preferences 1914 in the configuration shown in granular configuration 1914*b* which is sent in one example of times school may be in session (e.g., Monday through Thursday from 8am to 6 pm and Friday 8am to 12 pm).

Alternatively, the entity may select notification preferences according to any time configuration 1914*a* to be notified of the satisfaction of the other rule configuration elements regardless of the time or day of their occurrence.

Turning now to FIGS. 20A through 20I, FIGS. 20A through 20I depict an example progression through rule creation. Description of elements and/or features in a specified figure among FIGS. 20A-201 may also apply to other figures among FIGS. 20A-201 even when not expressly described in conjunction with those other figures.

FIG. 20A depicts rule summary pane UI 2000 (summarizing progression of a rule) along with rule type configuration UI 2002A. FIG. 20B depicts rule summary pane UI 2000 along with event configuration UI 2002B. FIG. 20C depicts rule summary pane 2000 along with locations configuration UI 2002C. FIG. 20D depicts rule summary pane UI 2000 along with areas configuration 2002D. Rule summary pane UI 2000 may also be referred to as summary 2000, summary pane 2000, pane 2000, or the like.

As depicted, pane 2000 includes a rule configuration button 2001, progress visualization 2018, and rule parameter status icons 2016, 2019, 2021, 2023, and 2025. As will be discussed, the progress visualization 2018 and the various status icons provide visual information about rule progression as well as individual rule parameters as they are successfully configured.

In general, UI 2002A, UI 2002B, UI 2002C, and UI 2002D can include UI elements similar to (or even the same as) one another. However, UI elements in UI 2002A, UI 2002B, UI 2002C, and UI 2202D may include different information (e.g., different values) even though the UI frame/element/structure are similar (or even the same). Pane 2000 can be used to visually represent rule creation/configuration progression. In FIG. 20A, summary 2000 (e.g., initially) indicates that a rule is 0% configured.

Rule type configuration UI 2002A depicts additional details related to rule creation/configuration. More specifically, "Step 1: rule type" 2004 includes UI elements for selecting a rule type and corresponds to rule type 2006.

Rule type configuration UI 2002A includes a link or UI control 2008. Selecting the link or UI control 2008 can cause the full rule to be presented. For example, in response to selection of UI control 2008, a modal dialog similar to those described with respect to with FIGS. 19A and 19B can be presented. This may be beneficial to a user that is familiar with the rule configuration workflow and wants to configure configuration elements in a sequence different than a predefined workflow (e.g., configuring "areas" prior to "events.")

As depicted, rule type configuration UI 2002A also includes parameter area 2010. As depicted throughout FIGS. 20A through 20I, Parameter area 2010 is a user interface element that can be populated with parameters that are contextually appropriate or necessary for the current parameter being configured (e.g., rule type, events, locations, areas, or notifications). UI 2002A (i.e., a UI related to rule type) parameter area 2010 can include details, selections, configurations, etc., that are related to "rule type" configuration. A single "rule type" configuration element is available to the user. Other types of "rule types" may be available, for example, depending on the particular entity or user or on other factors.

Within UI 2002A, an entity is permitted to select "event based" as rule type 2006. UI 2002A can also present other rule information to help an entity understand that the rule type being creating is an event based rule. As used herein, a notification can be triggered when characteristics of a (e.g., live) event match a rule formula defined for an event based rule.

An event may be considered a "live" event even if there is some processing delay associated with signal ingestion, signal normalization, event detection or other related signal processing. In one embodiment, a live event is defined an event that is within a particular time frame of a time indicated in a raw signal timestamp. For example, a live event can be identified as an event that occurred within 1 hour of a "created at" timestamp applied to a signal at the source of the signal. Other varied and dynamic definitions of "live" can also be used. For example, different permissible processing delay times can be used for different types of events. Permissible processing delay times can also be elastic based on system load (e.g., increasing and decreasing as system load increases and decreases respectively). Thus, over time what is considered a "live" event may change.

In some embodiments, a rule configuration workflow transitions to a next configuration UI upon successful completion of a prior configuration UI. For example, the user may be taken from rule type configuration UI 2002A associated with "step 1" to event configuration 2002B associated with "step 2" depicted in FIG. 20B upon completing UI 2002A.

In other embodiments, a user affirmatively steps through configuration UIs using navigation controls. Navigation controls can include one or more of: next button 2012, back button 2014, a "Skip" button, etc. The "Skip" button can be used to skip portions of rule configuration. The user can select the skip button to move to the next step.

Upon transitioning from one configuration UI to the next—either automatically or through express navigation—a configuration UI is updated with contextually information relevant to another rule portion. As depicted in FIG. 20B, configuration window 2002B includes events UI elements. Step identifier 2004 is updated to "Step 2: Events" to correspond to configuration element 2017 in pane 2000. Back button 2014 is presented within configuration window 2002B allowing the entity to return to UI 2002A (which, in this example, is considered a prior step).

Pane 2000 is also updated in a number of ways in association with the transition to step 2. For example, in UI 2000 status identifier 2016 is updated to indicate completion of rule type configuration (i.e., in this example, the prior step). As depicted, a check mark is included a checkbox. However, status identifier can include any suitable visual indication to indicate completion (or non-completion) including other UI elements, colors, highlighting, typography, nesting, etc.

Parameter area 2010 is also updated to include the configuration parameters that are contextually relevant to the current configuration element. In this exemplary embodiment, step 2 includes selecting configuration parameters relating to one or more event types to be monitored. This could be a single event type, or any number of event types chained together by AND/OR logic. Events (including Computer Aided Dispatch (CAD) incident codes) can be displayed in the selection area. Parameter area 2010 can scroll to support a virtually unlimited number of event types (e.g., hundreds or thousands). While AND/OR operators are used extensively within the descriptions of Figurers 20A through 20I, it is understood that other types of operators are possible such as NOT, or conditional operators such as IF and ELSE IF. Additional operators may be available to configure additional types of relationships and rule criteria.

In some embodiments, category tags and/or incident (e.g., CAD) codes are displayed in parameter area 2010. Menu headers can be category tags and/or the incident codes and can be displayed based on a user's language selection.

Search field 2020 allows a user to search for and select event types that are available for matching and notification. In some embodiments, logic/programs process data entered into search field 2020 facilitating "fuzzy" searches on the event name and/or category name to help a user identify event types related to a search term. In some embodiments, fuzzy searches may include suggesting particular event types that are related to a search term in ways other than predefined relationships. For example, if two different event categories are often included in a single rule, when one of the event types is searched for, the related event type may be included in a listing of suggested event types to add to the rule.

In some embodiments, these suggestions may be based on a user role, entity relationship, access control, or historical understanding of rules the user has created.

In some embodiments, search field 2020 plays an enhanced role in assisting a user select event types. UI 2002B can be configured to utilize search field 2020 as the primary tool for populating event types in parameter area 2010. Focus can be placed on search terms entered into search field 2020 when UI 2002B is presented and then after an event is added.

Events may be arranged hierarchically, for example, in a parent/child arrangement. When a user selects a parent event (e.g., Accident), one or more (or all) children events may also be automatically selected (e.g., Fatal Accident, Injury Accident, Hit and Run, etc.). In one embodiment, a UI element represents an event type (e.g., parent) that includes one or more event sub-types (e.g., children). When the UI element is selected, an additional configuration pane can be presented for selecting any (and up to all) event sub-types.

Event sub-type presentation can be customized per user, for example, based on historical information, known related sub-types, or on another user associated basis. In some embodiments, event sub-types (e.g., child events) are linked with Boolean OR operators by default. On the other hand, main event types (e.g., parent events) are linked with Boolean AND operators by default when selected. In some embodiments, default linkages associated with children event types and/or main event types are different and/or can be modified.

When a parent event type (or any event that includes event sub-types) is depicted (e.g., as the result of a search suggestion, in a list, etc.), event sub-types associated with the parent event type can also be presented. In one embodiment, associated event sub-types are presented next to the parent event type. In other embodiments, a "plus" sign, a drop-down icon, or another UI element can be utilized to indicate event sub-types are available and/or associated with a parent event type (i.e., a broader event category).

Once a user has selected at least one event type (whether a parent event type, a child event type, or a sub-category or sub-type, as previously described) configuration window 2002B can check to determine whether configuration is sufficient to transition (e.g., progress) to another (e.g., next) step. In the case where an entity has configured valid parameters to satisfy the events step, the next button 2012 may be activated (e.g., "lit up") to allow the entity to transition.

In another embodiment, upon selection of one event type, parameter area 2010 may be contextually modified. Contextual modification can include presenting an interface allowing selection of additional events and corresponding connectors to link events and/or to increase rule complexity.

For example, a user may have initially selected an "Accident" event type and then selected an event sub-type of "Hit and Run." Upon selection of the desired sub-type, the user may be presented with an interface element asking whether the user would like to link to another event type or event sub-type using an "AND" operator or "OR" operator.

The user may select either operator. Upon operator selection, the user can be returned back to search tool 2020 to identify another event type (or event sub-type) to add to the rule. Upon selection of the other event type (or event sub-type), the system can then combine the event types, the event type and the event sub-type, or the event sub-types according to the user selected operator. Thus, at least in one embodiment, a user is queried for an operator prior to selecting the other event type (or event sub-type).

In another embodiment, a user selects an event type (or event sub-type), and then upon selection of another event type (or event sub-type), is presented with the option to select/modify a default combination operator. As previously described, event sub-types within the same event type may default to be combined with an "OR" operator while different event types may default to be combined with an "AND" operator. Thus, a user may select two event types and then, based on whether the event types differ or are sub-event types of the same event type, present the user with the default operator based on that relationship. An option to change the default operator can also be selected.

In some embodiments, the user may simply be informed of the operation to be applied to the combination. However, in other embodiments, the user may be presented with an AND/OR modal allowing selection/modification of the relationship.

Panel 2000 may also be updated in real-time as configuration actions occur and/or are occurring. For example, events 2017 within panel 2000 may begin to populate with the categories selected in parameter area 2010 as event types and/or event sub-types are selected. Additionally, status icon 2019 may be changed to an affirmative or confirmed setting (e.g., check mark in check box) to indicate that configuration of "Step 2: Events" is appropriate (e.g., is satisfactory to return results and/or is a valid configuration).

In some embodiments, a status icon (e.g., status icon 2019) may be shown in one state to indicate the current configuration is valid and in another different state to indicate the current configuration has been saved, accepted, validated, approved, or some other indication.

In some embodiments, selected event types and event sub-types can be associated with a UI element allowing them to be removed from a rule. For example, each selected event type or event sub-type, once selected, may include an "X" or other icon indicating that the event type or event sub-type can be removed. A UI removal element can be presented in either or both of pane 2000 and parameter area 2010.

In other embodiments, once an event type or event sub-type has been selected, it may become clickable or hoverable (e.g., with a mouse or other input device). Clicking on or hovering over the event type or event sub-type can present additional detail about the event type or event sub-type. Additional detail can include related event types, a count of the number of those event types that have occurred over a designated time period, the number of other rules available to the user that include that event type, or other types of information. Accordingly, a user can click on or hover over an event type or event sub-type to learn more about the event type or event sub-type.

FIG. 20B also depicts completion indicator 2018 at 20%, indicating current progress within the rule creation process. In one embodiment, each of Rule Type, Events, Locations, Areas, and Notification can be equally weighted such that completion of each step results in an increase in progress of 20%. In FIG. 20B, the completion indicator 2018 is shown as "20%" because the "Rule Type" element was previously completed. As described, elements within pane 2000 may be updated in real time as the user reaches a valid configuration or once the current configuration has been accepted or otherwise stored. Other embodiments may weight configuration steps differently such that completion indicator 2018 presents other indications of progress such as total length, sub-steps, or other indications.

In some embodiments, certain elements can be updated in real-time (e.g., to show valid configurations) while other settings are updated based on advancing through the configuration process.

When a user has selected event types/event sub-types along with corresponding connecting operators, the user can advance to the next step by selecting next button 2012.

As depicted in FIG. 20C, UI can be transitioned to "Locations". In one embodiment, "Locations" are static user selectable groups of locations selectable to identify events that happen nearby. Locations options can be any location data (e.g., Locations of Interest). New location data, like retirement homes and railroad crossings, can be added. Step identifier 2004 is updated to "Step 3: Location" to correspond to configuration element 2021 in pane 2000. Back button 2014 is presented within UI 2002C allowing a user to return to UI 2002B (i.e., which in this example is the prior step).

Similar to event types, locations may also be presented categorically and with sub-locations associated with those locations. In one example, a broad category may be for "retirement communities" with sub categories being specific retirement homes. Schools, hospitals, religious buildings, etc., may also be presented both categorically and as sub-locations comprising specific locations within that category.

Similar to the previous description of "fuzzy" event search, search tool 2020 can be used for location searching and selection based on relationships between or among different locations. As one example, a user may initially search for and select "government buildings" as a location and be suggested to also select "parks/monuments" based on a relationship between these two locations. As described, a relationship may be based on past rules, past events, past user actions, or other forms of links or available associations.

Upon selection of a location, the parameter area 2010 may be updated to visually indicate for the user that a location has been selected. Additionally, pane 2000 may also be updated to show the user's selection and whether the current configuration element has reached a satisfactory configuration state.

After selecting a location, another UI component may allow a user to select a distance parameter associated with the location. For example, the user may be able to select a radius around a selected location (or for each of a collection of individual locations) where an event occurrence is to trigger a match.

In one example, a user selects a location (e.g., schools). Upon location selection, a "Set Radius Around Location" modal can be presented. The user can use the "Set Radius Around Location" to specify a radius, for example, 1000 feet. Matching events within the specified radius can trigger the rule. Events outside the radius (even if otherwise matching) do not trigger the rule. Practically, a specified radius represents a physical proximity measure of event relevance (to a selected location).

In some embodiments (including an example described with respect to FIG. 20G), radius selection is facilitated through a UI element that includes a map. Discrete locations of the location type may be presented on the map along with a UI element that facilitates radius selection. In some embodiments, the selected radius may be visualized as an expandable border or shading surrounding the location(s) at the selected radius.

However, there is no requirement that physical proximity be circular. A variety of different shapes (e.g., ovals, squares, rectangles, etc.) can also be used. In one embodiment, user interface tools allow a user to connect various lines to define a physical proximity of event relevance to a location. Contextual clues may also be injected into a map to aid a user in selecting an area around a location type.

In some embodiments, a radius or other area around one specific location within the selected location category may have a different size than surrounding another location within the same category. For example, major roads, borders, or other boundaries may be used to modify the radius or other area around one location for a given category while different boundaries may be used for a different location.

In one embodiment, a specified radius may be set as a default, such as 1000 ft. In other embodiments, the specific default radius can be defined per location type. For example, the default radius (or other area) may be greater for a hospital or power plant than for a fast food restaurant or a pharmacy.

In some embodiments, a radius (or other area) is selected after location category. After location category selection, a modal dialog is presented. The user selects a (or accepts a default) radius (or some other area) before returning to a main interface to select additional locations or transition to a different configuration step.

In other embodiments, known boundaries associated with the locations may be used (e.g., in lieu of a radius). The use can be presented an additional option to further refine the location by creating or altering the known boundaries.

After the user specifies the radius (or other area/boundaries), a new location definition button can be added above the select area 2010. The radius (or other area/boundaries) is included in the location definition button. If the user clicks on the location definition button, the "Set Radius Around Location" modal opens and the Location Select Area scrolls to show the event (behind the modal).

Upon successful selection/configuration of locations, the user can select the next button 2012 to continue.

Figure 20E:
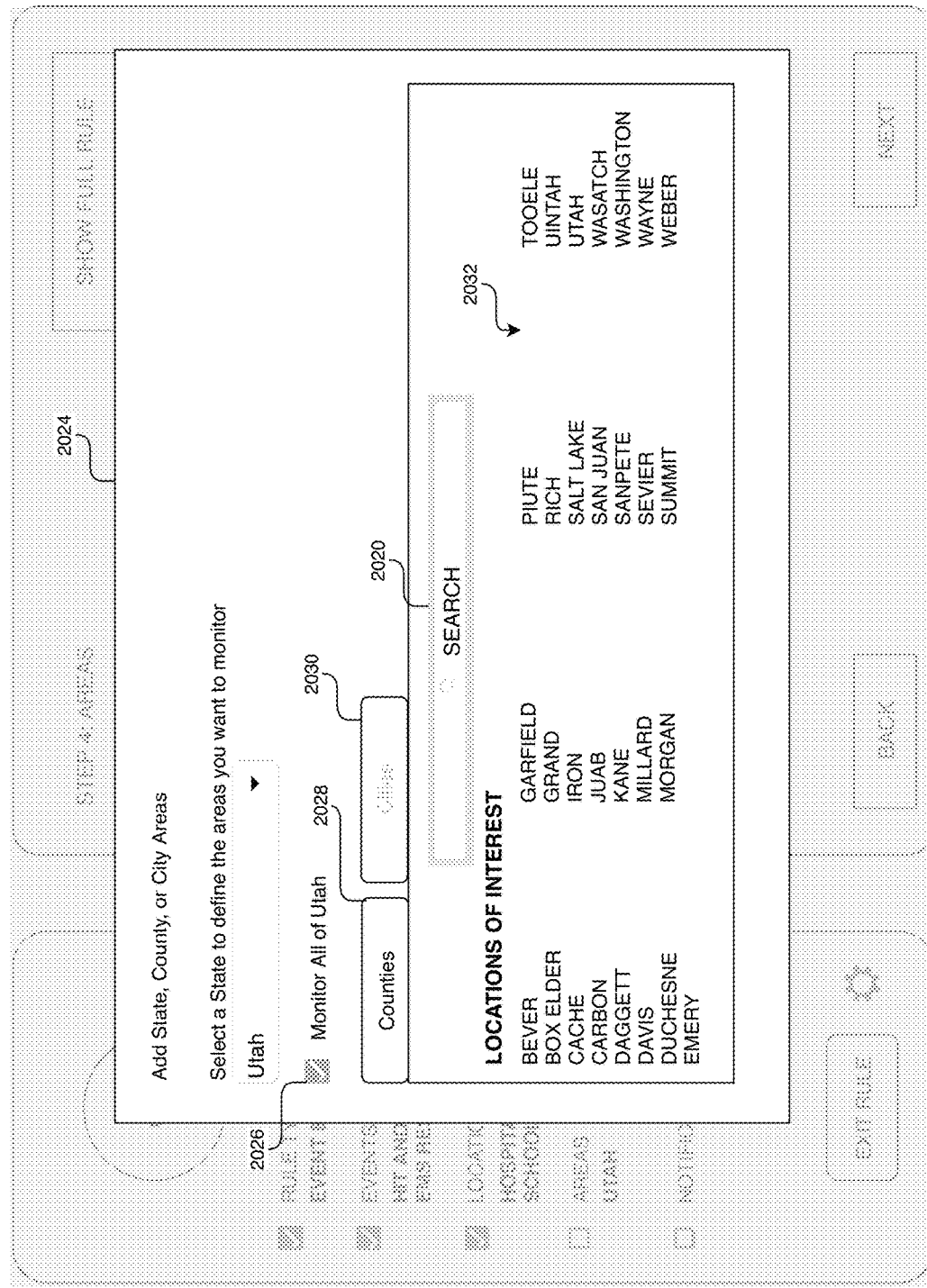

As depicted in FIG. 20D, UI can be transitioned to "Areas". FIGS. 20D, 20E, 20F, and 20G illustrate various UI elements facilitating user configuration of areas. As used herein, an area can be a state, county, city, or custom boundary (e.g., user defined). In general, a user notification can be generated when a rule is triggered within a defined area.

In one embodiment, selection of next button 2012 in UI 2002C causes a transition to UI 2002D in FIG. 20D. For example, step identifier 2004 is updated to "Step 4: Areas" to correspond to configuration element 2023 in pane 2000. Back button 2014 is presented within configuration window 2002D allowing a user to return to UI 2002C (i.e., which in this example is the prior step).

Within FIG. 20D, parameter area 2010 depicts area options 2024 applicable to the current event type (or types) and/or event sub-type (or sub-types), including defined areas 2022 and custom areas 2034. Selection of defined areas 2022, can transition UI to modal 2024 in FIG. 20E including "Add State, County, or Cities." A user can use modal 2024 to select states, counties, cities, etc. A user's current State can be preselected in the state dropdown and the County tab is active, showing state counties.

In some embodiments, such as for entities that are interested in events across multiple states or the entire country, no state is preselected. A user's state related information can be derived from a user's profile or other information known about the user.

In one embodiment, an entire state can be selected by clicking on checkbox 2026 to monitor the entire selected state. In such embodiments, if the entire state checkbox 2026 is selected, the counties and cities UI can be disabled, removed, or shown at reduced opacity to indicate to the user that they cannot be individually selected (or deselected).

If the user does not select checkbox 2026, the user is able to select individual counties or cities using the county tab 2028 or cities tab 2030, respectively. Upon selection of one of the tabs, the user is presented with a selection list 2032 allowing them to select one or more counties or cities to configure the areas element. Search tool 2020 may allow for search suggestions. For example, search tool 2020 may provide suggestions for adjacent counties or cities to a currently selected area.

Search tool 2020 may also be configured to automatically determine which dataset to pull from based on whether a user is on the counties tab 2028 or cities tab Using tabs 2028 and 2030, a user can select a combination of counties and cities. For example, a user may be interested in an entire county, but only a specific city in a different county (e.g., a city that borders the county, but is not in the county). In some embodiments, a user selects states, counties, or cities. For overlapping areas, the smaller area can be used for notifications when an event is triggered.

In some embodiments, the listing of selectable counties or cities may be modified for a user (e.g., limited) based on permissions associated with the user. For example, a user may be presented with a subset of counties within a state based on the user being part of an organization that services that subset of counties. The same may be true of cities or other predefined areas.

When areas selection is completed, a "Save" button can become active and allow the user to return to the prior interface (e.g., FIG. 20D), or advance to the next configuration element.

Subsequent to areas selection, a user may be presented with a defined area map 2036 (in FIG. 20F). Defined area map 2036 depicts the final selected area. For example, it may be that checkbox 2026 (monitor all of Utah) was selected in area options 2024. As such, defined area map 2036 shows the boundaries of the entire state (of Utah). If the user had instead selected one or more counties or cities (as previously described), defined area map 2036 could instead show the selected areas using suitable boundaries.

Modal 2024 of FIG. 20E and defined area map 2036 of FIG. 20F may also be combined with each other on the same UI. In such an embodiment, a user can select a location from county list 2032 (or a corresponding city list). The selected location can be depicted in defined area 2036 to aid the user in selecting areas and/or locations of interest.

In another embodiment, the user may instead interact with a defined area map by selecting areas on an interactive map. As areas are selected, their formal location identifications may then be shown or highlighted in a different area such as modal 2024.

Referring back to FIG. 20D, a user can alternatively select the "Custom Areas" element 2034. As a result of selecting element 2034, map 2038 can be presented to a user (in FIG. 20G). Map 2038 can include interactive drawing/selection tools.

For example, FIG. 20G includes drawing tool bar 2040. Drawing tool bar 2040 further includes drawing tools 2044 (e.g., radius tool 2044a, box tool 2044b, way-point tool 2044c, and line tool 2044d, etc.) allowing freeform selection of particular areas of interest. Tool bar 2040 also includes region naming field 2042 and save button 2046. Radius tool 2044*a* is shown that allows a user to center the selection on a particular location and then extend detection using a fixed radius from that central position. The user may be able to do this using a gesture or through the use of a drop down, such as the radius selector 2048. In some embodiments, both types of operations are available.

Using one or more of radius tool 2044*a*, box tool 2044*b*, way-point tool 2044*c*, and/or a line tool 2044*d*, a user can select specific points that are connected to form a boundary that encloses a region of interest. In some embodiments, a user is able to select multiple different contained regions such as regions that surround distinct cities. In some embodiments, the created regions overlap.

The user can name a selected region using region name field 2042 and then save the region using save button 2046. In some embodiments, the user can create multiple regions by naming and saving each region individually. In other embodiments, the user can name and save a multi-region mapping under a single name.

In one embodiment, as a user defines custom regions, the system determines specific areas included in the defined custom regions. If a user changes the size of a custom region, specific locations within the custom region can also change. For example, it may be that a user selects radius tool 2044A and centers a circle on Salt Lake City. Subsequently, if the user increases the radius of the circle, additional cities within that radius are listed to help the user understand what areas are within the custom region (radius).

Square tool 2044*b* allows a user to create a custom region with 4 sides. In one embodiment, a user can click and drag square tool 2044*b* to generate a square boundary around a desired location. Square tool 2044*b* can also be configured to allow each of the vertices of the square to include a handle that allows the user to modify the shape of the boundary from a square into a four-sided polygon with sides of varying length. Similarly, each side of the region created using square tool 2044*b* may also be selectable such that one side can be moved independently of the other sides while maintaining a contiguous boundary.

Square tool 2044*b* may also be capable of having only three sides or more than four sides. Thus, in some embodiments, square tool 2044*b* may be a polygon tool that allows enclosed boundaries with various numbers of configurable sides to be created.

Waypoint tool 2044*c* may allow a user to generate very detailed boundary paths that would be difficult to create using the radius, circle, square, or polygon tools previously described. Using waypoint tool 2044*c*, a user can click anywhere on the map area to create a new waypoint. A boundary can be generated that connects the new waypoint to a previously created waypoint. As a user creates additional waypoints, an area or region boundary is created that encompasses a portion of map 2038. To complete a contiguous boundary, the user may select the original (e.g., first) waypoint causing a boundary line to be completed between the first waypoint and the final waypoint. In other embodiments, a boundary between the last-created waypoint and the first-created waypoint is maintained even while the user adds additional waypoints between.

Line tool 2044*d* may also be present and allow a user to quickly generate polygons that define desired areas or regions.

Any or all of drawing tools 2044 may be operable by a user with an interface device like a mouse or other pointer (e.g., a finger on a touch screen). Additionally, the tools may also be capable of receiving data inputs for use in defining a boundary. For example, latitude/longitude data may be imported or otherwise provided by the user and used to set the waypoints for waypoints tool 2044*c* that define an area or boundary map.

In another embodiment, the system may facilitate creating regions with dynamic edges. For example, if a user defines a custom region with the radius tool, the system may suggest to the user that if they expand or contract the radius slightly, a city/area/county/etc., may be added or removed. In a similar embodiment, the system may suggest to a user: natural boundaries, common boundaries, historical boundaries, service area boundaries, or other known information to aid in defining custom regions having increases relevance and/or appropriateness for the user.

In one embodiment, after the custom region has been created, the user can name the region. Based on the region, the area name can then be presented with a visualization of the quantity of sub-areas that are within that custom region. For example, the number of cities, counties, states, etc., may be listed alongside the name of the custom region.

In one embodiment, after the user successfully defines a custom region (e.g., a region that has a contiguous border with a coverage of sufficient area), the UI may enable or present a save button 2046 to allow the user to save the custom region.

In another embodiment, once a custom region has been successfully defined, the user is able to define additional custom regions within the same view such that multiple custom regions are defined. Once a region has been defined, the region—represented by the region name given by the user—is presented in a list. In one embodiment, a listing of defined custom regions includes a UI control that allows the user to remove the defined region from the custom area configuration.

In one embodiment, while the user is defining a new custom region, other existing custom defined regions are visually deemphasized (e.g., their opacity is reduced) such that definition of the new customized region is emphasized.

If the user has defined a customized area and clicks on the "Next" button before clicking on the "Save" button, the area can be saved automatically, and the user can be moved to the next step.

Thus, when a user completes area selection/definition (of one area or of multiple areas), the user can save the selected/defined areas and select the next button to move to the next configuration step.

In one embodiment, selection of next button 2012 in UI 2002D causes a transition to UI 2002H in FIG. 20H. For example, step identifier 2004 is updated to "Step 5: Notifications" to correspond to configuration element 2025 in pane 2000. Back button 2014 is presented within configuration window 2002H allowing a user to return to UI 2002D (i.e., which in this example is the prior step).

Turning to FIG. 20H, a user can define how and when they are to receive notifications. Users can receive notifications, for example, in an "app", via SMS, or via email. Each notification method can be a checkbox, for example, including in app checkbox 2050, SMS checkbox 2052, or email checkbox 2054.

The user can select as many notification methods as they prefer (e.g. In App and SMS). In one embodiment, the app checkbox 2050 is checked by default while SMS checkbox 2052 and email checkbox 2054 are unchecked by default. However, other default checkbox selections/deselections are possible.

Depending on the notification method, additional information may be configurable and/or requested (or even required) from the user. For example, if SMS checkbox 2052 is selected, SMS number field 2056 can be populated to designate the SMS number where notifications are to be sent. Similarly, if email checkbox 2054 is checked, email address field 2058 can be populated to designate an email address where notifications are to be sent.

In some embodiments, the SMS and email fields may be auto populated by the system based on user account/profile information. For example, the user may include an SMS and/or email address in their user profile, one or more of which is automatically inserted into either or both of these fields. In some embodiments, the user is able to edit the default addresses, while in other embodiments access control rules force predefined (e.g., possibly read only) values in these fields. For example, a user may be configuring notification preferences for a team or organization such that notifications should be sent to a team account rather than the individual account. In such cases, the team accounts may be pre-populated into the fields (and the fields designated read only).

In some embodiments, multiple accounts can be designated for each notification method. For example, each notification may be sent to multiple email addresses. In some embodiments, this is accomplished by adding a new email address field 2058 for each additional email address that is to receive the notification. In other configurations, the user may be able to designate multiple addresses within the single email address field 2058 by using a delimiter character such as a comma or semicolon.

In some embodiments, accounts or addresses added to notification fields are checked against access control rules to determine whether the account is authorized to receive notifications. The access control rules may also be linked to specific event types, locations, and/or areas such that a given account may be authorized to receive some sorts of notifications but not others. In the case that a user inputs an address into a notification field that is determined to be invalid and/or unauthorized to receive a notification based on the current rule parameters, the user is notified of the incompatible configuration.

In some embodiments, notification method input fields may include drop-down or selection menus populated with eligible/authorized accounts. In some embodiments, if a user adds an SMS or an email address, those values are added to the user account for access on later rules.

In addition to configuring notification methods, the user also configures time preferences 2060. Time Preferences allow the user to receive notifications at specified times. In one option, the user can select always on radio button 2062. When radio button 2062 is selected, the user desires to receive notifications any time a corresponding rule is matched. In one embodiment, always on notifications are the default.

In another option, the user may select custom schedule radio button 2064. Custom scheduling allows the user to receive notifications during specified days and times. Once custom schedule radio button 2064 is selected, day and time fields 2066 become active and configurable. In one embodiment, a select all link is presented that allows every day to be activated in one click. The user can then modify the times for each day separately according to their preference.

If a day is selected, the start time and end time field are enabled. If day is unchecked start time and end time are disabled.

If multiple days are selected, start and end time fields can be auto-filled with the users initial start or end time entry (e.g. if the user adds 10:00 am into the Monday Start time field, then the start time for Tuesday, Wednesday, and Thursday are auto-filled to 10:00 am). If the user updates the start or end time fields, the new value does not auto-fill the other start and end times.

In some embodiments, the system is able to make recommendations for dates and times based on known or predicted characteristics from the other configuration steps. For example, if the locations element is set to detect events that occur at schools, a custom notification preference may be suggested for receiving notifications during known school hours Monday through Friday.

In another example, if the event selected is for excess heat, notifications may be suggested for times known to be the hottest portion of the day.

As with the previously described configuration steps, once the user has configured the notifications element in a sufficient manner, the user is able to transition to other configuration elements. In the depicted embodiments, notification is the final configuration step. As such, selecting next or save at the notifications step can complete rule configuration (e.g., when the user proceeded step-wise through the configuration process, as described). However, other configuration step orderings are possible and contemplated.

Figure 20I:
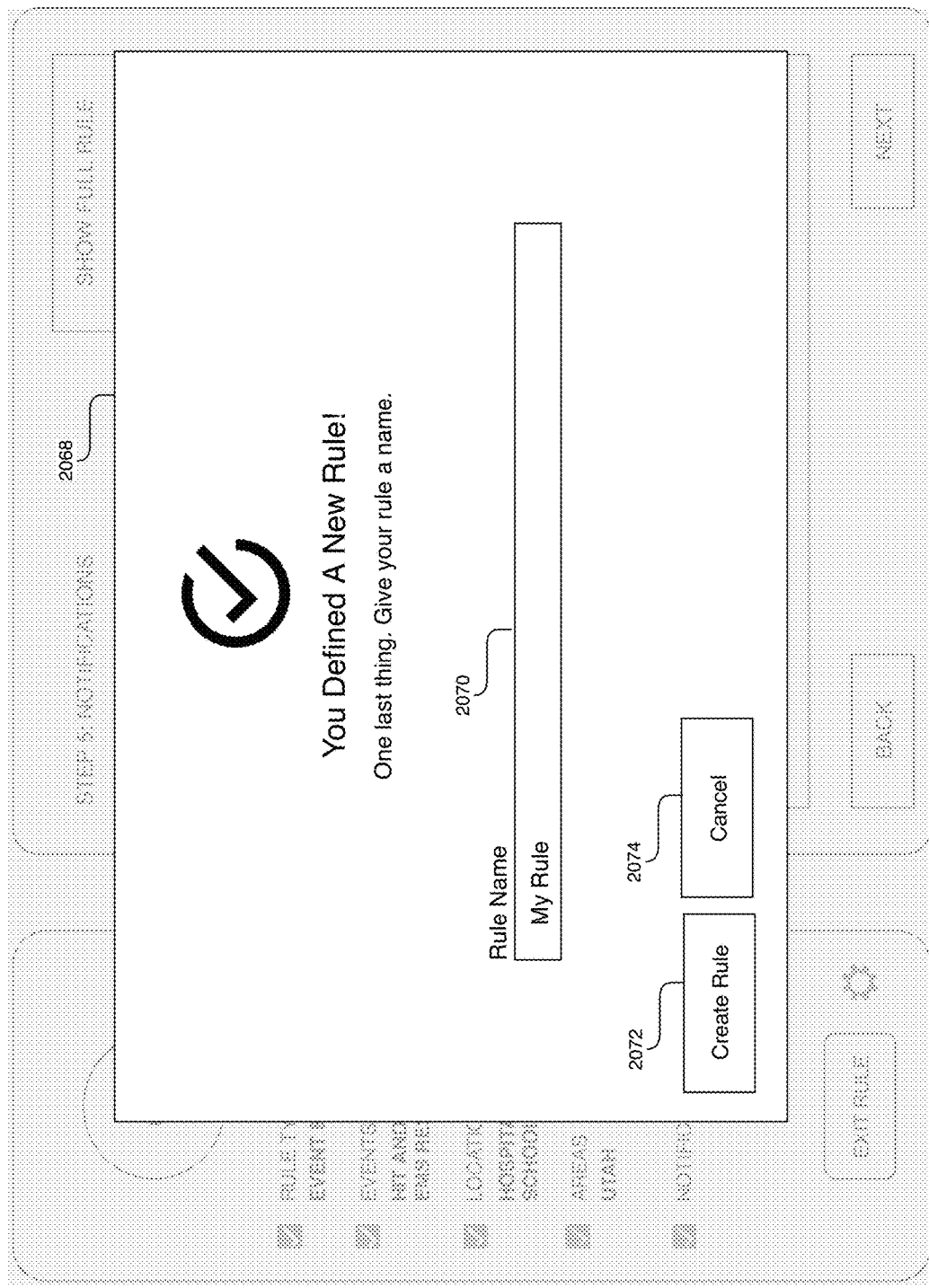

To ensure a user understands a created rule, the user can be presented with a UI, such as the confirmation modal 2068 depicted in FIG. 20I, confirming rule creation. Confirmation modal 2068 includes Rule Name field 2070 permitting the user to enter a rule name. The user can then select Create Rule button 2072 confirming rule creation.

In some embodiments, rule name 2070 is suggested by the system based on information within the rule. For example, a rule name may be suggested that follows a format such as "Events+Location+Areas+Notification Type." In one example, the rule name is "Fire-Schools & Hospitals-Utah-Custom." In other embodiments, the elements within the suggestion may be altered or presented differently. The user can also input a custom rule name.

In one embodiment, the rule name is less than 80 characters.

If the user reaches confirmation modal 2068 but decides they would like to further configure the rule, the user can select cancel 2074 to return to the rule configuration workflow.

As has been described with FIGS. 20A through 20I, a rule creation workflow or wizard may be utilized to allow a user to generate a rule through stepwise guidance and validation.

Figure 21:
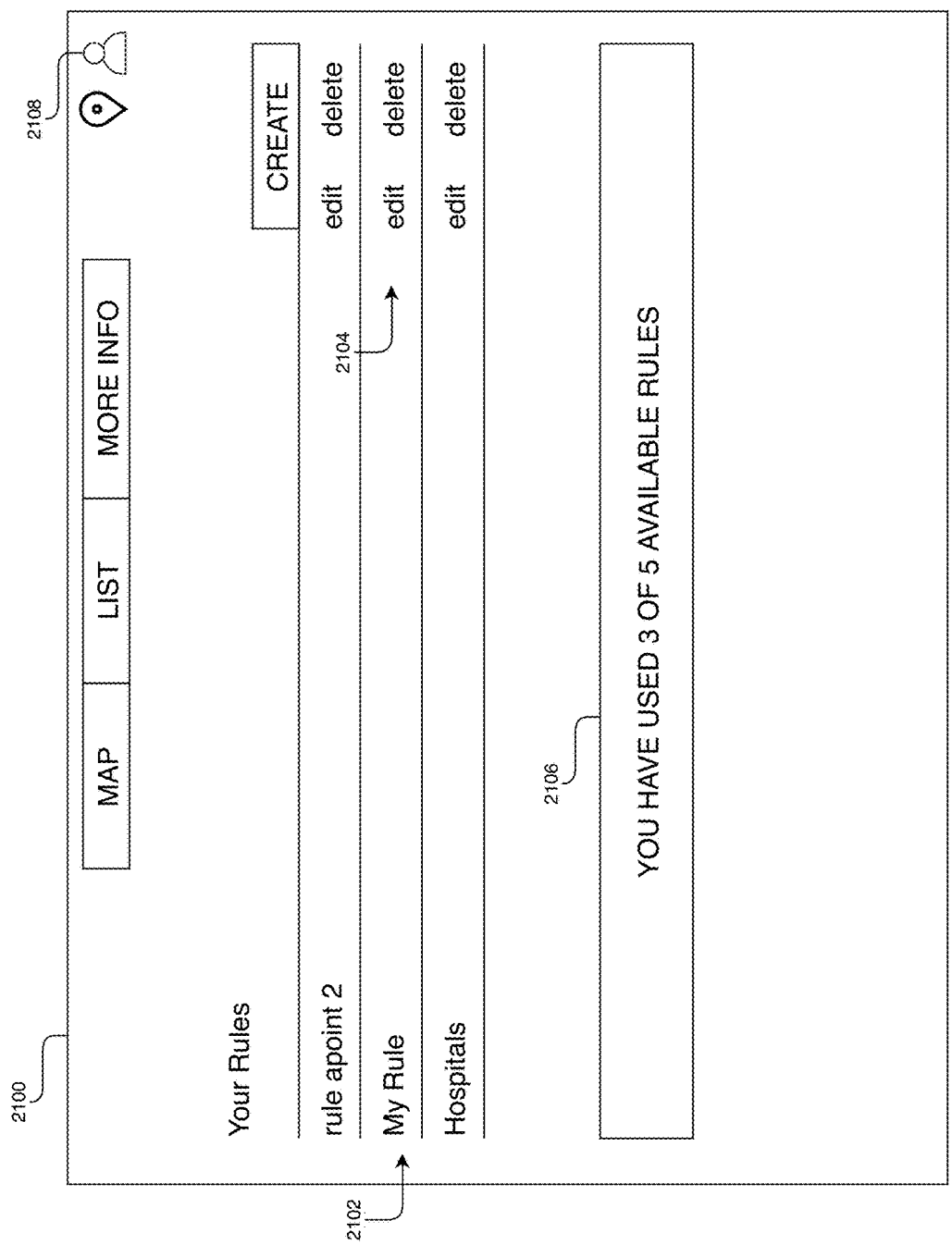
FIG. 21 illustrates a user interface for viewing user generated rules.

Turning now to FIG. 21, a user can also access a UI 2100 for viewing and/or managing created rules. Within UI 2100, the user can view a rules list 2102 showing rules available to the user. In some embodiments, only rules created by the user are shown. In other embodiments, any rule that is linked to the user or over which the user has control (e.g., by being part of a team or group) can be shown.

For example, a user may be in a management capacity allowing UI 2100 to show rules created by users over which the user has authority. In another embodiment, a user may be linked to a particular set of SMS or email addresses such that any rule that is configured to notify the address can appear in list 2102. In this way, the user can identify rules they have access to or can expect to receive notifications about.

Associated with each rule are options 2104 that include, for each rule, at least an edit option and delete option. The edit option allows the user to re-enter the rule creation workflow and modify a rule. Similarly, the delete option allows the user to delete a rule. In one embodiment, the user receives a modal or non-modal confirmation that a rule has been deleted and/or modified. In some embodiments, the notification may include an undo option to roll-back a rule change or a rule deletion.

In some embodiments, the function of the rule options 2104 may be dictated by the user's role or other permissions. For example, a user may have authorization to edit a rule but not delete a rule. In another embodiment, the user may have the ability to delete themselves from the rule (e.g., remove their account from the notification configuration) but not otherwise alter the rule for others.

In some embodiments, UI 2100 includes additional options allowing the user to organize the rules according to their preference or other preconfigured option (e.g., creation date, last trigger date, location, notification recipient, etc.). In some embodiments, a user may be able to see the rules they are associated with (e.g., are to receive notifications from), but cannot edit or delete the rules (e.g., have read only access).

In some embodiments, users may also have the option to share their rules with other users or groups. For example, rule options 2014 may additionally include a "share" option that when selected allows a user to identify another user, group, or team to share the rule with. In some embodiments, sharing functions provide a permission to another user or group to see triggered events from the rule. In other embodiments, sharing can be facilitated by providing the underlying programmatic formula describing the rule to another entity. The other entity can then use the formula to create their own rule (or as the basis for a new rule with additional configuration).

UI 2100 may also include a system message area 2106. In one embodiment, system message area 2106 includes an indication of the number of available remaining rules the user is authorized to configure. In other embodiments, system message area 2106 may be configured to display information such as the identity of the last triggered rule, the most recently created rule, or other information.

UI 2100 may also include user tools 2108 that enable the user to make global changes such as configuring user preferences, contact information, or the like.

Figure 22:
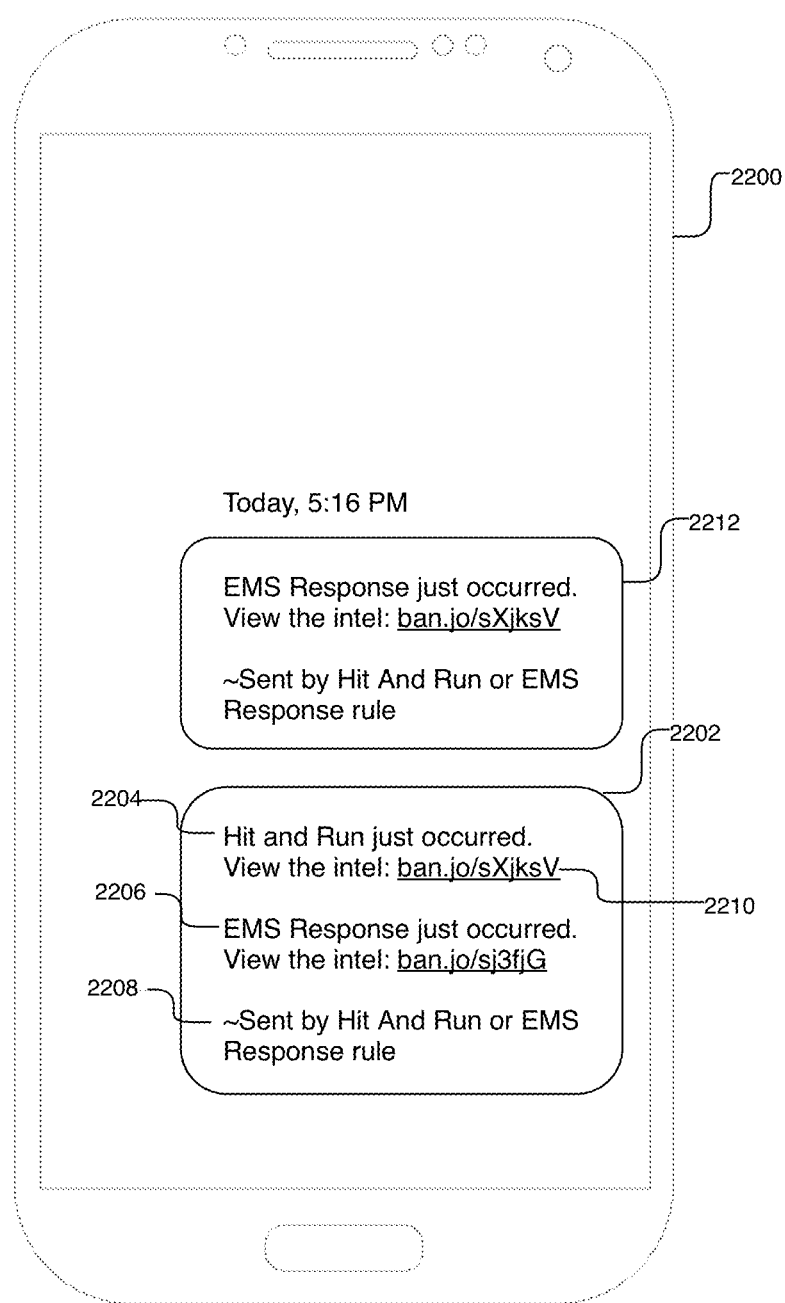
FIG. 22 illustrates an embodiment for receiving event notifications as a mobile device.

FIG. 22 illustrates an example of receiving a triggered notification 2202 at mobile device 2200 (e.g., a mobile phone). Mobile device 2200 can be configured to receive an SMS message (e.g., by selecting check box 2052 and entering the appropriate number in field 2056 of FIG. 20H).

Using a rule creation workflow similar to that described in FIGS. 20A through 20I, a rule can be created wherein the events "hit and run" and "EMS response" are with an "OR" operator such that the detecting of either event in proximity to a "hospital" or "school" within "Utah" would satisfy the event rule.

In such an example, a more recent notification 2202 includes an indication of an event type 2204 "Hit and Run" and an event type 2206 "EMS Response." Notification 2202 includes these two event types within the same notification but as separate instances. Presenting separate instances in the same notification can be due to use of an "OR" operator in the rule that generated notification 2202.

In an embodiment where an "AND" operator is used to combine the event types, the notification is generated as a combined notification such that the event types are combined in the manner of "Hit and Run AND EMS Response occurred."

Notification 2202 also includes an indication 2208 of the rule that generated the notification(s). As previously described, the pair of depicted notifications were triggered form a rule that included "Hit and Run OR EMS Response."

For each event notification, a link may be provided. For example, link 2210 is depicted along with rule notification 2204. The link provides access to additional information about the message. For instance, the link may take the user to the rule that caused the trigger or may take the user to a stream of raw data that was used to determine the event that caused the trigger.

Each triggered event may include a different link to different underlying information about that particular message even if the same underlying rule triggered both messages (e.g., if the rule includes an OR operator, different types of underlying data may be associated with the different elements connected by the OR).

In some embodiments, the link provides access to an app that allows the user a full range of options relating to the event(s) that resulted in the trigger and notification. For example, the link may direct the user to the underlying information or data corresponding to the event. Additional tools or information may also be presented that can allow the user to perform actions such as dispatching resources, triage, communicating with people or resources also linked to the event, or the like.

A user may be able to see prior notifications such as prior notification 2212. As depicted, notification 2212 may include only an indication that the "EMS Response" portion of the shooting OR robbery rule was triggered. In one embodiment, a single stream of triggered events can be aggregated for the user in one location (e.g., an SMS thread). Notifications may be grouped by triggered rule by having all notifications for a particular rule sent from a specific SMS origination address. Similarly, notifications can be grouped in other ways by sending notifications within a group with an associated origination address. In this way, when a notification is received through known SMS systems, notifications can be grouped according to their trigger.

In other embodiments, triggered events may appear in the same stream regardless of their triggering rule. In this way, a user need only review one notification stream in order to see relevant notifications. The described functionality (e.g., how notifications are grouped at the user device) can be configurable depending on user or organizational preferences.

The user may have also received a notification at mobile device 2200 through the App as a push notification and as an email to an email application. Push notifications are understood to be any sort of notification received through an app and also presented outside of the app at a device, such as on a home screen or lock screen. Push notifications can be configured to have some or all of the notification information and/or configured to provide links to external data or to locations within their corresponding app for the user to receive additional information about the notification or triggering rule.

In some embodiments, the information provided through an SMS or a short code may be too long to work well or even be compatible with the receiving system. Accordingly, "shortcodes" can be used to transmit certain information such as a URL that directs the user to additional information.

In one embodiment, a user may also be able to "unsubscribe" from certain types of notifications through a direct response to the notification. For example, the user may unsubscribe from SMS based notifications by replying to a notification with a keyword, such as "stop."

Subscription to notifications can be authorized during rule setup (e.g., when an address is used in a saved rule). For example, it may be that a telephone number is included to receive SMS messages, prior to sending any event notifications. A confirmation of the alerts may be provided to the recipient telephone number to confirm that the telephone number is correct and that event notifications are authorized to be received at the telephone number. A similar process may be used with email addresses or other notification addresses.

Unsubscribing from notifications may be configurable at the event level (e.g., request to stop notifications for a current event), at the rule level (e.g., request to stop notifications for the current rule), or at a global level (e.g., request to stop all notifications). Depending on the user, subscription/unsubscription may be configurable based on user role, device owner, or another criterion. For example, a user may not be able to unsubscribe from notifications sent to an employer provided device but may be able to unsubscribe from notifications received at a personal device.

Such functionality may result in the underlying rule being modified such as by unchecking the SMS option within the notifications configuration parameter, as previously discussed. In other embodiments, a separate authorization list may be kept such that rule notification is checked against the additional list to determine whether to transmit the notification to the particular number.

A user may be able to further configure specific alerts to stop (e.g., future notifications originating from certain rules) or may be able to stop all notifications.

Notifications can also be received by email. In one embodiment, emails are sent via plain text to ensure deliverability and cross compatibility across devices. An email may follow a template that includes a subject line indicating that a rule has been triggered. The body may include an identification of the rule that was triggered along with some level of event detail and a link to view additional detail. The email may also include the rule that originated the notification along with a link to allow the user to stop notifications.

As previously described, the stop notifications options may be configurable to apply to only one particular rule, a set of rules, a category of rules, all notifications, etc.

If a user opts to stop notifications, another entity may be notified of that action. For example, if a firefighter unsubscribes from notifications, the Captain of the firehouse may be notified to ensure that request is appropriate or to ensure that somebody else is receiving the notifications for those alerts.

Users can also be notified of actions with in-app notification. In one embodiment, notifications can be displayed in a notification bar. The notifications can remain for specified amount of time, for example 72 hours, however the time is configurable and updatable. In some embodiments, the app can force the event to be available for the user for a specified amount of time regardless of whether the user has viewed or dismissed the notification.

If the user clicks on a notification, a map also presented on the app interface can zoom in and center on the event(s). If there are multiple notifications, the user can toggle through them by clicking on navigation controls. If the user clicks next on the last notification, the first notification can show. A "dismiss" control may be provided for some or all notifications that allows a user to remove the corresponding notification from view. Similarly, a "Dismiss All" option may be configured to remove all notifications.

In some embodiments, viewing a notification (e.g., in app or through a verifiable push notification interaction) automatically clears the in-app notification.

While app notifications, SMS notifications, and email notifications are described herein, other notification platforms are contemplated such as MMS, emergency pagers, AVL devices, or any other device or protocol suitable for receiving notifications.

Figure 23:
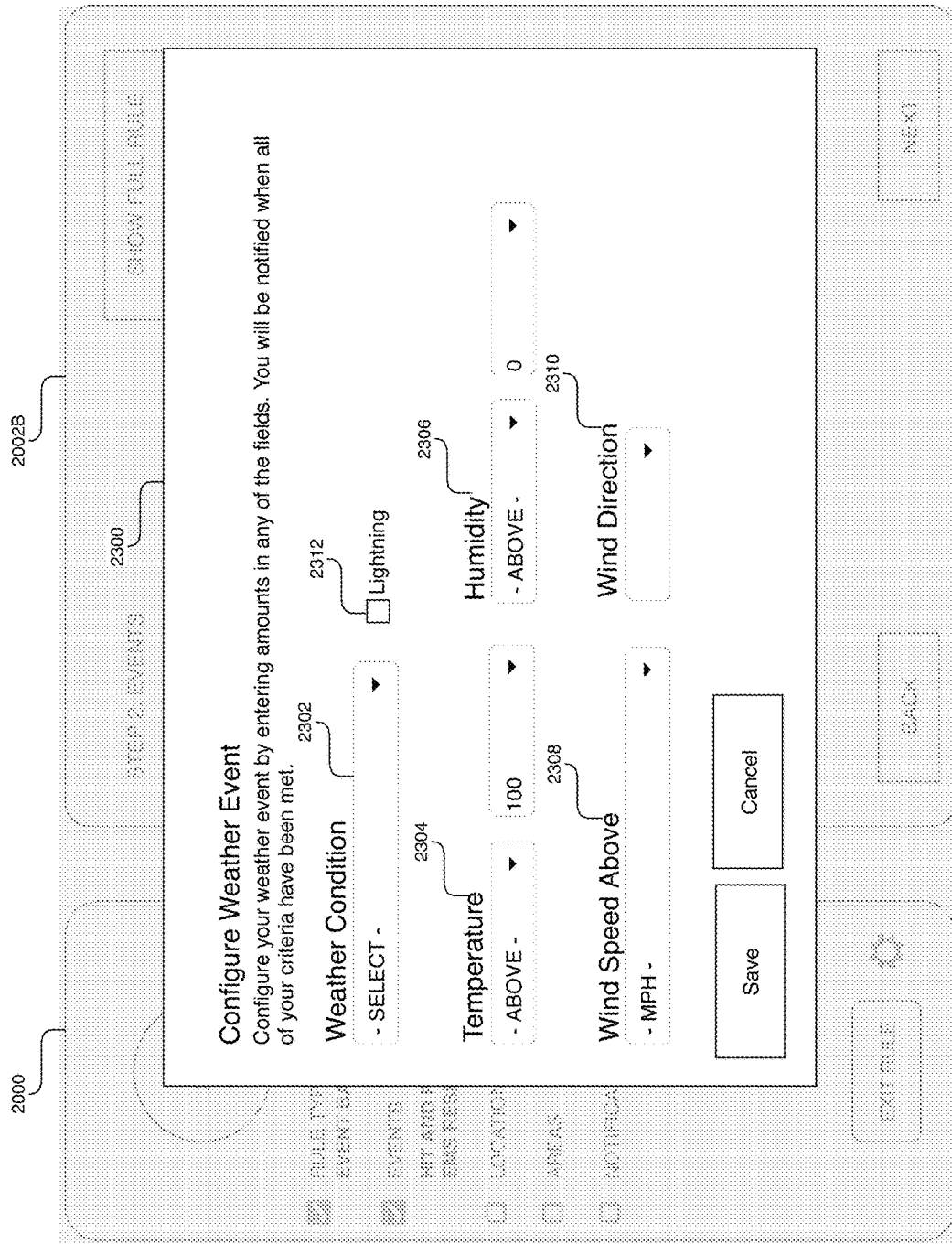
FIG. 23 illustrates a user interface for generating whether related rule configurations.

Turning to FIG. 23, certain types of events may require additional types of configuration parameters. For example, weather related events have certain types of conditions that can be configurable. These additional configurations can be helpful when isolating a particular degree or type of impact of a weather event for notification.

Weather events may be stand-alone events (e.g., notify me when the temperature is greater than 100 degrees), or as complimentary conditions to other events (e.g., notify me of power outages only when it is greater than 100 degrees).

As depicted, weather event parameters 2300 are presented in the case of a user selecting "weather" while configuring the events configuration element previously described. The event category may include a singular button that allows a weather event to be added. In other embodiments, the system may identify a selected weather-related event and present parameters 2300 to help the user further define the events portion of the rule.

Parameters 2300 may include a weather condition dropdown 2302 that includes options such as rain, temperature, flood, hail, or other weather events. Based on the selection, additional parameters may automatically be added within parameters 2300.

Some additional weather-related events can also be chosen separately from the weather condition dropdown 2302. For example, lighting selector 2312 may be selected by a user either independently from other weather events or in conjunction with another weather event chosen in dropdown 2302. In some aspects, the weather activity (e.g., lightning) may be replaced with a different weather event (e.g., tornado) or additional selectable options may be included.

Using sub-parameters 2304 through 2310, the user may configure the weather parameters they are interested in, such as temperatures above/below a selected level, humidity above or below a selected percentage, windspeed above a certain level, and/or windspeed heading.

Such elements can be created in the previously described manner with relation to combining rules with logical AND/OR operators. In some embodiments, a separate weather event is created for each individual weather event type (e.g., windspeed is created separately from temperature). However, if multiple conditions are selected within a signal configuration, those can be treated as conjunctive rules (e.g., temp about 100 AND humidity above 60%).

Once the weather event has been created, the weather event can be saved and thereby added to a current rule as previously described.

At least two weather event concepts are supported. In one example, a user can configure a "weather only rule" in which satisfaction of the rule and corresponding notification can occur based solely on the presence of the weather event. Weather AND/OR (or not) rules are also contemplated in which a weather event/condition is combined with a different type of event (e.g., non-weather-related event) using an AND/OR clause.

Weather condition data streams may be received through weather station reports or other sources within the defined area configured in the rule. The system may then identify weather events from those data streams. The system creates a user generated weather event and places an event pin on top of the weather station.

For weather AND rules, no new event is created. For example, if a power outage occurs while the temperature is above 100 F, the rule is triggered and the power outage event is flagged. No weather event is created. The weather can be viewed on the intel screen (e.g., as provided by a link or shortcode within the notification, as previously described).

Configuration of weather events—such as described in conjunction with FIG. 23—may also be more fully integrated into the flows or processes depicted and described in conjunction with FIGS. 20A through 20I. For example, during configuration of any suitable non-weather event (e.g., a power outage), an additional configuration parameter may be presented to allow the event to include values for weather-related parameters.

In one example, a user may select a power-outage event during event selection (e.g., as depicted in FIG. 20B). Upon selecting the event, a modal dialog similar to that of FIG. 23 may be presented indicating to the user that particular event type may be additionally configured with weather-related configuration parameters. For example, a power-outage event may be coupled with a high-temperate event.

In such instances, UI pane 2000 may include an additional identifier showing that the event (e.g., power outage) is further configured with weather parameters. The additional weather parameter(s) can be shown as an additional discrete event in the events listing.

Figure 24:
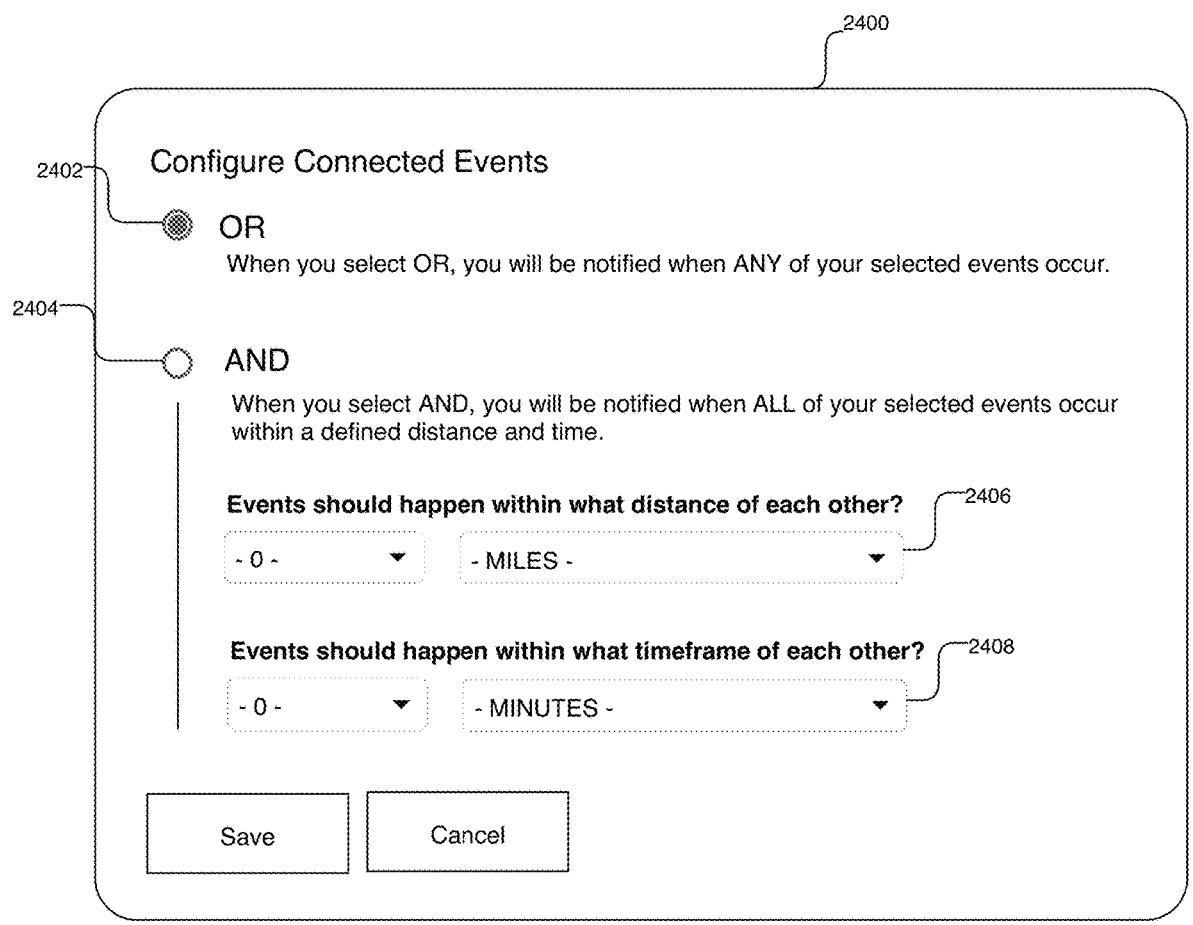
FIG. 24 illustrates a user interface for providing logic configurations for connecting event types in a user generated rule configuration system.

FIG. 24 presents an alternative UI 2400 that may be implemented to help a user build rule logic. When a user selects a second event or each additional event, the "Configure Connected Events" modal can appear. UI 2400 may be presented to a user at any suitable point in rule building when two parameters are combiner in an AND logical relationship and/or an OR logical relationship. UI 2400 includes OR operator 2402 and AND operator 2404. As previously described, the use of OR operator 2402 effectively generates separate rule processing logic for each of the elements combined with OR (disjunctive). For example, a rule that is the same for location, areas, and notification can operate the same for either of two event types combined with the OR logical connector.

AND operator 2404 can be associated with additional configuration options. For example, AND operator 2404 can be associated with physical distance parameter 2406 and timeframe distance 2408.

Physical distance parameter 2406 facilitates selection of a physical distance. A selected physical distance defines that two events linked with an AND also occur within a specific distance of each other. For example, it may be that the events "Shooting" and "Robbery" are to be within a physical distance of 1000 ft. Thus, a shooting and robbery detected within 1000 ft of each other can satisfy the AND (and thus can trigger a notification). On the other hand, a shooting and robbery detected more than 1000 ft away from each other do not satisfy the AND (and thus do not trigger a notification).

Similarly, timeframe parameter 2408 facilitates selection of a timeframe. A selected timeframe defines that two events linked with an AND also occur within a specified time of each other. For example, it may be that the events "Shooting" and "Robbery" are to occur within 10 minutes of one another. Thus, a shooting and robbery detected within 10 minutes of each other can satisfy the AND (and thus can trigger a notification). On the other hand, a shooting and robbery occurring more than more than 10 minutes apart do not satisfy the AND (and thus do not trigger a notification).

As previously mentioned, UI 2400 can be (e.g., automatically) presented anytime a logic statement is used. For example, if a user selects a second location UI 2400 can be presented to allow the user to select the logical operator to use to combine the two locations. Additionally, a user may invoke UI 2400 by, for example, clicking on an existing indication of a logical relationship in order to edit or further configure (refine) that relationship. For example, a user may select the AND element 1814 or the OR element 1816 described in conjunction with FIG. 18. In response, UI 2400 can be presented.

The AND/OR operators can be used to combine multiple configuration parameters. For example, OR operators can be used within the event parameter, the location parameter, and the areas parameter. Because of this, many possible variants of notifications are possible depending on which elements are present.

In some embodiments, a user may also be able to configure a rule (or even portions of a rule) using rule formulas. For example, a workflow or wizard can be used during creation of a rule through a formalized rule workflow. In this way, (e.g., more experienced) users can more efficiently formulate new rules, or edit existing rules, without use of the wizard. Similarly, once a rule is created, it can be shared in formula form with other entities.

Formulaic Rule Examples:
(Disabled Vehicle AND Ambulance Requested)
within 1 hour and 1 mile
OR (Officer-Related Emergency AND Stakeout)
(((Request For Registration AND Disabled Vehicle)
within 1 hour and 1 mile
AND Ambulance Request)
  within 1 hour and 1 mile
  AND Officer-Related Emergency)
    within 1 hour and 1 mile
((Convoy Or Escort AND Disabled Vehicle)
within 1 hour and 5 mile
AND Ambulance Request)
  within 1 hour and 10 miles
  OR Bomb Threat As shown above, a user can create more complex rules using express formulas and syntax. A user may utilize the previously described wizard to begin rule creation and finish or edit rules within a formula editor (not shown). As such, embodiments of the invention include a robust set of interoperating modules that facilitate creation and modification of rules having varied complexity. Events can be linked using essentially unlimited AND/OR logic.

Figure 25:
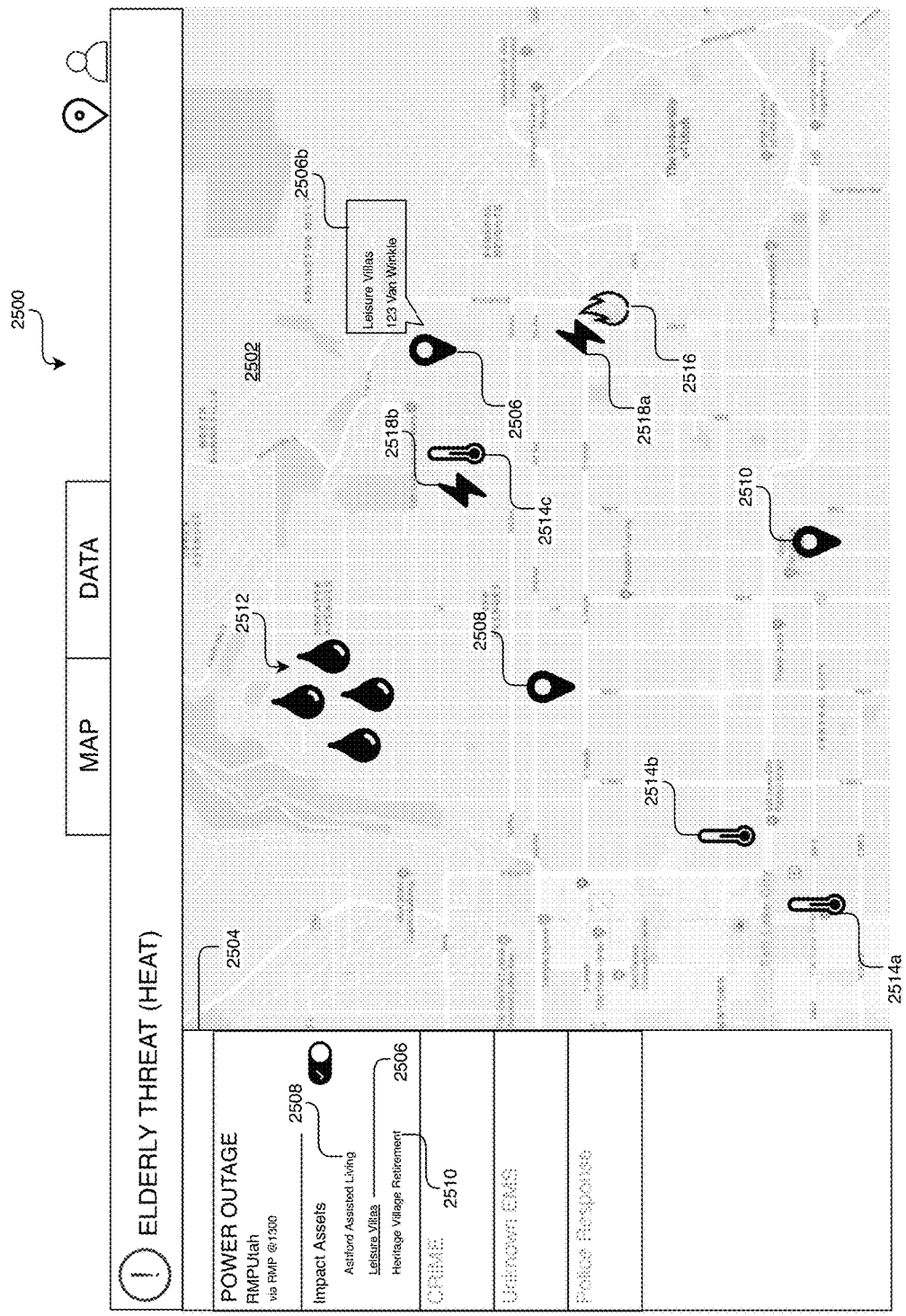
FIGS. 25 and 26 illustrate an app interface for user notification and exploration of triggered events.

FIG. 25 illustrates an UI 2500 that presents users with a visualization of current events based on the rules they have configured or are applicable to them. UI 2500 includes a map portion 2502 onto which triggered rules/events can be shown. Map portion 2502 may be set by a user (e.g., through navigation gestures) or dynamically by broadening/contracting in order to show triggered events. In other scenarios, map portion 2502 may be based on a user's authorization level, role, or other characteristic of the user.

Information panel 2504 is also included. Panel 2504 depicts a different view of current events as well as additional information about events depicted in map portion 2502. As depicted, panel 2504 shows an expanded event labeled "power outage" along with additional information about the "power outage" event. Additional events are also shown below that event but are visually diminished (e.g., grayed out) because they are not currently in focus.

The listing of events may be automatically arranged in panel 2504 according to one or more criteria such as timestamp, severity, truthfulness, status, event type, location, or other characteristic(s).

Map portion 2502 and panel 2504 can be interconnected such that an action or interaction on one affects or automatically updates the other. For example, selecting the "power outage" event from panel 2504 may cause elements on map portion 2502 to be highlighted or emphasized in some manner (e.g., to help a user understand the types of elements that are being affected by the event).

Within UI 2500, selecting the power outage event identifies three impacted assets 2506, 2508, and 2510 to be highlighted. In this scenario, those three locations are retirement communities that are within the power outage area. In one example, the power outage event can be triggered by a rule created in the previously described rule creation engine. For example, a rule could be created that triggers an event notification anytime there is a power outage that affects a retirement community. Because this power outage affects the three retirement communities 2506, 2508, and 2510, the event was triggered and presented to the user.

The user can take additional action to learn more about the impacted assets. For example, the user may select element 2506 from panel 2504 that corresponds to location 2506 on the map. When this selection is made, the map portion 2502 is updated to include additional information about the location such as the address of the location shown as detail bubble 2506*b*.

The reverse interaction is also possible. For example, the user can select location 2506 in map portion 2502 and information bubble 2506*b* can appear and element 2506*a* can be highlighted in panel 2504.

Map portion 2502 can simultaneously include multiple different event types with different event-type visualizations. For example, water/flood notifications can be isolated and grouped according to the origination location. Temperature event identifiers 2514*a*, 2514*b*, and 2514*c* represent temperature readings that satisfy a rule available to the user regarding temperature readings.

A fire is represented by fire icon 2516 and lighting by lightning icons 2518*a* and 2518*b*. As previously described, selecting any of these event identifiers allows the user to find out more about those events including discovering more about the events in panel 2504.

Events that have triggered a rule can be highlighted on the map. For example, details on the map connected to a particular event can be highlighted in the same distinct color on both the map and within panel 2504.

Events linked with OR operators (e.g., from rules where one or more conditions were linked with an OR logical operator) can be triggered as events occur (e.g., one at a time). On the other hand, AND events can trigger multiple events simultaneously (e.g. a shooting event and a riot event) because both event types are required in order for the rule to trigger.

Events that are triggered in conjunction another event (e.g., AND connected conditions) may be visually liked together on the map (e.g., using a specific symbol, number, icon, etc.)

In some embodiments, the identifier on the map may also be selected to include a popover with a label indicating the rule name and/or rule area corresponding to the rule that was satisfied triggering the event detection.

An event listed in panel 2504 may also include an "Impacted Locations" section. For example, the "power outage" event (e.g., as shown in panel 2504) may also include a first specified number corresponding to the number of locations that are affected by the rule. For example, in the prior description, three retirement communities were affected by the power outage rule. Thus, a number "3" (not shown) may be presented in panel 2504 in association with the impact assets if "retirement communities" were the configured locations.

If more than one location type is included within the rule, those counts may be aggregated or presented separately with a corresponding location type next to the count.

In another aspect, reports of certain types of signals are affected by the way the information is received from reporting entities. For example, public utilities (e.g., power providers) may provide data formatted as shapefile, radii, number of customers impacted, or other data types. In an example where a provider provides a shapefile and radius, the provided boundary can be used to identify the location of the event and corresponding coverage area.

In an example where a number of affected customers is provided, the system may perform a calculation such as using census for the affected zip code to derive population, then divide the population by the number of affected customers to get an impact percentage. The percentage can then be translated to a radius that extends from a centroid within the zip code to show the relative impact of the event. When a utility provides less useful information (or no information) a default radius can be applied.

In one aspect, a lat/long and number of impacted customers is received. Logic can be implemented using the number of affected customers to get a radius for "Impacted Locations."

The way events are shown on map 2502 can also be configured such that all events are shown even if they don't fully match a rule. For example, if a user rule includes an AND operator combining two types of events (e.g., a fire and a power outage), map 2502 may be configured to show all fires even if there are no corresponding power outages required by a rule.

In other embodiments, events listed on map 2502 are only shown when a corresponding rule is satisfied. Thus, in the prior example, a fire may only be shown if a corresponding power outage also occurs to thereby satisfy the AND operator within the user rule.

Displaying events on map 2502 may also be configured based on event type such that some events are always shown even if a rule isn't triggered because an additional criterion has not yet been matched. For example, severe or important event types (e.g., fires, shootings, kidnappings, etc.) may always be shown even if another criterion is not met.

On the other hand, other types of events may not be shown unless a rule is satisfied. For example, a traffic jam may not be shown on the map unless a corresponding AND linked event (e.g., an EMS response) is also detected. In this way, important events can be shown without overwhelming a user with all types of events.

Interface 2500 may also be configured to highlight or otherwise distinguish events that have satisfied a rule from events that have not yet satisfied a rule. For example, all shootings may be shown on the map irrespective of whether they have triggered a more specific rule. However, a shooting within 1000 feet of a school may be emphasized on map 2502 if a particular rule requires only shootings within 100 feet of a school.

In another example, panel 2504 may group events belonging to triggered rules at the top of the list and place other events that have not triggered rules lower on the list. In this way, a user is able to see all events but can more easily recognize events that are of particular importance to them (e.g., based on the presences of a rule directed to those event criteria).

Figure 26:
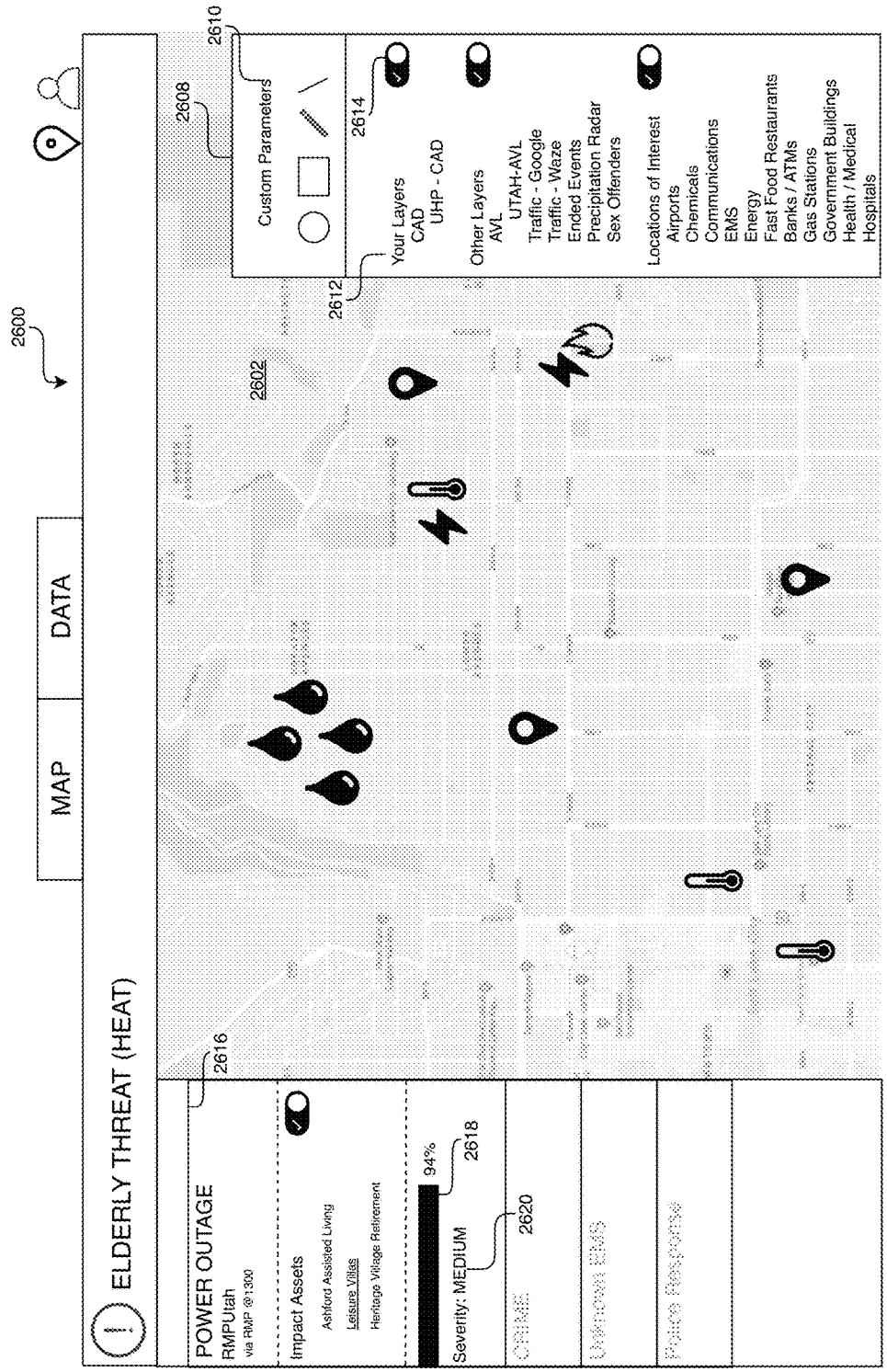

FIG. 26 shows an interface 2600 that includes a map portion 2602 (similar to the map portion 2502 from FIG. 25) along with an additional UI toolbar 2608. Within toolbar 2608 are custom parameters 2610 and layer controller 2612.

As previously described, custom parameters 2610 comprises tools that a user can use to create custom regions within map portion 2602 for different kinds of inspection. For example, the user may use the radius tool to select a sub-portion of map portion 2602 to see events identified within that sub-portion. Similar actions can be performed with the other custom region tools.

Layer controller 2612 allows the user to control the type of data layers that are applied and shown on map portion 2602. For example, using layer toggle 2614, the user can enable/disable information relating to AVL, Traffic, past events, precipitation, and sex offenders. In some embodiments each individual layer has its own layer toggle in addition to a category or source layer toggle. In this manner, the ability to show or hid specific layers or sub-layers can be individual controlled.

Interface 2600 also illustrates some additional data that may be presented within event stream panel 2616. For example, each event may include a visual indication 2618 of event truthfulness and a visual indication 2620 of event severity. In one embodiment, the truthfulness is a determined value that represents the degree to which the system believes the underlying signal(s) used to generate the event are reliable, accurate, truthful, complete, etc. For example, if the identification of the event "power outage" is based on information received directly from the power utility company, the visual indication 2618 may show a high truthfulness value because the power utility is likely to be a reliable source of information relating to a power outage event. On the other hand, if the signal used to generate the power outage event is from a social media source, the corresponding visualization 2618 is likely to be a lower value.

Truthfulness visualizations can be configured based on rules and machine learning data and can be dynamically updated as new information about an event is received.

As previously described, severity may be calculated using various data elements and may be updated or altered as new information is received and processed. For example, visual indication 2620 can indicate the severity of an event. While the term "medium" is used in the depicted embodiment, other methods can be used to visualize severity such as colors, sizes, numbers, etc.

Briefly referring back to FIG. 11, functionality described with respect FIGS. 18-26 can be integrated into user interface 1111 and/or event notification 1116. Entity input 1149 can be used to define rules (including disjunctive/or conjunctive operators). Defined rules can be included in preferences 1126. As such, event preference sets 1127 stored in event preferences database 1109 can include defined rules. Event notification 1116 can notify entities when an event or combination of events satisfies a defines rule.

Accordingly, a defined rule is similar to preferences (e.g., preferences 1126) entered through user interface 1111. A defined rule (including any logic operators) can be stored in a repository similar to event preferences database 1109. On an ongoing basis and/or as events are detected, event notification 1116 or another similar module can compare defined rules to combinations of one or more detected events. When a match is detected, event notification 1116 or the other similar module can send a notification in accordance with notification preferences (e.g., SMS, email, in app).

Figure 27A:
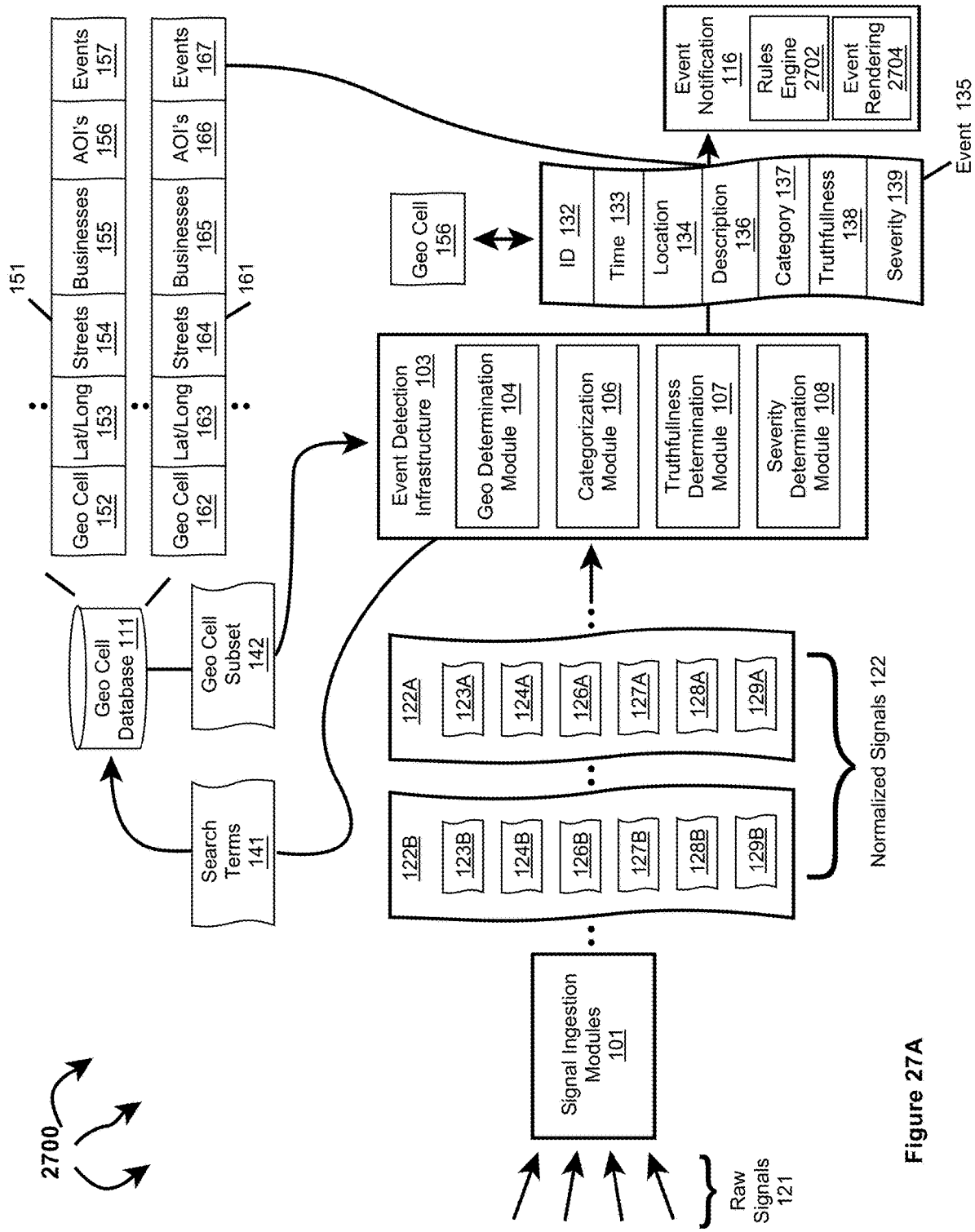
FIG. 27A illustrates an example computer architecture that facilitates normalizing ingesting signals and generating event notifications based on user generated rules.

FIG. 27A depicts a computer architecture 2700 similar to computer architecture 100 described in conjunction with FIGS. 1A and 1B. As depicted, event notification 116 includes rules engine 2702 and event rendering component 2704.

As previously described, a user may generate rules for events they are interested in receiving notifications about. Computer architecture 2700 includes rules engine 2702, along with a corresponding configuration platform (e.g., user interfaces as previously described) to receive, store, and/or access user-generated rules.

In one embodiment, as event 135 is identified, the event can be moved to event notification 116. At this point, event notification 116 can consult rules engine 2702—including any user rules generated therein—to determine whether event 135 (possibly in combination with one or more other events) satisfies any rules. In the case that event 135 (in combination with any other events) does satisfy at least one user rule, event rendering component 2704 may function to generate and/or display the notification. As previously described, rendering event 135 may include sending a notification via SMS, email, MMS, push notification, or other means. In other embodiments, rendering may include causing the notification to be displayed at an app or other user device.

Figure 27B:
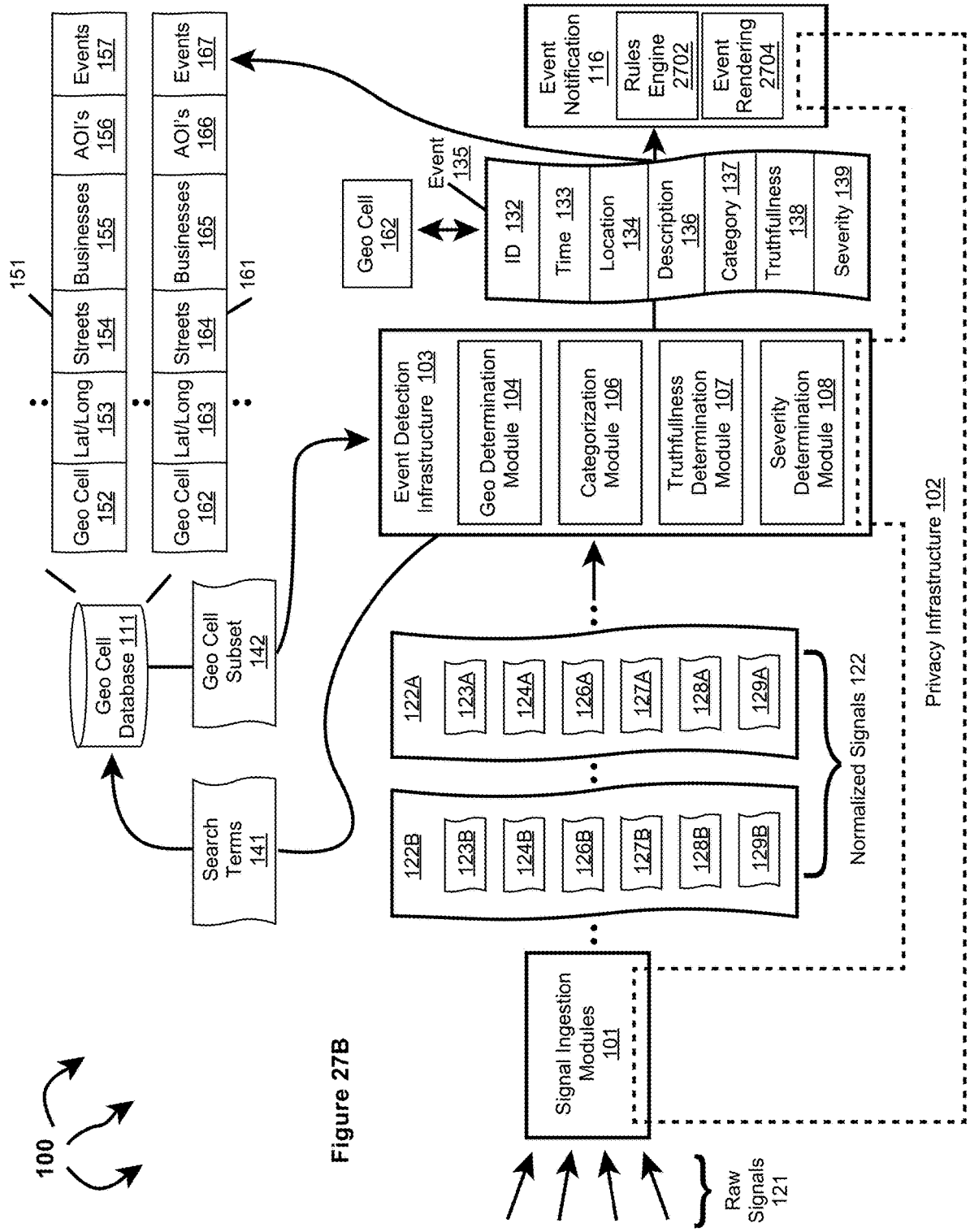
FIG. 27B illustrates the example computer architecture of FIG. 27A and includes a privacy infrastructure.

FIG. 27B depicts computer architecture 2700 including privacy infrastructure 102 (similar to FIG. 1C).

As depicted in FIG. 27B, privacy infrastructure 102 spans data ingestion modules 101, event detection infrastructure 103, and event notification 116. As such, privacy infrastructure 102 can implement and/or apply any described data privacy operations, such as, user information removal, user information scrubbing, user information stripping, user information obfuscation, access rule application, etc., at and/or through interoperation with any of: rules engine 2702 or event rendering 2704.

Figure 28:
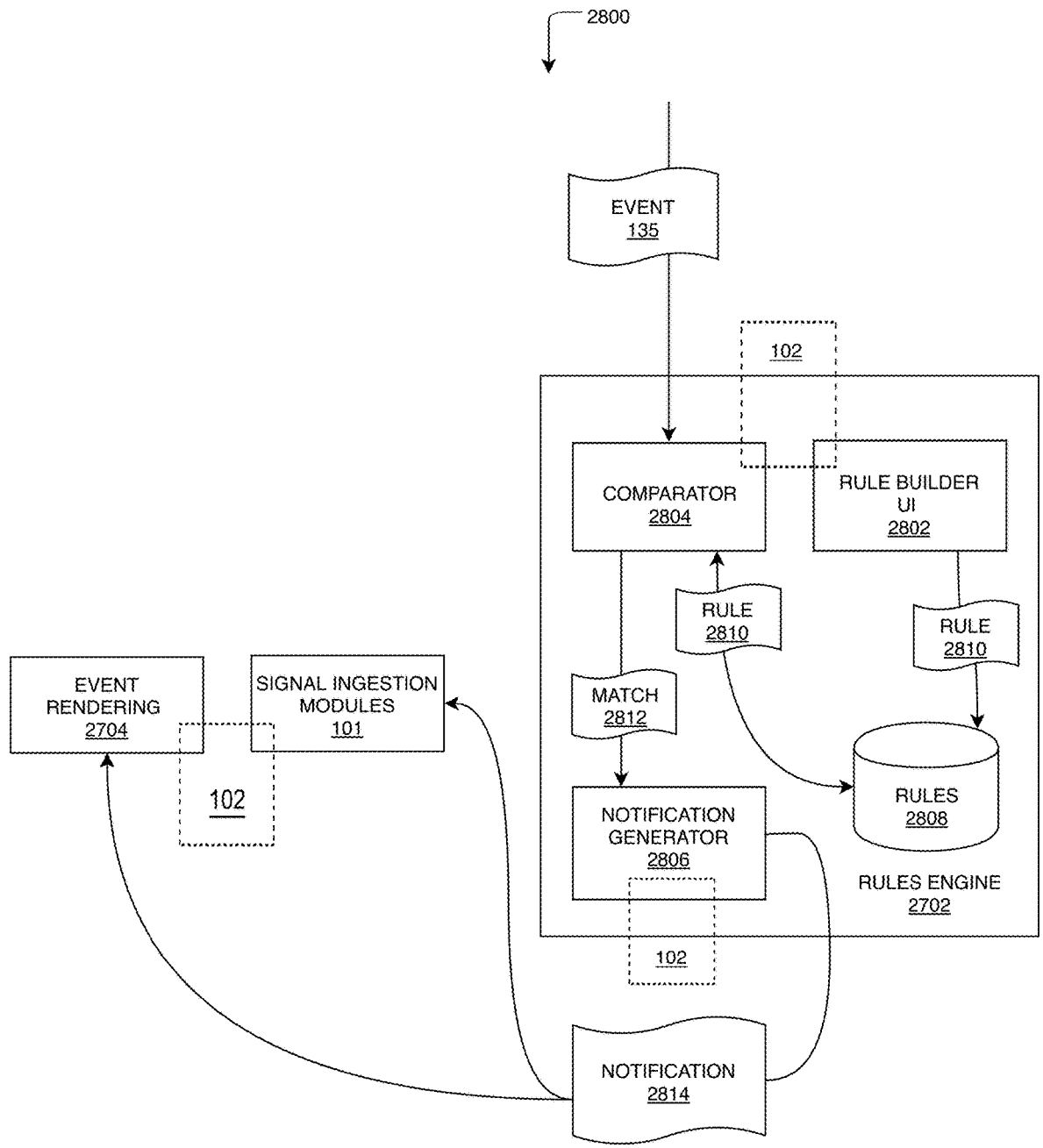
FIG. 28 depicts an example computer architecture for analyzing normalized events against user generated rules.

FIG. 28 depicts a computer architecture 2800 that includes signal ingestion modules 101, rules engine 2702, and event rendering 2704. Rules engine 2702 further includes rule builder UI 2802, comparator 2804, notification generator 2806, and rules 2808. As previously described in FIGS. 20A through 20I, rule builder UI 2802 may present a series of UI elements (e.g., in UI screens 2002A, 2002B, 2002C, 2002D, etc.) allowing a user to configure a user rule. The user rule can be configured to generate notifications when one or more (and possibly a plurality of) events matching the rule occur(s).

For example, rule builder UI 2802 may be utilized to generate rule 2810. Upon creation, rule 2810 may be stored rules 2808, such as, a database or other data structure. As depicted, rules 2808 is included within rules engine 2702, however, it is appreciated that rules engine 2702 may access rules 2808 through security layers, access control layers, or other mediating devices or structures such as the internet.

As described, event 135 can be identified from one or more normalized signals 122 and then passed through to the rules engine 2702. Comparator 2804 can compare characteristics of event 135 to rules 2808 to determine whether a rule, such as rule 2810, matches event 135.

Upon comparing characteristics of event 135 to rules 2808, comparator 2804 determines whether one or more rule conditions are satisfied. In the case a rule is satisfied, for example if event 135 matches rule 2810, comparator 2804 can pass the match 2812 to notification generator 2806 to generate an appropriate notification 2814 as per described user preferences.

Notification generator 2806 may utilize event rendering component 2704 to cause the notification events to be rendered (e.g., message sent, interface updated, etc.). For example, if a user has selected SMS notifications for rule 2810 (the rule that matched event 135), notification generator 2806 can cause an SMS notification to be sent to the user device designated within the rule (e.g., on its own, using event rendering component 2704, or using one or more other components).

In addition to providing the notification to a user, notification 2814 may also be set to signal ingestion modules 101 as a (raw) signal for ingestion, processing, and event detection. For example, the act of sending a notification to a user may be of interest to one or more entities and, thus, generating notification 2814 may result in a different matched rule and a new notification (e.g., about the original notification) being sent to a different user/entity.

As depicted in FIG. 28, privacy infrastructure 102 spans data ingestion modules 101, rules engine 2702 (including rule builder UI 2802, comparator 2804, and notification generator 2806), and event rendering 2704. As such, privacy infrastructure 102 can implement and/or apply any described data privacy operations, such as, user information removal, user information scrubbing, user information stripping, user information obfuscation, access rule application, etc., at and/or through interoperation with any of: data ingestion modules 101, rules engine 2702, rule builder UI, comparator 2804, notification generator 2806, or event rendering 2704.

Figure 29A:
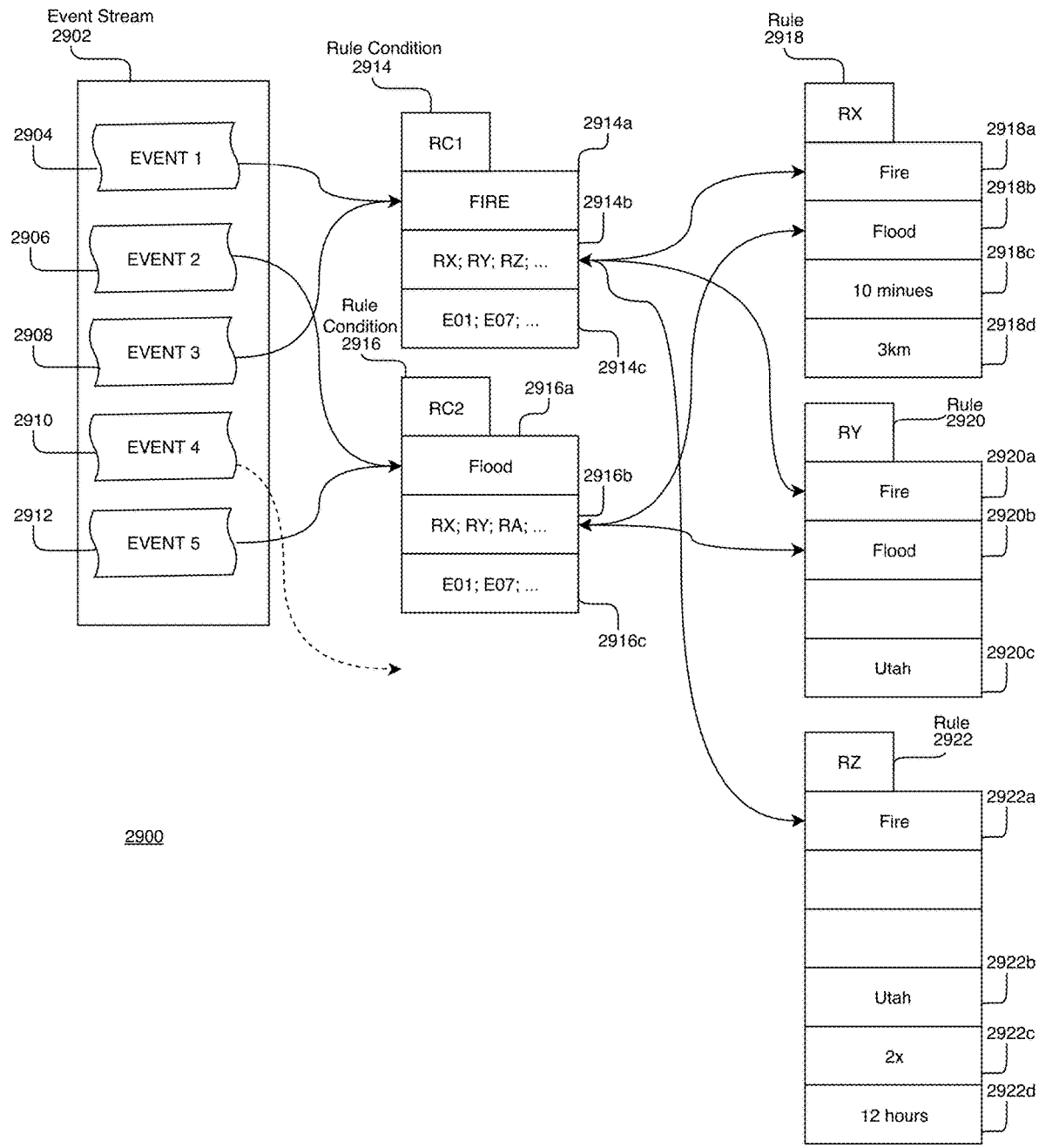
FIGS. 29A through 29E depict an embodiment for processing, tracking, and determining rule condition components from disparate events across a time window.

FIGS. 29A through 29E depict an architecture 2900 corresponding to one aspect of rules engine 2702. FIG. 29A depicts a collection of events, included in an event data stream 2902. Event data stream 2902 includes events 2904 through 2912 (e.g., similar in configuration to event 135). As previously described, such events may be detected through signal ingestion, normalization, and event detection. Events in event stream 2902, including events 2904 through 2912, may be received at different times or from different sources.

Architecture 2900 can also include one or more rule conditions, such as, rule condition 2914, rule condition 2916, etc. and one or more rules, such as, rule 2918, rule 2920, rule 2922, etc.

Rule conditions may be sub-elements and/or atomic elements of a rule. For example, rule 2918 may be composed by an entity using the previously described rule configuration interfaces (e.g., as described in FIGS. 20A through 20I). As depicted, rule 2918 includes the requirement for two event types, fire 2918a and flood 2918b, a timeframe 2918c (10 minutes), and a distance 2918d (3 km).

As previously explained, fire 2918a and flood 2918b may be combined according to an AND/OR operator such that, depending on the operator, either or both events must be present in order to satisfy the event type portion of the rule.

As depicted, fire 2918a and flood 2918b can be considered "rule conditions" within rule 2918. As depicted, rule condition 2914 includes the event type fire 2914a, and rule condition 2916 includes the event type flood 2916a.

In this way, rules can be composed of discrete rule conditions. In some embodiments, use of discrete rule conditions facilitates more efficient triggering of rules. For example, as described, an "event" may be indicative of a discrete type of activity that is occurring. Because of this, a "fire" may be detected separately form a "flood" even if they are happening at the same time within the same general location. That is, event detection may be configured to identify atomized events even within collections of concurrent events. These atomized events may then be configured to satisfy rules by satisfying rule conditions within those rules.

Rule conditions may also be tracked within a data structure that includes additional information about each rule condition. For example, rule condition 2914 includes an inverted list 2914b that may include a reference of all rules that include that particular rule condition. For example, as depicted, rule condition 2914 "RC1" is linked to rules "RX; RY; RZ; . . . " This means that the rules named "RX," "RY," and "RZ" each include a rule condition that matches rule condition 2914 for the event type of "Fire."

Rule condition 2916 "RC2" includes event type 2916a for a "Flood." Rule condition 2916 also includes inverted listing 2916b illustrating that rules "RX," "RY," and "RA" include the flood event type as at least one condition of the rule. (Rule RA is not expressly depicted in FIG. 29A)

Rule conditions 2914 and 2916 also include entity information 2914c and 2916c, respectively. In some embodiments, it may be important to ensure that whatever underlying signal was used to detect an event is authorized for viewing by an entity that has picked the rule condition. As an example, an entity may provide signals into the signal ingestion engine for event detection such as detection of power outages within the entity's facilities. However, that entity may limit access to detected events to authorized users within the entity and not, for example, to a local fire department or power company.

Thus, if a fire department creates a rule that includes a rule condition for "power outages," it may be necessary to ensure that events detected from the private entity signals (e.g., a private company) do not trigger the rule condition for the fire department (e.g., unauthorized entity).

As depicted, rule conditions 2914 and 2916 include such entity information. Upon detection of an event that satisfies a rule condition, entity information 2914c and/or 2916c can then be checked to determine whether the entity has access/authorization to the signal from which the event satisfying the rule condition was detected.

For example, a particular entity may be permitted to see events originating from (e.g., detected from) particular signal sources. Another entity may not be permitted to see events from the particular signal sources. As such, it may be necessary to include permissions information within a rule condition that can be checked to ensure that, in addition to the event type, time, location, etc., the entity that created the rule containing the rule condition is also permitted to view the events detected from the particular signal sources.

Rule condition 2914 is depicted with permissions 2914c including permissions for entity "E01" and "E07," (the ellipsis indicates that additional entities may also have permissions). Event 1 2904 is depicted as satisfying rule condition 2914 indicating that event 2904 is a "fire" event. Notably, depending on the embodiment, event 2904 may satisfy rule condition 2914 by virtue of being an event that satisfies the event-type fire 2914a and may not, at least initially, consider entity information 2914c.

However, in other embodiments, event 2904 may not be considered as meeting rule condition 2914 unless entity information 2914c is also determined to be satisfied (e.g., by determining whether an entity listed within entity information 2914c is authorized to see event 2904 based on the permissions applied to the signal used to detect event 2904). For example, if the entity that built the full rule that contained rule condition 2914 is listed within entity information 2914c, the entity can be considered authorized to receive notifications that are based (at least in part) on rule condition 2914. On the other hand, if the entity is not listed in entity information 2914c, the entity may not receive notifications even if all of the other elements of rule condition 2914 are satisfied.

As used within the examples of FIGS. 29A through 29E, entity information 2914c and 2916c can also be accessed during other processes (e.g., notification generation) to verify that an entity is authorized to receive an event notification.

As depicted, Rules 2918, 2920, and 2922 represent "full" rules (e.g., rules configured by an entity). Rule 2918 includes event type fire 2918a, event type flood 2918b, time window 2918c, and distance 2918d. As can be appreciated from previous description, rule 2918 may indicate a rule that requires a fire AND/OR a flood, within 10 minutes of each other, and within 3 kilometers of each other. Rule 2920 requires a fire AND/OR flood within Utah (no timeframe condition is provided). Rule 2922 requires a fire event to occur in Utah two times within 12 hours.

FIG. 29A depicts numerous example paths between events 2902, rule conditions 2914 and 2916, and rules 2918, 2920, and 2922. For example, event 2904 can be identified as a fire, event 2906 can be identified as a flood, event 2908 can be identified as a fire, event 2910 can be identified as an event other than a flood or a fire, and event 2912 can be identified as a flood.

Rule condition 2914 includes inverted listing 2914b depicting how rules 2918, 2920, and 2922 are linked to or associated with rule condition 2914. Rule condition 2916 includes inverted listing 2916B indicating that rules 2918, 2920, and Rule RA (not depicted) are linked to rule condition 2916

Connection lines illustrate relationships between the data stored within inverted listings 2914b and 2916b. For example, fire event type 2918a is related to inverted listing 2914b, flood event type 2918b is linked to inverted listing 2916b, and so forth. These referential elements allow the rules engine to determine which full rules rely on which rule conditions such that when a rule condition is satisfied all full rules that include that specific rule condition can be more easily identified.

Based at least in part on placing full rules within inverted listings in rule conditions, received events can be accumulated over time and used to determine whether a full rule has been triggered.

Figure 29B:
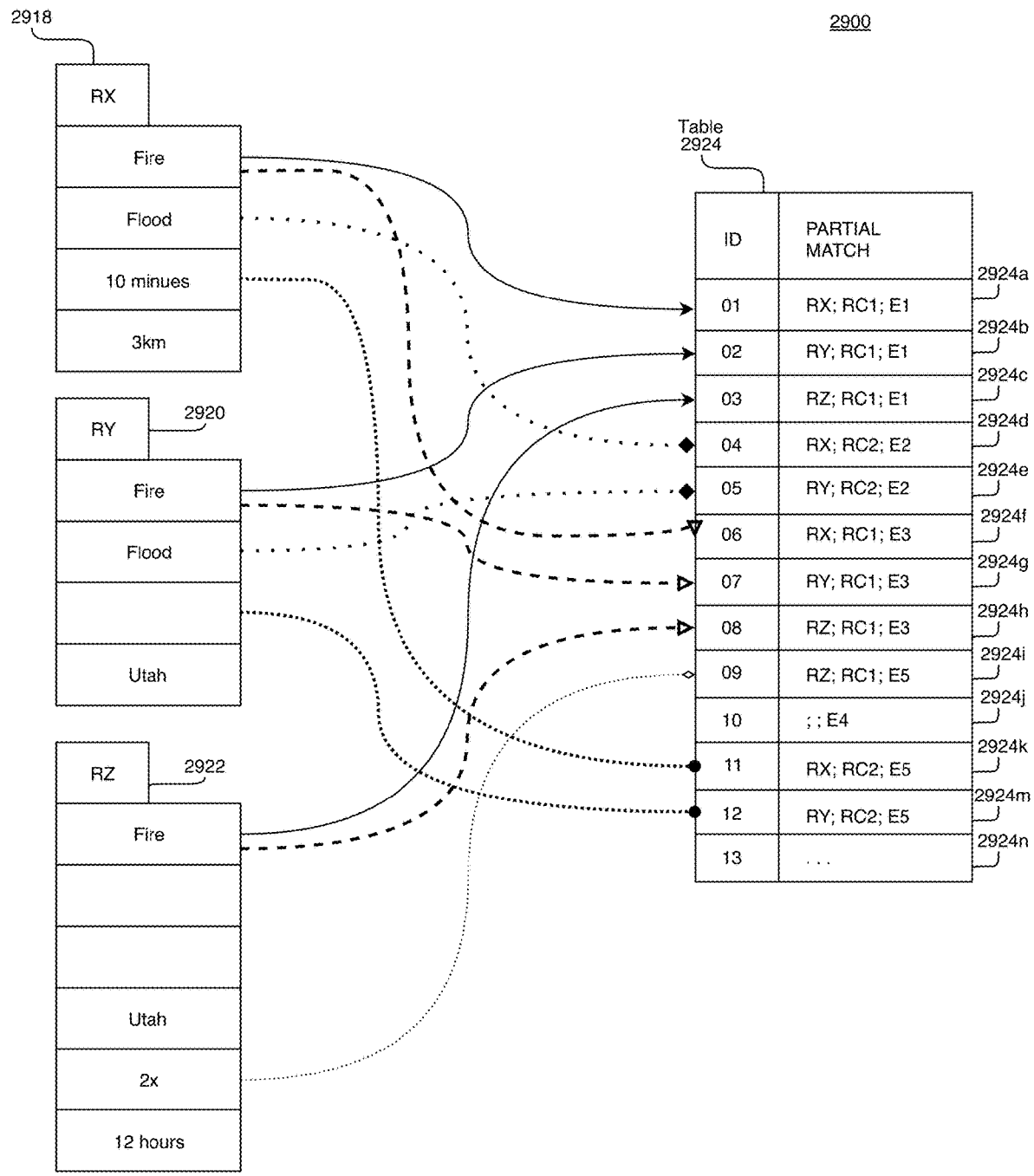

Moving to FIG. 29B, matching table 2924 is depicted. Entries within matching table 2924 are depicted with connecting lines that conceptually depict relationships among rules 2918, 2920, and 2922 and entries within the able. Matching table 2924 may allow tracking of detecting events that match rule conditions over time.

In one example depicted in FIGS. 29A and 29B, event 2904 "Event 1" is depicted as satisfying event type 2914a of rule condition 2914 (as shown using the arrow connecting event 2904 and event type 2914a). Once this connection has been determined, inverted listing 2914b can be used to determine that rules 2918, 2920, and 2922 each include rule condition 2914 within their full rule. Thus, using the inverted listing within the rule condition 2914 allows event 2904 to be associated with the full rules 2918, 2920, and 2922 through the rule condition. It is appreciated, however, that while event 2904 may be associated with the full rules, it may not fully satisfy any rule because rules may contain more than one rule condition.

Based on satisfaction of rule condition 2914, and determining that rules 2918, 2920, and 2922 include rule condition 2914, associated entries can be made in matching table 2924. For example, entries 2924a, 2924b, and 2924c can be made within matching table 2924 and include an entry for each respective rule (i.e., "RX," "RY," and "RZ"), the rule condition that was met (i.e., "RC1") and the event that met the rule condition (i.e., "E1").

Once matching table 2924 has been updated, the new entries can be referenced over time to determine whether rule conditions for a rule have been met.

Assuming for the sake of illustration that rule 2918 and rule 2920 each require an AND operation to connect their event type conditions. At a point in time, event 2904 is detected. As depicted, event 2904 satisfies rule condition 2914 for being a "fire." Using inverted table 2914b, the rules engine can identify that rule condition 2914 is included within rules 2918, 2920, and 2922. However, event 2904 alone cannot fully satisfy rule 2918 or 2920, and one occurrence of a fire is insufficient to satisfy rule 2922. As such, event 2904 may not, on its own, trigger any rule notifications.

The occurrence of event 2904 can then be stored in matching table 2924 along with the rules that include the satisfied rule condition along with an identifier of the event. As depicted, entry 2924a, 2924b, and 2924c include the identified rules "RX," "RY," and "RZ" have satisfied a rule condition "RC1" according to event "E1."

At another point in time, event 2906 is detected. As depicted, event 2906 satisfies rule condition 2916 for being a "flood." Using inverted table 2916b, the rules engine can then identify that rule condition 2916 is included within rule 2918 and 2920. However, event 2906 alone cannot fully satisfy rule 2918 or 2920. As such, event 2904 may not, on its own, trigger any rule notifications.

The occurrence of event 2906 can then be stored in matching table 2924 along with the rules that include the satisfied rule condition along with an identifier of the event. As illustrated, entry 2924d and 2924e include the identified rules "RX" and "RY" have satisfied a rule condition "RC2" according to event "E2."

Subsequently, a rules engine may check to determine whether the satisfaction of rule condition 2914 and rule condition 2916 is sufficient to satisfy one or more full rules, such as, 2918, 2920, and/or 2922. For example, the rules engine 2702 may determine whether event 2904 and event 2906 occurred within 10 minutes of each other and within 3 km of each other to satisfy rule 2918, or whether events 2904 and 2906 both occurred within Utah. Rules engine 2702 may also determine whether rule 2922 is satisfied by having at least two fire events detected within Utah within a 12-hour time window.

In a scenario where an affirmative determination has been made (i.e., satisfaction of a full rule), rules engine 2702 may generate a notification. If no affirmative determination is made, a notification is not generated. For example, it may be that events 2904 and 2906 did not fully satisfy parameters of rules 2918, 2920, or 2922. As such, no notification is generated. However, matching table 2924 is maintained. Additional events can be used for partial matches and to determine if accumulated events satisfy conditions of any full rules.

At a third time, event 2908 is detected. As depicted in FIG. 29A, event 2908 is also a fire. As such, event 2908 satisfies rule condition 2914 which is linked to rules 2918, 2920, and 2922. The occurrence of event 2908 and satisfaction of rule condition 2914 for the three full rules are then logged in the manner previously described as entries 2924f, 2924g, and 2924h within matching table 2924.

As described, after any new event (and corresponding rule conditions and associated rules) is logged in matching table 2924, rules engine 2702 may again check to see if any full rule is now satisfied based on entries in table 2924.

As depicted, with the occurrence of the second fire event (event 2908), rule 2922 is fully satisfied (two fires within Utah within 12 hours). In addition to sending the match to rule notification, an entry 2924*i* can be entered into matching table 2924 indicating that full rule 2922 has been satisfied. As such, matching table 2924 can track both the satisfaction of partial rules (i.e., rule conditions) and also the satisfaction of complete rules. Thus, rules engine 2702 may also be able to track more complex rules, for example rules that are triggered upon the occurrence of one or more full rules. For example, another rule may exist that is triggered when a different full rule has been triggered a certain number of times within a certain timeframe. In a scenario where the different full rule contains multiple rule conditions, this arrangement (a rule dependent on satisfaction of another rule) can simplify checking for rule satisfaction using rule or rule condition nesting.

At a fourth time, event 2910 is detected. Event 2910 is not associated with either rule condition 2914 or 2916. In some embodiments, the occurrence of event 2910 may be ignored by the rules engine because no current rules include rule conditions that are interested in an event type of event 2910.

In other embodiments, event 2910 may be logged in matching table 2924. However, additional information relating to a satisfied rule condition or full rule is omitted, as depicted in entry 2924*j*. In some embodiments, as new rules are created, rule conditions may be retroactively applied across entries within matching table 2924.

At a further time, event 2912 is detected. As depicted, event 2912 is a flood that may be linked to rule condition 2916 (a rule condition within at least rules 2918 and 2920). Entries 2924*k* and 2924*m* may consequently be logged in matching table 2924 to reflect the occurrence of the flood event.

Additionally, as described, rules engine 2702 may determine whether the event 2912, in addition to the prior logged events, cumulatively now satisfy any full rules. Rules engine 2702 may then generate notifications when a match is determined, and a new entry made within match table 2924 logging the full rule match.

Figure 29C:
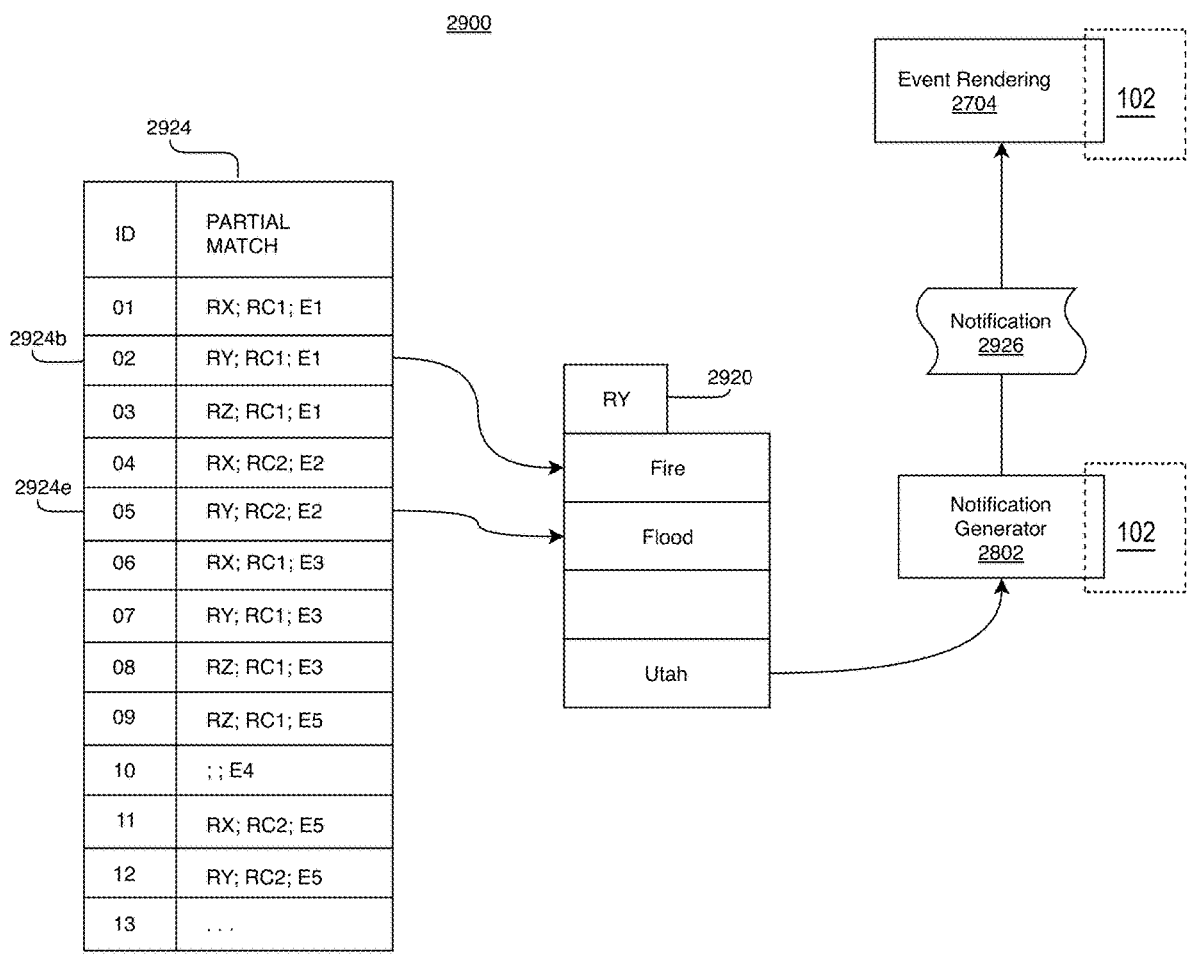

FIG. 29C depicts the matching of rule 2920 using matching table 2924. As depicted, full rule 2920 includes rule conditions for event types of "fire" and "flood." In the depicted example, an AND operator is used to combine the event types. The rule additionally includes the location of "Utah" such that a fire and flood occurring within Utah satisfy rule 2920.

Within matching table 2924, rule condition 2920*a* is logged as being satisfied with entry 2924*b* indicating the satisfaction of rule condition "RC1" (2914) within rule "RY" by event "E1," (2904) as previously described.

Rule condition 2920*b* is logged as being satisfied at entry 2924*e* upon the occurrence of event "E2" (2906). As can be appreciated, event E1 and event E2 should be assumed to have occurred within the designated location (Utah).

Upon determining that rule 2920 has been satisfied, rules engine 2702 may send the match to notification generator 2802 (previously described) that can then generate and send notification 2926 to event rendering 2704 for presentation at a user device (e.g., an SMS, email, in-app notification, etc.)

Figure 29D:
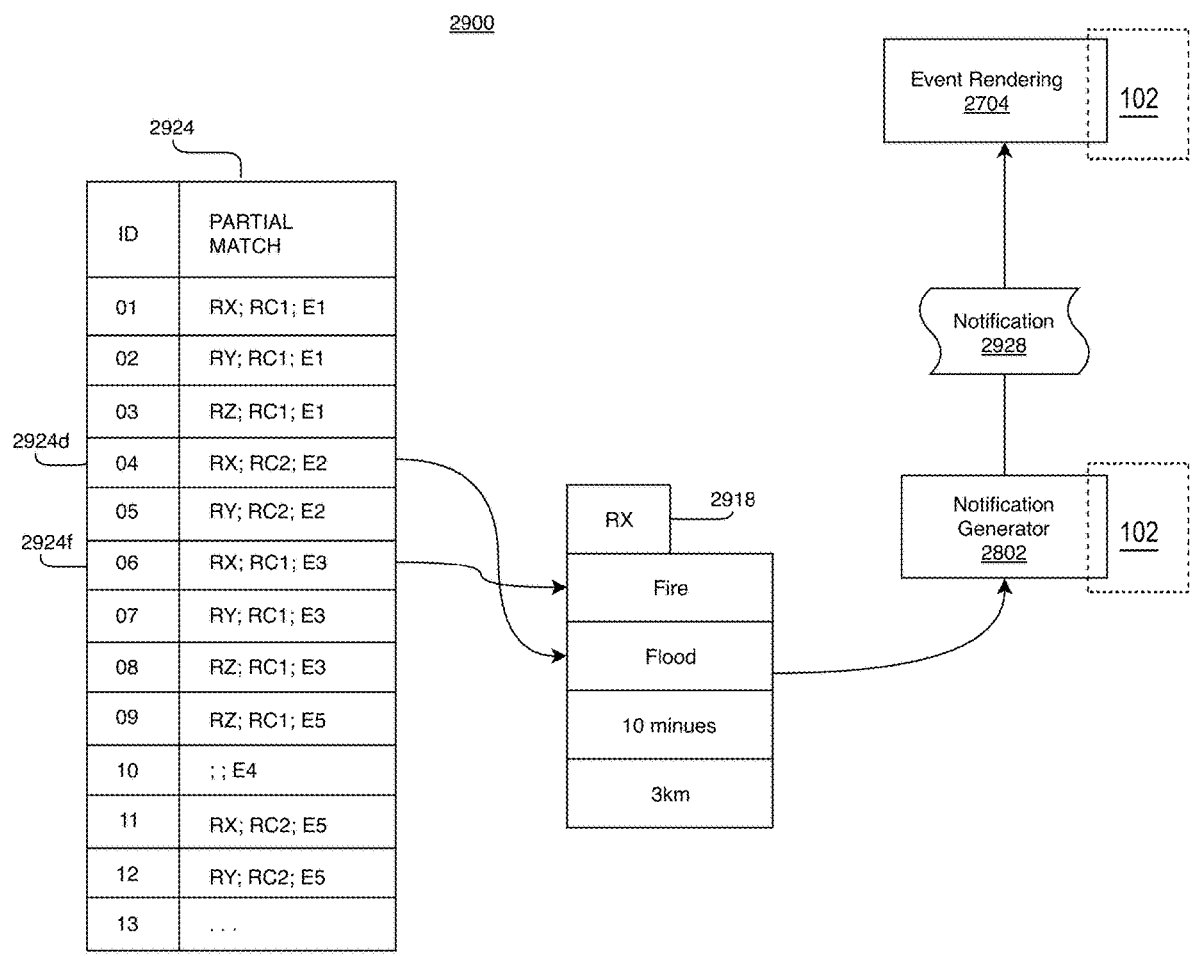

FIG. 29D depicts satisfaction of rule 2918 using matching table 2924. As depicted, rule 2918 includes the requirements for event types of "fire" (2918*a*) AND "flood" (2918*b*) that occur within 10 minutes of each other (2918*c*) and within 3 km of each other (2918*d*). In some embodiments, time windows and location requirements are treated as AND operations by default. In other embodiments, a user may be able to configure the way in which these parameters are considered matches. For the sake of the present examples, the time windows and locations are combined with the event types with AND operators.

As depicted, it is the occurrence of events "E2" (2906) and "E3" (2908) that satisfy rule 2918. The order of satisfaction of rule conditions is flexible such that rule condition "RC2" (2916) can be satisfied prior to rule condition "RC1" (2914) (or vice versa).

From entries within rule table 2924, the combination of event "E1" (2904) and event "E2" (2906) did not satisfy rule condition 2918 even though they represent both of the fire and flood event. It may be that the events did not occur within 10 minutes of each other (e.g., event "E2" occurred more than 10 minutes after event "E1") or the events occurred more than 3 km from each other.

On the other hand, another fire event, event "E3" (2908) may have occurred within 10 minutes of event "E2" (2906) and within 3 km of event "E2." As such, rules engine 2702 may determine that rule 2918 has been satisfied and trigger notification generator 2802 to generate and send notification 2928 to event rendering 2704 for presentation to a user.

Figure 29E:
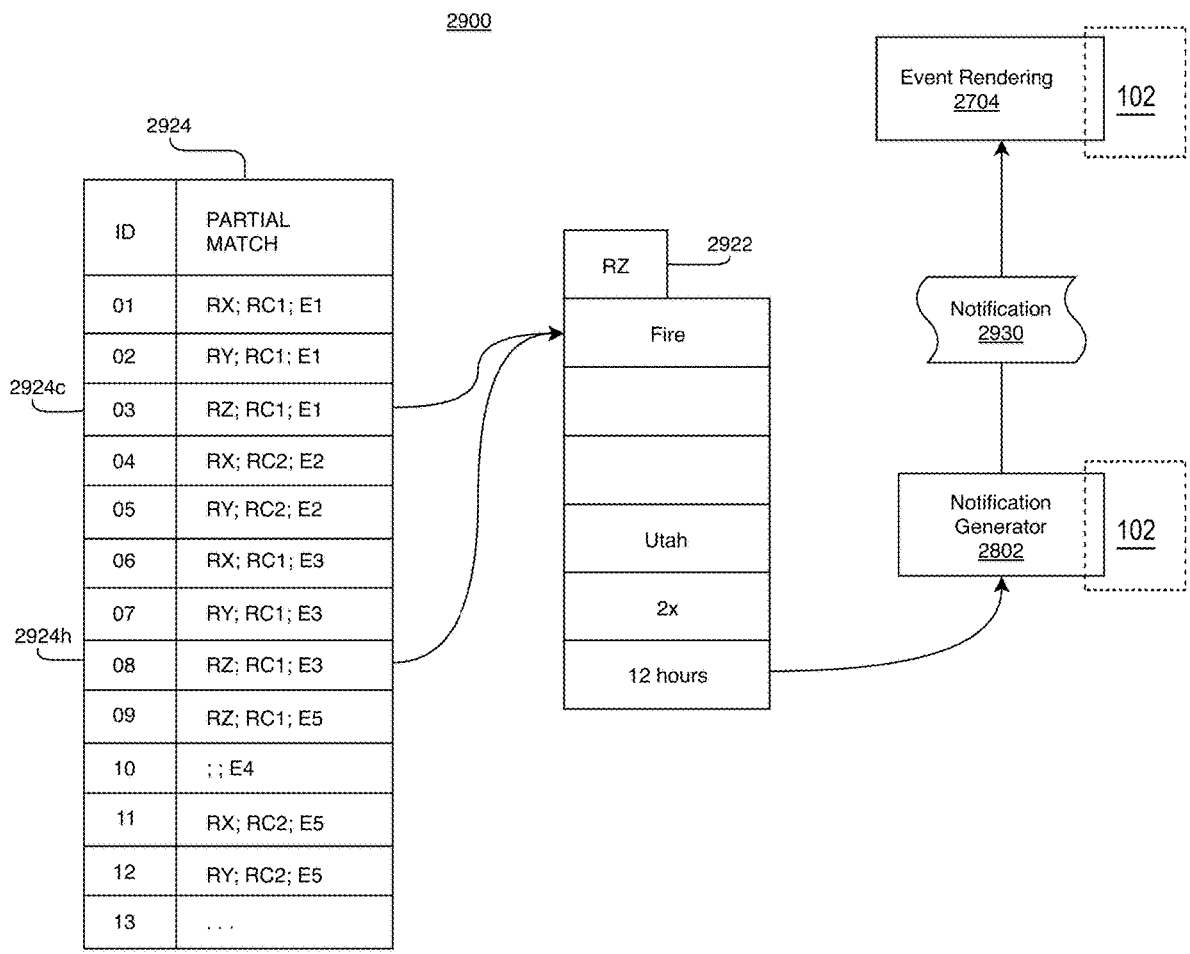

FIG. 29E depicts satisfaction of rule 2922 using matching table 2924. As depicted, full rule 2922 includes only one event type rule condition for a "fire" (2922*a*). However, full rule 2922 also indicates that notification should only occur when the event type condition occurs in Utah (2922*b*), twice (2922*c*), and within a 12-hour period (2922*d*). As depicted, it is the combination of the occurrence of event "E1" (2904) satisfying rule condition "RC1" (2914), along with the occurrence of event "E3" (2908) also satisfying rule condition "RC1," that contribute to the satisfaction of full rule 2922.

In some aspects, with respect to the examples of FIGS. 29C, 29D, and 29E, entity permissions may be checked and verified at any of several points within the system. For example, rules engine 2702 may check permissions after determining the match to a full rule but prior to sending the match to notification generator 2802. In other embodiments, notification generator 2802 may be configured to check for permissions prior to actually generating a notification (e.g., notification 2930) and sending it to the user device. As described, checking permissions may be enabled by checking an embedded source identifier associated with the signal source that was a basis for detecting an event. In some embodiments, this source identifier may be passed along with the signal and events derived from the signals by appending metadata to those elements.

The appended metadata may then be checked against another table (not shown) that associates source identifiers with entity identifiers allowed to access, see, or otherwise receiving notifications about events linked to that source identifier.

Thus, within the examples of FIGS. 29A through 29E, some embodiments may enforce authorization checking at any of several locations between receiving the events 2902 and sending notifications to an entity device.

As depicted in FIGS. 29C-29E, privacy infrastructure 102 spans event rendering 2704 and notification generator 2802. As such, privacy infrastructure 102 can implement and/or apply any described data privacy operations, such as, user information removal, user information scrubbing, user information stripping, user information obfuscation, access rule application, etc., at and/or through interoperation with any of: event rendering 2704 or notification generator 2802.

Figure 30:
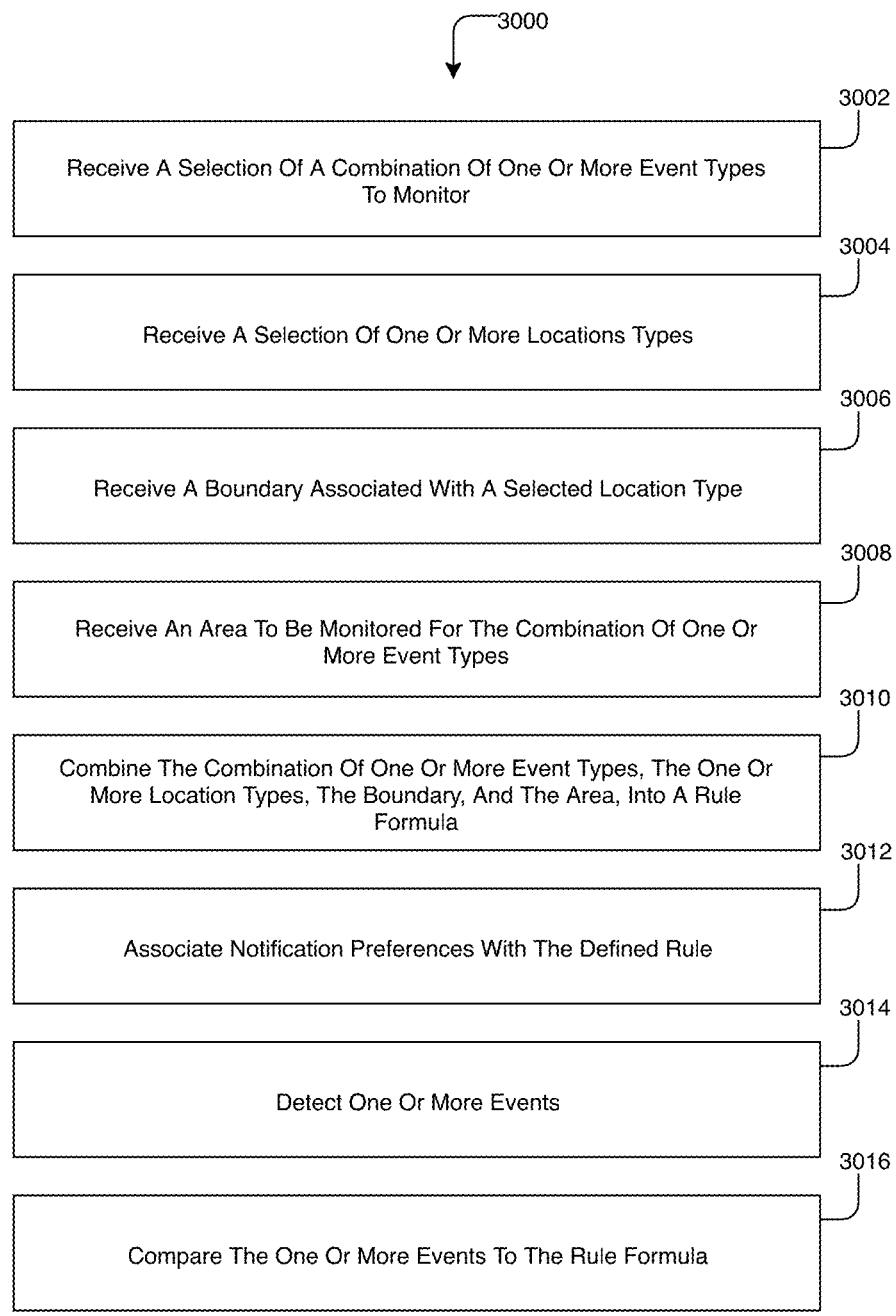
FIG. 30 depicts a method for generating notifications based on user generated rules according to an embodiment.

Moving now to FIG. 30, a method 3000 for generating notifications based on events matching user rules. Method 3000 includes receiving a selection of a combination of one or more event types for monitoring (3002). For example, a user may select one or more event types within parameter selection area 2010 as illustrated in FIG. 20B. Method 3000 includes receiving a selection of one or more locations types (3004). For example, the user selects one or more locations of interest in parameter selection area 2010 as illustrated in FIG. 20C.

Method 3000 includes receiving a boundary associated with a selected location type (3006). For example, as described in FIG. 20C, the boundary may be associated with particular locations of particular location types (e.g., hospitals, schools, airports, etc.) In some embodiments, the boundary may be the precise physical boundary defining a location. In other embodiments, the boundary may include additional area surrounding the location. For example, a radial boundary may be established with the selected location at the center. In other scenarios, the boundary may be established based on other characteristics near a location (e.g., major roads, other location types, jurisdictional boundaries, etc.)

In some embodiments, the boundary for one instance of a location type may differ from another instance of the same location type. Similarly, instances of a particular location type may have a preset boundary that differs from one or more boundaries associated with other location types. For example, the boundary around schools may be greater than the boundary around restaurants. As another example, the boundary around a school within a particular zip code may be different than the boundary around a different school in a different zip code. Thus, boundaries may be associated with locations in various ways depending on user preferences.

Method 3000 includes receiving an area to monitor for a combination of one or more event types (3008). As described in FIG. 20D through FIG. 20G, a boundary may be selected as either a pre-defined area or a custom area (FIG. 20D). In the case of selecting pre-defined areas, the user may select boundaries defined by geographic concepts such as countries, states, counties, cities, or the like (FIG. 20E). In some embodiments, boundaries may define regions that include multiple individual geographic elements (e.g., the "south-western United States" or "Northern California"). As depicted in FIG. 20G, a user may also set boundaries using drawing tools, such as drawing tools 2044.

Method 3000 includes combining the combination of the one or more event types, the one or more location types, the boundary, and the area into a rule formula (3010). For example, as described, a formulaic representation of the user-configured rule may be generated. It is appreciated that although a formula may be created, a user may not necessarily see or interact with the underlying formula. Instead, for example, a user may see their rule formula within a user interface such as UI 2000 as shown within FIGS. 20A through 20I. More specifically, a user may see the rule parameters along with rule operators (e.g., AND/OR) in a visual form rather than in a formula form.

Method 3000 includes associating notification preferences with the defined rule (3012). For example, notification parameters configured by the user in interface 2002H of FIG. 20H may be associated with the defined rule. As described within FIGS. 29A through 29E, the designation of one or more event types, locations, time windows, boundaries, distances, etc., can be used to formulate a full rule such as rules 2918, 2920, and/or 2922. Depending on the type of operators selected by the user during rule creation, the generated rules can be satisfied by corresponding combinations of rule conditions such as rule condition 2914 and/or rule condition 2916. It is appreciated that vast numbers of rule conditions are possible that that virtually limitless unique full rules are possible.

Method 3000 includes detecting one or more events (3014). For example, an event may be processed through an architecture such as architecture 2700 that includes ingesting signals through signal ingestion modules 101. These signals are then processed into normalized signals 122 and passed to an event detection infrastructure 103. An event 135 may eventually be identified and passed to Rules Engine 2702 for processing (as described in conjunction with FIG. 28). As described in FIG. 29A, normalized events can be processed and matched against rule conditions (e.g., rule conditions 2914 and/or 2916) to determine whether they contribute to full rules (e.g., full rules 2918, 2920, and/or 2922).

Method 3000 includes comparing one or more events to the rule formula (3016). As previously described, the rule formula can be represented as a combination of discrete rule conditions. Characteristics of the normalized event can then be compared to the rule conditions to determine a match. For example, as shown in FIG. 28 (and/or FIG. 29C, 29D, or 29E), event 135 is compared to rules 2808 at comparator 2804 to determine whether any rules match the event.

In some aspects, method 3000 also includes one or more privacy operations. Privacy infrastructure 102 can implement and/or apply any described data privacy operations (possibly through interoperation with modules included in one or more of: data ingestion modules 101, event detection infrastructure 103, event notification 116, rules engine 2702, rule builder UI 2802, comparator 2804, notification generator 1806, or event rendering 2704) such as, user information removal, user information scrubbing, user information stripping, user information obfuscation, access rule application, etc., prior to, during, or after any of: 3002, 3004, 3006, 3008, 3010, 3012, 3014, or 3016.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:
1. A method comprising:
receiving an indication of a location type, a boundary geometry, a user event truthfulness preference, a first event type, and a second event type;
receiving an indication of an area including a first location of the location type and a second location of the location type;
combining the location type, the boundary geometry, the area, the user event truthfulness preference, the first event type, and the second event type, into a rule formula;
monitoring the area for events occurring within a first boundary surrounding the first location or occurring within a second boundary surrounding the second location, the first boundary and the second boundary defined in accordance with the boundary geometry;
accessing first event characteristics including a first event type and a first event truthfulness corresponding to a first detected event;
identifying user information contained within the first event characteristics;
applying a data privacy operation to the user information;

accessing second event characteristics including a second event type and a second event truthfulness corresponding to a second detected event;

determining that a combination of the first characteristics and the second characteristics satisfy the rule formula subsequent to applying the data privacy operation, including determining that the first event type and the second event type occurred in combination within the first boundary and that the first event truthfulness and the second event truthfulness both satisfy the user event truthfulness preference; and automatically electronically notifying an entity in accordance with notification preferences that the rule formula was satisfied.

2. The method of claim 1, wherein applying a data privacy operation comprises permanently eliminating the user information.

3. The method of claim 1, wherein applying a data privacy operation comprises applying a cryptographic operation to the user information.

4. The method of claim 1, wherein identifying user information contained the first event characteristics comprises identifying one or more of: confidential information, patient information, personally identifiable information (PII), personal health information (PHI), sensitive personal information (SPI), or Payment Card Industry information (PCI) contained within the first event characteristics.

5. The method of claim 1, wherein applying a data privacy operation to the user information comprises applying the data privacy operation to one or more of: confidential information, patient information, personally identifiable information (PII), personal health information (PHI), sensitive personal information (SPI), or Payment Card Industry information (PCI).

6. The method of claim 1, wherein applying a data privacy operation to the user information comprises temporarily obscuring the user information.

7. The method of claim 1, further comprising:
identifying other user information contained within the second event characteristics; and
applying another data privacy operation to the other user information; and
wherein determining that a combination of the first characteristics and the second characteristics satisfy the rule formula comprises determining that a combination of the first characteristics and the second characteristics satisfy the rule formula subsequent to applying the other data privacy operation.

8. The method of claim 1, further comprising chaining together the first event type and the second event type with a logic operator selected from among an OR operator or an AND operator.

9. The method of claim 8, wherein chaining together the first event type and the second event type with a logic operator comprises chaining the first event type and the second event type together with an AND operator.

10. The method of claim 9, furthering comprising defining that an event of the first event type and another event of second event type are to occur within a specified distance of one another within a boundary defined by the boundary geometry to satisfy the AND operator.

11. The method of claim 9, furthering comprising defining that an event of the first event type and another event of the second event type are to occur within a specified time of one another within a boundary defined the boundary geometry to satisfy the AND operator.

12. The method of claim 1, wherein receiving an indication of a boundary geometry comprises receiving an indication of a boundary geometry defining a radius.

13. The method of claim 1, wherein receiving an indication of an area comprises receiving an indication of an area that completely surrounds the first boundary and the second boundary.

14. The method of claim 1, wherein combining the location type, the boundary geometry, the area, the user event truthfulness preference, the first event type, and the second event type, into a rule formula comprises determining that the entity is authorized to formulate the rule formula.

15. The method of claim 1, wherein combining the location type, the boundary geometry, the area, the user event truthfulness preference, the first event type, and the second event type, into a rule formula comprises editing another rule formula into the rule formula.

16. A system comprising:
a processor;
system memory coupled to the processor and storing instructions configured to cause the processor to:
receive an indication of a location type, a boundary geometry, a user event truthfulness preference, a first event type, and a second event type;
receive an indication of an area including a first location of the location type and a second location of the location type;
combine the location type, the boundary geometry, the area, the user event truthfulness preference, the first event type, and the second event type, into a rule formula;
monitor the area for events occurring within a first boundary surrounding the first location or occurring within a second boundary surrounding the second location, the first boundary and the second boundary defined in accordance with the boundary geometry;
access first event characteristics including a first event type and a first event truthfulness corresponding to a first detected event;
identify user information contained within the first event characteristics;
apply a data privacy operation to the user information;
access second event characteristics including a second event type and a second event truthfulness corresponding to a second detected event;
determine that a combination of the first characteristics and the second characteristics satisfy the rule formula subsequent to applying the data privacy operation, including determining that the first event type and the second event type occurred in combination within the first boundary and that the first event truthfulness and the second event truthfulness both satisfy the user event truthfulness preference; and
automatically electronically notify an entity in accordance with notification preferences that the rule formula was satisfied.

17. The system of claim 16, wherein instructions configured to apply a data privacy operation comprise instructions configured to permanently eliminate the user information.

18. The system of claim 16, wherein instructions configured to apply a data privacy operation comprise instructions configured to apply a cryptographic operation to the user information.

19. The system of claim 16, wherein instructions configured to identify user information contained the first event characteristics comprise instructions configured to identify one or more of: confidential information, patient information, personally identifiable information (PII), personal health information (PHI), sensitive personal information (SPI), or Payment Card Industry information (PCI) contained within the first event characteristics.

20. The system of claim 16, wherein instructions configured to apply a data privacy operation to the user information comprise instructions configured to apply the data privacy operation to one or more of: confidential information, patient information, personally identifiable information (PII), personal health information (PHI), sensitive personal information (SPI), or Payment Card Industry information (PCI).

21. The system of claim 16, wherein instructions configured to apply a data privacy operation to the user information comprise instructions configured to temporarily obscure the user information.

22. The system of claim 16, further comprising instructions configured to:
 identify other user information contained within the second event characteristics; and
 apply another data privacy operation to the other user information; and
 wherein instructions configured to determine that a combination of the first characteristics and the second characteristics satisfy the rule formula comprise instructions configured to determine that a combination of the first characteristics and the second characteristics satisfy the rule formula subsequent to applying the other data privacy operation.

23. The system of claim 16, further comprising instructions configured to chain together the first event type and the second event type with a logic operator selected from among an OR operator or an AND operator.

24. The system of claim 23, wherein instructions configured to chain together the first event type and the second event type with a logic operator comprise instructions configured to chain the first event type and the second event type together with an AND operator.

25. The system of claim 24, furthering comprising instructions configured to define that an event of the first event type and another event of second event type are to occur within a specified distance of one another within a boundary defined the boundary geometry to satisfy the AND operator.

26. The system of claim 24, furthering comprising instructions configured to define that an event of the first event type and another event of the second event type are to occur within a specified time of one another within a boundary defined by the boundary geometry to satisfy the AND operator.

27. The system of claim 16, wherein instructions configured to receive an indication of a boundary geometry comprise instructions configured to receive an indication of a boundary geometry defining a radius.

28. The computer system of claim 16, wherein instructions configured to receive an indication of an area comprise instructions configured to receive an indication of an area that completely surrounds the first boundary and the second boundary.

29. The computer system of claim 16, wherein instructions configured to combine the location type, the boundary geometry, the area, the user event truthfulness preference, the first event type, and the second event type, into a rule formula comprise instructions configured to determine that the entity is authorized to formulate the rule formula.

30. The computer system of claim 16, wherein instructions configured to combine the location type, the boundary geometry, the area, the user event truthfulness preference, the first event type, and the second event type, into a rule formula comprise instructions configured to edit another rule formula into the rule formula.

* * * * *